US011992710B2

(12) United States Patent
Conrad

(10) Patent No.: US 11,992,710 B2
(45) Date of Patent: May 28, 2024

(54) FILTER MASK

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 669 days.

(21) Appl. No.: 17/171,954

(22) Filed: Feb. 9, 2021

(65) Prior Publication Data

US 2021/0275841 A1 Sep. 9, 2021

Related U.S. Application Data

(63) Continuation-in-part of application No. 17/025,995, filed on Sep. 18, 2020, now abandoned, which is a continuation-in-part of application No. 16/932,118, filed on Jul. 17, 2020, now abandoned, which is a continuation-in-part of application No. 16/913,849, filed on Jun. 26, 2020, now Pat. No. 11,752,370, and a continuation-in-part of application No. 16/913,919, filed on Jun. 26, 2020, and a continuation-in-part of application No. 16/913,885, filed on Jun. 26, 2020, now Pat. No. 11,771,928.

(60) Provisional application No. 63/027,237, filed on May 19, 2020, provisional application No. 63/010,468, filed on Apr. 15, 2020, provisional application No. 63/004,803, filed on Apr. 3, 2020, provisional (Continued)

(51) Int. Cl.

*A62B 18/08* (2006.01)
*A41D 13/11* (2006.01)
*A62B 18/00* (2006.01)
*A62B 18/02* (2006.01)
*A62B 7/10* (2006.01)
*A62B 18/10* (2006.01)

(52) U.S. Cl.

CPC ........ *A62B 18/084* (2013.01); *A41D 13/1161* (2013.01); *A41D 13/1184* (2013.01); *A62B 18/02* (2013.01); *A62B 18/025* (2013.01); *A62B 7/10* (2013.01); *A62B 18/006* (2013.01); *A62B 18/08* (2013.01); *A62B 18/10* (2013.01)

(58) Field of Classification Search

CPC .... A62B 7/00; A62B 7/10; A62B 9/00; A62B 9/04; A62B 18/00; A62B 18/02; A62B 18/084; A62B 18/088; A62B 19/00; A62B 23/00–02; A41D 13/11–1192; A61M 16/06–0694

See application file for complete search history.

(56) References Cited

U.S. PATENT DOCUMENTS 5,689,833 A 11/1997 Allen et al.
6,216,693 B1 4/2001 Rekow et al.

(Continued)

OTHER PUBLICATIONS

International Search Report and Written Opinion, received in connection to international patent application No. PCT/CA2020/051792, dated Jan. 21, 2021.

(Continued)

*Primary Examiner* — Rachel T Sippel

(74) *Attorney, Agent, or Firm* — Philip C. Mendes da Costa; BERESKIN & PARR LLP/S.E.N.C.R.L., .s.r.l.

(57) ABSTRACT

A filter mask for biological material has a mask body and a strap assembly having first and second connectors each having a flared rigid portion for receiving a top strap.

12 Claims, 133 Drawing Sheets

Related U.S. Application Data application No. 62/993,480, filed on Mar. 23, 2020, provisional application No. 62/987,067, filed on Mar. 9, 2020.

(56) References Cited

U.S. PATENT DOCUMENTS

| | | | | |
|---|---|---|---|---|
| 7,077,128 | B2 | 7/2006 | Wilson et al. | |
| 2009/0044809 | A1 | 2/2009 | Welchel et al. | |
| 2009/0241961 | A1* | 10/2009 | McAuley | A61M 16/0057 128/207.18 |
| 2010/0051031 | A1 | 3/2010 | Lustenberger et al. | |
| 2011/0197341 | A1* | 8/2011 | Formica | B32B 27/08 2/209.3 |
| 2018/0250486 | A1* | 9/2018 | Amarasinghe | A61M 16/0816 |
| 2020/0269001 | A1* | 8/2020 | Guney | A61M 16/0816 |
| 2021/0187234 | A1* | 6/2021 | Tebbutt | A61M 16/0694 |
| 2022/0323702 | A1* | 10/2022 | Eves | A61M 16/024 |

OTHER PUBLICATIONS

U.S. Appl. No. 16/913,849.
U.S. Appl. No. 16/913,885.
U.S. Appl. No. 16/913,919.
U.S. Appl. No. 16/932,118.
U.S. Appl. No. 17/025,995.

* cited by examiner

FILTER MASK

CROSS-REFERENCE TO RELATED APPLICATIONS

This application:

(a) is a continuation-in part of U.S. patent application Ser. No. 17/025,995 filed on Sep. 18, 2020:

a. which is a continuation-in part of U.S. patent application Ser. No. 16/932,118 which was filed on Jul. 17, 2020 which itself is a continuation-in part of each of Ser. No. 16/913,849 filed on Jun. 26, 2020, Ser. No. 16/913,885 filed on Jun. 26, 2020 and Ser. No. 16/913,919 filed on Jun. 26, 2020, each of which claims the benefit of the filing date of U.S. Provisional Patent Application No. 62/987,067 filed on Mar. 9, 2020; U.S. Provisional Patent Application No. 62/993,480 filed on Mar. 23, 2020; U.S. Provisional Patent Application No. 63/004,803, filed on Apr. 3, 2020; U.S. Provisional Patent Application No. 63/010,468, filed on Apr. 15, 2020; and U.S. Provisional Patent Application No. 63/027,237, filed on May 19, 2020; entitled FILTER MASK; and, b. which claims the benefit of the filing date of U.S. Provisional Patent Application No. 62/987,067 filed on Mar. 9, 2020; U.S. Provisional Patent Application No. 62/993,480 filed on Mar. 23, 2020; U.S. Provisional Patent Application No. 63/004,803, filed on Apr. 3, 2020; U.S. Provisional Patent Application No. 63/010,468, filed on Apr. 15, 2020; and U.S. Provisional Patent Application No. 63/027,237, filed on May 19, 2020; entitled FILTER MASK; and, (b) claims the benefit of the filing date of U.S. Provisional Patent Application No. 62/987,067 filed on Mar. 9, 2020; U.S. Provisional Patent Application No. 62/993,480 filed on Mar. 23, 2020; U.S. Provisional Patent Application No. 63/004,803, filed on Apr. 3, 2020; U.S. Provisional Patent Application No. 63/010,468, filed on Apr. 15, 2020; and U.S. Provisional Patent Application No. 63/027,237, filed on May 19, 2020; entitled FILTER MASK, the contents of each of which are incorporated herein by reference.

FIELD

This disclosure relates generally to a filter mask (which may be referred to as a filter mask) such as a mask which may be used to filter biological contaminants from the air, such as a virus.

Introduction

The following is not an admission that anything discussed below is part of the prior art or part of the common general knowledge of a person skilled in the art.

Various types of filter masks are known. Typically, a filter mask uses a filter media that overlies the mouth and nose of a person. For example, a surgical mask or an N-95 mask may overlie the nose and mouth of a person and may be secured by tie members that wrap around a person's ears or the back of a person's head.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one aspect of the filter mask disclosed herein, which may be used by itself or with one or more other aspects disclosed herein, there is provided a mask having a strap assembly with a first connector and a second connector, each connector having a flared rigid portion for receiving a top strap. An advantage of this design is that the flared rigid portions maintain a spacing between the lateral sides of the user's head and the first and second connectors such that pressure caused by the top strap may be reduced. Another advantage is that the top strap may be adjusted to better stabilize the mask on the user's head without causing additional discomfort to the user.

In accordance with this broad aspect, there is provided a mask comprising:

a) a mask body having a front and first and second laterally opposed sides;

b) a strap assembly securable on a head of a user, the strap assembly comprising a first connector member on the first lateral side, a second connector member on the second lateral side and a top strap, the first connector member has a first rigid flared portion, the second connector member has a second rigid flared portion and the top strap has a first portion and a spaced apart second portion, wherein, when the mask is worn by a user, the top strap extends over the head of the user, the first portion is attached to the first rigid flared portion, the second portion is attached to the second rigid flared portion and each of the flared rigid portions extends outwardly from the head of the user.

In any embodiment the flared portion is attached to a portion of the strap assembly and, when the mask is worn by the user and the top strap extends over the head of the user, the flared portion may extend upwardly and outwardly at an angle in the range of 70-85° from a plane in which the portion is located.

In any embodiment, the angle may be about 80°.

In any embodiment, the top strap may be adjustable.

In any embodiment, the adjustable top strap may comprise an elastomeric material.

In any embodiment, the adjustable top strap may have an adjustable length.

In any embodiment, each connector member may be rotatable about an axis generally parallel to the head of the user such that the connector member rotates when the top strap is adjusted.

In any embodiment, the strap assembly may further comprise a rear strap which, when the mask is worn by the user, extends around a rear portion of the head of the user the, rear strap may have a first side portion on the first lateral side and a second side portion on the second lateral side and the first and second side portions may be rigid.

In any embodiment, each of the first side portion and the second side portion may have a mask body engagement end and a rearwardly disposed opposed end and the connector member may be positioned proximate the rearwardly disposed end.

In any embodiment, the first side portion and the second side portion may be convex.

In any embodiment, the first and second connector members may be positioned rearward of the external acoustic meatus of the head.

In any embodiment, the first and second connector members may be rigid.

In any embodiment, the first and second connector members may be made from a rigid plastic.

In any embodiment, the rigid plastic may be ABS, HDPE, nylon or polycarbonate.

In accordance with another aspect of this design, which may be used by itself or with one or more other aspects disclosed herein, there is provided a mask having a mask body and a first strap for extending around a head of a user. The first strap has first and second side portions that are rigid. An advantage of this design is that the rigid first and second side portions may reduce pressure on the head of the user when the mask is worn. The first and second side portions may be positioned and adjusted by each user to improve the comfort of the user when the mask is worn.

In accordance with this aspect, there is provided a mask comprising:

- a mask body having a front and first and second laterally opposed sides, each laterally opposed side having a strap attachment member; and,
- a first strap for extending around a head of a user, the first strap comprising a first side portion which, when worn by the user, extends over a portion of a first lateral side of the head of the user and a second side portion which, when worn by the user, extends over a portion of a second lateral side of the head of the user, wherein the first side portion and the second side portion are rigid.

In any embodiment, the first side portion and the second side portion may be convex.

In any embodiment, when the user is wearing glasses, the first side portion and the second side portion may be positioned laterally outwardly of temples of the glasses.

In any embodiment, each of the first side portion and the second side portion may engage the head of the user rearward of the temples of the glasses.

In any embodiment, each of the first side portion and the second side portion may engage the head of the user rearward of the external acoustic meatus of the head.

In any embodiment, the first side portion and the second side portion may be made from a rigid plastic.

In any embodiment, the rigid plastic may be ABS, HDPE, nylon or polycarbonate.

In any embodiment, each of the first side portion and the second side portion may have a mask body engagement end and a rearwardly disposed opposed end and the first strap may further comprise an adjustable band which may extend between the opposed ends of the first side portion and the second side portion.

In any embodiment, the adjustable band may comprise an elastomeric material.

In any embodiment, the adjustable band may have an adjustable length.

In any embodiment, each of the first side portion and the second side portion may have a mask body engagement end and a rearwardly disposed opposed end and the mask body engagement ends may be rotatably mounted to the strap attachment members.

In any embodiment, each of the mask body engagement ends may be removably rotatably mounted to the strap attachment members.

In any embodiment, each of the mask body engagement ends may comprise a hook and each of the strap attachment members may comprise a hook receiving portion whereby each hook receiving portion may receive one of the mask body engagement ends.

In any embodiment, each of the mask body engagement ends may comprise a pivot pin receiving portion and each of the strap attachment members may comprise a pivot pin.

In any embodiment, the mask may further comprise a second strap.

In any embodiment, the second strap may comprise a first side portion which, when worn by the user, may extend over a portion of the first lateral side of the head of the user and a second side portion which, when worn by the user, may extend over a portion of the second lateral side of the head of the user, wherein the first side portion and the second side portion of the second strap may be rigid.

In any embodiment, each of the first side portion and the second side portion may be transparent.

In any embodiment, each of the first side portion and the second side portion of each of the first strap and the second strap may be transparent.

In accordance with another aspect of this design, which may be used by itself or with one or more aspects disclosed herein, a filter mask uses one or more air treatment members that are positioned above or below a person's head. An advantage of this design is that the filter does not block the person's face. Accordingly, a medical worker, such as a doctor, may examine a patient while the patient is wearing the mask and be able to view all or substantially all of the patient's face through a transparent face plate. Similarly, if a medical worker, such as a doctor, is wearing the mask while examining the patient, the patient will be able to view all or substantially all of the medical worker's face. For example, the mask may comprise a transparent face plate that overlies at least the mouth and nose of a patient thereby rendering most or all of the patient's or medical worker's face visible.

Optionally, the face plate overlies the person's mouth, nose and eyes and accordingly may overlie all of the person's face. The face plate may be part of the mask body (e.g., a single integrally formed face plate may overlie the person's mouth, nose and eyes and form a closed volume between the face of a user and the inside of the mask). Alternately, a separate face shield that overlies the upper face of a user so as to overlie the eyes of a user, may be mountable, and optionally removably mountable, to the filter mask. An advantage of this embodiment is that the person's eyes are covered by the mask and may not be exposed to ambient air that may contain a biological contaminant. A further advantage is that a doctor may view all of a patient's face, which may improve the diagnosis of a person wearing the mask.

In accordance with another aspect of this design, which may be used by itself or with one or more other aspects disclosed herein, the mask body may include a sealing member provided on a user side of the mask body. The sealing member abuts the face of the user to form a closed volume around the mouth and nose of the user. At least a portion of the sealing member extends into the closed volume. An advantage of this design is that the sealing member may conform to each individual user's face to provide an improved seal against the user's face. In other words, the position of the seal along the sealing member may vary to improve the seal for each user.

In accordance with this aspect, there is provided a filter mask comprising:

a) a mask body having a user side that faces towards a face of the user when the filter mask is worn by a user; and, b) a sealing member provided on the user side of the mask body, wherein, when the filter mask is worn by a user, the sealing member abuts the face of the user whereby a closed volume that covers the mouth and nose of the user is provided, the closed volume having a perimeter wherein a portion of the sealing member extends inwardly of the perimeter into the closed volume.

In any embodiment, the sealing member may comprise a resilient member.

In any embodiment, the sealing member may comprise an open cell foam or a closed cell foam.

In any embodiment, the sealing member may comprise a closed cell foam having a stiffness of 10-80 on shore 00 scale.

In any embodiment, the sealing member may have a user side that abuts the face of the user when the user is wearing the filter mask, the user side of the sealing member may have an inner edge located in the closed volume and an outer edge that is spaced outwardly from the inner edge, the user side of the sealing member may have a width extending between the inner edge and the outer edge and, when the user is wearing the filter mask, only a portion of the user side of the sealing member may abut the face of a user.

In any embodiment, the portion of the user side of the sealing member that abuts the face of a user may comprise the inner edge.

In any embodiment, the sealing member may comprise a closed cell foam having a stiffness of 10-80 on shore 00 scale.

In any embodiment, the sealing member may have a user side that abuts the face of the user when the user is wearing the filter mask, the user side of the sealing member may have an inner edge located in the closed volume and an outer edge that is spaced outwardly from the inner edge, the user side of the sealing member may have a width extending between the inner edge and the outer edge wherein at least 10% of the width of the user side of the sealing member may be located in the volume.

In any embodiment, the sealing member may have a user side that abuts the face of the user when the user is wearing the filter mask, the user side of the sealing member may have an inner edge located in the closed volume and an outer edge that is spaced outwardly from the inner edge, the user side of the sealing member may have a width extending between the inner edge and the outer edge wherein at least 15% of the width of the user side of the sealing member may be located in the volume.

In any embodiment, when the filter mask is worn by a user, the closed volume may cover the mouth, nose and eyes of the user.

In accordance with another aspect of this design, which may be used by itself or with one or more other aspects disclosed herein, the filter mask includes a face plate that is permanently attached to the filter mask. The face plate provides an open volume that overlies the eyes of the user. An advantage of this design is that the face plate improves the protection of the user's eyes from contaminates, while still allowing air flow in front of the user's face to improve the comfort of the user.

In accordance with this aspect, there is provided a filter mask comprising:

a) a mask body having a user side that faces towards a face of the user when the filter mask is worn by a user wherein, when the filter mask is worn by a user, the filter mask abuts the face of the user whereby a closed volume that covers the mouth and nose of the user is provided; and, b) a face plate that is permanently attached to the filter mask wherein, when the filter mask is worn by a user, the face plate overlies the eyes of the user whereby an open volume that overlies the eyes of the user is provided.

In any embodiment, the face plate may be integrally molded with a portion of the mask body.

In any embodiment, the face plate and the portion of the mask body may be transparent.

In any embodiment, when the filter mask is worn by a user, the portion of the mask body that overlies the mouth of the user may be transparent.

In accordance with another aspect of this design, which may be used by itself or with one or more other aspects disclosed herein, the filter mask includes a face plate that is integrally formed as part of the mask body. An advantage of this design is that the speed and/or ease of manufacturing the filter mask may be improved. Another advantage of this design is that by integrally forming the face plate with the mask body the seal between the mask body and the face plate may be improved since the seam between the face plate and the mask body has been eliminated.

In accordance with this aspect, there is provided a filter mask comprising:

a) a mask body having a user side that faces towards a face of the user when the filter mask is worn by a user wherein, when the filter mask is worn by a user, the filter mask abuts the face of the user whereby a closed volume that covers the mouth and nose of the user is provided; and, b) a face plate that is integrally formed as part of the mask body wherein, when the filter mask is worn by a user, the face plate overlies the eyes of the user whereby an open volume that overlies the eyes of the user is provided.

In any embodiment, the face plate and a portion of the mask body that overlies the mouth of the user when the filter mask is worn by the user may be transparent.

In any embodiment, the face plate and a portion of the mask body that overlies the mouth and nose of the user when the filter mask is worn by the user may be transparent.

In accordance with another aspect of this design, which may be used by itself or with one or more other aspects disclosed herein, the air inlet to the filter mask faces downwardly. The air inlet may be rearward of the face of a person wearing the filter mask or below the mouth of a person wearing the mask. For example, if the air inlet is rearward of the face of a person wearing the filter mask, then the air inlet may face towards the top of a person's head. Alternately, if the filter assembly is below the mouth of a user (e.g., in front of the chin or a person wearing the filter mask) then the air inlet may face the ground. Accordingly, for example, the plane of the opening to the filter mask (the air inlet) may be perpendicular or generally perpendicular to the ground when a person is wearing the filter mask. Therefore, the air treatment member may be protected from, e.g., rain. Therefore, the air treatment member is less likely to become wet if the filter mask is worn by a person when it is raining.

In accordance with this aspect, there is provided a filter mask comprising:

(a) a mask body which, when worn by a user, abuts the face of the user and covers the mouth and nose of the user; and, (b) a filter assembly that is suitable for having a filter media housed therein, the filter assembly having a port for airflow therethrough as the user breathes, wherein when the filter mask is worn by a user and the user is standing upright, the port faces downwardly.

In any embodiment, when the user is wearing the mask, the filter assembly may be positioned below a mouth of the user and a portion of the mask body overlying the mouth may be transparent.

In any embodiment, the filter media may be removably receivable in the filter assembly while the filter mask is worn by a user.

In any embodiment, the filter media may be removable through the port.

In any embodiment, the filter assembly may have a cavity in which the filter media may be removably receivable and the port may be located at the entrance to the cavity.

In any embodiment, the cavity may have an insertion direction for the filter media, the cavity may be defined by walls and, when the filter media is positioned in the cavity, the filter media may be recessed inwardly of the port in the insertion direction and a portion of the walls may define a descending lip which may extend outwardly of the filter media in a direction that is opposite to the insertion direction.

In any embodiment, the port may be used for inhalation and exhalation.

In any embodiment, the filter media may be provided in a filter cartridge and the filter cartridge may have an inhalation side and an exhalation side.

In any embodiment, the filter media may be provided in a filter cartridge and, when the filter cartridge is positioned in the filter assembly, a portion of two opposed sides of the filter cartridge may be visible whereby the portions provide gripping surfaces for removal of the filter cartridge from the filter assembly.

In any embodiment, the filter assembly may have a cavity in which the filter cartridge may be removably receivable, the cavity may have an insertion direction for the filter cartridge, the cavity may be defined by walls that extend in the insertion direction and the portion of two opposed sides of the filter cartridge may extend outwardly of two of the walls of the cavity when the filter cartridge is inserted in the cavity.

In any embodiment, the filter media may be provided in a filter cartridge and the filter cartridge may have a handle.

In any embodiment, the filter assembly may be openable.

In any embodiment, the filter assembly may have a cavity in which the filter cartridge may be removably receivable, the cavity may have an insertion direction for the filter cartridge, the cavity may be defined by walls that extend in the insertion direction and one of the walls may be moveable between a closed position in which the filter cartridge may be secured in the cavity and a removal position in which the filter cartridge may be removable from the cavity.

In any embodiment, the filter cartridge may be lockingly receivable in the cavity.

In any embodiment, the filter cartridge may have a first engagement member which may mate with a second engagement member when the filter cartridge is positioned in the cavity and the one of the walls is in the closed positioned whereby the filter cartridge may be lockingly receivable in the cavity.

In any embodiment, the one of the walls may be pivotally mounted to the filter assembly.

In any embodiment, the one of the walls may have a guide surface.

In any embodiment, the filter media may be provided in a filter cartridge and the filter material may be removably receivable in the filter cartridge.

In accordance with another aspect, which may be used by itself or with one or more other aspects disclosed herein, the filter mask may have a solid/liquid outlet and storage container. For example, in the case of emesis, the vomit from a patient who is wearing the filter mask may flow downwardly into the storage container. An advantage of this design is that the air treatment member is spaced from the vomit and will not be soiled by the vomit and may therefore continue to function even after the patient has vomited.

In accordance with another aspect of this design, the faceplate may be provided with a speaker, such as a vibratory diaphragm, so as to enable a medical worker to more clearly understand what a patent says. Alternately, the face plate itself may be designed as a vibratory diaphragm or as a resonant member so as to better transmit the words that are said by a patient wearing the mask. Alternately, the filter mask may include a speaker that may be connected, e.g., wirelessly such as by Bluetooth™ to a remote speaker (e.g., a mobile phone).

In accordance with another aspect, which may be used by itself or with one or more other aspects disclosed herein, the filter mask has a replaceable filter assembly. Accordingly, the mask body of a filter mask may have a filter assembly that is removably attachable thereto. For example, the mask body may have one or more inlet and outlet ports that are removably connectable to one or more inlet and outlet ports on a filter assembly. Alternately, the filter mask may have a recess or cavity or the like for removably receiving a filter holder (which may also be referred to as a filter cartridge). The replaceable filter assembly or filter holder may have any one or more features disclosed herein. An advantage of this design is that the filter assembly or filter holder may be replaced with a new or a cleaned filter assembly or filter holder while the person continues to wear the mask. Also in accordance with this aspect, different filter assemblies or filter holders may be provided. For example, the filter assemblies or filter holders may use different filter materials and/or may provide differing levels of filtration. Accordingly, a mask body may be modified to provide enhanced filtration by only changing the filter assembly or the filter media or the filter holder. Also, due to supply constraints, there may be a limited supply of certain filter materials. Accordingly, a filter assembly or filter holder having a desired degree of filtration may be fabricated from available filter materials without concern for the size or configuration of a filter housing. According, filter assemblies or filter holders using different filter materials and different configurations or sizes may be useable with a common mask body by, e.g., configuring the inlet and outlet ports of a filter assembly to mate with those of an existing mask body by sizing a filter holder to be slideably receivable in a recess of a filter mask. Alternately, different sized filter masks (e.g., an adult sized mask and a child sized mask) may use the same filter holder.

In accordance with this aspect, there is provided a filter mask comprising:

(a) a mask body which, when worn by a user, abuts the face of the user and covers the mouth and nose of the user; and, (b) a filter assembly having a cavity in which a filter cartridge is removably receivable, wherein a filter material is removably receivable in the filter cartridge.

In any embodiment, the filter cartridge may be openable whereby the filter media may be removable when the filter cartridge is opened.

Optionally, a mask body may have two or more filter assemblies concurrently attachable thereto such that, at any one time, the mask body may have two filter assemblies attached thereto. For example, one filter assembly may be attached to one or more inlet and outlet ports and another filter assembly may be attached to a one or more alternate inlet and outlet ports. A valve may be provided to selectively close the flow path between one of the filter assemblies and the mask body or each of the filter assemblies and the mask body. An advantage of this design is that one of the filter assemblies may be used as a backup filter assembly in case the other filter assembly is damaged. Alternately, the air flow path from a filter assembly to the mask body may be closed while a filter assembly is being replaced.

In accordance with another aspect, which may be used by itself or with one or more other aspects disclosed herein, a filter assembly may comprise a multilayer filter. Accordingly, a plurality of filter media having different pore sizes may be used. An advantage of this design is that the filter media that is provided to filter a biological contaminant (the biological filter media) may have one or more porous filter members upstream thereof when a person inhales. The more porous material may therefore protect the biological filter media from particulate contaminants in the ambient and/or moisture in the ambient. Alternately, or in addition, the biological filter media may have one or more porous filter members upstream thereof when a person exhales. The more porous material may therefore protect the biological filter media from particulate contaminants in the air and/or moisture in the air when a person exhales. The more porous filter media may be removable for cleaning or replacement. Such more porous material may comprise foam (e.g., a reticulated polyurethane foam) and/or felt. The more porous filter media will inhibit or prevent larger particulate matter from travelling to the smaller pore sized biological filter material.

In accordance with another aspect, which may be used by itself or with one or more other aspects disclosed herein, one or more filter members of a filter assembly may be positioned in a filter holder with a portion of the filter material extending outwardly of the filter holder. For example, the filter holder may have an opening on one side and the filter member may extend through the opening. Optionally, an opening is also provided on an opposed side of the filter holder and the filter member may extend outwardly through each of the opposed sides of the filter holder. An advantage of this design is that the filter member may be slid into position in the filter holder by inserting the filter member into the opening on a first side of the filter holder and then sliding the filter member longitudinally through the filter holder so that a portion of the filter member extends outwardly of the second opposed end of the filter holder while another portion of the filter member is positioned outwardly of the first side of the filter holder. The filter member may be secured in position in the filter holder by applying an adhesive, such as glue from a hot melt glue gun 164 and/or silicone, at a location at which the filter member exits the filter holder. For example, the adhesive may be applied on the exterior of the filter holder along the perimeter of the opening through which the filter material extends. An advantage of this design is that the adhesive (the sealing member) is visible from the exterior of the filter holder so that the seal may be easily inspected.

In accordance with another aspect, which may be used by itself or with one or more other aspects disclosed herein, the mask body may have a sealing member that includes a deformable portion that seals around the temples of eyeglasses. An advantage of this design is that the mask body may provide a full seal for the face of a user even if the user is wearing glasses. Alternately, or in addition, a deformable member may be provided for placement on the temples of eyeglasses so as to form a seal when the mask is placed on the face of a person who is wearing glasses. Such an embodiment may be used if the face plate of the filter mask overlies the eyes of a person wearing the filter mask. Alternately, if the filter mask only overlies the mouth and nose of a person wearing the filter mask, then the upper end of the mask body may have recessed portions into which the eyeglasses of a person may seat.

In accordance with another aspect, which may be used by itself or with one or more other aspects disclosed herein, the mask body may have a sealing member wherein only a portion of the sealing member, e.g., an inner edge, may contact the face of a user. For example, the angle between the user side of a sealing member and the face of a user may be sufficiently acute such that only a portion of the user side of the face seal abuts the face of a user and most of the user side of the sealing member may be spaced from the face of a user. Accordingly, the contact between the seal and the face of a user may be concentrated on a small area of the sealing member. Therefore, if the sealing member is relatively stiff (e.g., 10-80 or 35-50 on shore 00 scale), a good seal may still be provided.

In accordance with another aspect, which may be used by itself or with one or more other aspects disclosed herein, the mask may have an openable port through which a biological sample may be taken. For example, a lower portion of the face plate may have an openable port through which a doctor may insert a swab to take a sample from, e.g., a person's mouth or nose. Alternately, a port may extend through the filter assembly or filter holder. Optionally, a deformable membrane or a duck bill valve may be provided proximate the port. The membrane may deform or the valve may open to permit the swab to extend therethrough. Alternately, or in addition, a sealing member may be provided on the stem of the, e.g., swab. Accordingly, as the swab is inserted through the opened port, the sealing member (e.g., silicon) may abut the outer side of the port to seal the port as the swab is inserted. Another advantage of the openable port is that the person may open the port to drink through a straw.

In accordance with another aspect, which may be used by itself or with one or more other aspects disclosed herein, one or more fans (e.g., such as a fan that may be typically used to cool a CPU and which may therefore be referred to as a CPU fan), may be incorporated into the mask and, optionally, into the filter assembly. The one or more fans may be powered by an on board energy storage member, such as a battery or a capacitor, which may be rechargeable in situ and/or removable for replacement or recharging. The one or more fans may be used to assist during inhalation and/or exhalation but may optionally only be used for assisting with inhalation. An advantage of this design is that a user is provided with assistance to draw air through the filter media. If the fan is provided in the exhalation path, then the fan may utilize a propeller fan blade design.

In accordance with this aspect, there is provided a filter mask comprising:

(a) a mask body which, when worn by a user, abuts the face of the user and covers the mouth and nose of the user; and (b) a filter assembly that is suitable for having a filter media housed therein, the filter assembly having a port for airflow therethrough, wherein a first fan is provided downstream of the port in a direction of flow of air during inhalation and the first fan comprises a motor and a propeller.

In any embodiment, the port may be used for inhalation and exhalation whereby air may travel past the first fan during both inhalation and exhalation.

In any embodiment, the filter mask may have an inhalation passage and an exhalation passage and the first fan may be provided in the inhalation passage.

In any embodiment, a second fan may be provided in the exhalation passage.

In any embodiment, the filter media may be provided in a filter cartridge, the filter cartridge may have an inhalation side and an exhalation side and the first fan may be provided on the inhalation side.

In any embodiment, the first fan may produce an air flow of 6 to 18 liters/minute.

In any embodiment, the filter mask may further comprise an energy storage member operably connected to the fan and the energy storage member may be rechargeable while positioned in the filter mask.

In any embodiment, the filter mask may have a charging port.

In any embodiment, the filter media may comprise a HEPA filter media.

In any embodiment, the filter media may be provided in a filter cartridge, the filter cartridge may have first and second opposed sides and walls extending between the opposed sides wherein the walls and opposed sides may define a cavity in which the filter media is positioned, the first opposed side may have a first port for air flow therethrough, the second opposed side may have a second side surface having a second port for air flow therethrough wherein, during inhalation, air may travel from the first port, through the filter media and through the second port, the fan may be provided downstream of the second port and the second port may be provided on only one end of the second side surface.

In any embodiment, the second port may occupy less than 50% of the second side.

In any embodiment, the first side may be open and may comprise the first port.

In any embodiment, during inhalation, the cavity may have a downstream side and the downstream side of the cavity may include a header.

In any embodiment, the header may be positioned between the filter media and the second side surface.

In accordance with this aspect, there is also provided a filter mask comprising:

(a) a mask body which, when worn by a user, abuts the face of the user and covers the mouth and nose of the user; and, (b) a filter assembly that is suitable for having a filter media housed therein, wherein the filter mask has an inhalation passage and an exhalation passage, the filter media is provided in the inhalation passage and a first fan is provided in the inhalation passage.

In any embodiment, the filter media may be also provided in the exhalation passage and a second fan may be provided in the exhalation passage.

In any embodiment, the filter mask may further comprise an energy storage member operable connected to the fan and the energy storage member may be rechargeable while positioned in the filter mask.

In accordance with another aspect, which may be used by itself or with one or more other aspects disclosed herein, there is provided a filter mask having a filter cartridge with first and second ports for airflow and a fan provided downstream of the second port wherein the second port occupies less than 50% of a second side of the filter cartridge. An advantage of this design is that the same port may be used for inhalation and exhalation. A common passageway may allow the fan to be used for regenerative energy recovery.

In accordance with this aspect, there is provided a filter mask comprising:

(a) a mask body which, when worn by a user, abuts the face of the user and covers the mouth and nose of the user;

(b) a filter cartridge having first and second opposed sides and walls extending between the opposed sides wherein the walls and opposed sides define a cavity in which the filter media is positioned, the first opposed side has a first port for air flow therethrough, the second opposed side has a second side surface having a second port for air flow therethrough wherein, during inhalation, air travels from the first port, through the filter media and through the second port; and, (c) a fan provided downstream of the second port wherein the second port is provided on only one end of the second side surface such that the second port occupies less than 50% of the second side.

In any embodiment, the first side may be open and may comprise the first port.

In any embodiment, during inhalation, the cavity may have a downstream side and the downstream side of the cavity may include a header that may be positioned between the filter media and the second side surface.

In accordance with another aspect, which may be used by itself or with one or more other aspects disclosed herein, the separate inhalation and exhalation channels may be provided. For example, one or more inhalation channels may be provided on one lateral side of the mask and one or more exhalation channels may be provided on the other opposed lateral side of the mask. Therefore, during inhalation, air may be drawn downwardly on one lateral side of the volume between the mask and the face of the user and, during exhalation, air may travel upwardly along the opposed lateral side of the volume. An advantage of this design is that a circulation pattern may be set up in the volume. Such a circulation pattern will assist in reducing carbon dioxide build up in the volume. In addition, the circulation may assist in reducing, inhibiting or preventing fog build up on the inside of the faceplate of the mask.

In accordance with another aspect, which may be used by itself or with one or more other aspects disclosed herein, water may be added to the air entering the filter mask, which may thereby cool the air inhaled by a person wearing the filter mask. For example, if a multilayer filter is used, the outer more porous filter media (e.g., foam), may be provided with water.

In accordance with another aspect, which may be used by itself or with one or more other aspects disclosed herein, the frame of a filter mask that can removably receive a filter holder may be made of a closed cell foam or a reinforced closed cell foam. An advantage of this design is that the frame of a filter mask that can removably receive a filter holder may be made of a flexible material. Also, a closed cell foam, which is a non-traditional frame material, may be used. In alternate embodiments, the frame member may be made of molded plastic or stamped metal. A plastic or stamped metal frame may include a spring section whereby the frame may provide a spring force to bias the sealing member or a contact portion of the sealing member against the face of a user.

In accordance with another aspect, which may be used by itself or with one or more other aspects disclosed herein, copper, silver zinc or a mixture thereof may be provided, e.g., vapour deposited or plasma sprayed) on some or all of the frame to provide an anti-microbial property to the frame.

In accordance with another aspect, which may be used by itself or with one or more other aspects disclosed herein, copper, silver zinc or a mixture thereof may be provided to a formed foam, e.g., an open cell foam, to reduce the pore size of the open cells and thereby increase the degree of filtration provided by the treated open cell foam. For example, nanoparticles of copper, silver, zinc, or a mixture thereof may be introduced into foam to form a metal coated foam filter media or vapour deposited on foam to form a metal coated foam filter media or foam may be subjected to a plasma spray to form a metal coated foam filter media. For example, an open cell foam such as polypropylene, with 0.2-100, 0.5-50 or 3-25 micron pores prior to deposition, can be converted to have 0.05-0.1 micron pores after deposition.

In accordance with another aspect, which may be used by itself or with one or more other aspects disclosed herein, there is provided a filter mask having a face plate or face shield that is spaced from the face of a person wearing the filter mask. Such a face plate or face shield may be a separate face shield that overlies the upper face of a user so as to overlie the eyes of a user. Such a face plate or face shield may be mountable, and optionally removably mountable, to the filter mask. An advantage of this design is that the face plate may provide additional protection to the user by protecting the eyes of the user from airborne contaminates, as described previously.

In accordance with this aspect, there is provided a filter mask comprising:

(a) a mask body which, when worn by a user, abuts the face of the user and covers the mouth and nose of the user;

(b) a filter assembly removably mounted to the mask body, the filter assembly comprising a fan and a cavity that is suitable for having a filter media housed therein; and, (c) a face plate, wherein an air flow passage extends between an inlet port of the filter assembly and the mask body.

In any embodiment, the face plate may be removably mounted to the filter mask.

In any embodiment, the face plate may be removably mounted to the mask body.

In any embodiment, the face plate may be removably mounted between the filter assembly and the mask body.

In any embodiment, the filter mask may further comprise a mounting assembly removably mounting the filter assembly to the mask body and the mounting assembly may extend through an opening in the face plate.

In any embodiment, the mounting assembly may comprise a first mounting member provided on the filter assembly and a second mounting member provided on the mask body and the mounting members may define a portion of the air flow passage.

In any embodiment, the filter assembly may be rotatably mounted to the mask body.

In any embodiment, the face plate may be spaced from a face of the user.

In any embodiment, when the user is wearing the filter mask, the face plate may be positioned on a side of the mask body opposed to the face of a user.

In accordance with another aspect, which may be used by itself or with one or more other aspects disclosed herein, there is provided a filter mask having a face plate that is removably mounted to the filter mask. An advantage of this design is that the face plate may be offset from the face of the user, reducing the discomfort of the user by increasing the possibility of air flow across the user's face while protecting the user from airborne contaminates.

In accordance with this aspect, there is provided a filter mask comprising:

(a) a mask body which, when worn by a user, abuts the face of the user and covers the mouth and nose of the user;

(b) a filter assembly removably mounted to the mask body, the filter assembly comprising a cavity that is suitable for having a filter media housed therein; and, a face plate that plate is removably mounted between the filter assembly and the mask body.

In any embodiment, the filter mask may further comprise a mounting assembly removably mounting the filter assembly to the mask body and the mounting assembly may extend through an opening in the face plate.

In any embodiment, the mounting assembly may comprise a first mounting member provided on the filter assembly and a second mounting member provided on the mask body and the mounting members may define a portion of the air flow passage.

In any embodiment, the filter assembly may be rotatably mounted to the mask body.

In any embodiment, the face plate may be spaced from a face of the user.

In any embodiment, when the user is wearing the filter mask, the face plate may be positioned on a side of the mask body opposed to the face of a user.

In accordance with another aspect, which may be used by itself or with one or more other aspects disclosed herein, there is provided a filter mask having a removable face plate. An advantage of this design is that the face plate may be easily removed for cleaning, thereby improving the ability of the mask to be sanitized.

In accordance with this aspect, there is provided a filter mask comprising:

(a) a mask body which, when worn by a user, abuts the face of the user and covers the mouth and nose of the user;

(b) a filter assembly removably mounted to the mask body, the filter assembly comprising a cavity that is suitable for having a filter media housed therein; and, a face plate that plate is removably mounted to the filter mask.

In any embodiment, the face plate may be removably mounted to the mask body.

In any embodiment, the face plate may be removably mounted between the filter assembly and the mask body.

In any embodiment, the filter mask may further comprise a mounting assembly removably mounting the filter assembly to the mask body and the mounting assembly may extend through an opening in the face plate.

In any embodiment, the filter assembly may be rotatably mounted to the mask body.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 120 is a bottom perspective exploded view of the filter assembly of FIG. 118;

FIG. 121 is a schematic view of an exemplary embodiment of a steam cleaning system;

FIG. 122 is a schematic view of a further exemplary embodiment of a steam cleaning system;

FIG. 123 is a front perspective view of a further alternate embodiment of a filter mask having a face plate;

FIG. 124 is a front perspective view of the filter mask of FIG. 123 with the face plate removed;

FIG. 125 is a rear perspective view of the filter mask of FIG. 123 with the face plate removed;

FIG. 126 is a front exploded view of the filter mask of FIG. 123;

FIG. 127 is a front perspective view of a further alternate embodiment of a filter mask having a mask body with a face plate when worn by a user;

FIGS. 128A and 128B are front and rear views respectively of the mask body and face plate of FIG. 127;

FIGS. 129A and 129B are top and side views respectively of the mask body and face plate of FIG. 127;

FIG. 130 is a rear perspective view of the mask body and face plate of FIG. 127;

FIG. 131 is a bottom perspective view of the mask body and face plate of FIG. 127;

Figure 127:
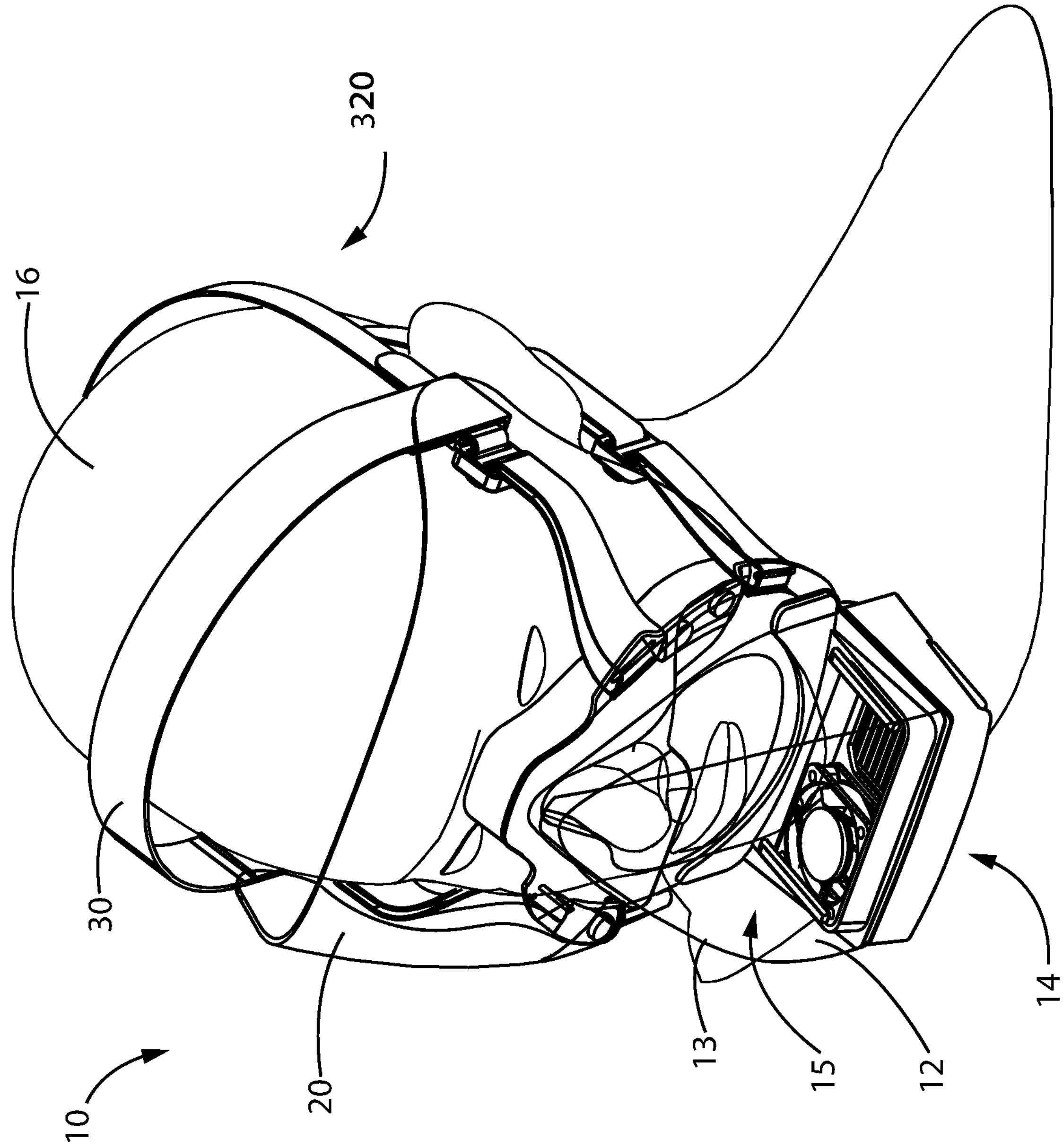
Figure 128B:
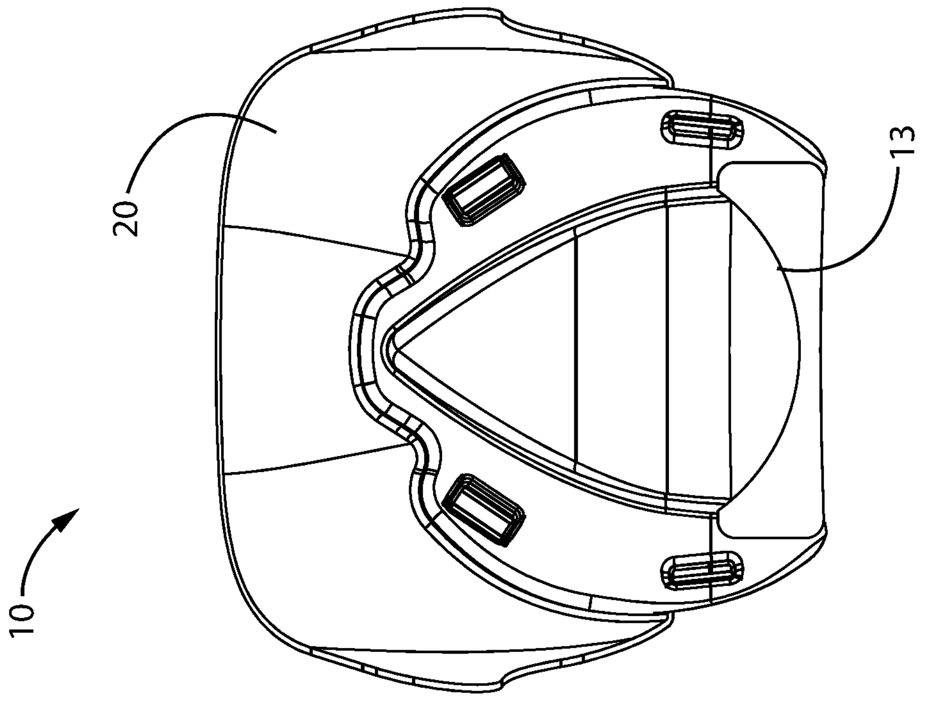
Figure 128A:
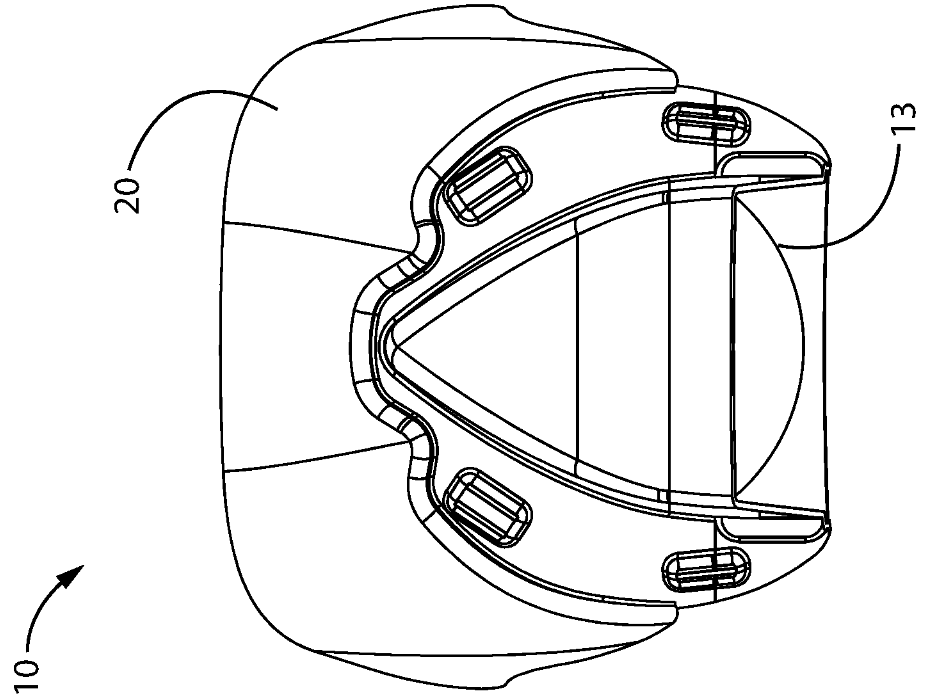
Figure 129B:
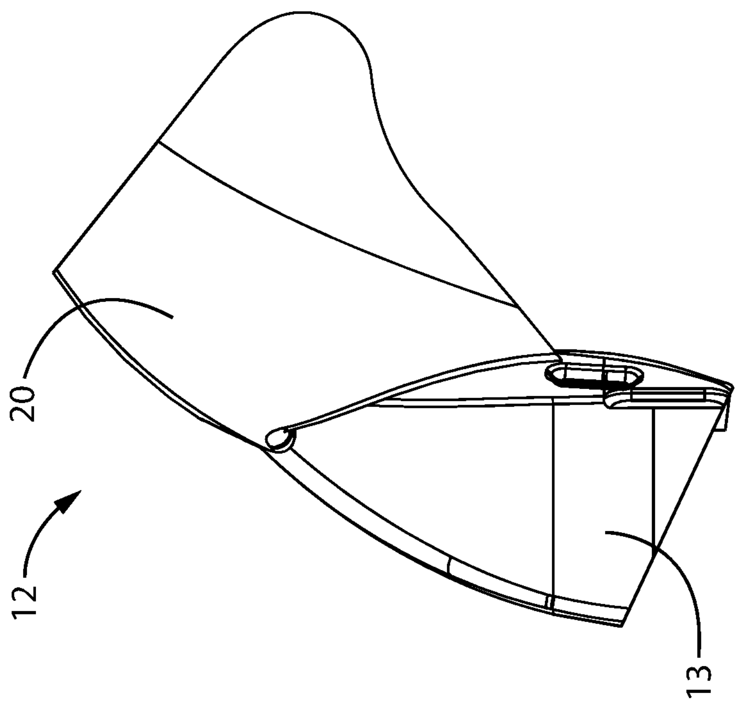
Figure 129A:
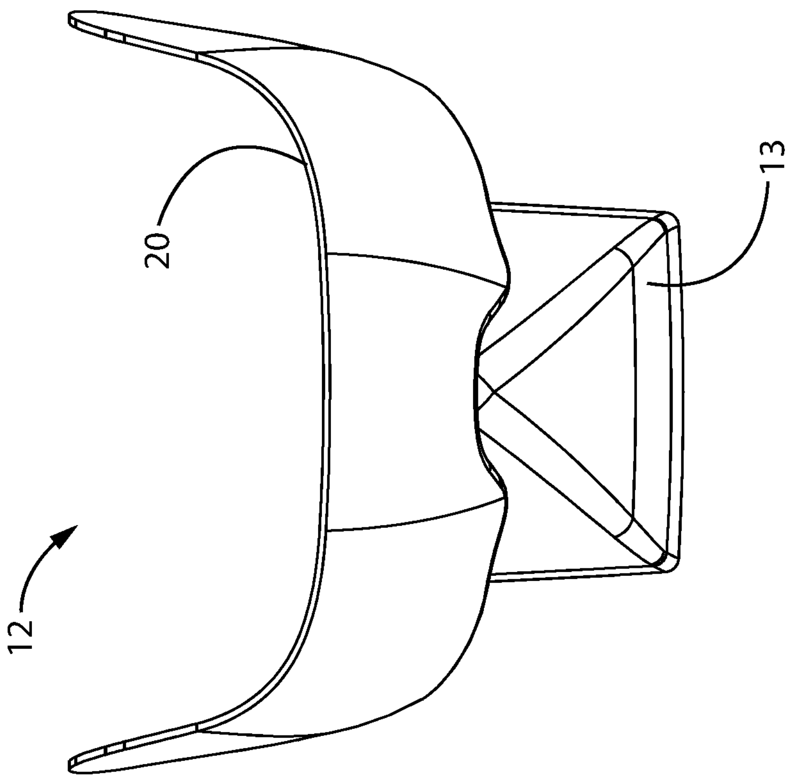
Figure 130:
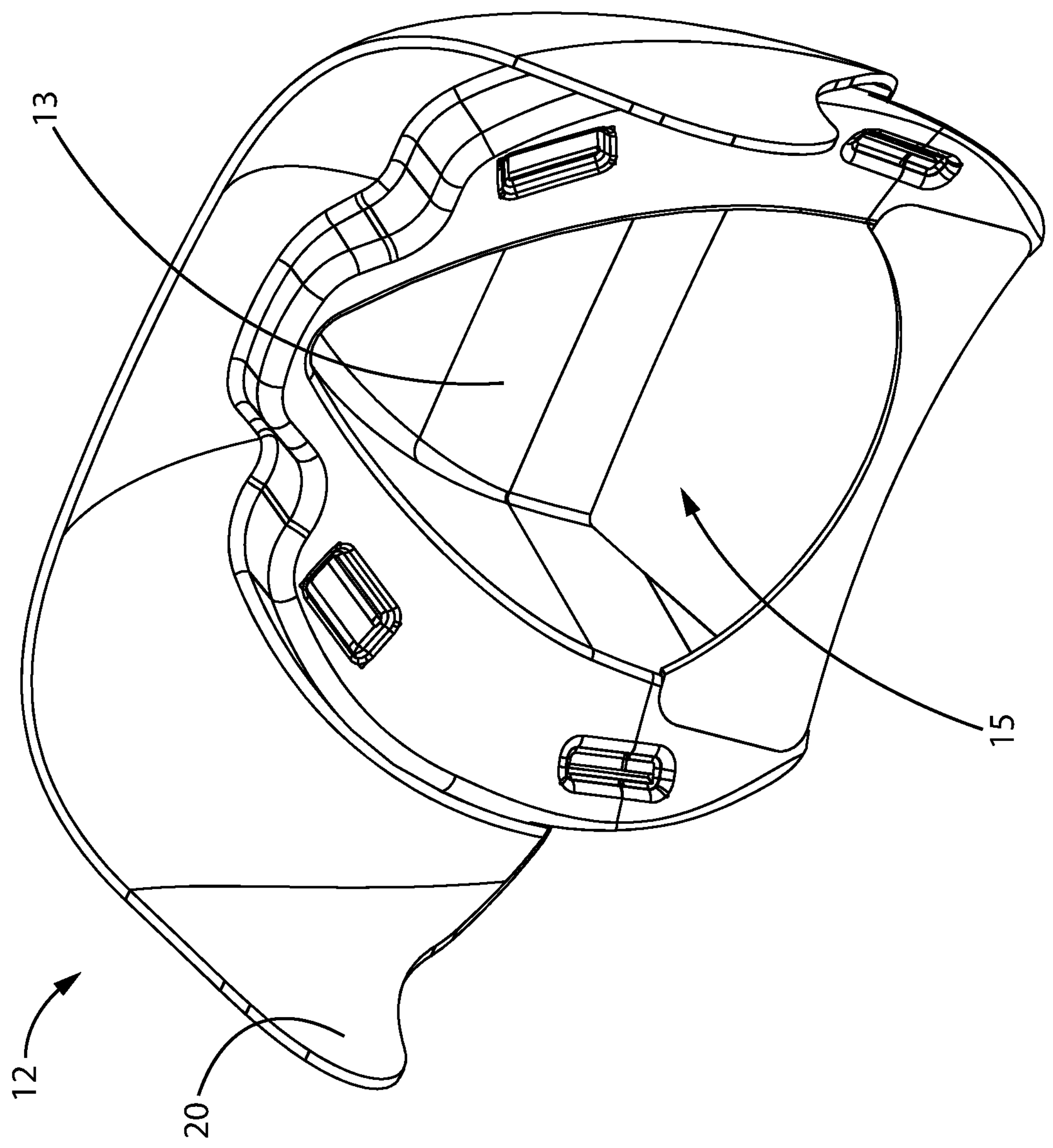
Figure 131:
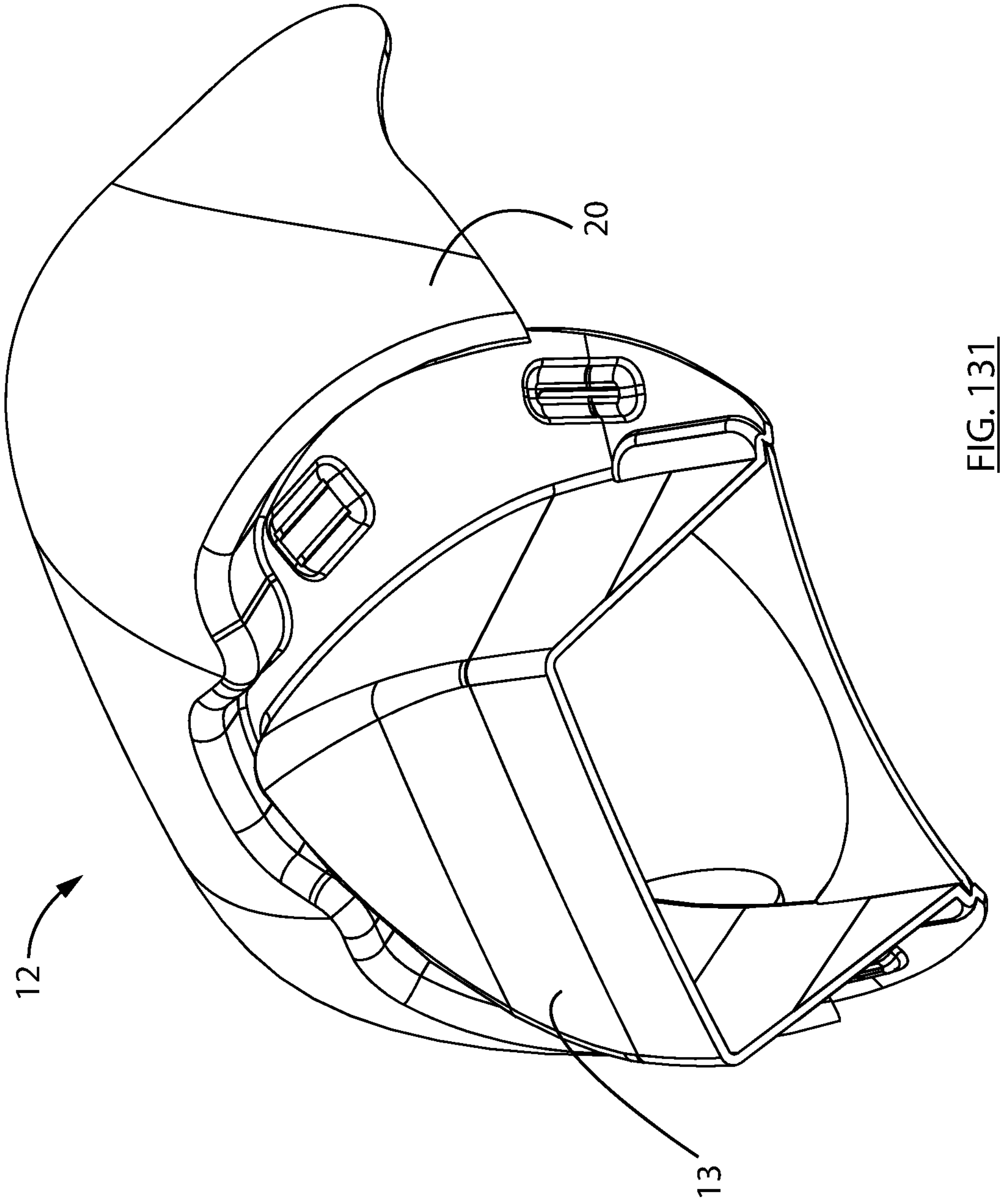
Figure 132:
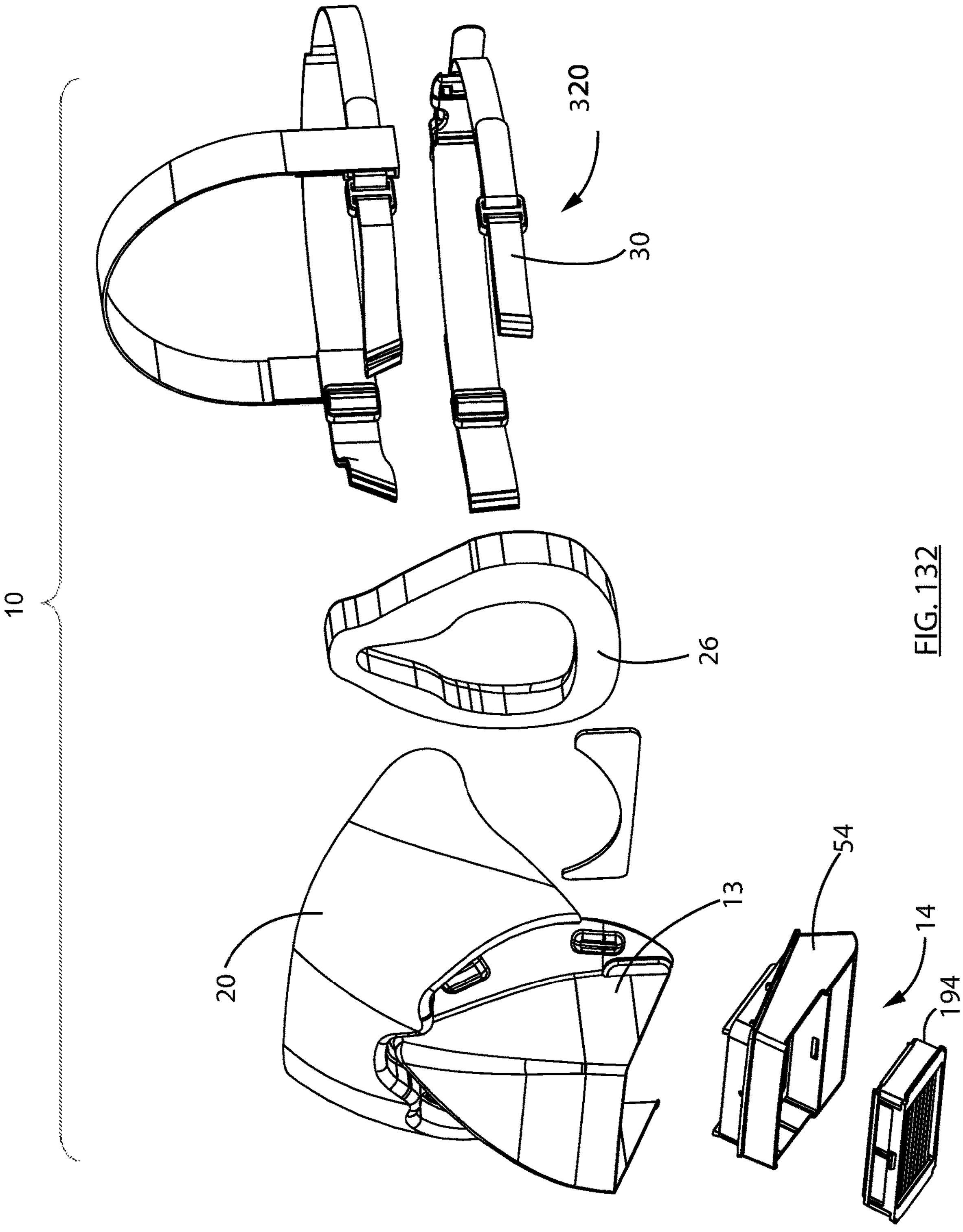
Figure 133:
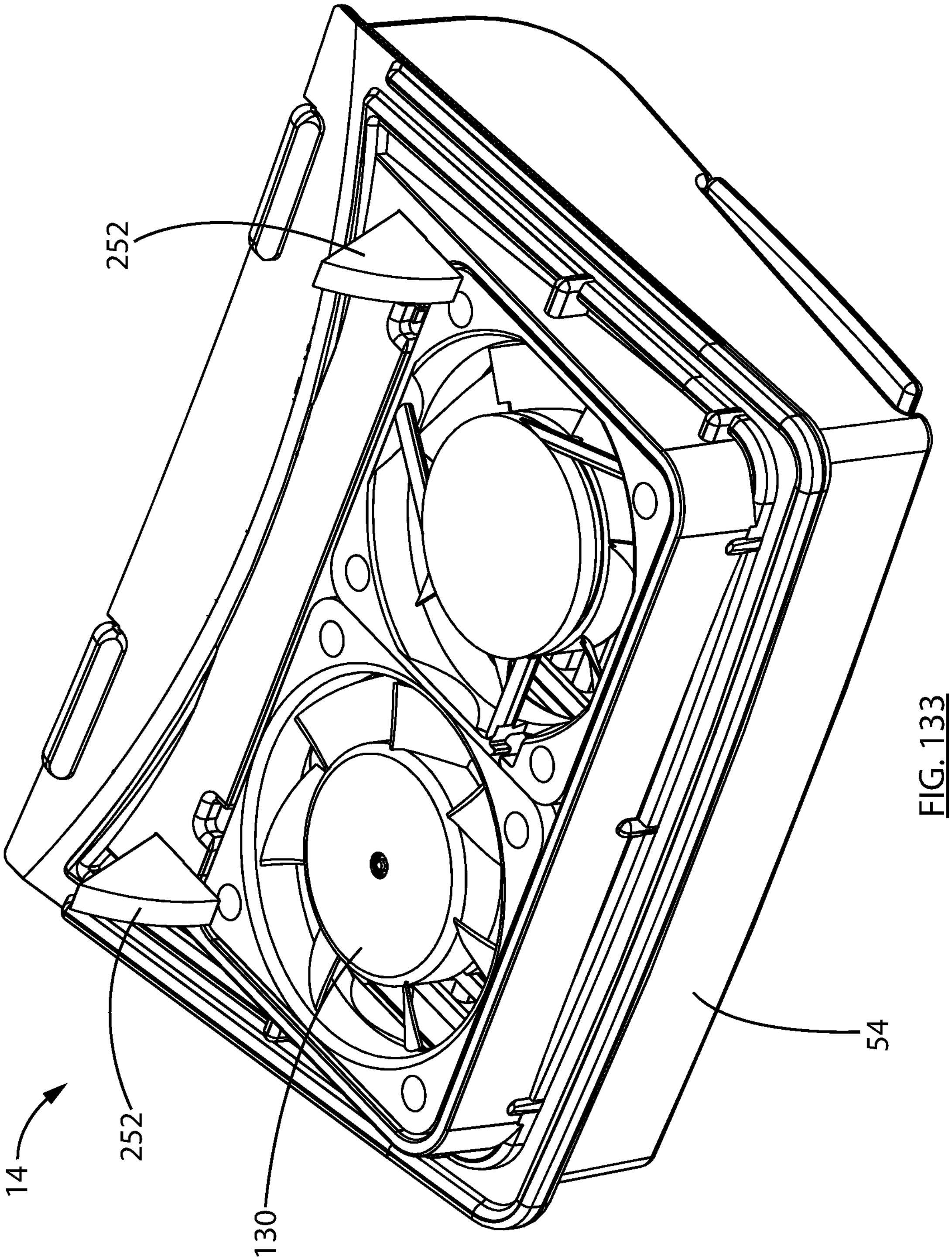
Figure 134:
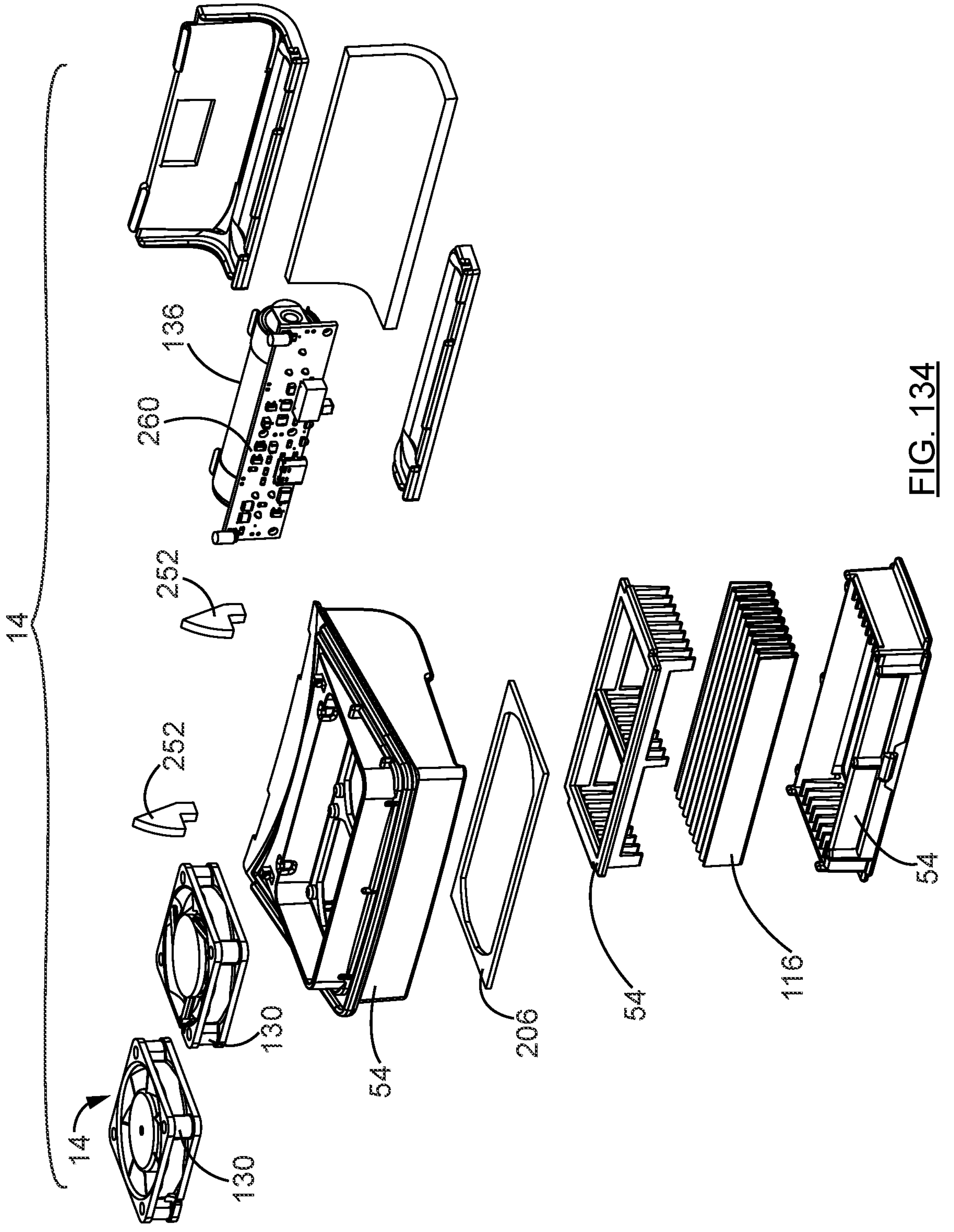
Figure 135:
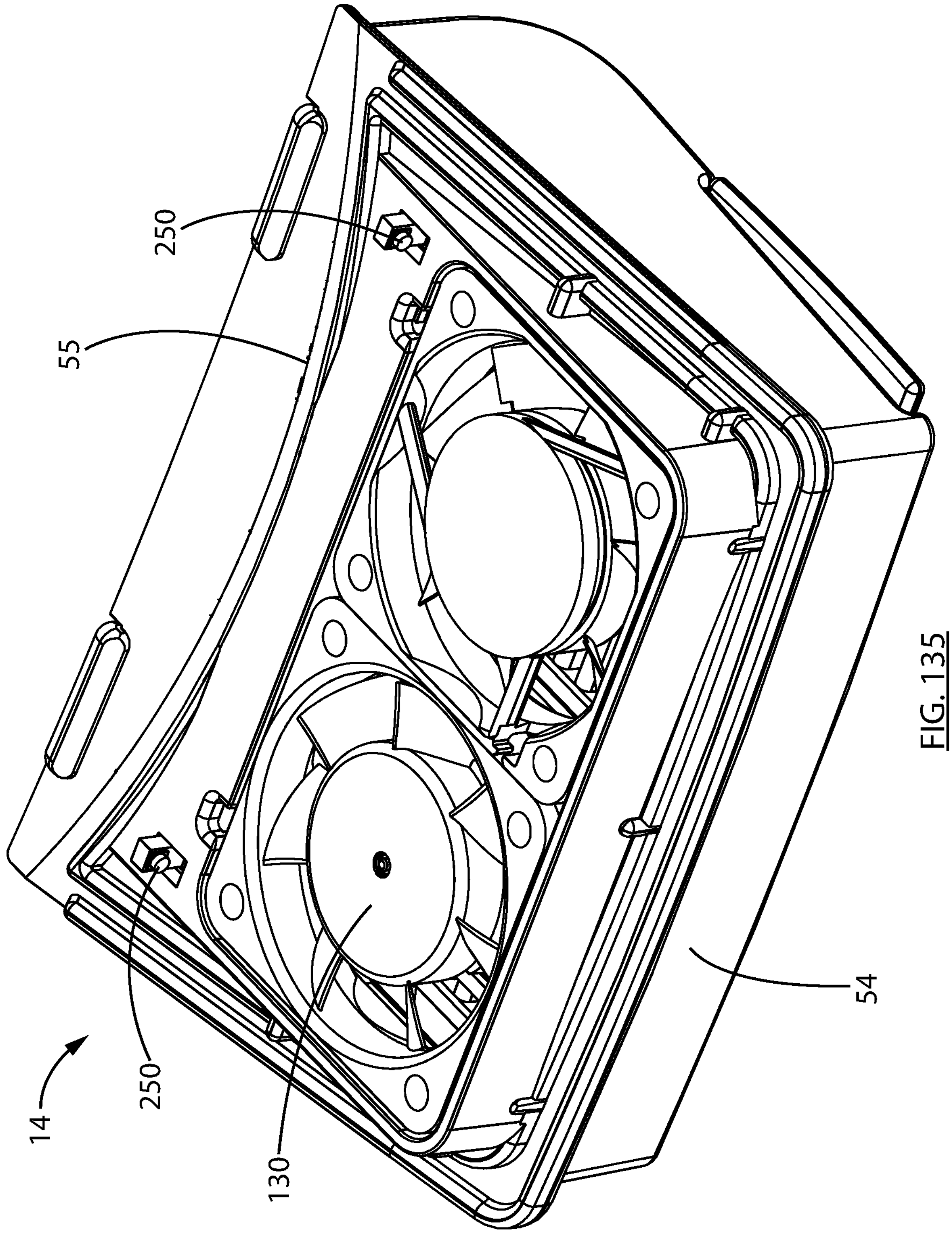
Figure 136:
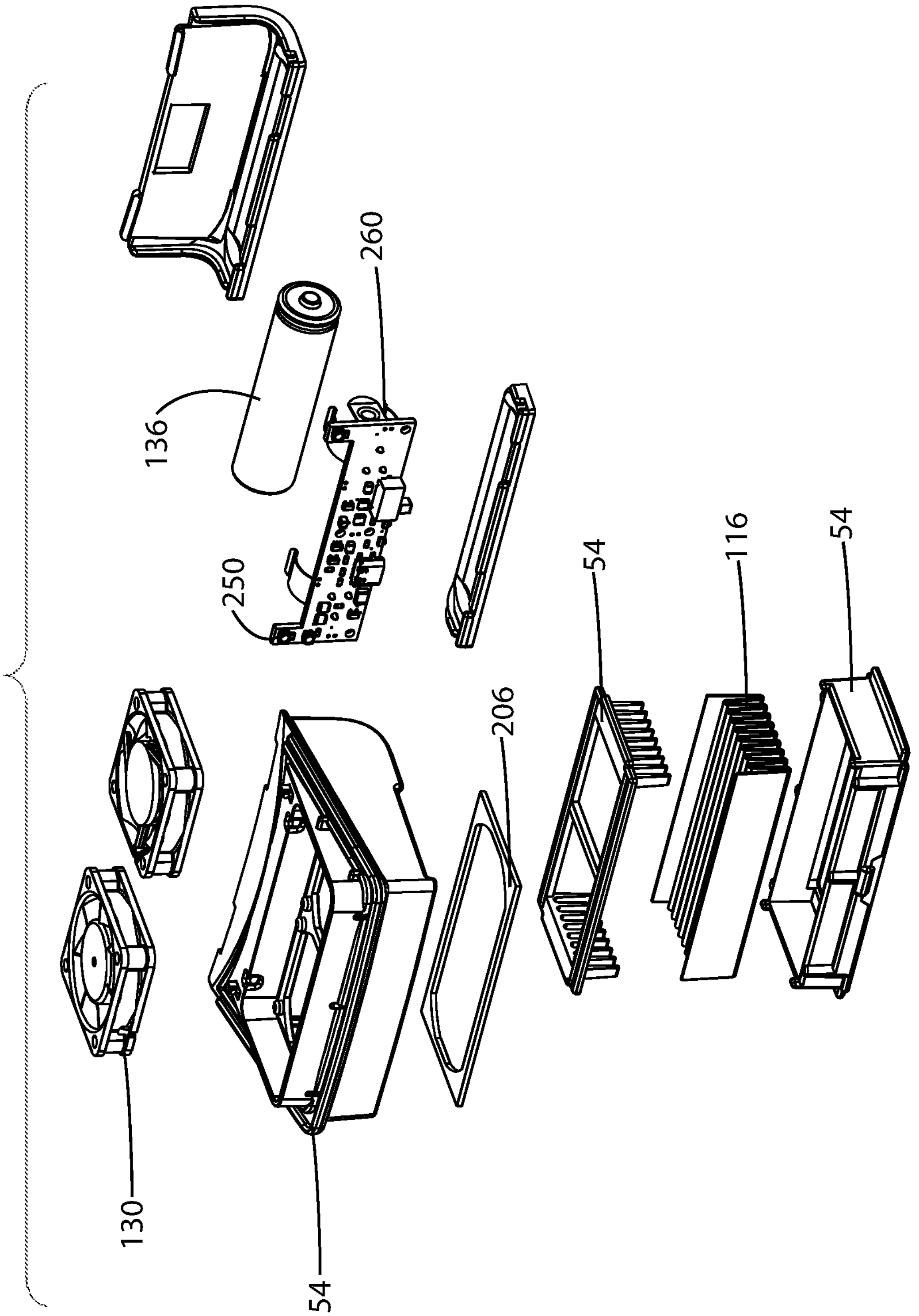
Figure 137:
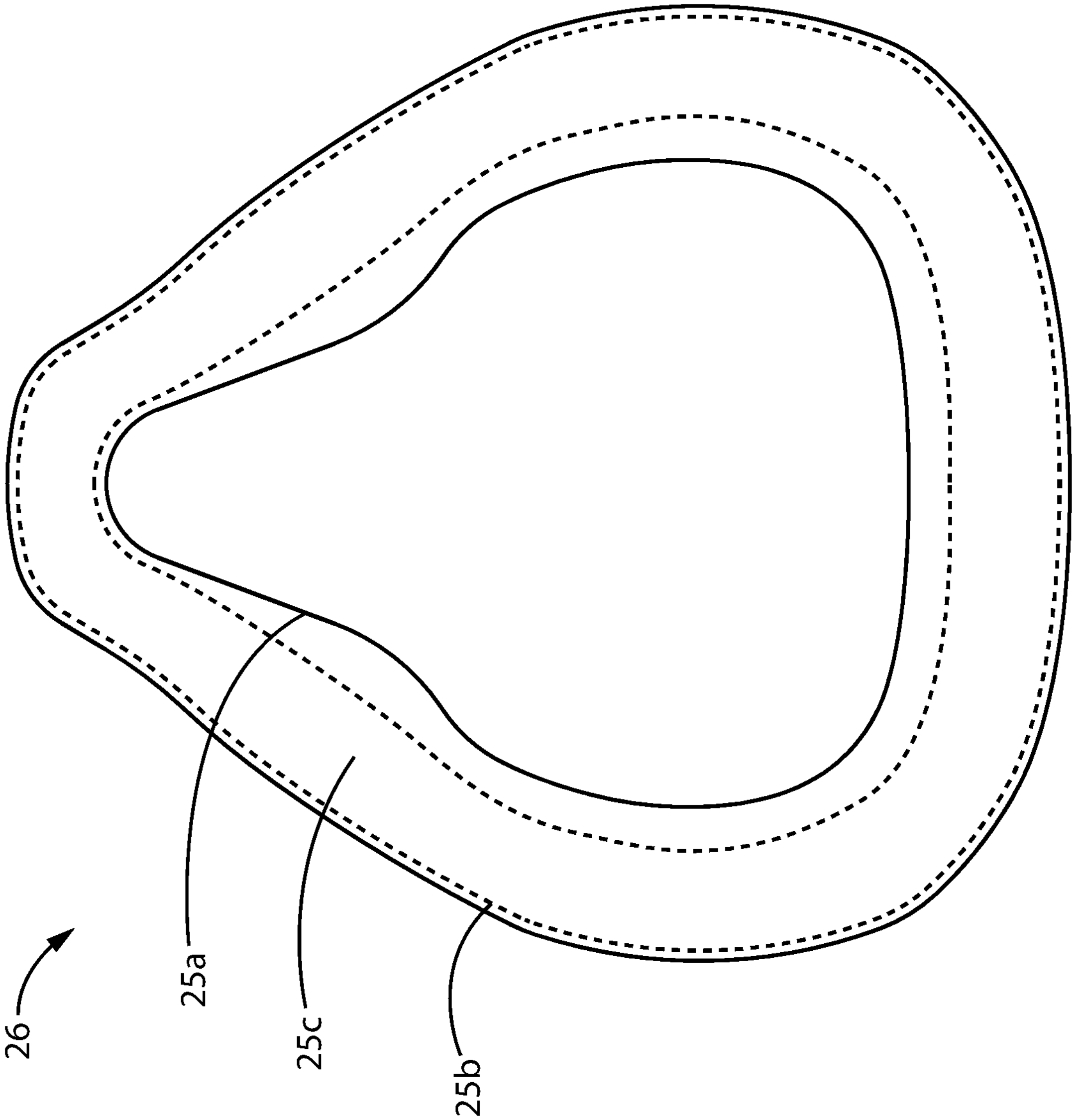
Figure 138B:
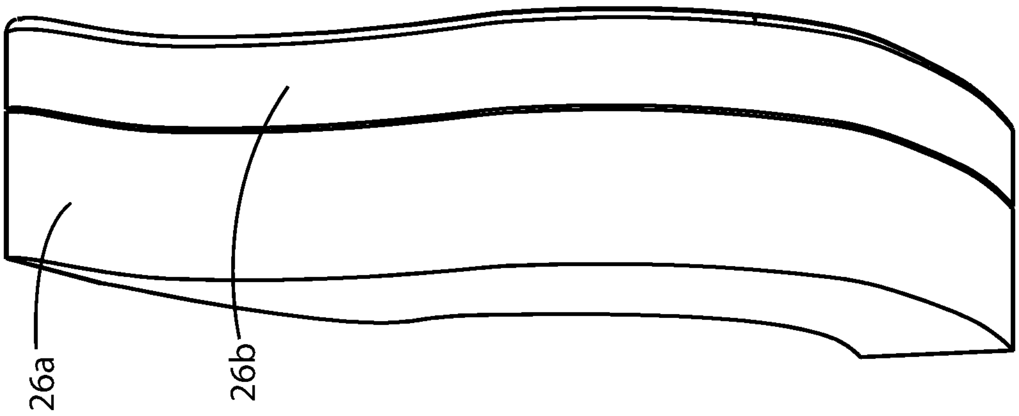
Figure 138A:
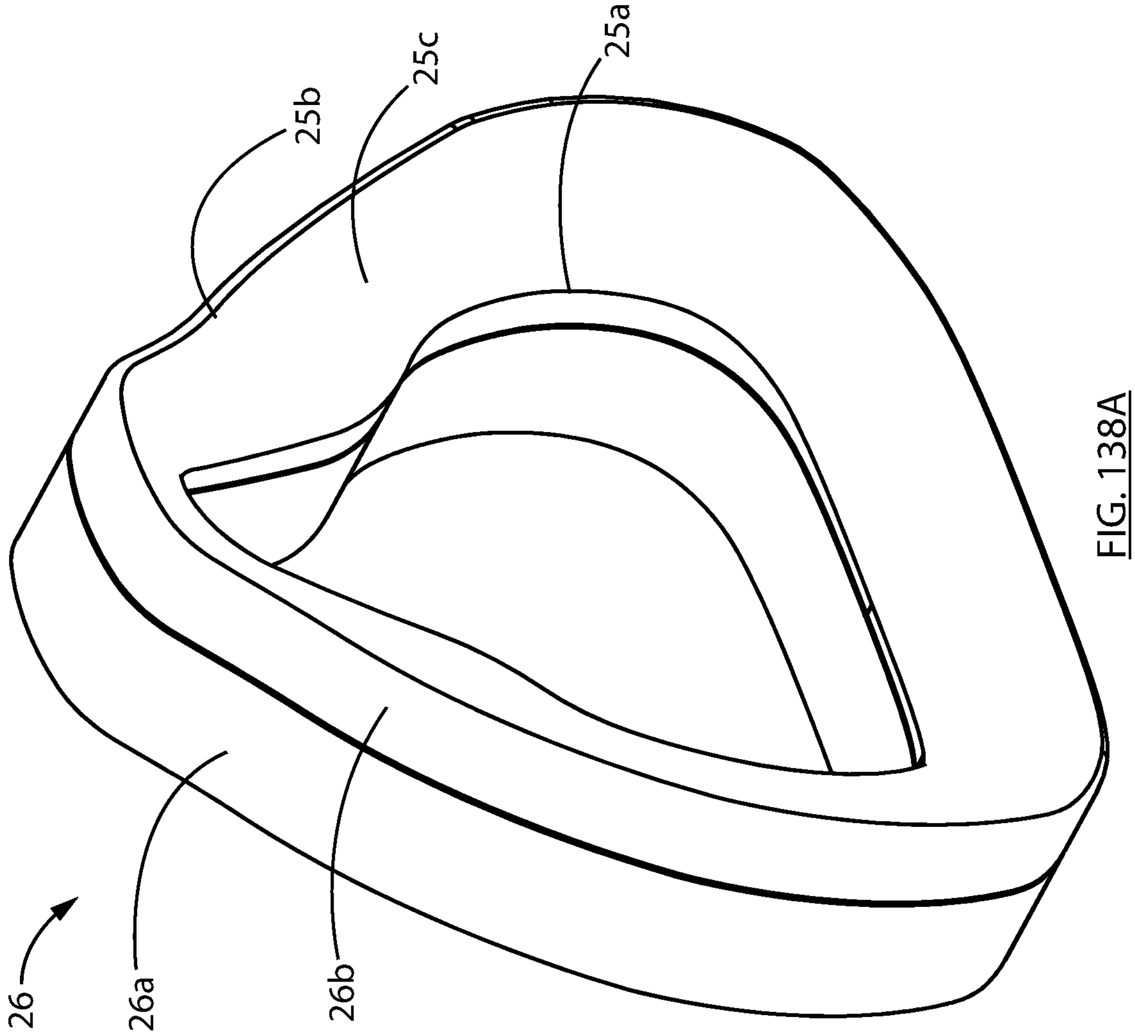
Figure 139:
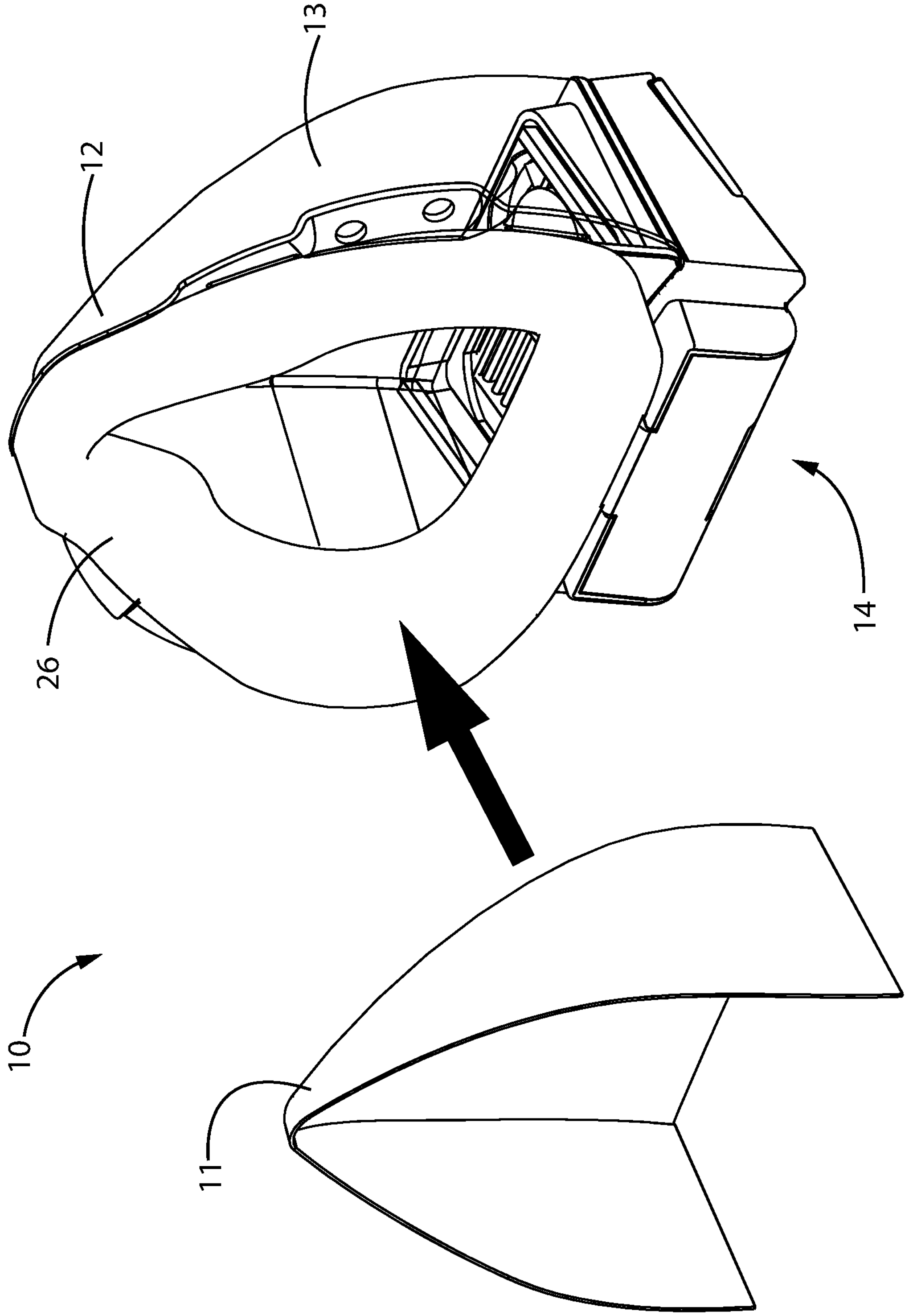
Figure 140:
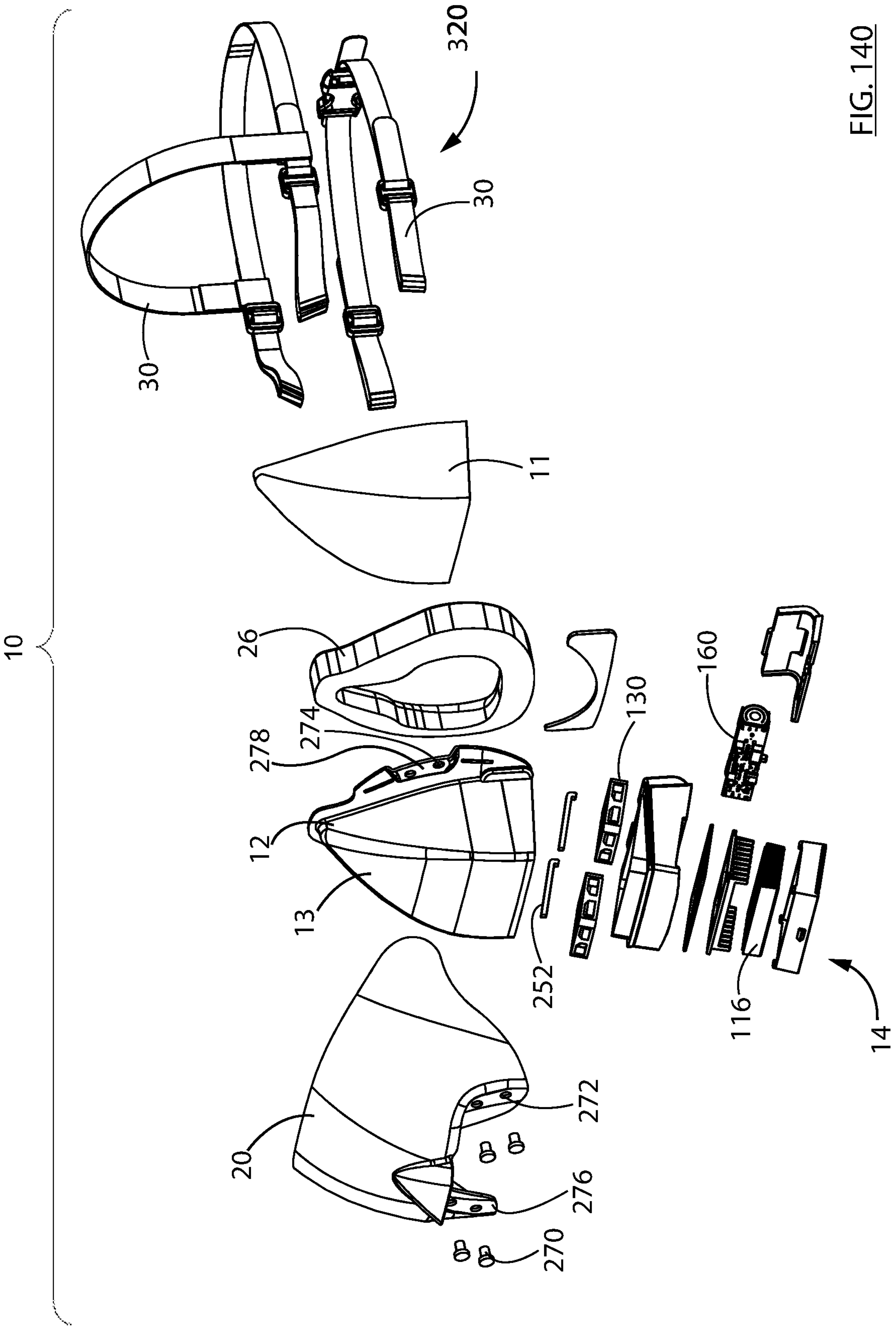
Figure 141:
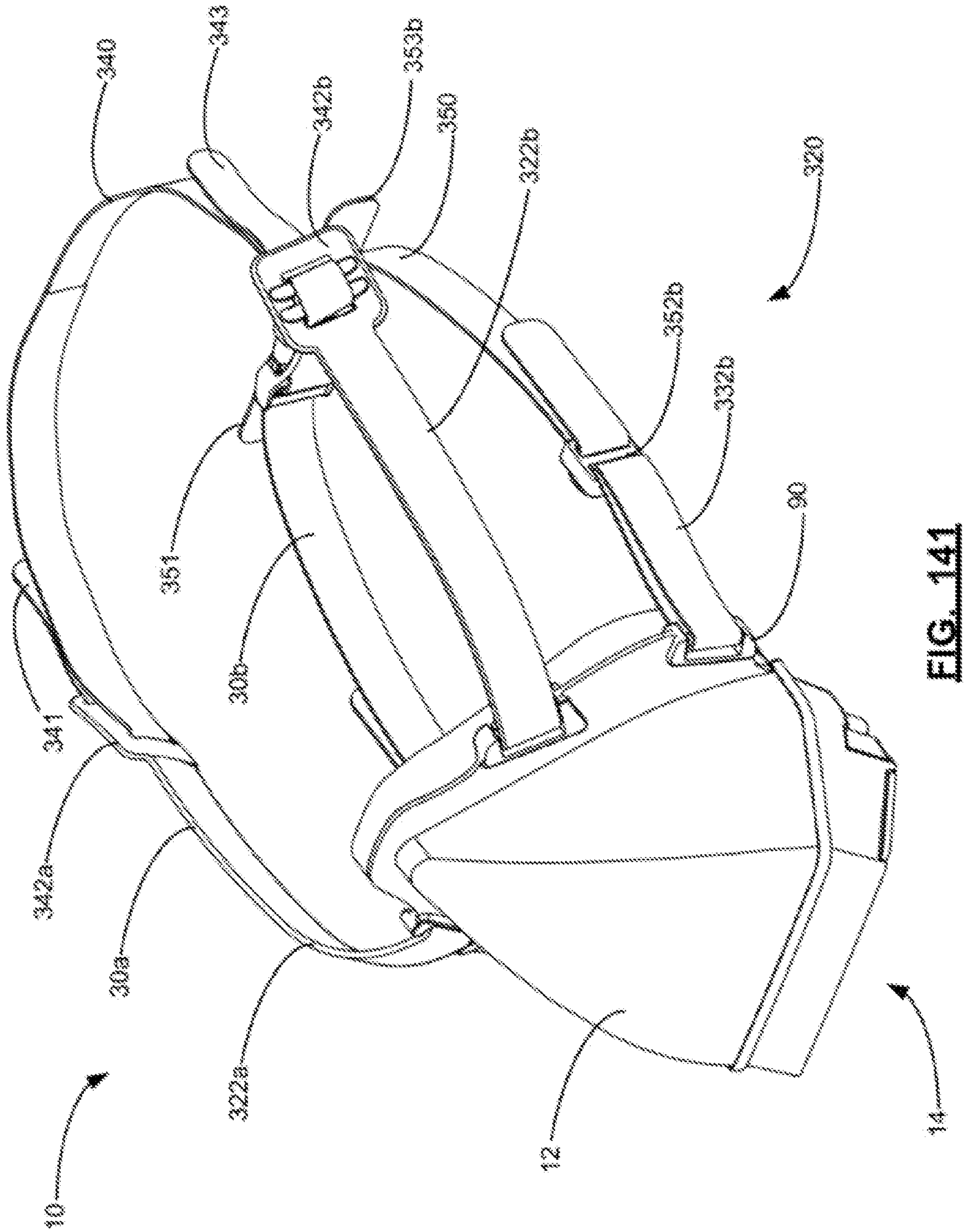
Figure 142:
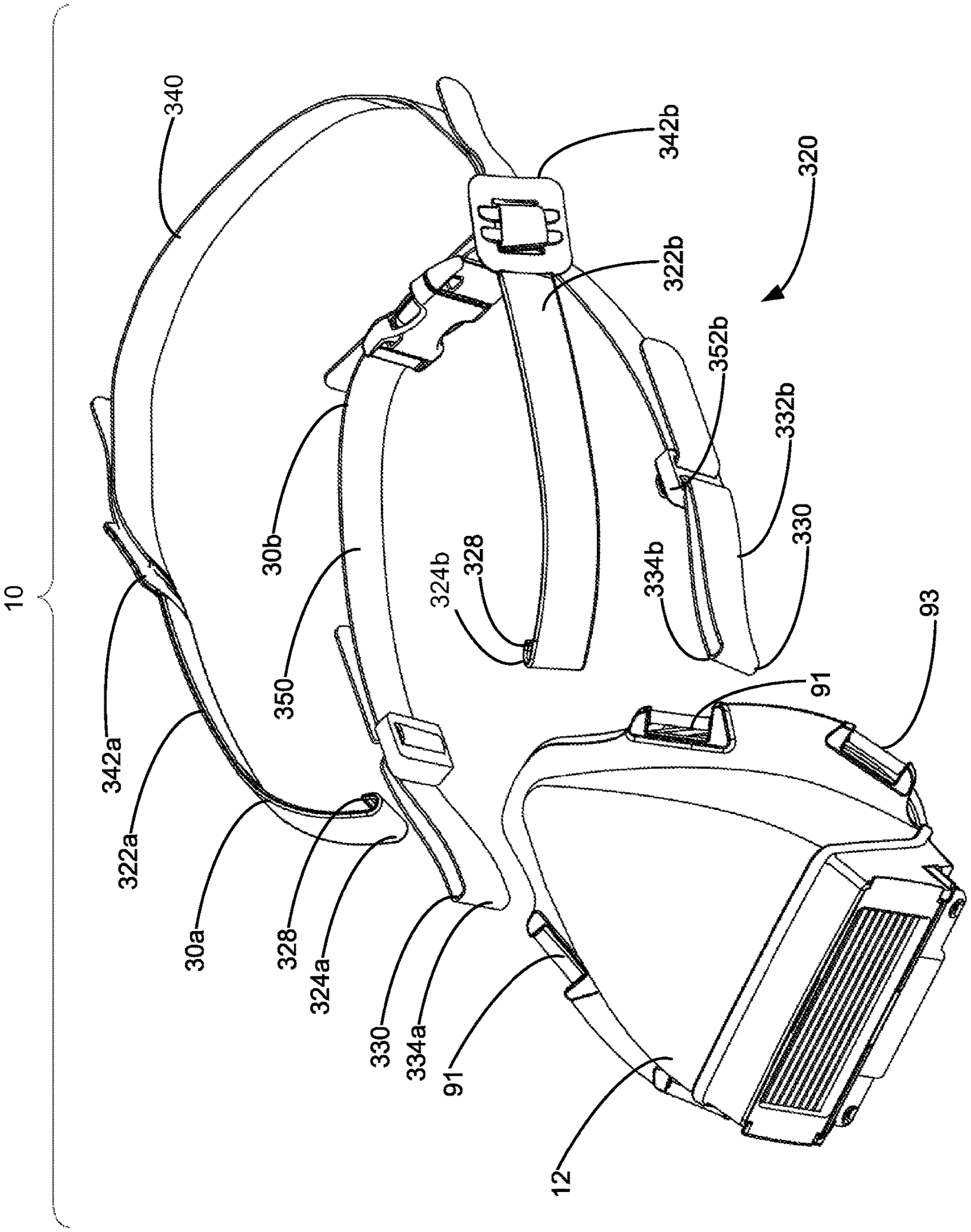
Figure 143:
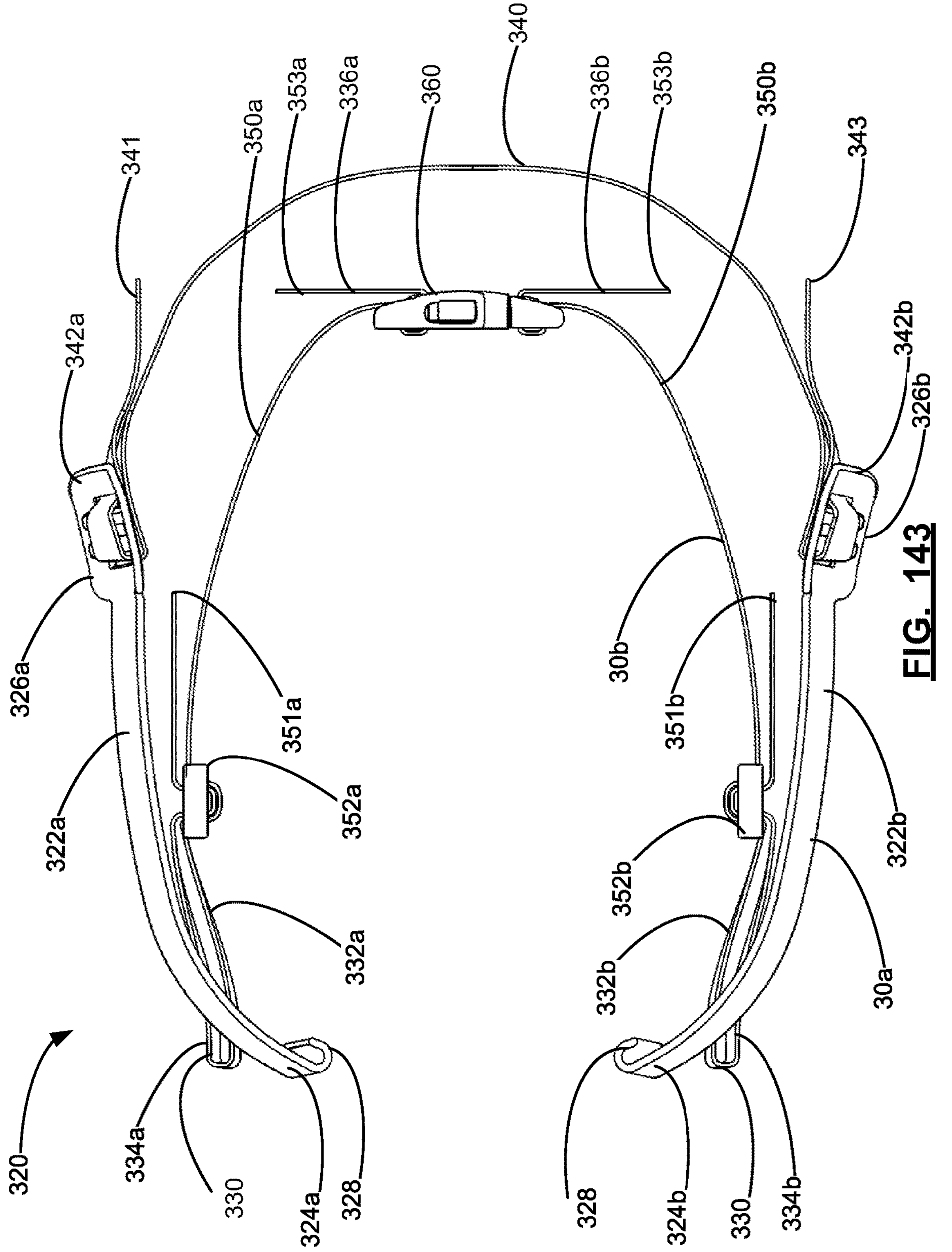
Figure 144A:
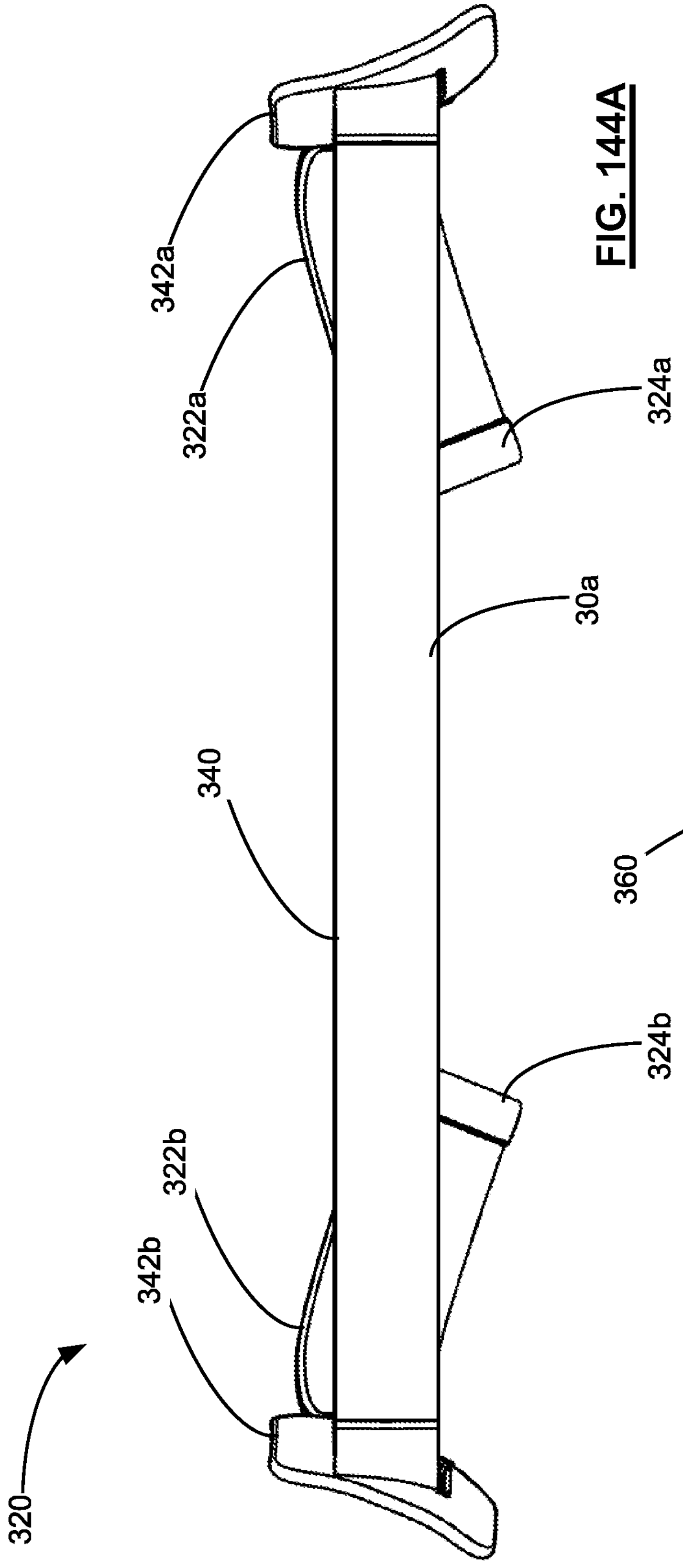
Figure 144B:
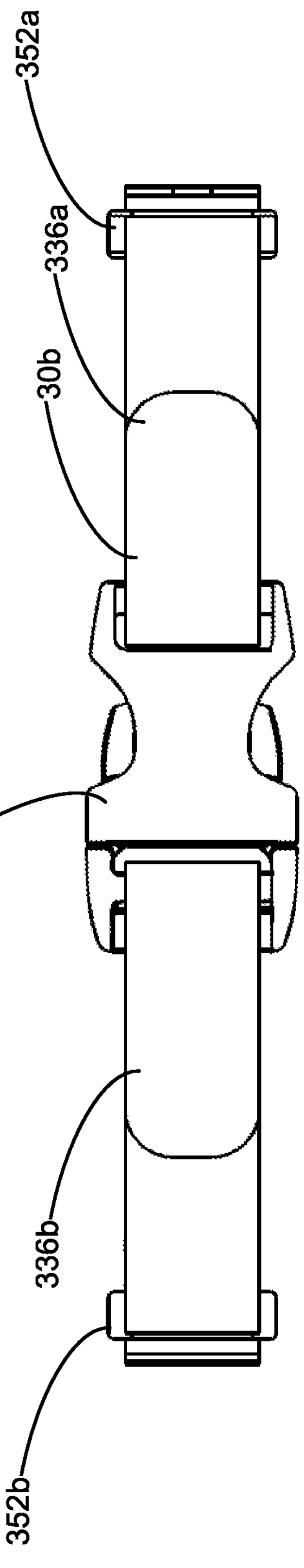
Figure 145:
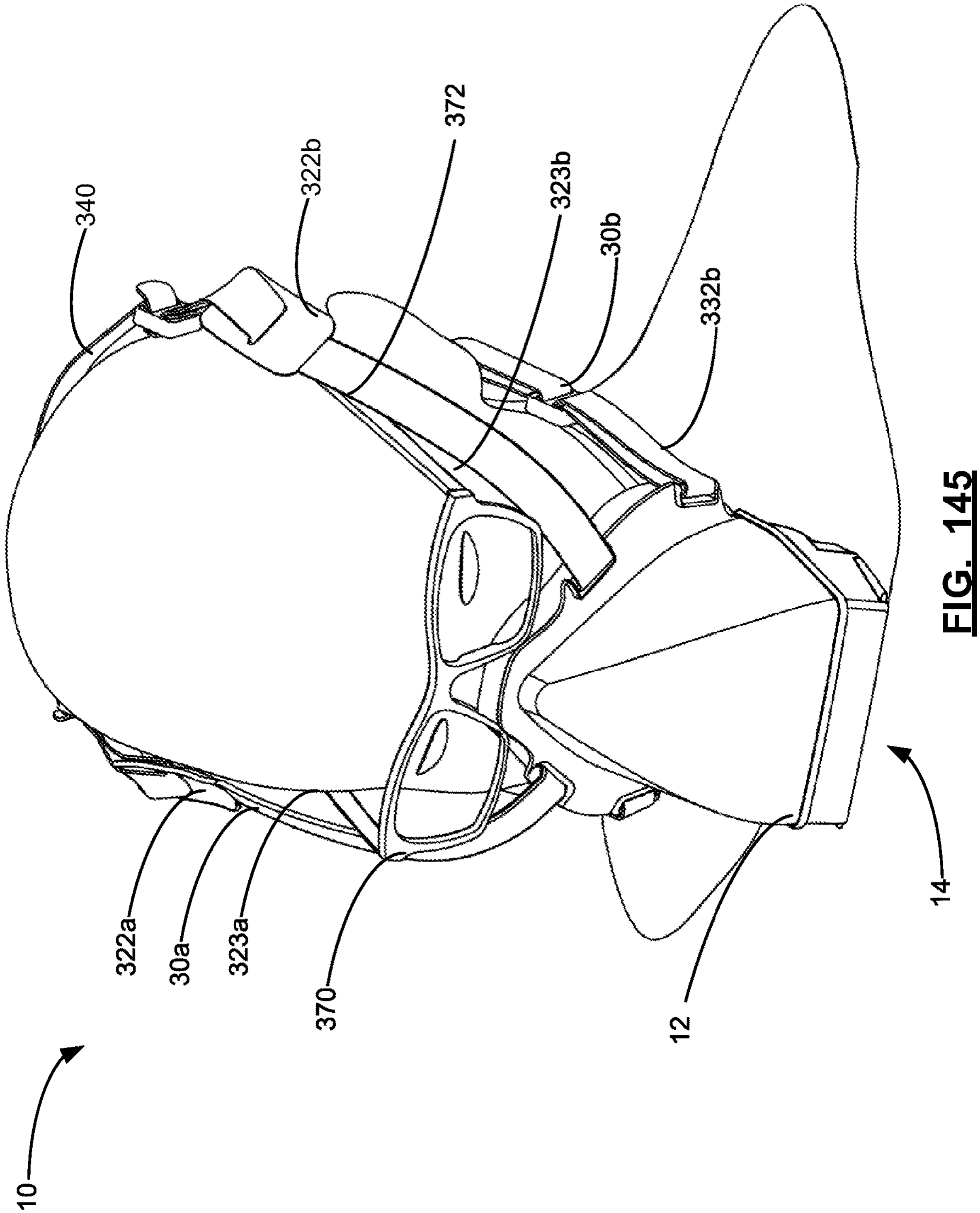
Figure 146:
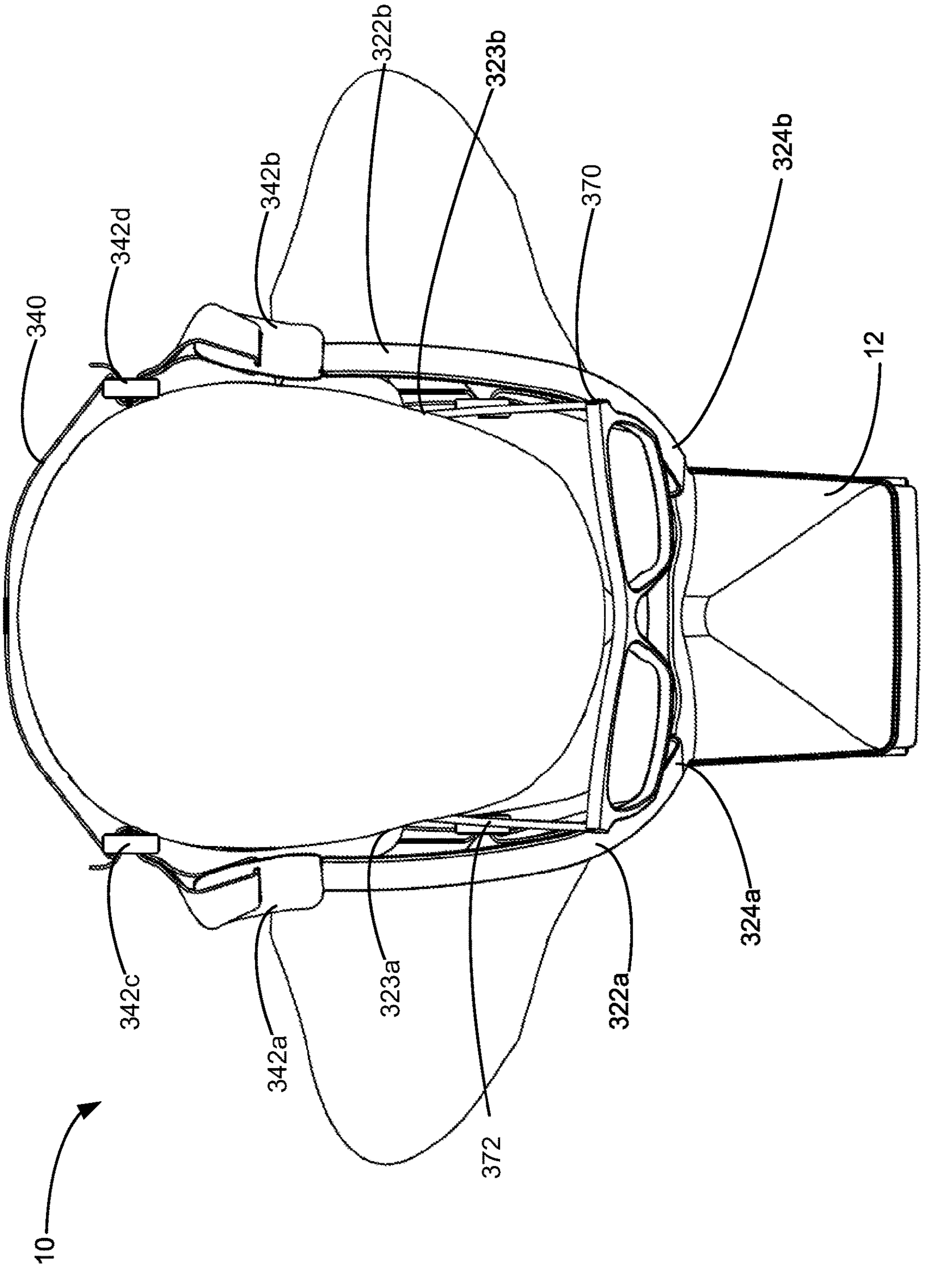
Figure 147:
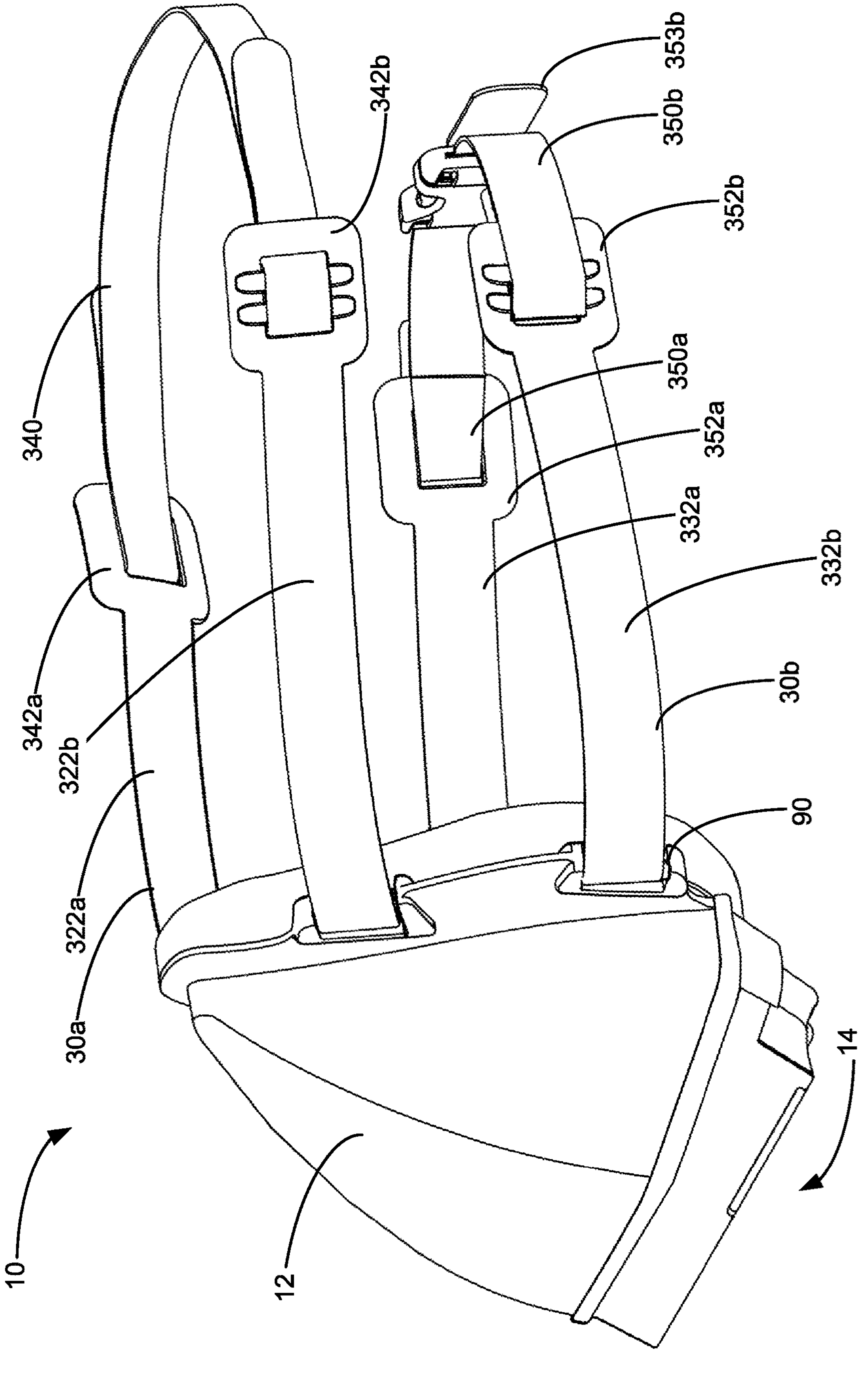
Figure 148:
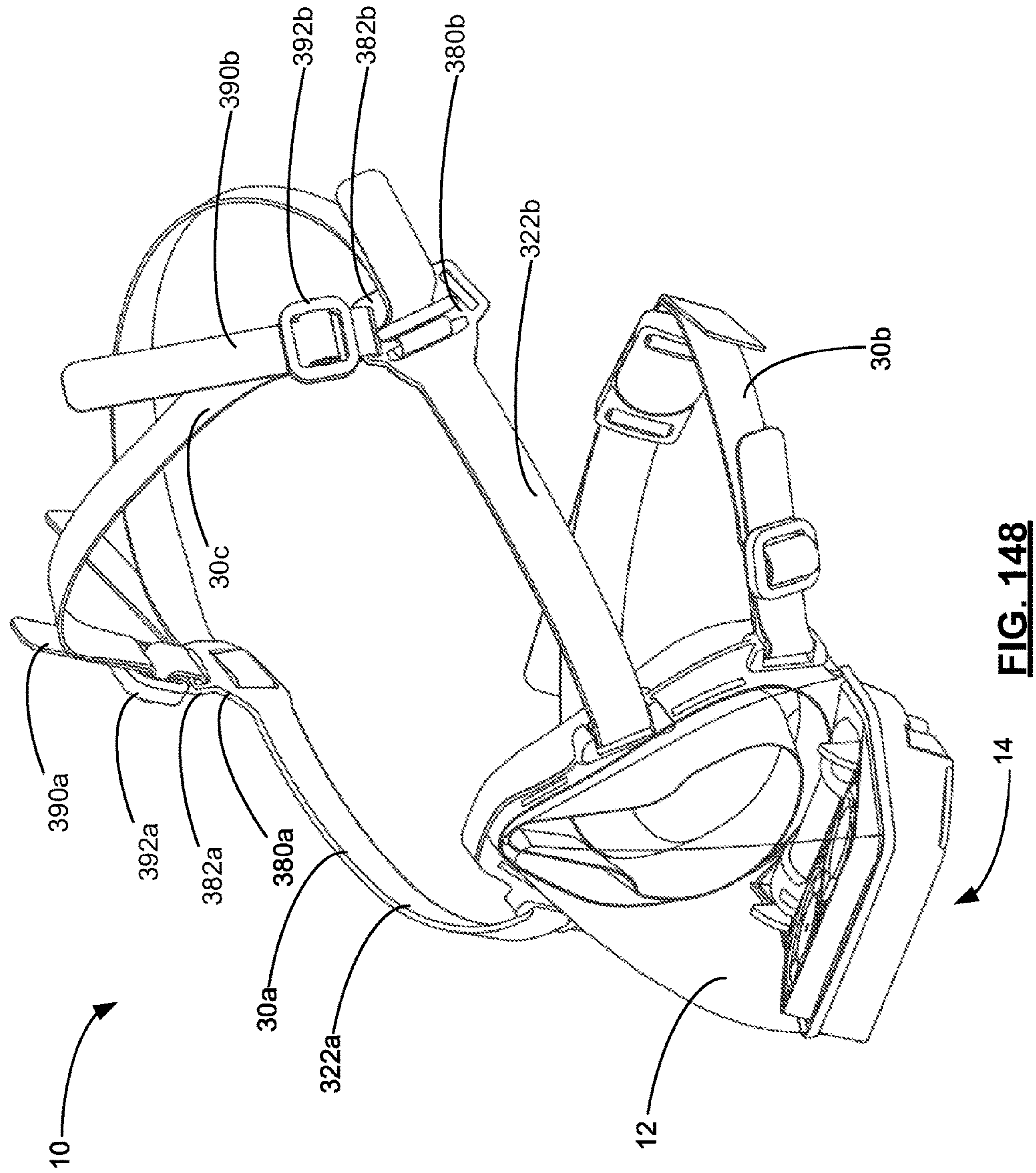

FIG. 132 is a front exploded view of the filter mask of FIG. 127;

FIG. 133 is a front perspective view of a further embodiment of a filter assembly;

FIG. 134 is a front exploded view of the filter assembly of FIG. 133;

FIG. 135 is a front perspective view of a further embodiment of a filter assembly;

FIG. 136 is a front exploded view of the filter assembly of FIG. 135;

FIG. 137 is a front view of an embodiment of a sealing member for use in a filter mask;

FIGS. 138A and 138B are rear perspective and side views, respectively, of a further embodiment of a sealing member for use in a filter mask;

FIG. 139 is a rear perspective view of a further embodiment of a filter mask having an insert;

FIG. 140 is a front exploded view of the filter mask of FIG. 139;

FIG. 141 is a front perspective view of a further alternate embodiment of a filter mask having a securing mechanism with rigid side portions;

FIG. 142 is a front perspective partially exploded view of the filter mask of FIG. 141;

FIG. 143 is a top view of the securing mechanism of FIG. 141;

FIG. 144A is a rear view of the securing mechanism of FIG. 141;

FIG. 144B is a rear view of a further embodiment of a securing mechanism;

FIG. 145 is a front perspective view of a further alternate embodiment of a filter mask having a securing mechanism with rigid side portions, when worn by a user;

FIG. 146 is a top view of the filter mask of FIG. 145, when worn by a user;

FIG. 147 is a side perspective view of a further alternate embodiment of a filter mask having a securing mechanism with rigid side portions;

FIG. 148 is a front perspective view of a further alternate embodiment of a filter mask having a securing mechanism with connector members having a flared rigid portion.

Figure 149:
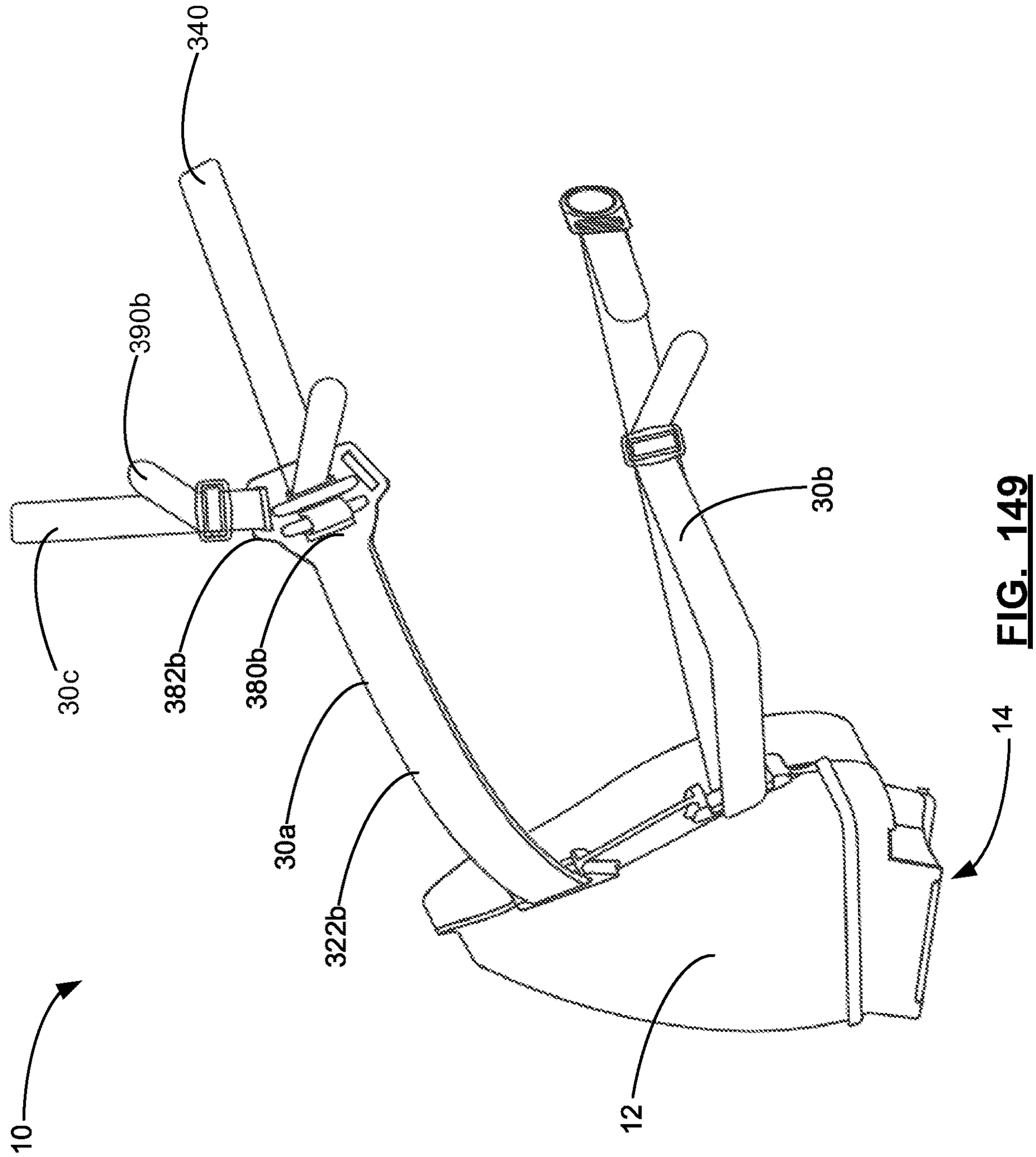

FIG. 149 is a side view of the filter mask of FIG. 148.

Figure 150:
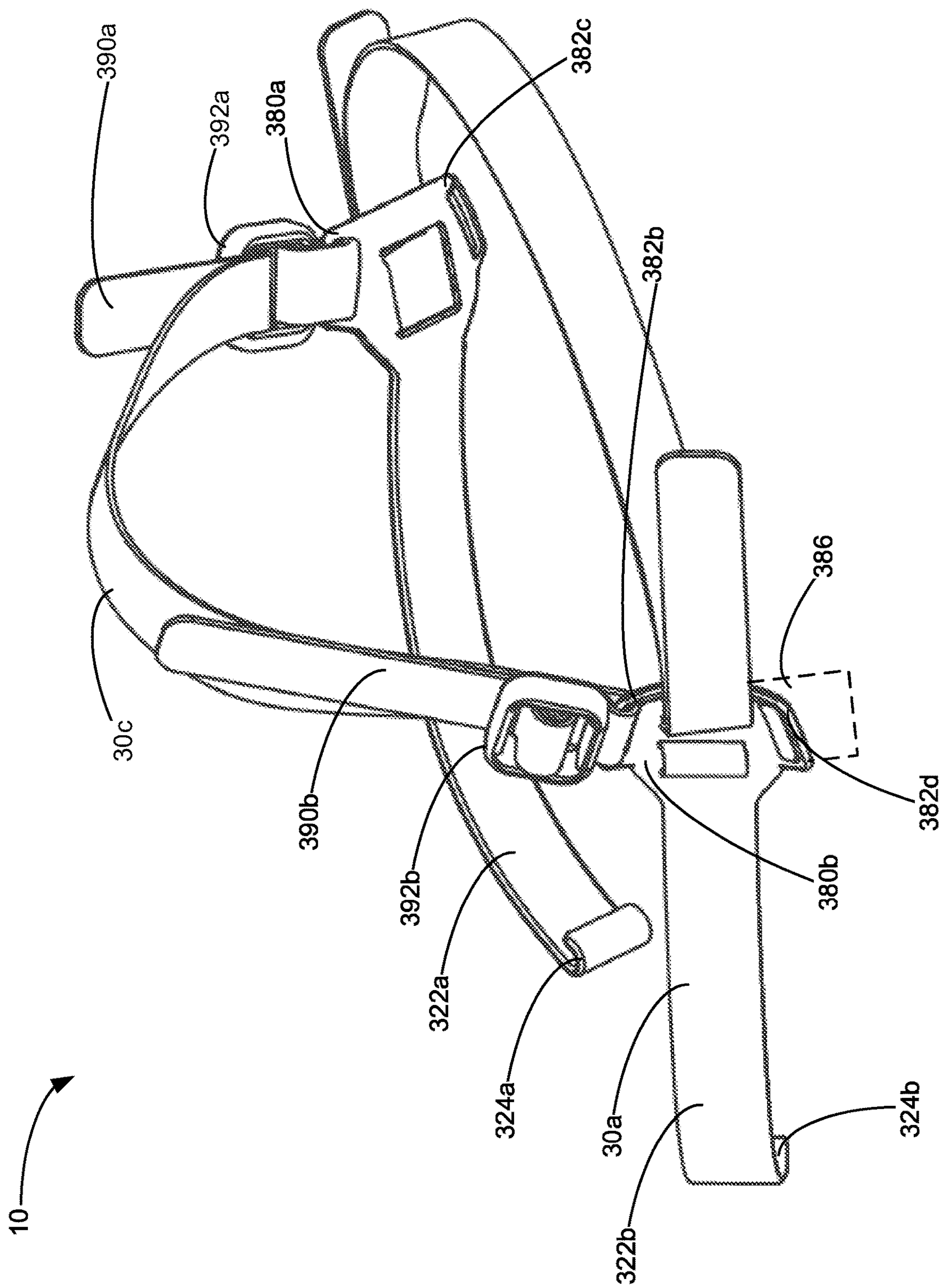

FIG. 150 is a rear perspective view of the securing mechanism of FIG. 148.

Figure 151:
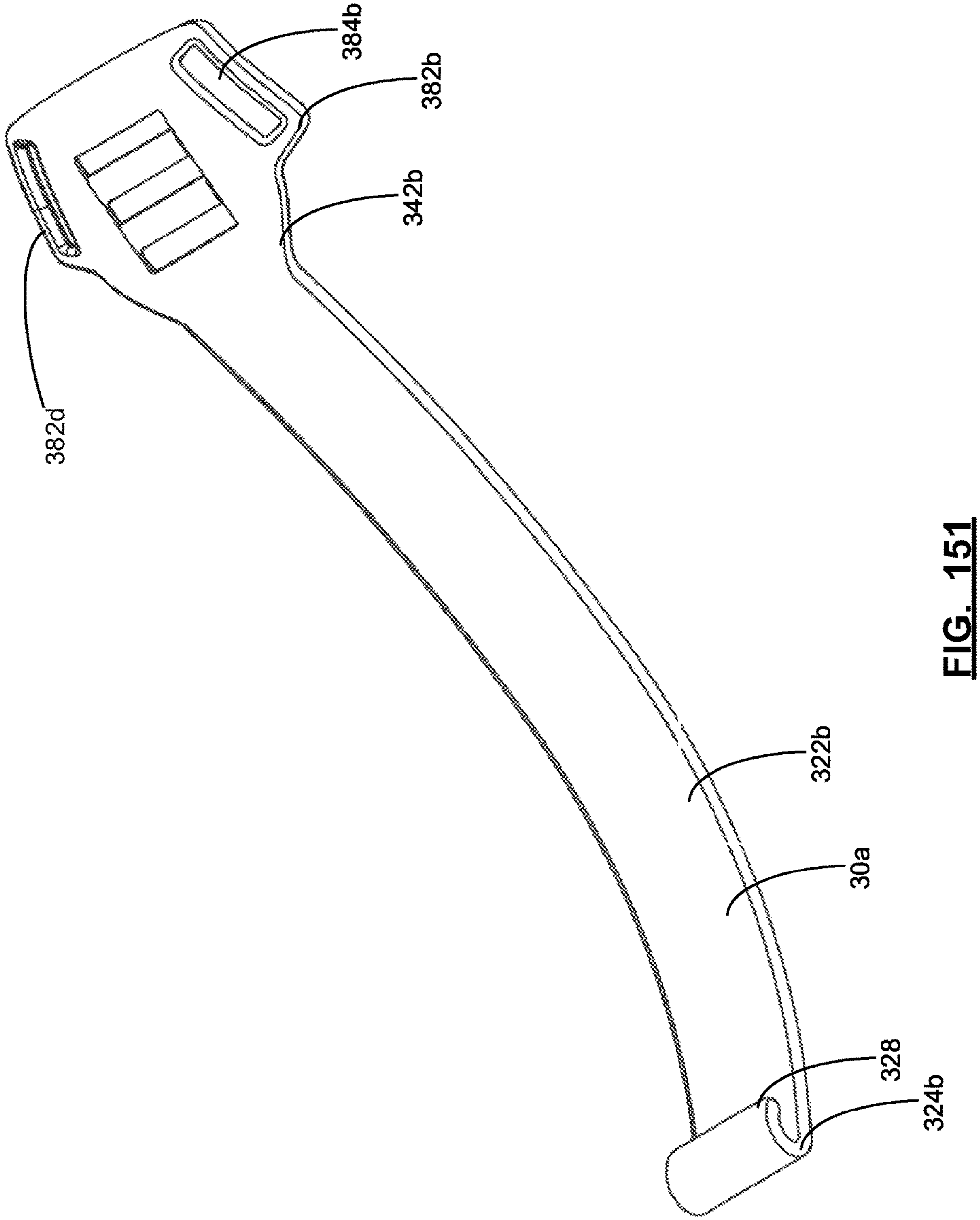
Figure 152:
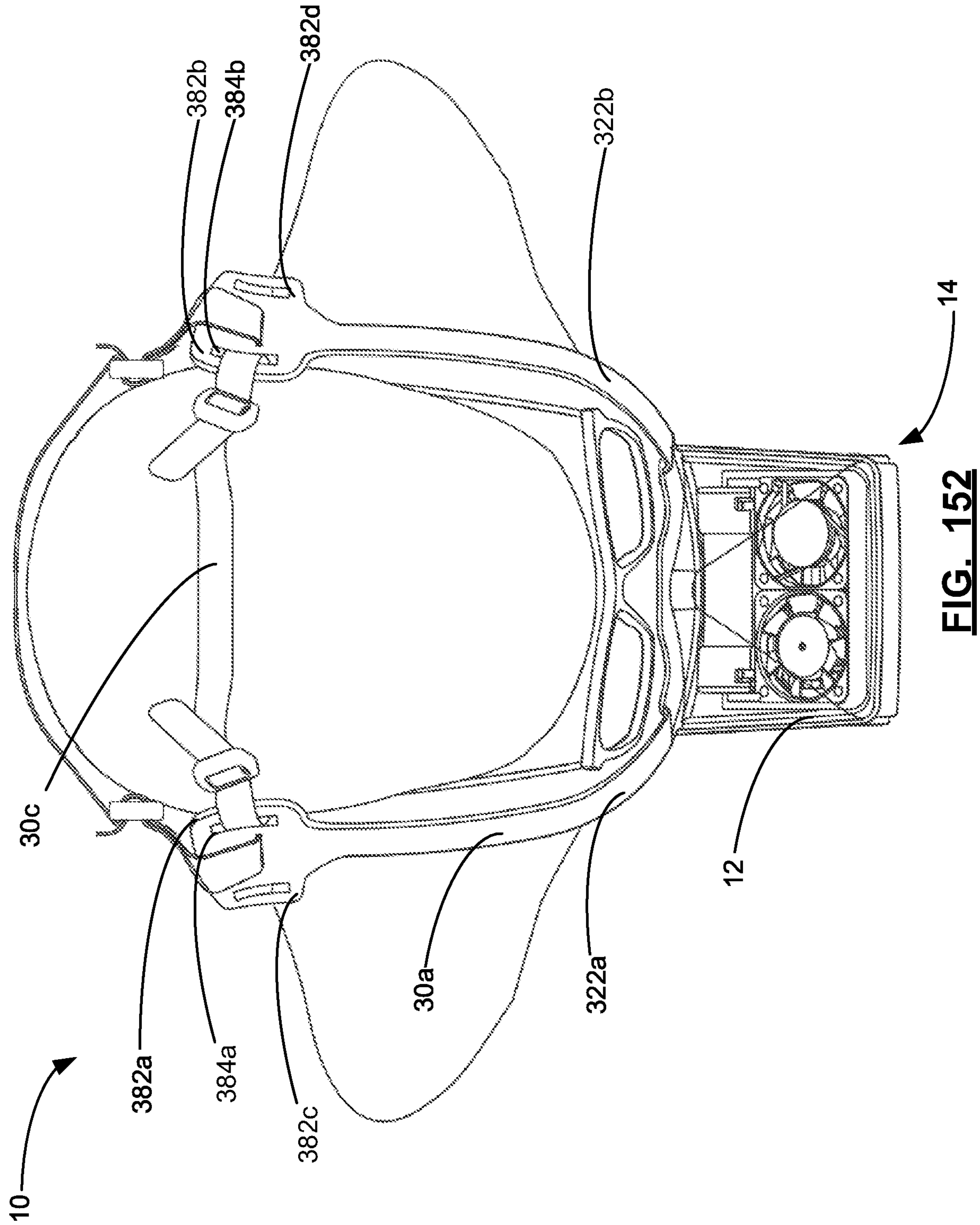

FIG. 151 is a rear perspective view of a connector of the securing mechanism of FIG. 148; and, FIG. 152 is a top view of the filter mask of FIG. 148 worn by a user.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

General Description of a Mask Body

Figure 1:
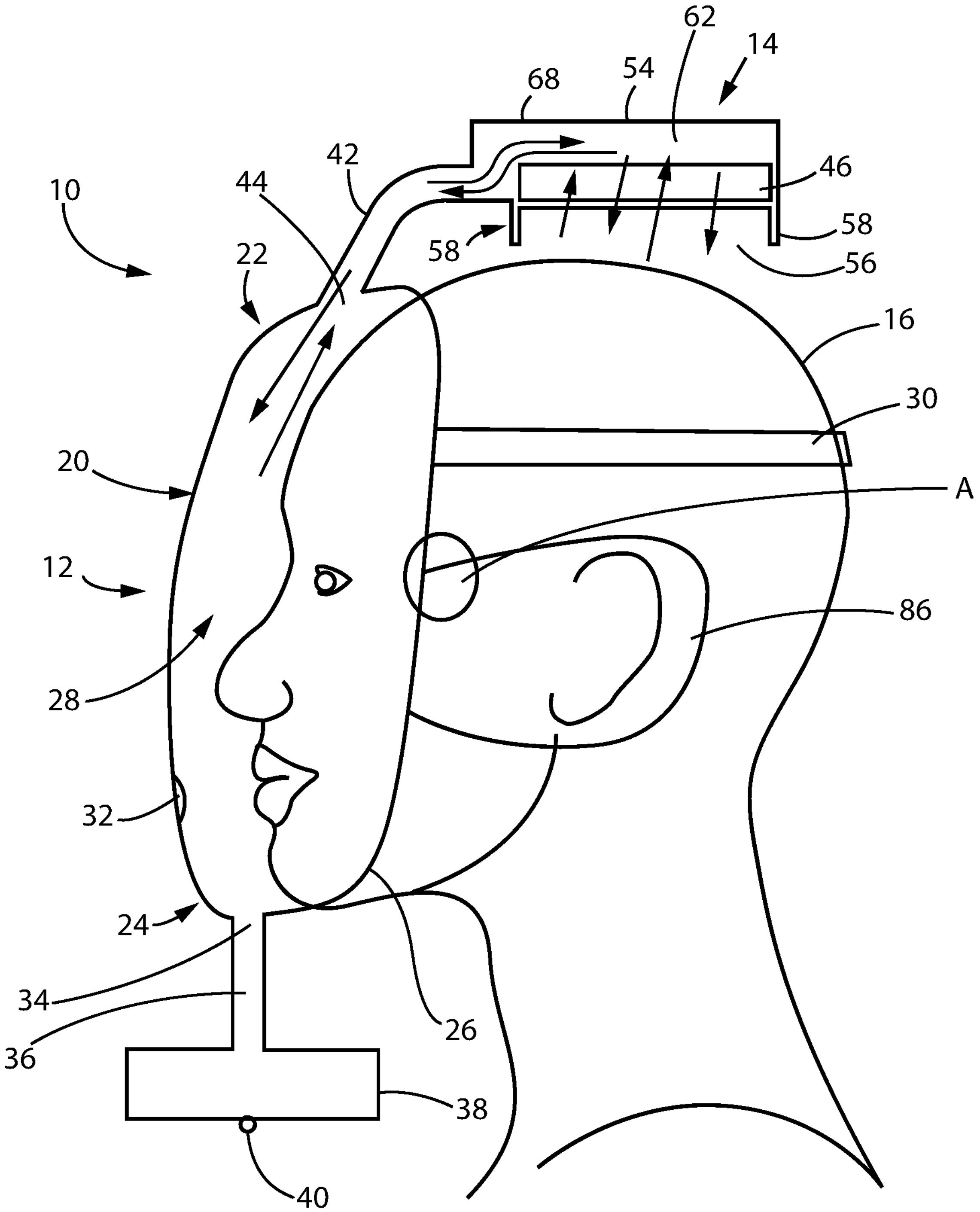
FIG. 1 is a side view of a person wearing a filter mask.

FIG. 1 exemplifies a person 16 wearing a filter mask 10. The filter mask comprises a mask body 12 and a filter assembly 14.

Figure 5:
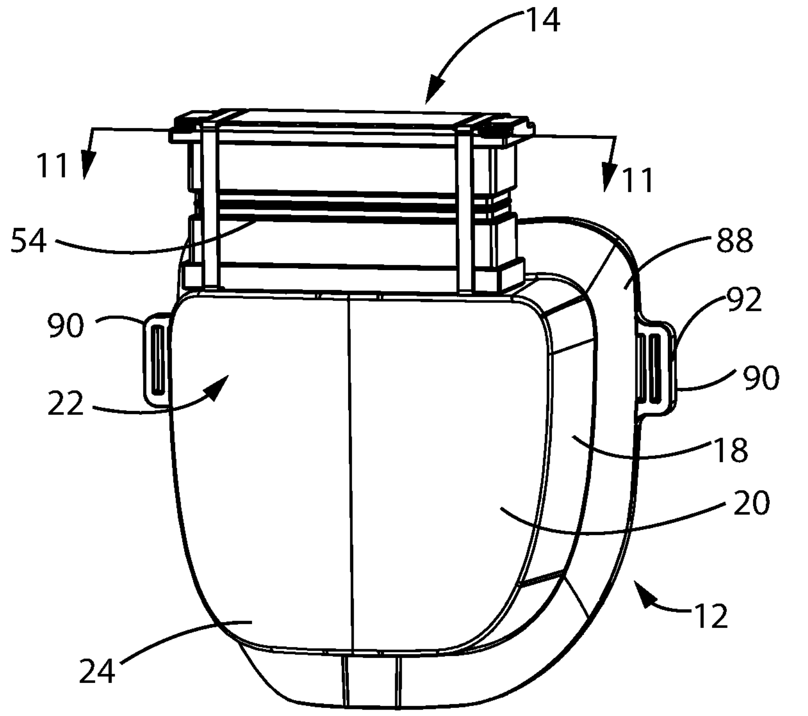
FIG. 5 is a front perspective view of an alternate embodiment of a filter mask wherein the strap for securing the filter mask in position has been omitted.
Figure 6:
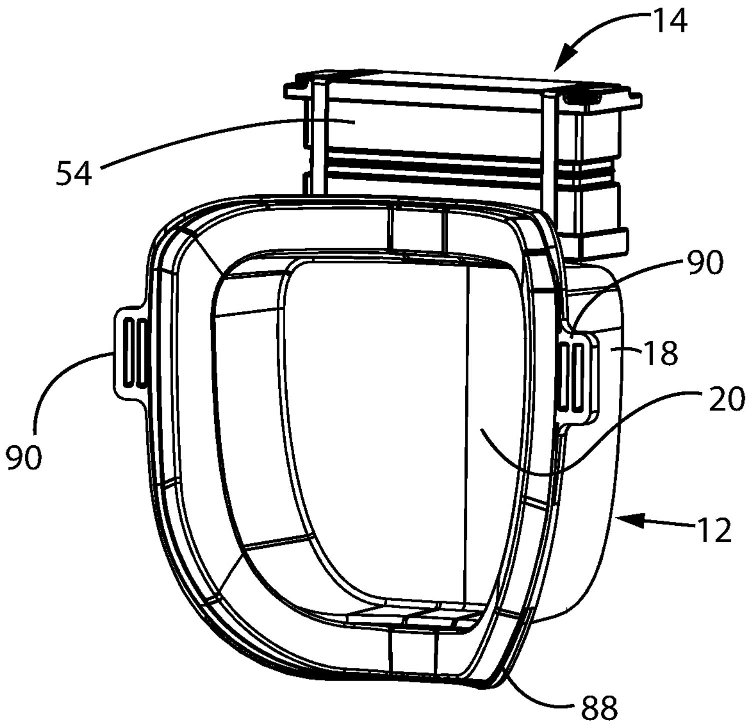
FIG. 6 is a rear perspective view of the filter mask of FIG. 5.
Figure 7:
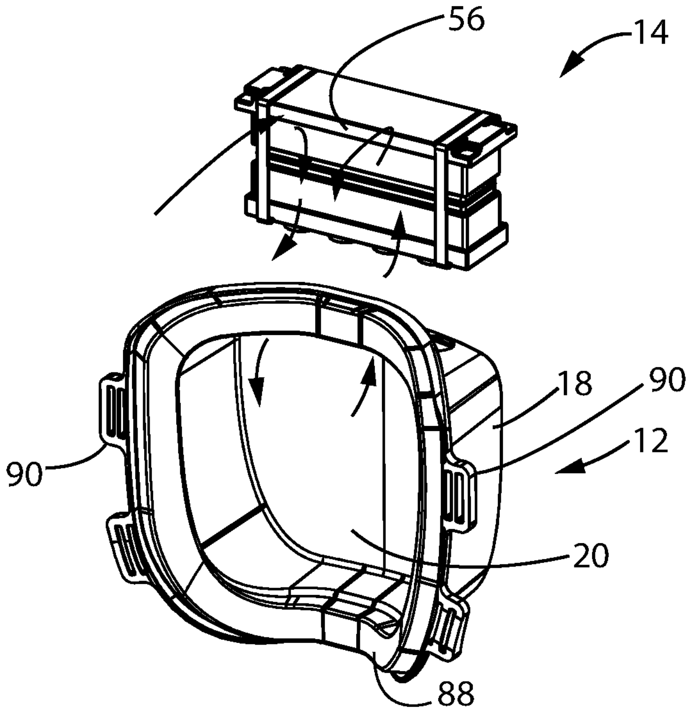
FIG. 7 is a rear perspective view of the filter mask of FIG. 5 with the filter assembly removed.
Figure 8:
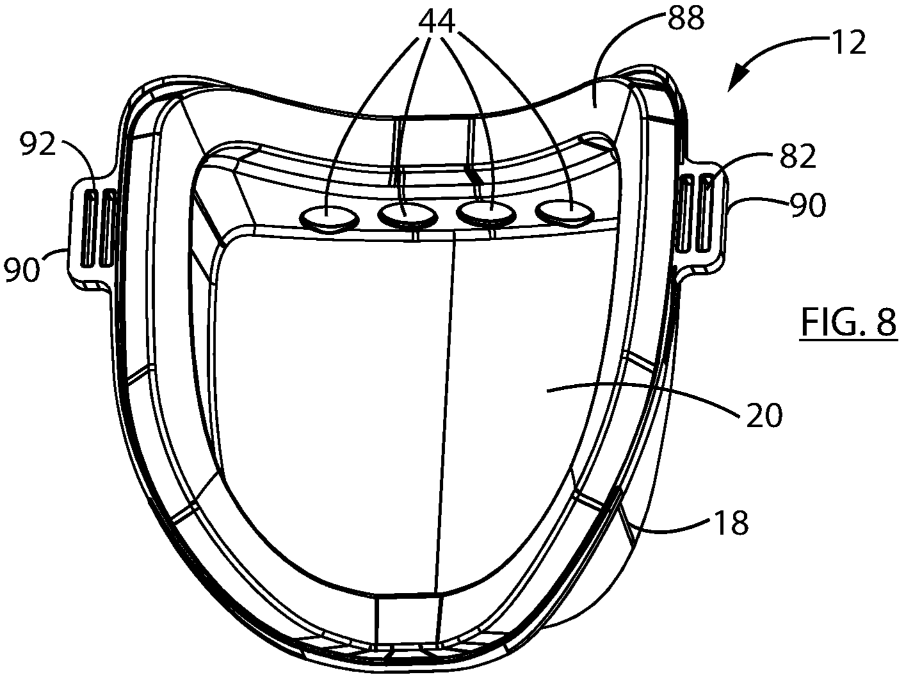
FIG. 8 is a rear perspective view of the mask body of the filter mask of FIG. 5.
Figure 9:
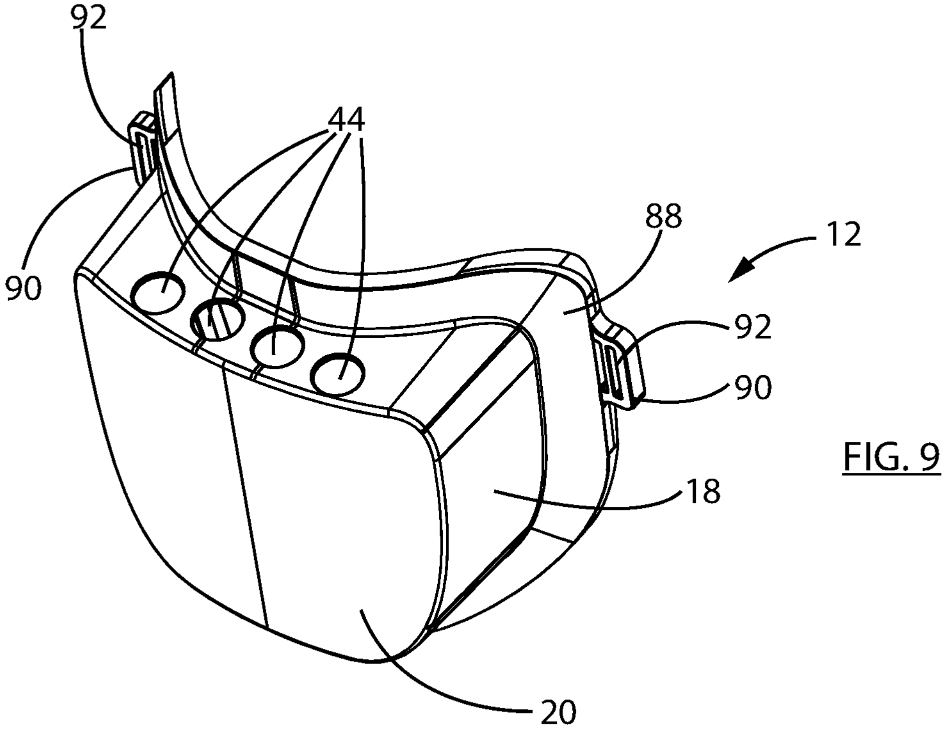
FIG. 9 is a front perspective view of the mask body of the filter mask of FIG. 5.
Figure 10:
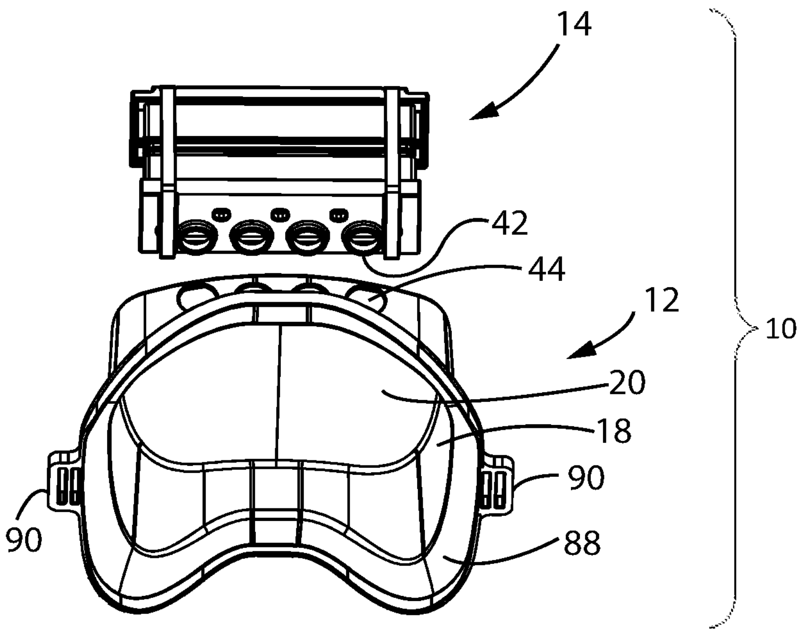
FIG. 10 is a rear perspective view of the filter mask of FIG. 5 showing the inlet and outlet ports of the filter assembly removed.

The mask body 12 may be of any size and shape that covers at least the mouth and nose of a user (see for example FIGS. 53-64 and 72-114) and, optionally, as exemplified, also covers the eyes of a person (see for example FIGS. 1 and 5).

As exemplified in the embodiments of FIGS. 1 and 5, the mask body 12 may have a transparent face plate 20 mounted thereto that, together with the mask body 12, defines a closed volume between the face of a user and the mask in which the mouth, nose and eyes of a person wearing the mask are located and enables the face of a user to be visible. It will be appreciated that the face plate 20 may be any shape and/or size. As exemplified in the embodiments of FIGS. 1 and 5, the face plate 20 may be a single piece that extends over the face of the user and defines a closed volume between the face of a user and the mask in which the mouth, nose and eyes of a person wearing the mask are located.

Figure 20:
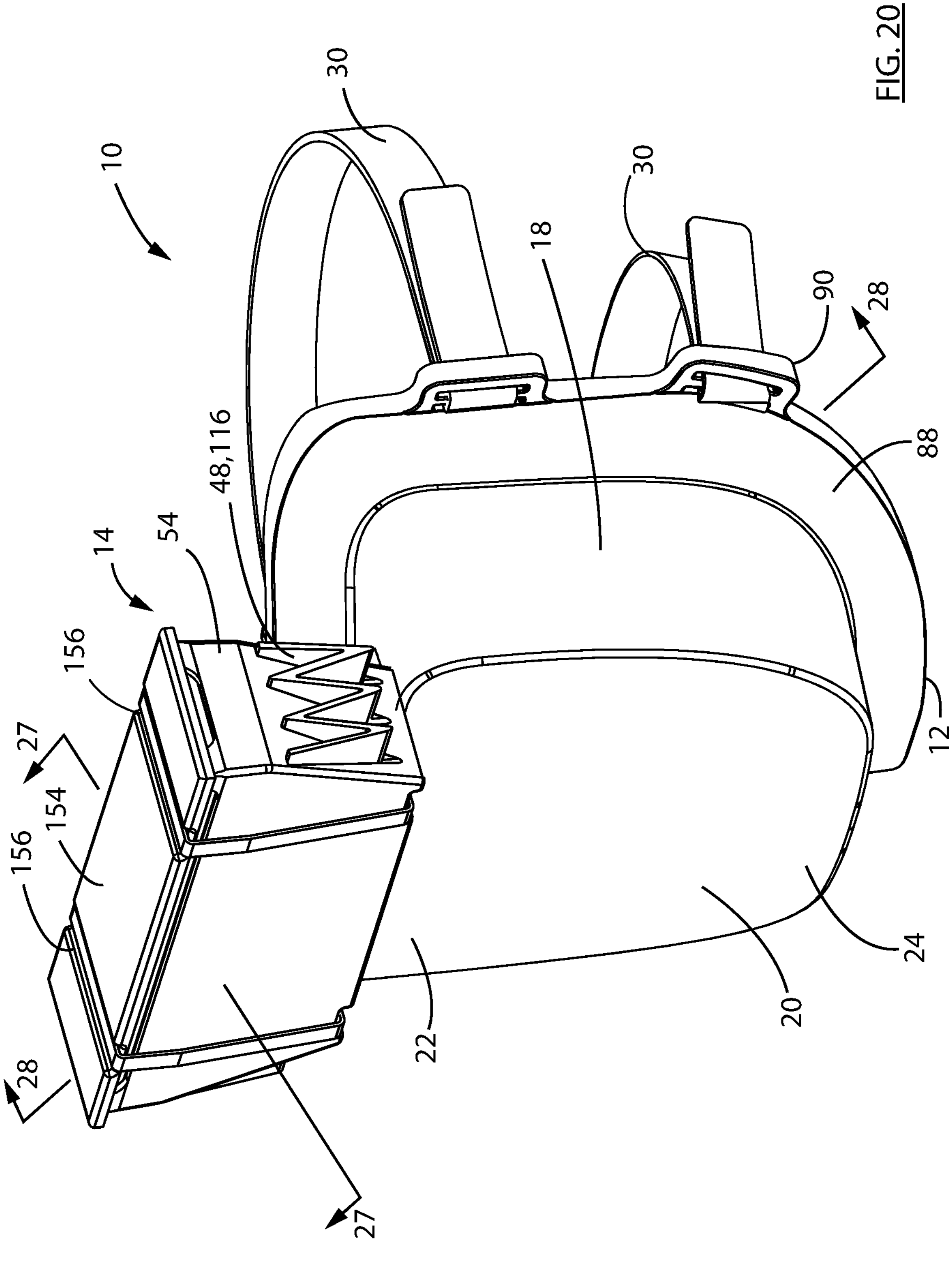
FIG. 20 is a front perspective view of a further alternate embodiment of a filter mask.
Figure 21:
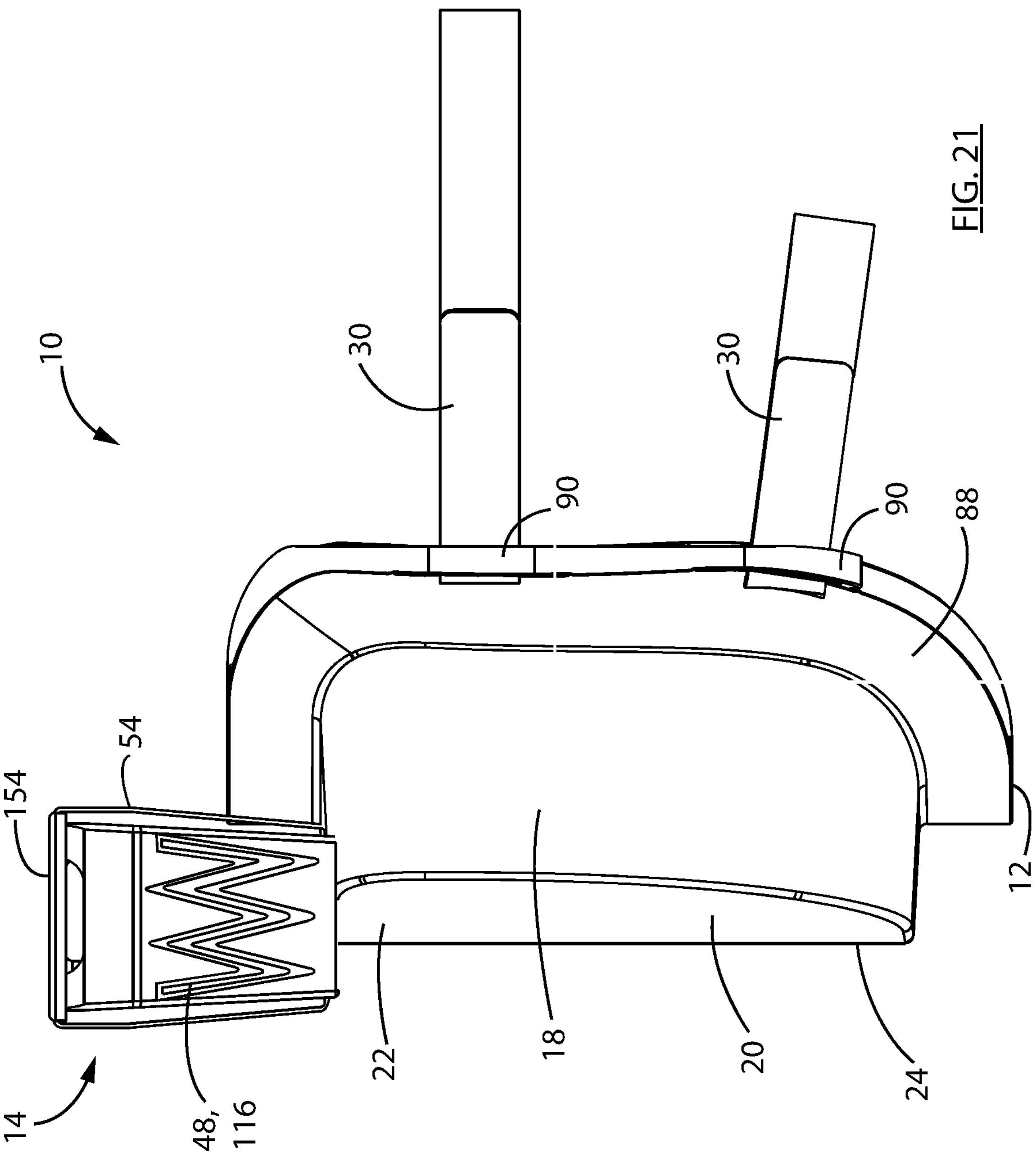
FIG. 21 is a side elevation view of the filter mask of FIG. 20.
Figure 22:
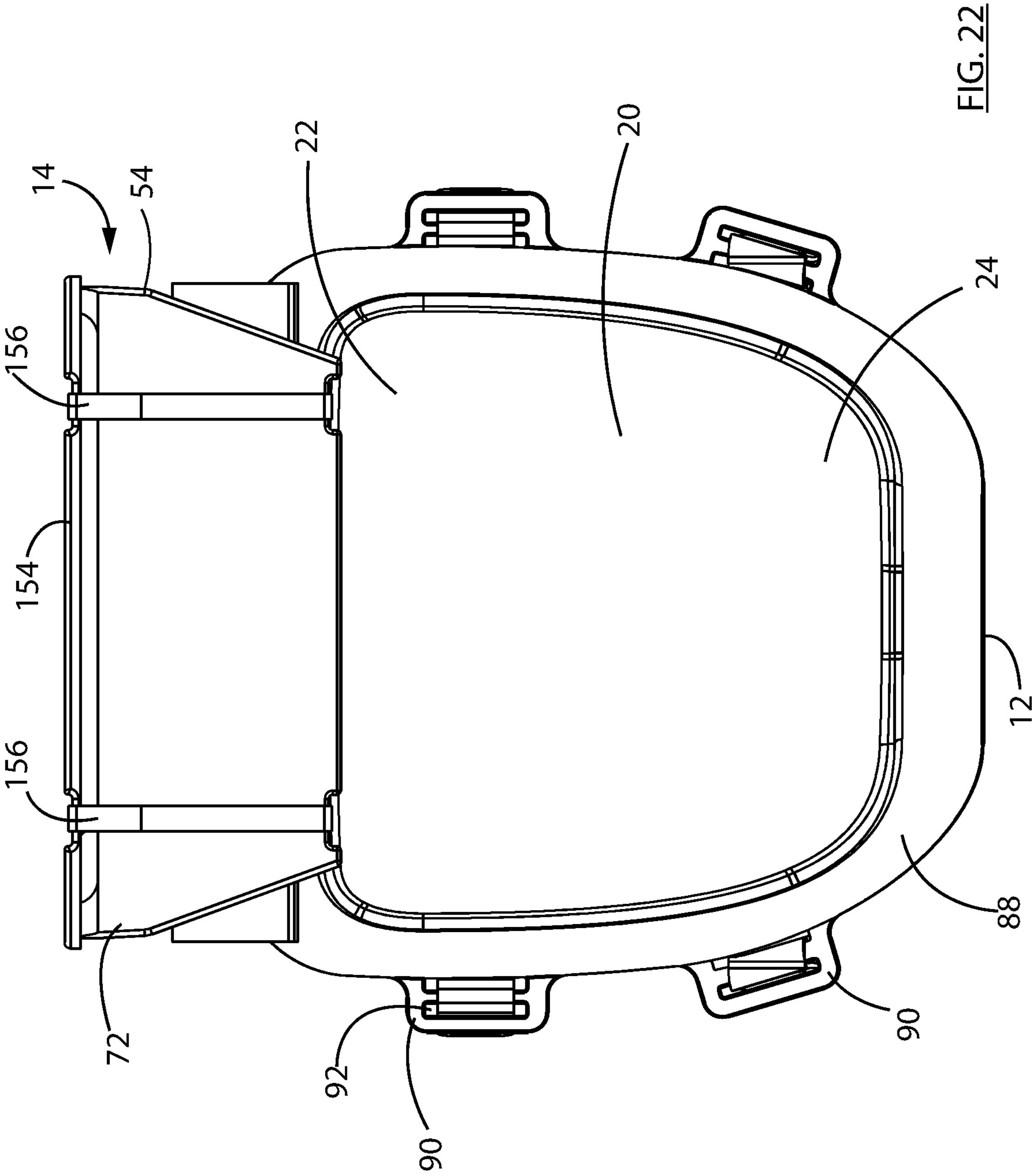
FIG. 22 is a front elevation view of the filter mask of FIG. 20.
Figure 23:
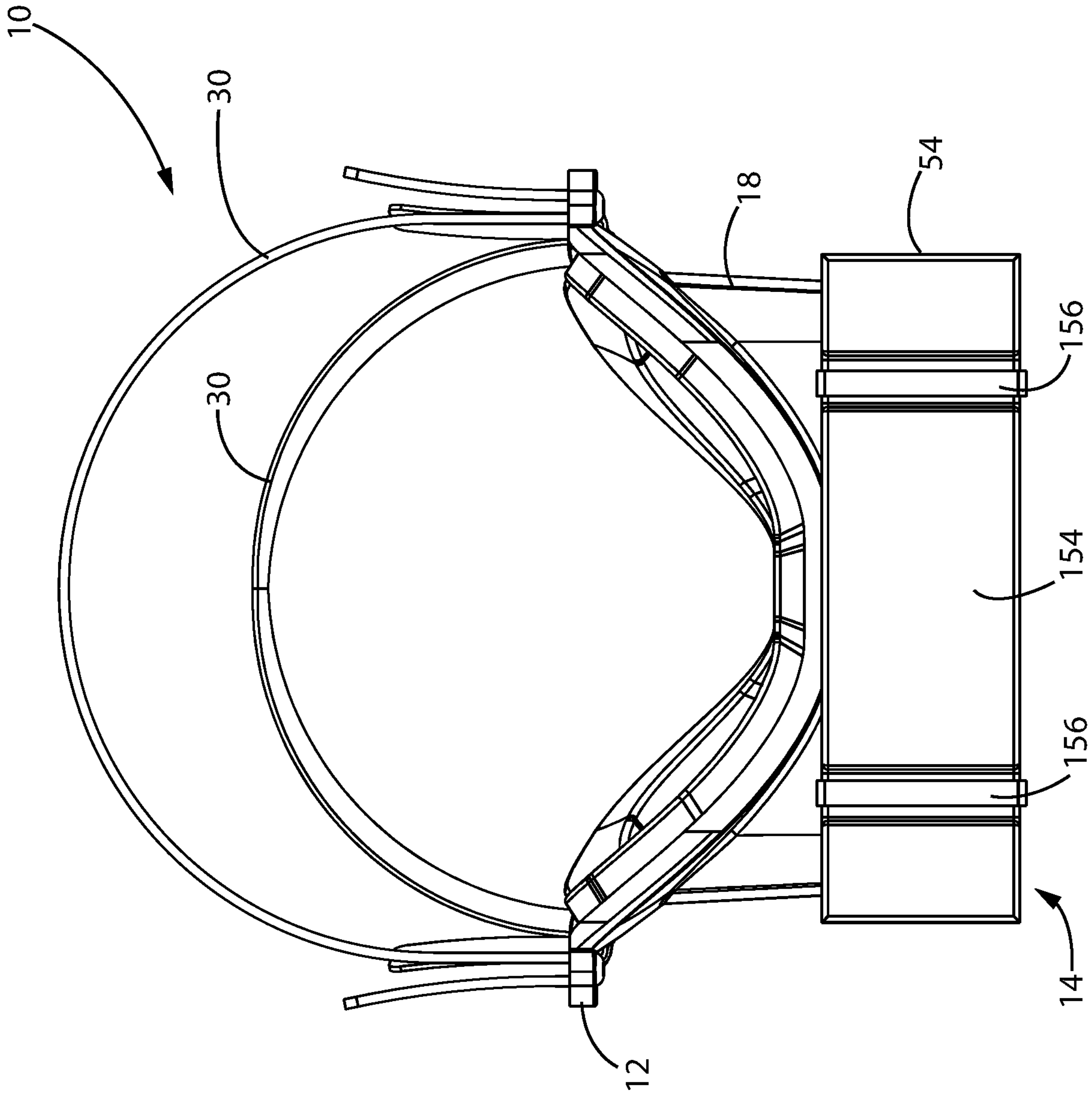
FIG. 23 is a top plan view of the filter mask of FIG. 20.
Figure 24:
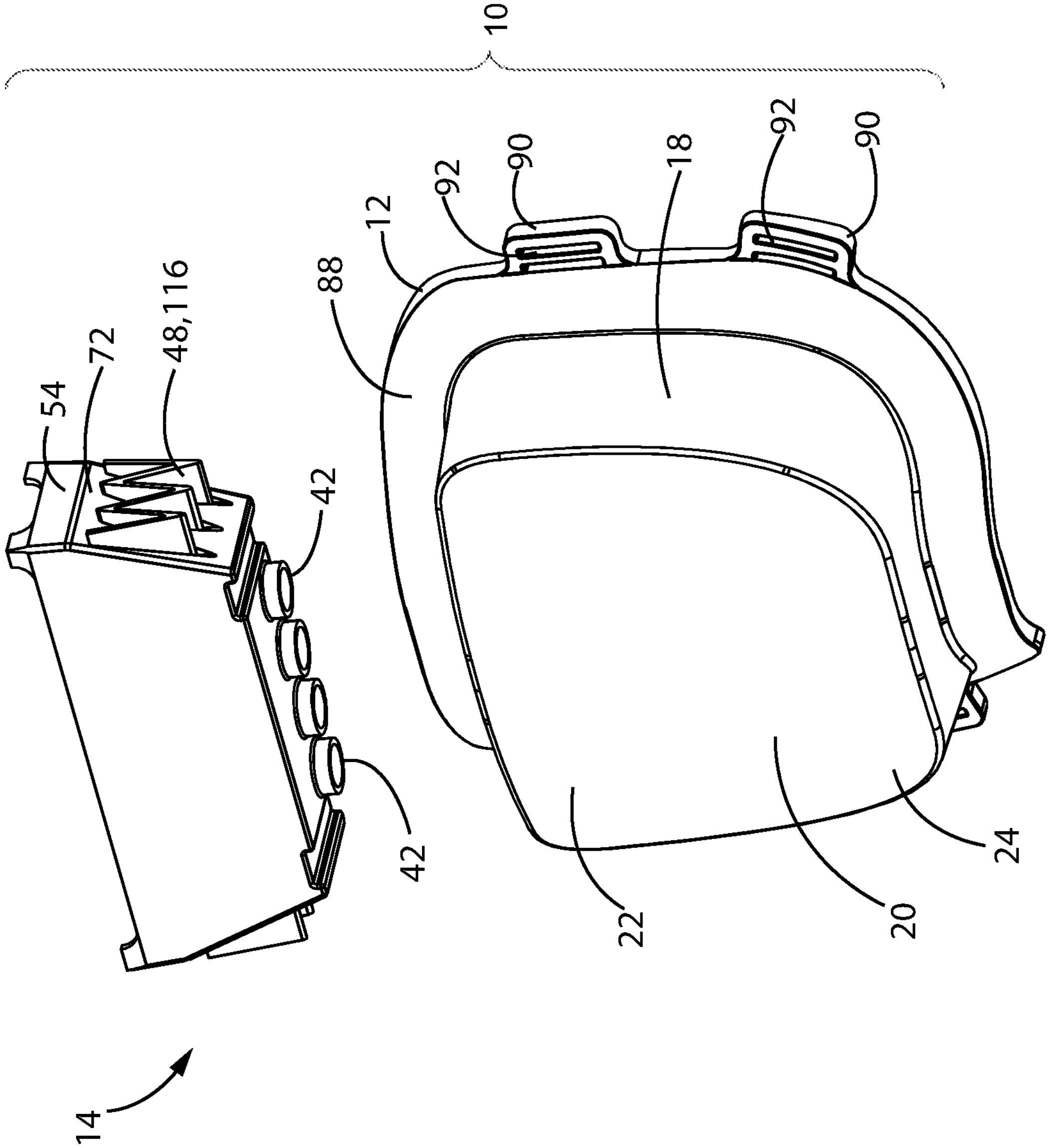
FIG. 24 is a front perspective view of the filter mask of FIG. 20 with the filter assembly removed.

As exemplified in the embodiments of FIGS. 1 and 5, the face plate has an upper end 22 and a lower end 24. The face plate is optionally made of a transparent material and is shaped to overlie and be spaced from the person's mouth, nose and eyes so as to define a volume 28 between the inner surface of the face plate 20 and the face of the person. Accordingly, as exemplified in FIG. 1, the face plate may be sized and shaped so as to rest against the side of a person's face. Alternately, as exemplified in FIG. 5, mask body 12 may have a flange portion 88 that seats against the face of a person wearing the filter mask 10. In the embodiments of FIGS. 5 and 20, face plate 20 is generally flat (i.e., it may generally extend in a plane). Therefore, a side panel 18 is provided to position the face plate 20 so it is located outwards of the nose of a person wearing the filter mask 10. As exemplified, side panel 18 extends generally forwardly from flange portion 88. It will be appreciated that side panel 18 may be made of any material and, optionally, side panel 18 is transparent. For example, side panel 18 may be a one-piece molded part (e.g., it could be vacuum molded from a transparent plastic) that is subsequently secured to flange portion 88 by, e.g., an adhesive, welding or the like.

Alternately, as exemplified in FIGS. 53-64, the mask body may not have a transparent face plate 20. Instead, the mask body 12 itself may overlie the mouth and nose of a user and define a closed volume 15 between the face of the user and the mask in which the mouth and nose of a person wearing the mask are located.

Alternately, as exemplified in FIGS. 101-104, the mask body 12 may incorporate a transparent portion 13, which may be considered a face plate 20, such that part or all of the mouth and, optionally part or all of the mouth and nose of a user are visible.

It will be appreciated that if the mask body 12 only creates a sealed volume 15 in which the nose and mouth of a user and not the eyes are located, then a supplemental face plate 20 may be provided which overlies the eyes of the user (see for example FIGS. 86-91, 113-114, and 123-132). In such a case, the supplemental face plate may be spaced in front of the eyes of a user and need not define a sealed volume in which the eyes are positioned. In other words, the face plate 20 may define an open volume 28 that overlies the eyes of the user. It will be appreciated that, in some embodiments, the closed volume 15 may include the face plate 20 such that the closed volume 15 covers the mouth, nose, and eyes of the user, as exemplified in FIG. 1.

Accordingly, as exemplified in the embodiments of FIGS. 86-97 and 113-115, the face plate 20 may be offset from the face of a person wearing the mask such that the volume 28 between the inner surface of the face plate 20 and the face of the person may be open to the environment. For example, the face plate 20 may be positioned on a side of the mask body 12 opposed to the face of the user, thereby offsetting the face plate 20 from the face of the user. The volume 28 defined by the face plate 20 of the embodiments of FIGS. 86-97 may allow for ambient airflow in front of a person's face while the face plate 20 protects the user's eyes. As exemplified, the mask body 12 does not provide airflow, either inhalation or exhalation, into or near the volume 28 or over the face plate 20. Positioning the air flow in and out of the filter mask 10 in a separate location than in the volume 28 may reduce condensation build-up on the face plate 20 (which can occur due to water vapor in the air exhaled by a user) and may reduce carbon dioxide entrapment and build-up in the volume 28.

The filter mask may be secured to the head of a person by any means known in the mask arts. For example, as exemplified in FIGS. 1, 20, and 95-97, one or more straps 30 may be provided to extend around a person's head and secure the filter mask 10 in position on a person's face.

As exemplified in the embodiments of FIGS. 86-97, the face plate 20 may be positioned such that the straps 30 secure the filter mask 10 in position on a person's face while allowing for other protective equipment to be worn. For example, the filter mask 10 of FIGS. 86-97 may allow a user to wear any form of head apparel without interfering with the filter mask 10. As exemplified in FIGS. 93-98, a user may wear a hard hat for protection without interfering with the operation and comfort of the filter mask 10.

As exemplified in FIGS. 5-12 and 20-29, flange portion 88 may be provided with strap attachments 90. Strap attachments 90 have openings 92 to which straps 30 (see FIGS. 20 and 95-97) may be attached. Any strap attachment and strap known in the mask arts may be used. Further. The strap may be attached to any portion of the filter mask 10. In some embodiments, the straps 30 may be at least partially see-through. For example, in some embodiments, the straps 30 may be transparent.

Mask Body

In accordance with this aspect, which may be used by itself or in combination with one or more other aspects, the mask body may be made of a flexible material. An advantage of this design is that the mask body may be made of, e.g., a closed cell foam or a closed cell foam that is reinforced.

An N-95 mask may be made of an N-95 filter media that is molded or formed into a desired shape for a mask. Such a design uses more filter material than is required. When biological filter material is in demand, then it is advantageous to use only an amount of biological filter material that is required for filtration. Accordingly, a mask body or mask frame may be provided which is made of an alternate material and the biological filter material may be removably receivable in, or removably attachable to, the mask body.

Closed cell foams are readily available and may be used by themselves or with one or more reinforcing layers to provide a mask body to removably receive a biological filter material. Closed cell foams may be relatively stiff compared to an open cell foam. For example, a closed cell foam may have a stiffness of, e.g., 10-80 or 35-50 on shore 00 scale. Accordingly, a closed cell foam may be used by itself as the mask body. An advantage of this design is that the mask body by itself may be the closed cell foam (e.g., sealing member 26).

Alternately, as exemplified in FIGS. 53-64, 87-98, and 101-117 the mask body may comprise a substrate 174 to which a closed cell foam is provided. Optionally the closed cell foam may be sealing member 26 (as exemplified in FIGS. 53-64) or an alternate sealing member may be provided, e.g., to the inner surface of the closed cell foam. As exemplified in FIGS. 53-64 87-98, and 101-117 substrate 174 is formed into a desired shape and a mask body side 27 or the sealing member 26 is mounted thereto, such as by an adhesive, welding or the like. The mask body side 27 may also be referred to as the mask user side 27, indicating the portion of the mask body 12 that faces towards the face of a user when the filter mask is worn by the user. Substrate 174 may provide added rigidity to the sealing member 26. Alternately, as exemplified in FIGS. 72-85, the substrate 174 may act as the sealing member 26. For example, the substrate 174 may be flexible such that the substrate 174 provides a seal against the face of a user. In some embodiments, the sealing member 26 may include a resilient member. For example, the sealing member 26 may be resilient such that when a user wears the mask 10, the resilient sealing member 26 resists deformation against the face of the user, thereby forming a seal between the mask 10 and the face of the user. It will be appreciated that the flexible substrate 174 may also have a sealing member 26 to improve the seal between the mask body and the face of the user. It will also be appreciated that a soft material may be provided to the substrate 174 to improve the comfort of the user without affecting the seal.

It will be appreciated that strap attachments 90 may be provided on the closed cell foam itself, substrate 174 (as exemplified) or both the closed cell foam and substrate 174.

Substrate 174 may be made of a variety of materials. For example, substrate 174 may be made of fiberglass, wood, compressed cellulose, plastic or metal. If substrate 174 is made of plastic, it may be made by injection molding or other thermoplastic forming process such as rotational molding, compression molding, vacuum forming or pressure forming. According to this embodiment, as substrate 174 has a sealing member 26 applied thereto, substrate 174 may be easily mass produced using forming processes which provide formed products having more variance. Alternately, or in addition, substrate 174 may be made of metal, e.g., aluminum, copper, copper coated steel, copper coated aluminum or the like. An advantage of this design is that stamping plants may be easily converted to produce substrates by providing an alternate stamping form. Accordingly, a stamping plant may be quickly retooled to produce a filter mask.

Optionally, substrate 174 may provide a biasing action to compress a sealing member 26 against the face of a user. Accordingly, as exemplified in FIGS. 64 and 83, substrate 174 comprises a filter attachment portion 176 and a flange portion. Juncture 178 is provided between flange portion 88 and filter attachment portion 176. Juncture 178 may provide a biasing force. For example, juncture 178 may be flexible section of substrate 174, which is formed as a spring member. Accordingly, for example, juncture 178 may be accordion shaped or corrugated. When filter mask 10 is placed on the face of a user, flange portion 88 maybe deflected away from the face of a user by interaction between the face of a user and flange portion 88. In such a case, juncture 178 may be sufficiently flexible to permit flange portion 88 to move away from the face of the user so that the filter mask seats comfortably on the face of a user while still applying an inward force to maintain contact between sealing member 26 and the face of a user.

In some embodiments, at least a portion of the mask body 12 may be partially see-through and/or transparent to allow a portion of the user's face to be seen. Providing a transparent portion of the mask body 12 may increase the ease of communication with others while the user is wearing the mask 10. For example, as exemplified in FIGS. 101-104, the mask body 12 includes a transparent portion 13. As exemplified in FIGS. 103-104, the transparent portion 13 allows the face of the user to be seen more clearly. As shown, the mouth and nose may more clearly be seen through the transparent portion 13. It will be appreciated that, in some embodiments, the entire mask body 12 may be at least partially see-through. For example, as exemplified in FIGS. 105-120, the entire mask body 12 is transparent.

Accordingly, when the mask body 12 includes the transparent portion 13, the filter assembly 14 may be positioned below the mouth of the user in order to provide visual access to the user's mouth and/or nose.

In some embodiments, the mask 10 may include a removable insert 11, as exemplified in FIGS. 139-140. As illustrated in FIG. 139, the insert 11 may be positioned within the mask body 12 to cover some or all of the transparent portion 13. Accordingly, when the insert 11 is positioned within the mask body 12, the transparent portion 13 is at least partially covered, or optionally fully covered. When the transparent portion 13 is covered by the insert 11, the nose and mouth region of the user may be hidden from view.

Face Sealing Member

In accordance with this aspect, which may be used by itself or in combination with one or more other aspects, in order to reduce ambient air leaking into the volume 28, a sealing member 26 may be provided. The sealing member may be any sealing member known in the mask arts. For example, the sealing member 26 may be a gasket, silicon, rubber, an open cell foam, a closed cell foam, an inflatable member or the like. The sealing member may be provided on the entire perimeter of the face plate 20 or the mask body 12.

Figure 17:
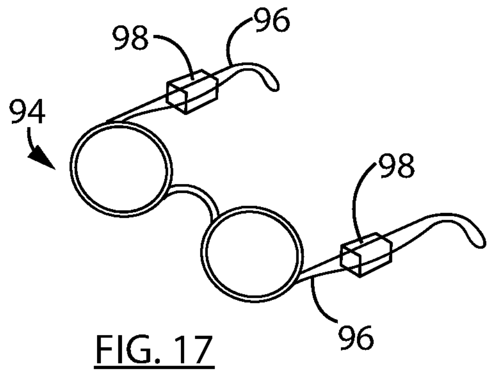
FIG. 17 is a perspective view of a pair of eye glasses with sealing members on the temples.
Figure 18:
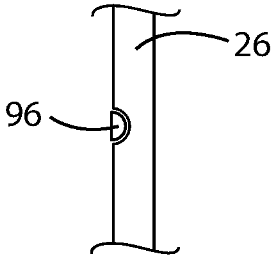
FIG. 18 is an enlarged end view of the portion of the seal of region A of the filter mask of FIG. 1 with the temple of a pair of eye glasses positioned as the eye glasses would be worn by the person wearing the mask in FIG. 1.

In some cases, a person, e.g., a patient or a doctor or a nurse, may wear glasses. In such a case, a sealing member 26 may be constructed so as to deform around the temples of a pair of glasses. Accordingly, the sealing member may have a sufficient depth (between the mask body 12 and the face of a user) so as to deform around and form a seal around the temple of the eyeglasses. See for example FIG. 18 wherein the temple 96 of the pair of eyeglasses 94 of FIG. 17 is positioned against the sealing member 26 and the sealing member has deformed to extend around temple 96. It will be appreciated that, in some embodiments, only the portion of the sealing member that is located at a position that would engage the temples 96 of eyeglasses 94 may be sealable about the temples.

Alternately, or in addition, as exemplified in FIG. 17, the temples 96 of eye glasses 94 may have an annular sealing member 98 positioned on the temples 96 (e.g., slideably positionable) so as to be positioned between the face of a person and the filter mask 10 when the person is wearing the filter mask.

Figure 116:
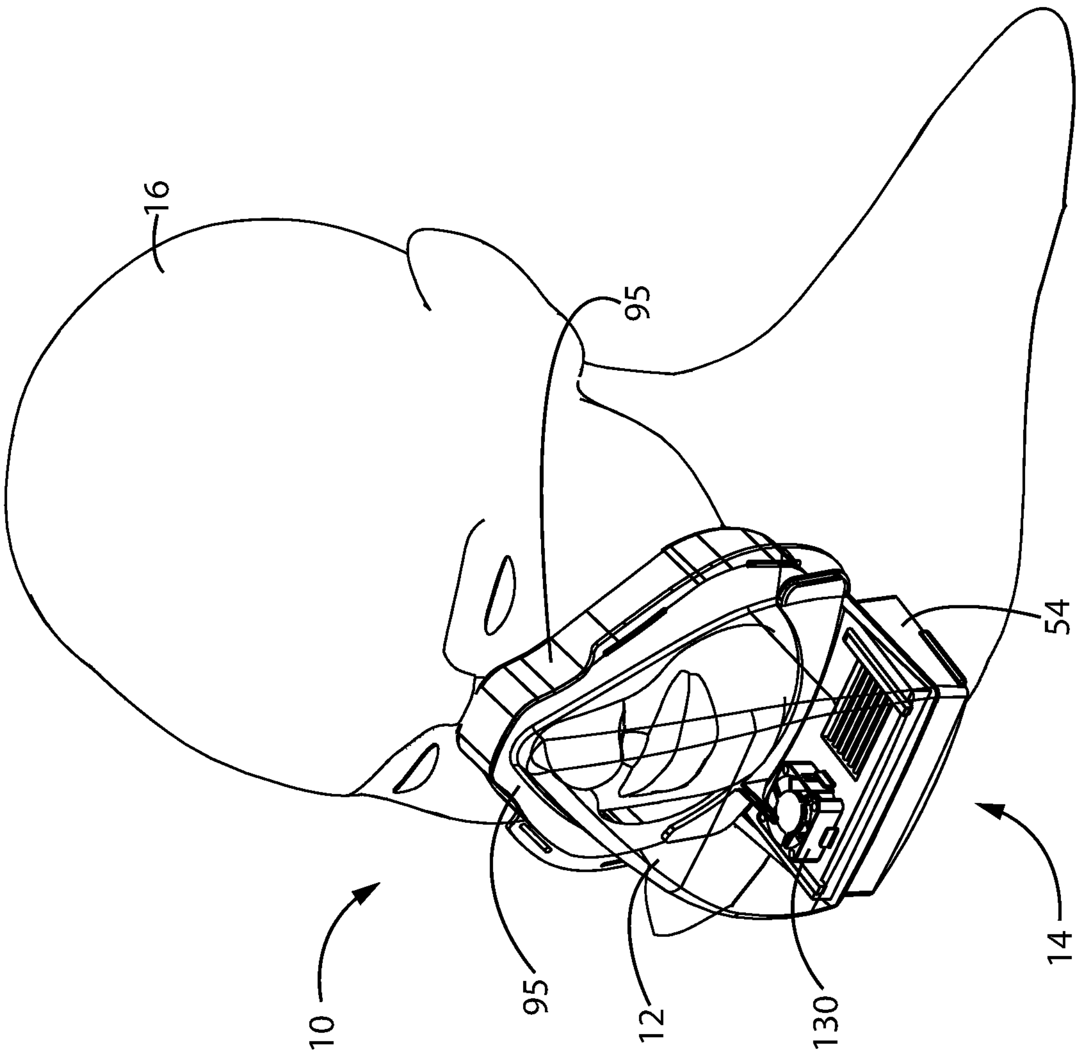
FIG. 116 is a front perspective view of a further alternate embodiment of a filter mask having a face plate when worn by a user.
Figure 117:
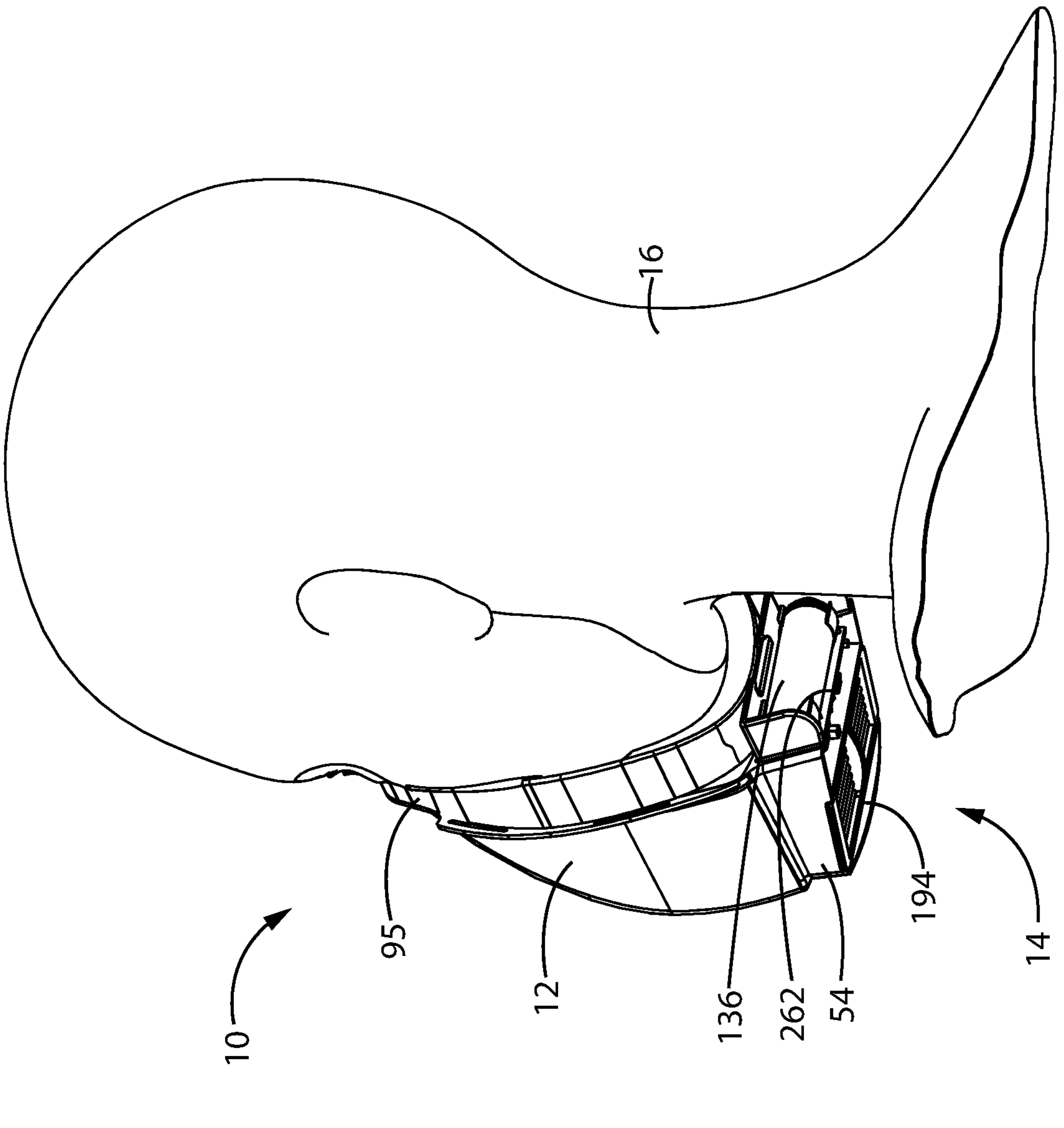
FIG. 117 is a rear perspective view of the filter mask of FIG. 116 when worn by a user.
Figure 118:
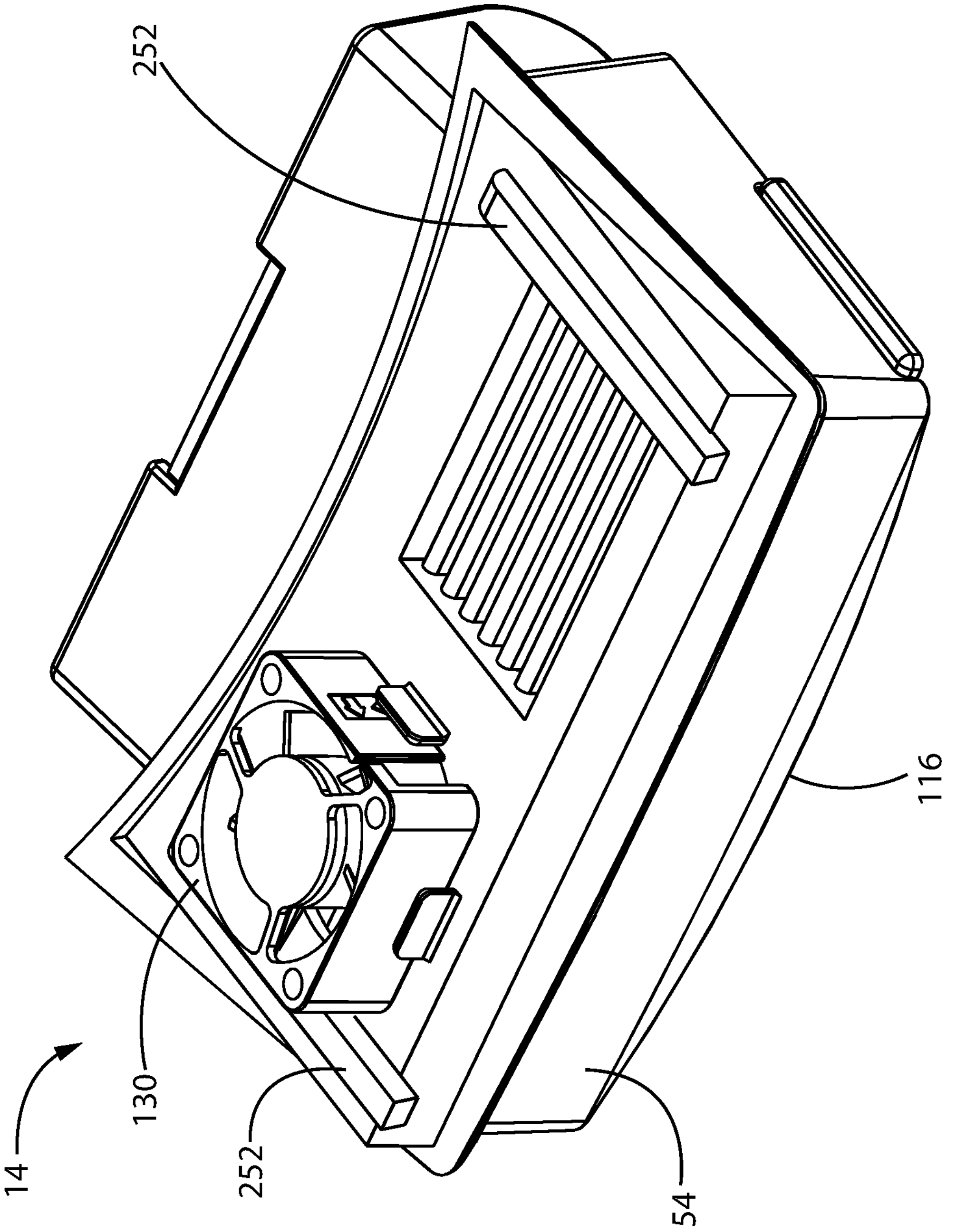
FIG. 118 is a front perspective view of a further embodiment of a filter assembly.

In some embodiments, eyeglasses 94 may be worn externally to the mask 10, without affecting the performance of the mask 10. For example, if as exemplified in FIGS. 110-115, the mask body 12 only seals the mouth and nose of a user, then the mask body 12 may include one or more external recesses for supporting eyeglasses 94. In some embodiments, as shown in FIGS. 116-117, the substrate 174 may include a recess 95 on either side of the user's nose for receiving eyeglasses 94. The recesses may provide stability and support for the eyeglasses 94 to be worn outside the mask 10 on the user. Accordingly, in the example embodiments of FIGS. 113-115, the glasses may be located behind face plate 20. In some embodiments, the sealing member 26 may include the recesses for receiving the user's eyeglasses 94. It will be appreciated that the recesses for eyeglasses 94 may be located on and/or in any location on the mask 10.

In some embodiments, a stiffer foam may be used, e.g., a closed cell foam, which may have a stiffness of 10-80 or 35-50 on shore 00 scale. In such a case, if all of a user side 25 of sealing member 26 abuts the face of a user, then sealing member 26 may not sufficiently compress to provide a complete seal around the perimeter of sealing member 26. Accordingly, in accordance with some embodiments, the user side 25 of sealing member 26 may be configured such that only a portion of the user side 25, e.g., the inner perimeter) contacts the face of a user. As exemplified in FIGS. 57, 64, 125, 137, and 138A, user side 25 may have an inner perimeter 25*a* and an outer perimeter 25*b* with an optional medial portion 25*c* therebetween. The inner perimeter 25*a*, outer perimeter 25*b*, and medial portion 25*c* may also be referred to as the inner edge 25*a*, the outer edge 25*b*, and the width 25*c* respectively. User side 25 may be shaped such that only inner perimeter 25*a* or essentially only inner perimeter 25*a* contacts the face of a user. For example, as exemplified in FIG. 64, user side may extend at an acute angle A such that outer perimeter 25*b* and optionally some or all of medial portion 25*c* are spaced from the face of a user. Accordingly, the contact between user side 25 and the face of a user is limited to a narrow band of user side 25 of sealing member 26. This will increase the pressure per square inch exerted on the portion of the sealing member 26 that contacts the face of a user. Once the inner perimeter compresses, then more of the user side 25 may seat against the face of a user until the compressive force is spread across an amount of the user side 25 such that sealing member will no longer compress.

It will be appreciated that other portions of the user side 25 may provide the contact with the face of a user, depending upon the configuration of user side 25. For example, outer portion 25*b* may provide the contact portion if user side commencing at outer portion 25*b* extends outwardly away from the face of the user at a rate greater than the curvature of the face. Alternately, medial portion 25*c* may extend inwardly away from substrate 174 to form a central contact portion that abuts the face of a user (e.g., user side 25 may be convex with medial portion 25*c* the portion located the furthest outward from substrate 174).

As described previously, the sealing member 26 may form a closed volume 15 covering the mouth and nose of the user. The seal formed against the face of the user, thereby defining the closed volume 15, may be referred to as the closed volume perimeter. In some embodiments, at least a portion of the sealing member 26 may extend inwardly of the closed volume perimeter into the closed volume 15, as exemplified in FIGS. 53-66, 86-97, 101-117, 123-127,132, and 137-140. Accordingly, in some embodiments, the inner perimeter 25*a* of the user side 25 of the sealing member 26 may be located within the closed volume 15. It will be appreciated that the portion of the sealing member 26 located within the closed volume 15 may vary. For example, in some embodiments, 5%, optionally 10%, optionally 15%, or optionally 20% of the width 25*c* of the user side 25 of the sealing member 26 may be located within the closed volume 15.

It will be appreciated that the thickness of the sealing member 26 may vary. For example, in some embodiments, the thickness of the sealing member 26 may be greater than 1.5", optionally 0.25" to 1.5", optionally 0.250" to 1", or optionally 0.375" to 0.75". In some embodiments, the thickness of the sealing member 26 may vary at different locations on the mask 10. For example, approximately 65% of the surface area of the face sealing member may have a thickness of 0.175" to 0.375" or optionally 0.08" to 0.5". Reducing the thickness of the sealing member 26 may reduce the material required for the mask 10, thereby reducing the weight and improving the comfort of the user.

In some embodiments, the sealing member 26 may have two regions 26*a* and 26*b*, as exemplified in FIGS. 138A and 1386. The regions 26*a*, 26*b* may be coloured differently to indicate the user side and the non-user side. For example, the region 26*b* may be a darker colour than the region 26*a*. A darker coloured region 26*b* may improve the aesthetics of the mask 10 once it has been worn by reducing the visibility of oil and/or makeup deposited on the sealing member 26 during use.

Alternately or in addition, the region 26*b* may have a different compressibility than the region 26*a*. For example region 26*b* may be a more compressible foam than region 26*a*.

Communication

In accordance with this aspect, which may be used by itself or in combination with one or more other aspects, a speaker 32, such as a vibratory membrane or resonant member, may be provided in the face plate 20. The speaker may enhance the ability of a doctor to hear a patient while the patient is wearing the filter mask 10. An advantage of a vibratory membrane is that the speaker 32 does not permit air to pass therethrough when a person is speaking.

In an alternate embodiment, the entire face plate 20 itself may be the vibratory membrane or resonant member.

Microphone

Figure 109:
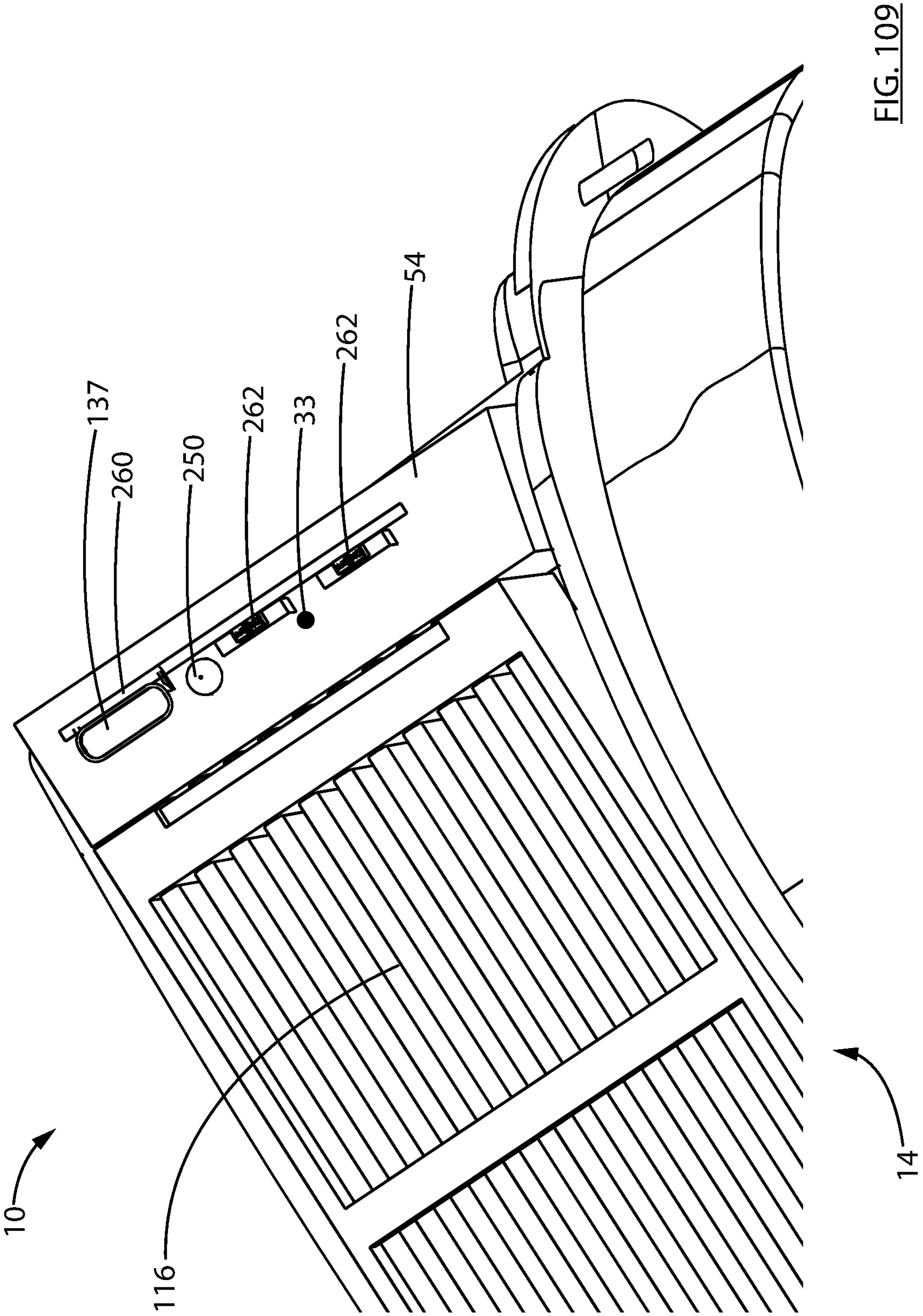
FIG. 109 is a partial bottom perspective view of the filter mask of FIG. 105.
Figure 110:
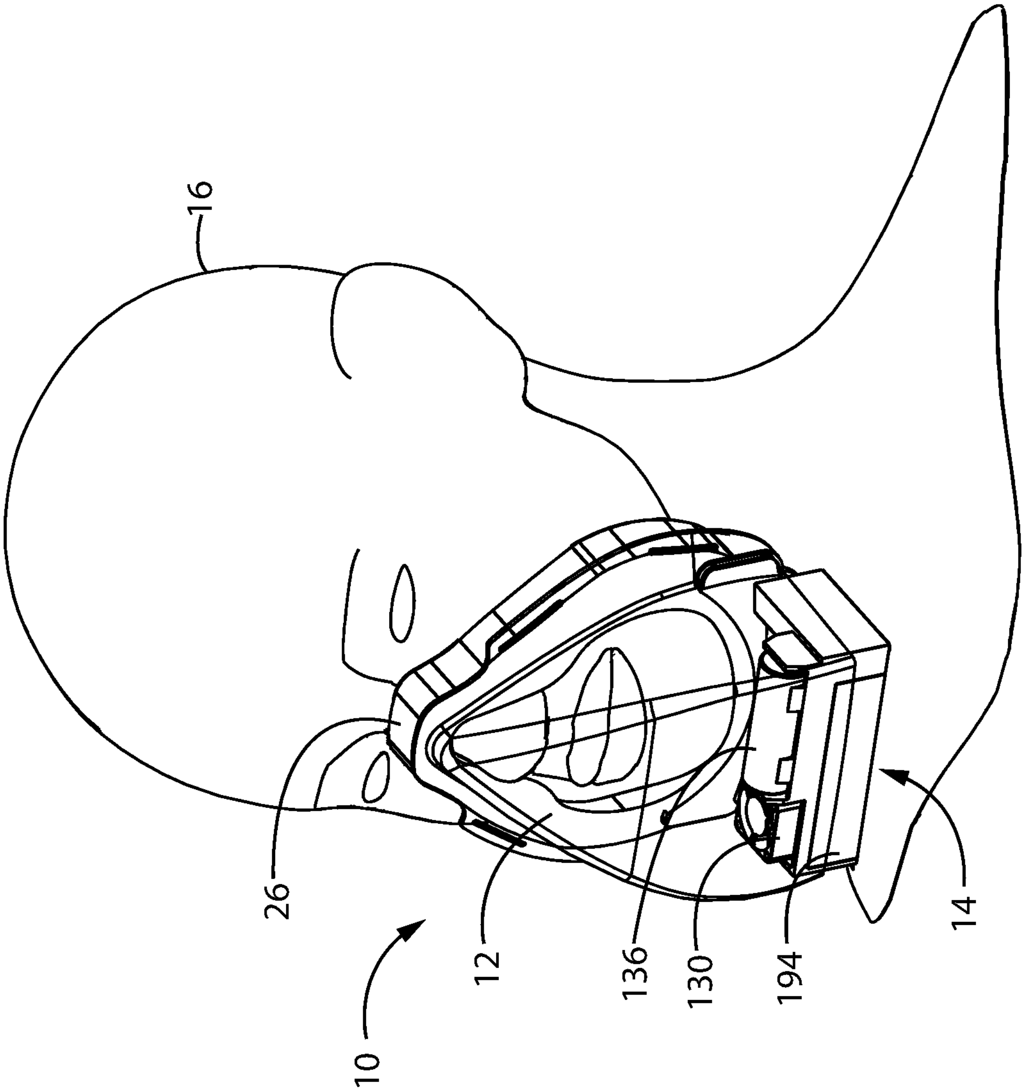
FIG. 110 is a front perspective view of the filter mask of FIG. 105 when worn by a user.
Figure 111:
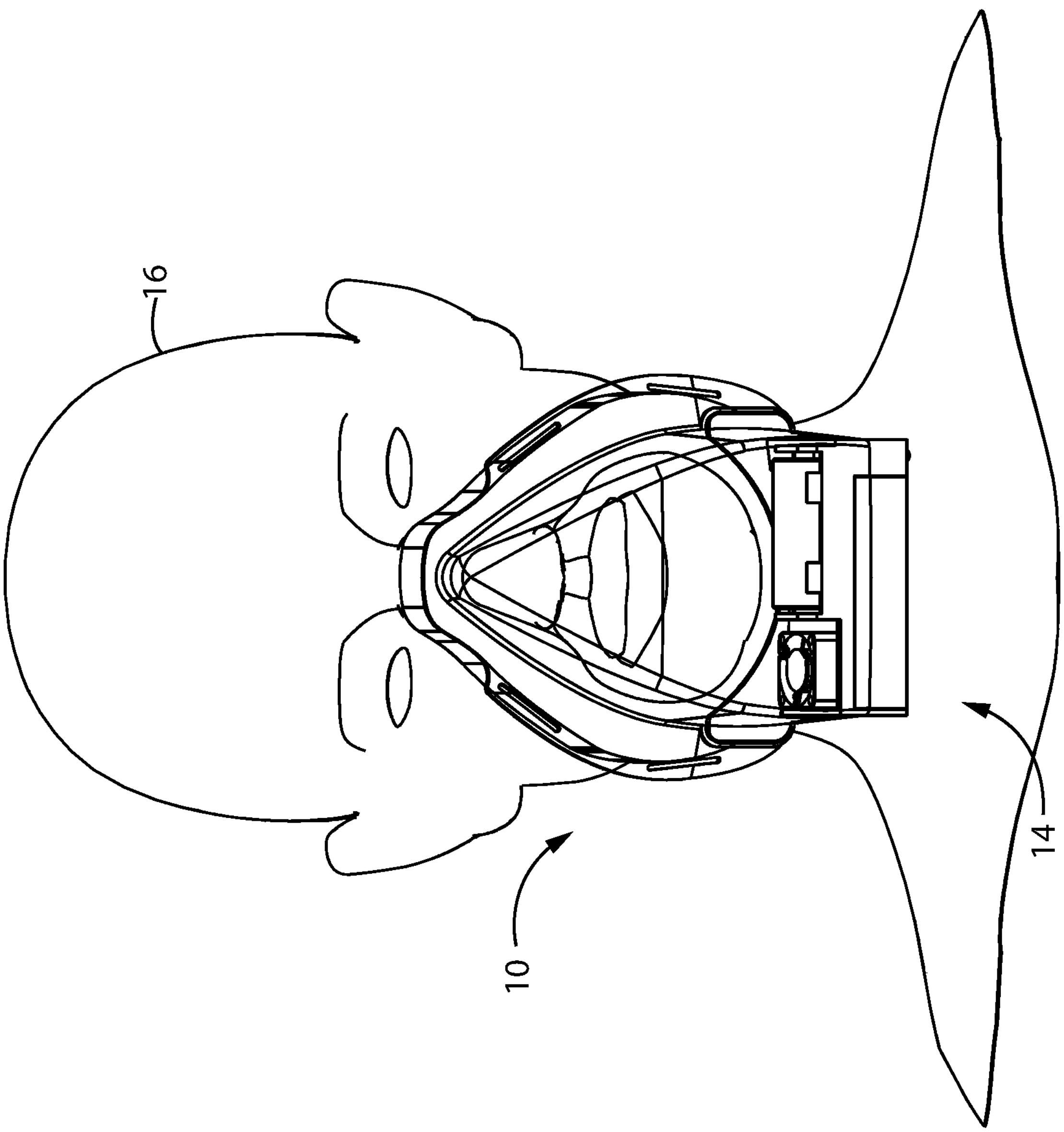
FIG. 111 is a front view of the filter mask of FIG. 105 when worn by a user.
Figure 112:
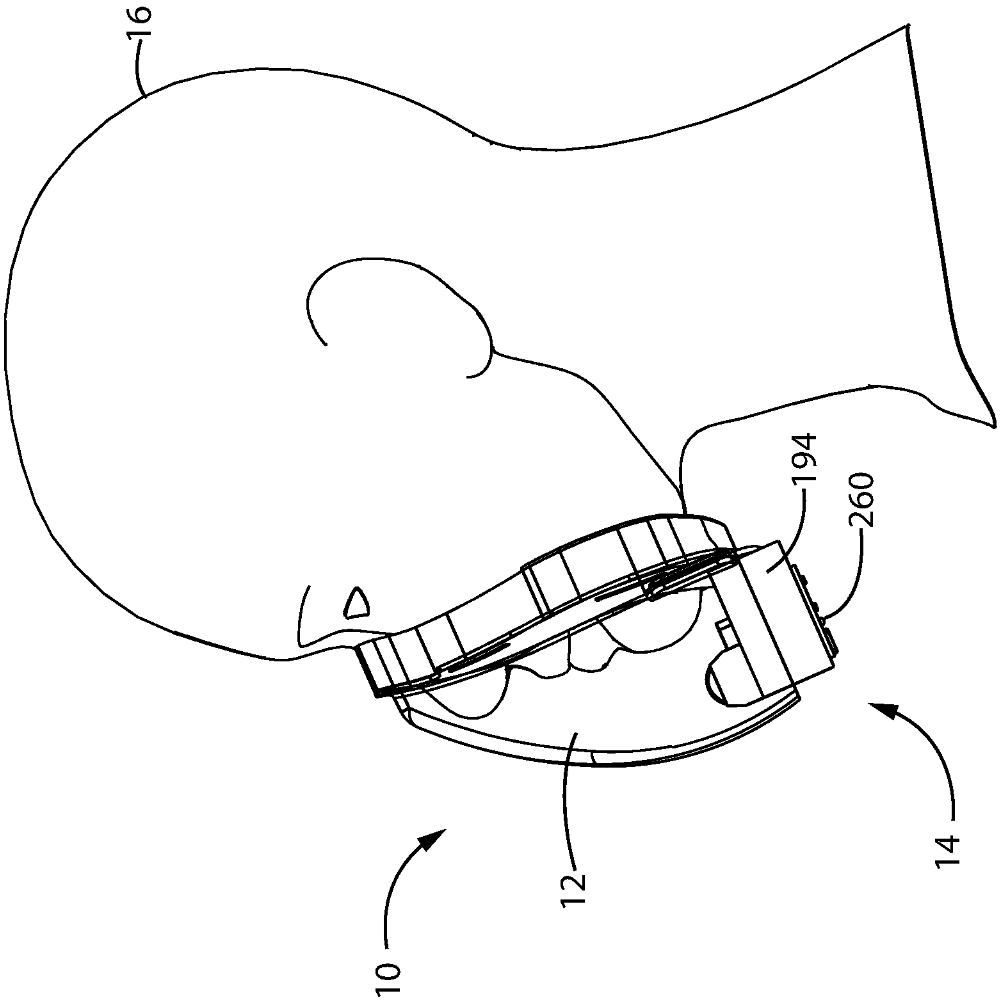
FIG. 112 is a side view of the filter mask of FIG. 105 when worn by a user.

In accordance with this aspect, which may be used by itself or in combination with one or more other aspects, the mask 10 may include a microphone 33, as exemplified in FIG. 109. The microphone 33 may be used to receive input when a user talks while wearing the mask.

It will be appreciated the microphone 33 may be wirelessly connected by any means used in the communications arts. For example, the microphone 33 may be wirelessly connected by, including but not limited to, Bluetooth, NFC, radio frequency, Wi-Fi, or any combination thereof. Accordingly, a user may connect to their mobile device and may make phone calls without taking off the mask 10 or may use their phone as a speaker. Alternately, the microphone 33 may provide a signal to a speaker provided on an exterior surface of the mask.

Optionally, an ear piece may be provided to allow a user to make phone calls without removing the mask 10. In some embodiments, the microphone 33 may be connected to the ear piece. It will be appreciated that the microphone 33 may be connected to the ear piece by any means. For example, the microphone 33 may have a wired connection to the ear piece. The wire may extend from the microphone 33 out of the mask 10 to the ear piece worn by the user. In some embodiments, the microphone 33 may be wirelessly connected to the ear piece by, including but not limited to, Bluetooth, NFC, radio frequency, Wi-Fi, or any combination thereof. In some embodiments, the microphone 33 may be wirelessly connectable to the ear piece and have an optional wired connection to the ear piece. Accordingly, if an energy storage member in the ear piece is depleted, a user may connect the wire to the microphone 33 to allow for continued use. It will be appreciated that each of the microphone and the ear piece may wireless connect to a cell phone.

In some embodiments, the microphone 33 may be electrically connected to the energy storage member 136. Connecting the microphone 33 to the existing energy storage member 136 may reduce the overall weight and complexity of the mask 10.

In some embodiments, the microphone 33 may be used for noise cancelling. For example, as a user breathes in and out of the mask 10, the enclosed space may increase the noise when a user is on a phone call. The microphone 33 may be used to actively cancel the noise such that the user may be heard more clearly.

In some embodiments, the mask 10 may include buttons 262 for controlling the volume of the speaker 32 and/or microphone 33. The buttons 262 may be located anywhere on the mask 10. Control of electrical components is discussed in more detail subsequently.

Emesis

In accordance with this aspect, which may be used by itself or in combination with one or more other aspects, an outlet 34 is provided in case of emesis. As exemplified in FIG. 1, the outlet 34 is provided in the lower portion 24 of the face plate 20. As exemplified, the outlet 34 comprises a port provided in a lower portion of the face plate 20 and a conduit 36 extends downwardly from the outlet 34 to a container 38. Accordingly, if a person were to vomit while wearing the filter mask, the vomit could flow downwardly due to gravity through conduit 36 and into container 38.

In order to empty the container 38, a drain plug 40 may be provided. Container 38 may be removably attached to conduit 36 and/or conduit 36 may be removable attached to mask body 12. Accordingly, if a person were to vomit while wearing the filter mask 10, the conduit 36 and/or the container 38 could be removed for cleaning and disinfection and/or replacement.

Biological Sampling and/or Drinking

In accordance with this aspect, which may be used by itself or in combination with one or more other aspects, an openable port may be provided. The port, when opened, enables a medical practitioner to take a biological sample from a person who is wearing the mask (e.g., from the mouth or nose of a person using, e.g., a swab). Alternately, or in addition, the port enables a person wearing the mask (e.g., a medical practitioner or a patient) to drink while wearing the mask, such as by using a straw. An advantage of this aspect is that a person who may be infected need not remove the mask to enable a biological sample to be taken. A further advantage is that a person wearing the mask may rehydrate without taking off the mask, thereby preventing a person possibly being exposed to a virus while taking a drink, or a person who is infected spreading a virus while taking a drink.

Figure 14:
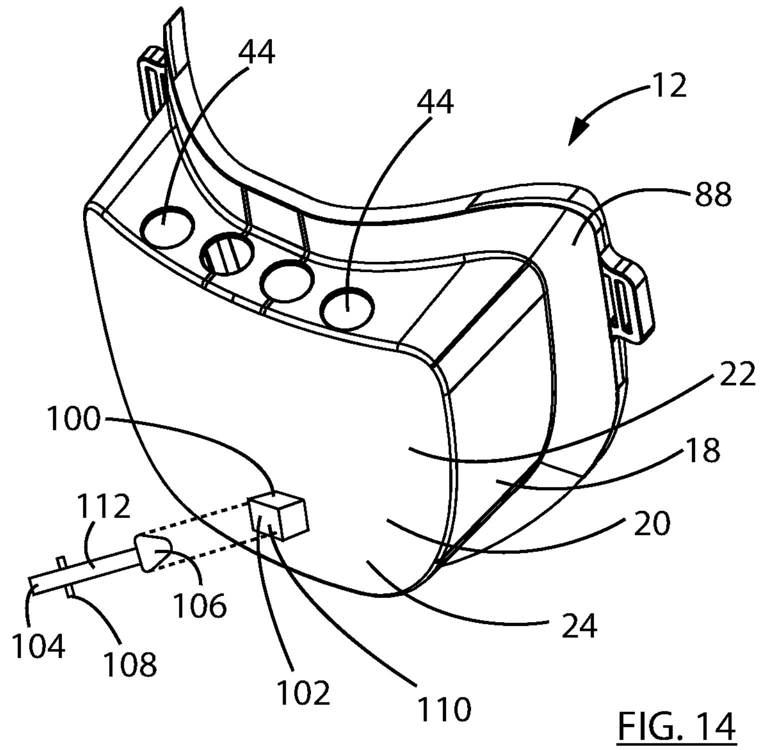
FIG. 14 is a front perspective view if an alternate mask body with an openable port provided in the open position and a sampling swab with a sealing member.

The openable door 100 may be provided on any portion of the filter mask 10, such as face plate 20, which is exemplified in FIG. 14, or the filter assembly itself (see for example FIGS. 60-62 and 64-66). If openable door 100 is provided on filter assembly 14, then an access port 102 may extend optionally through one or more layers of filter media 48 or between sections of the filter media. As exemplified in FIGS. 60-62 and 64-66, filter assembly 14 has an outer filter housing 180 and an inner filter housing 182. Optionally, outer filter housing 180 is moveable with respect to inner filter housing 182 so as to reveal openable door 100 or port 102 if no door 100 is provided. For example, outer filter housing 180 may be pivotally mounted to, translateably mounted to or removably attachable to inner filter housing 182 (see for example FIG. 66). Accordingly, in such embodiments, port 102 is only accessible when outer filter housing 180 has been moved to a port accessible position. As exemplified, each of outer filter housing 180 and inner filter housing 182 may have one or more filter layers provided therein. As exemplified, outer filter housing is provided with a foam filter 118 and inner filter housing is provided with a biological filter material 116. As discussed subsequently, each of outer and inner filter housings 180, 182 may be provided with one or more layers of a foam filter 118, a felt filter 120 and a biological filter material 116.

Figure 64:
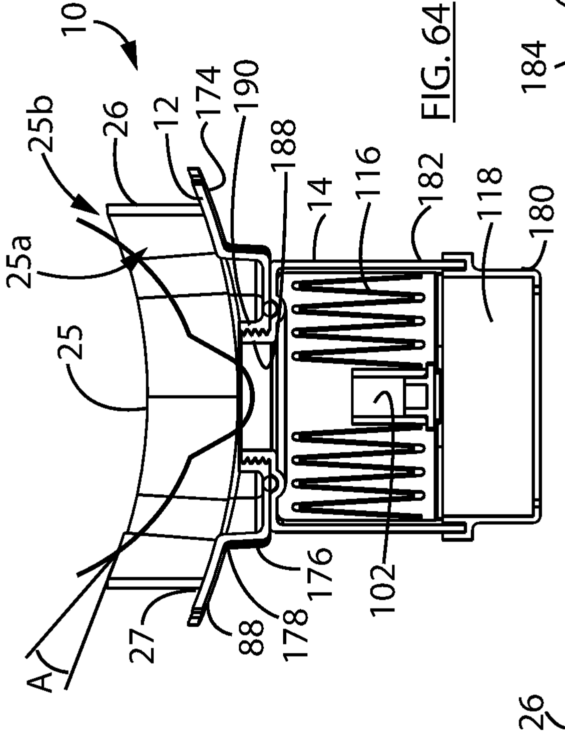
FIG. 64 is a cross-sectional view along the line 64-64 in FIG. 60.
Figure 66:
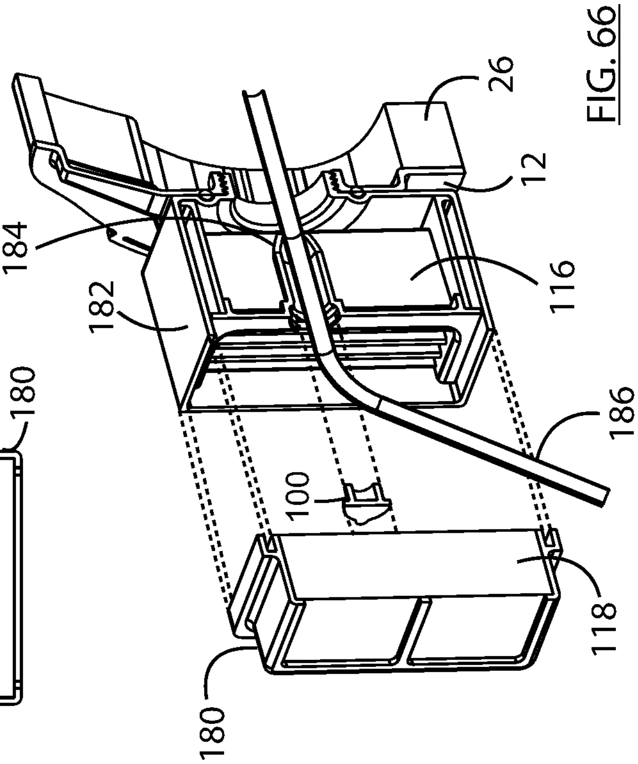
FIG. 66 is a perspective cross-sectional view along the line 61-61 in FIG. 60 wherein the outer filter housing has been removed to enable a person to use a drinking straw.
Figure 65:
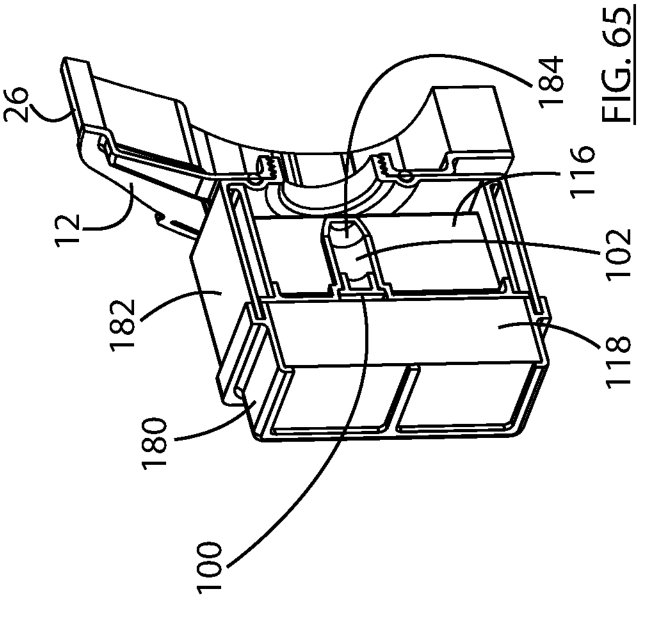
FIG. 65 is a perspective cross-sectional view along the line 61-61 in FIG. 60 wherein the inlet port has a duck bill valve.
Figure 67:
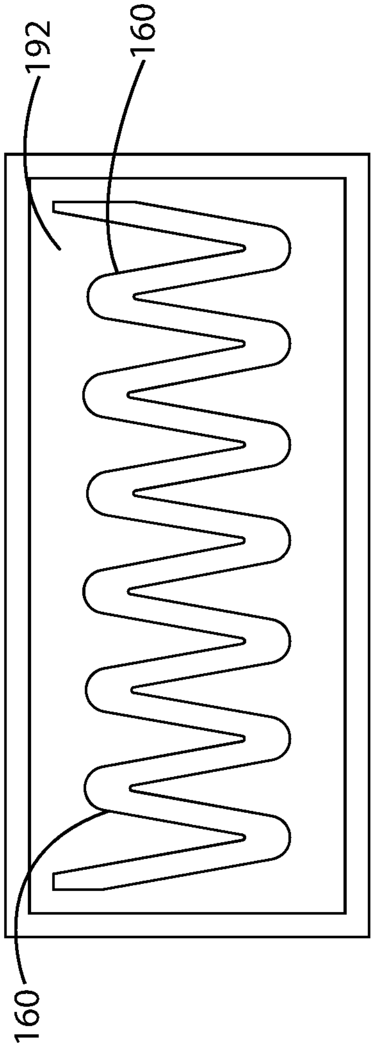
FIG. 67 is a side view of a side panel of a disposable filter holder which may be used in the embodiments of FIGS. 53 and 60.
Figure 68:
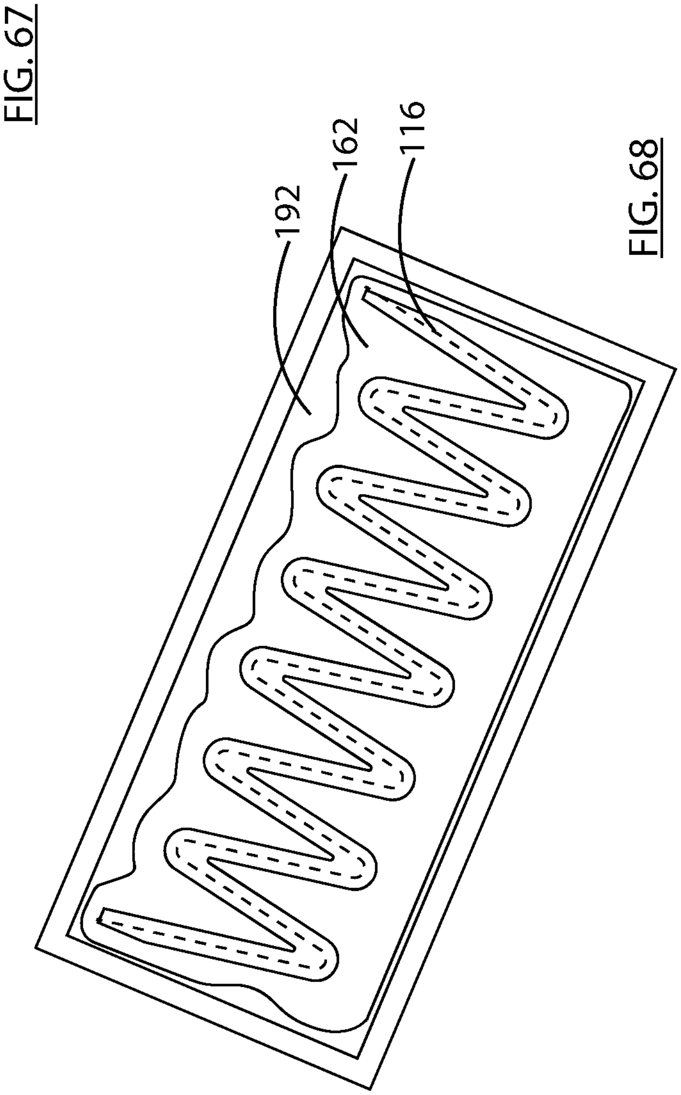
FIG. 68 is a side view of the side panel of FIG. 67 with filter media secured in the side panel.
Figure 69:
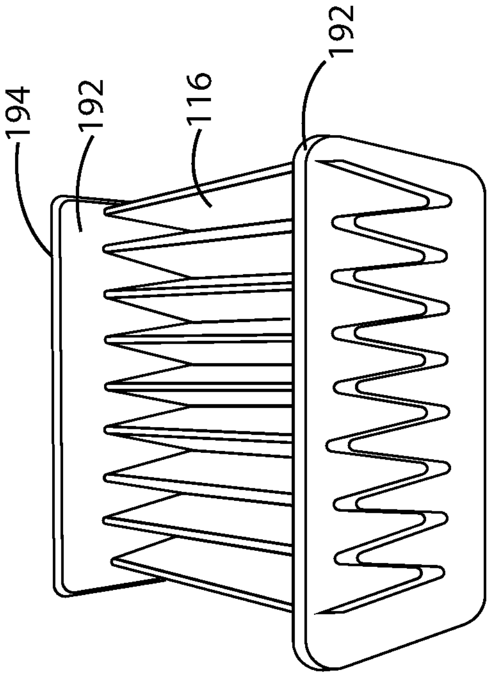
FIG. 69 is a top perspective view of a disposable filter holder using two side panels of FIG. 67.
Figure 70:
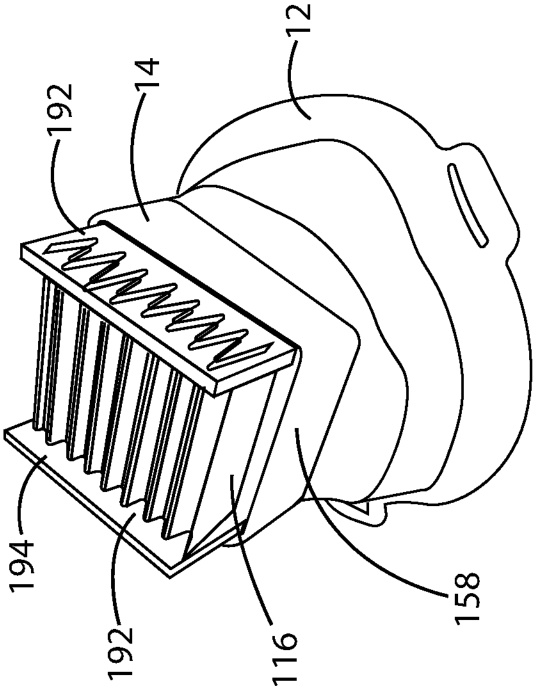
FIG. 70 is a front perspective view of a filter mask with a disposable filter cartridge being inserted.
Figure 71:
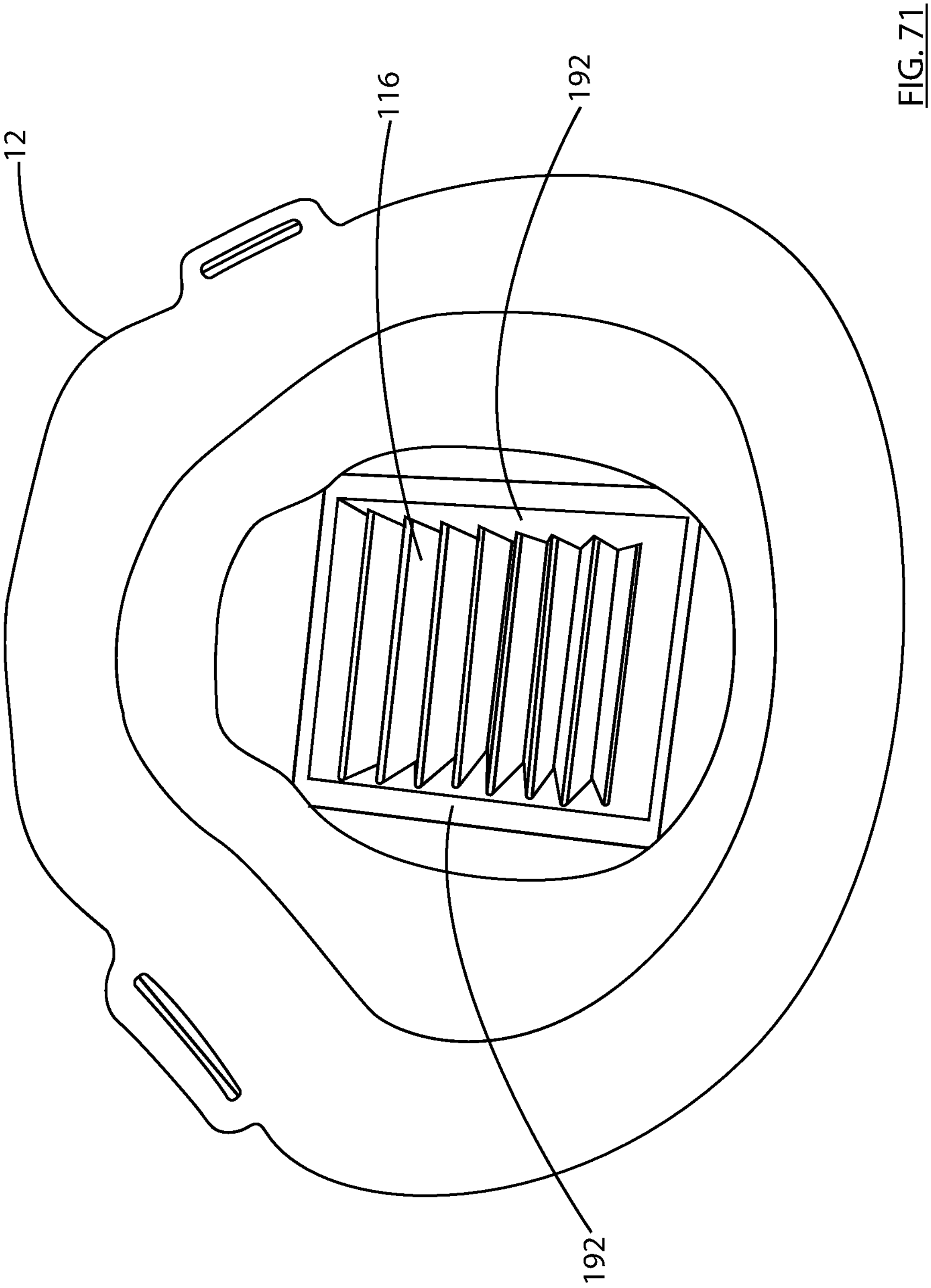
FIG. 71 is a rear perspective view of the filter mask of FIG. 70 with the disposable filter cartridge fully inserted.
Figure 72:
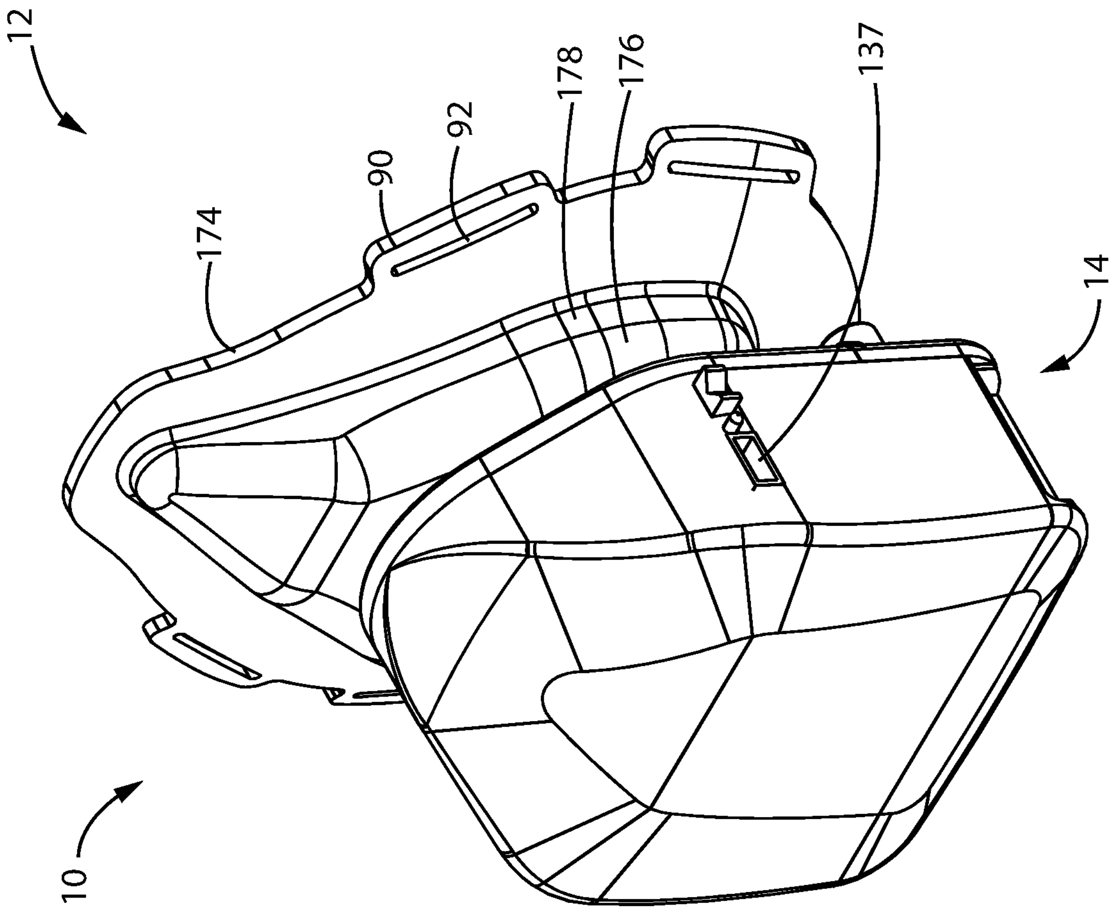
FIG. 72 is a front perspective view of a further alternate embodiment of a filter mask wherein the straps for securing the filter mask in position has been omitted.
Figure 73:
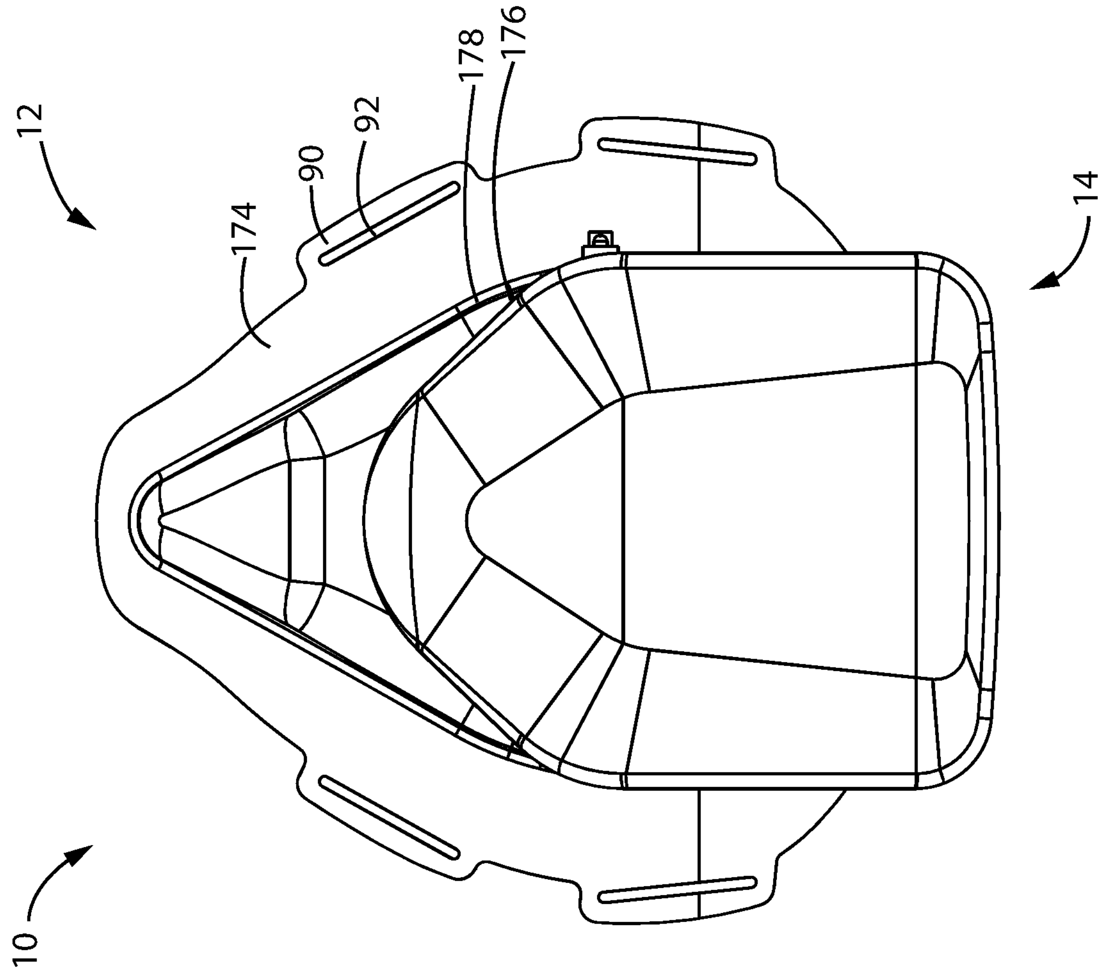
FIG. 73 is a front view of the filter mask of FIG. 72.
Figure 74:
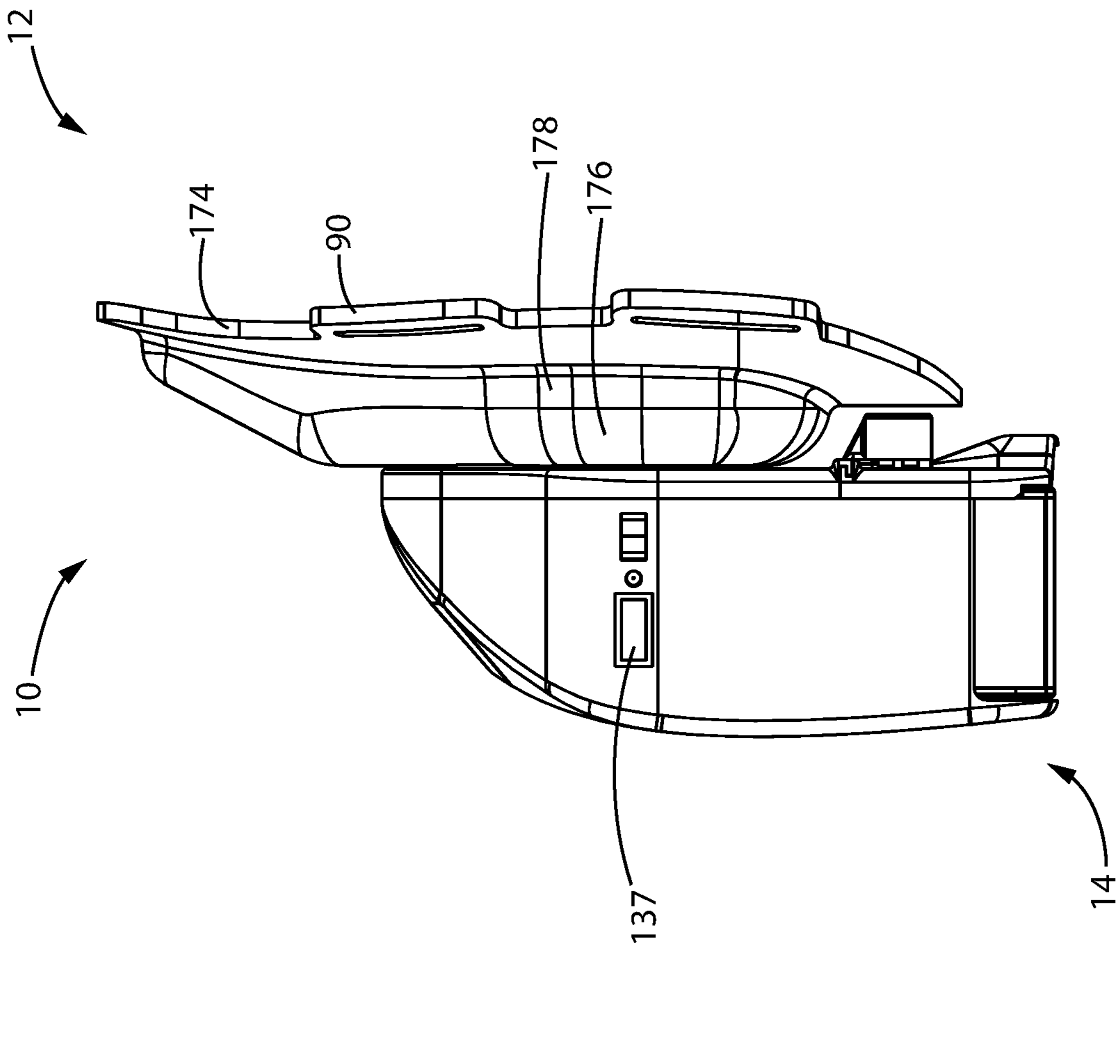
FIG. 74 is a side view of the filter mask of FIG. 72.
Figure 75:
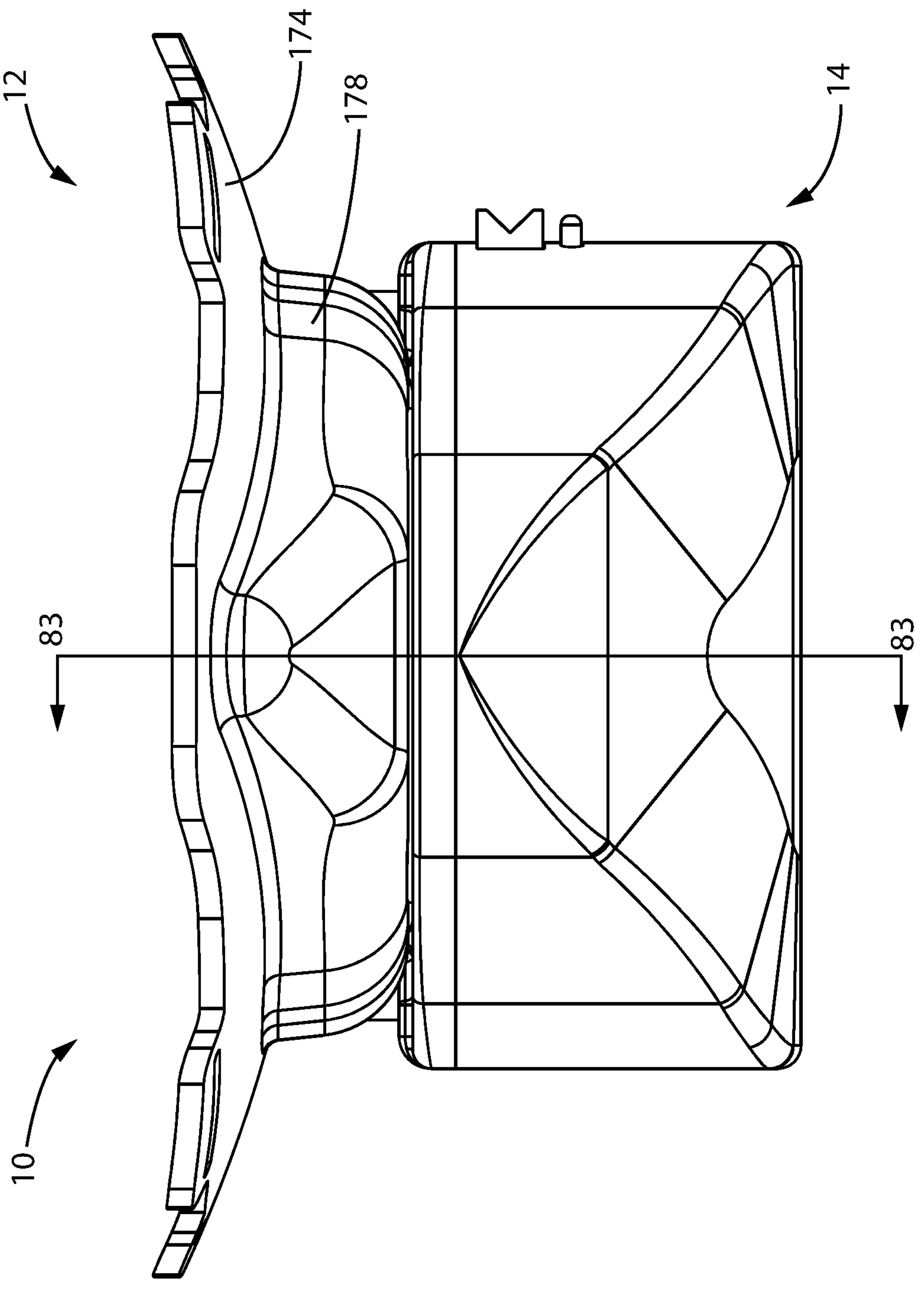
FIG. 75 is a top view of the filter mask of FIG. 72.
Figure 76:
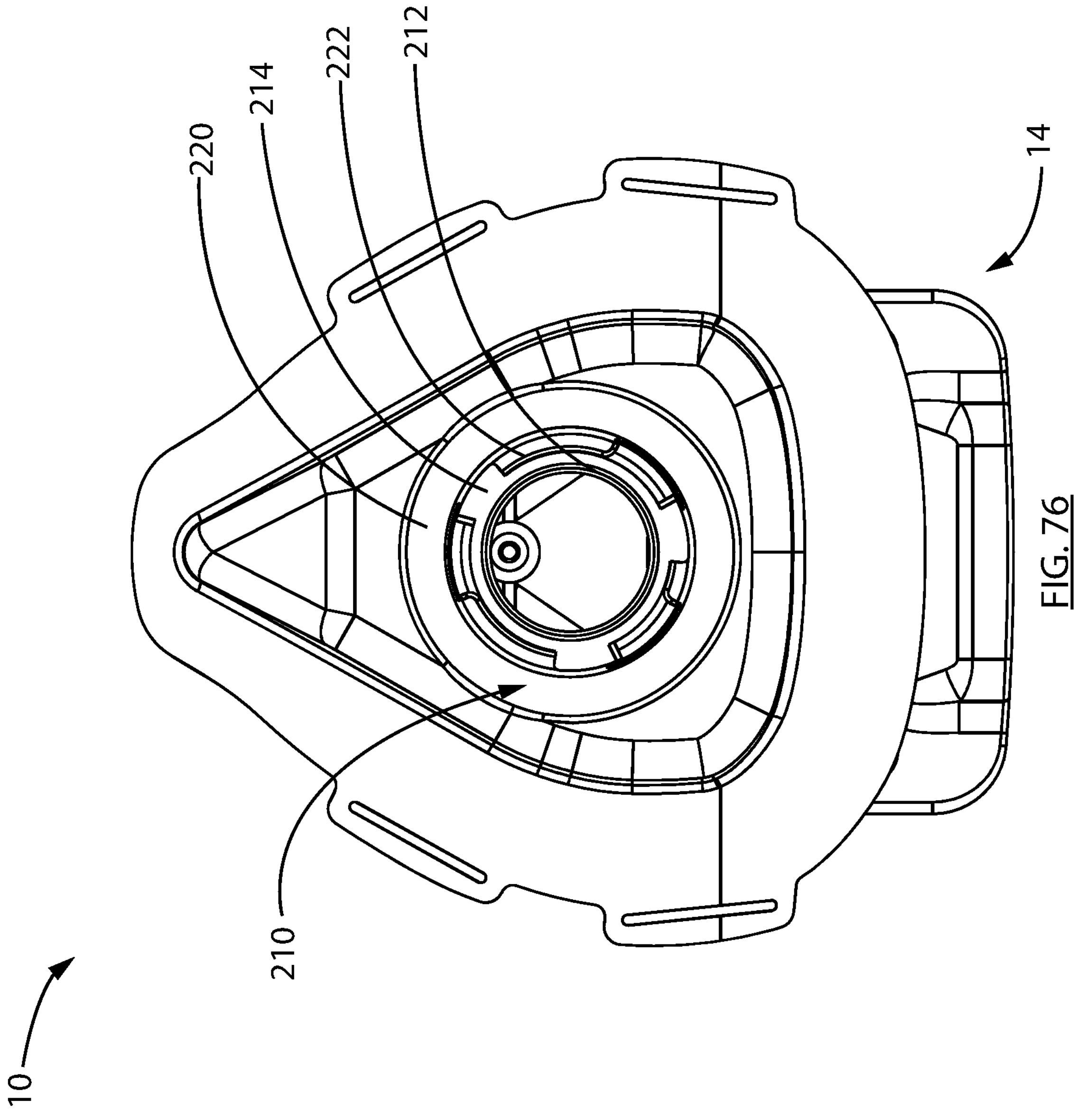
FIG. 76 is a rear view of the filter mask of FIG. 72.
Figure 77:
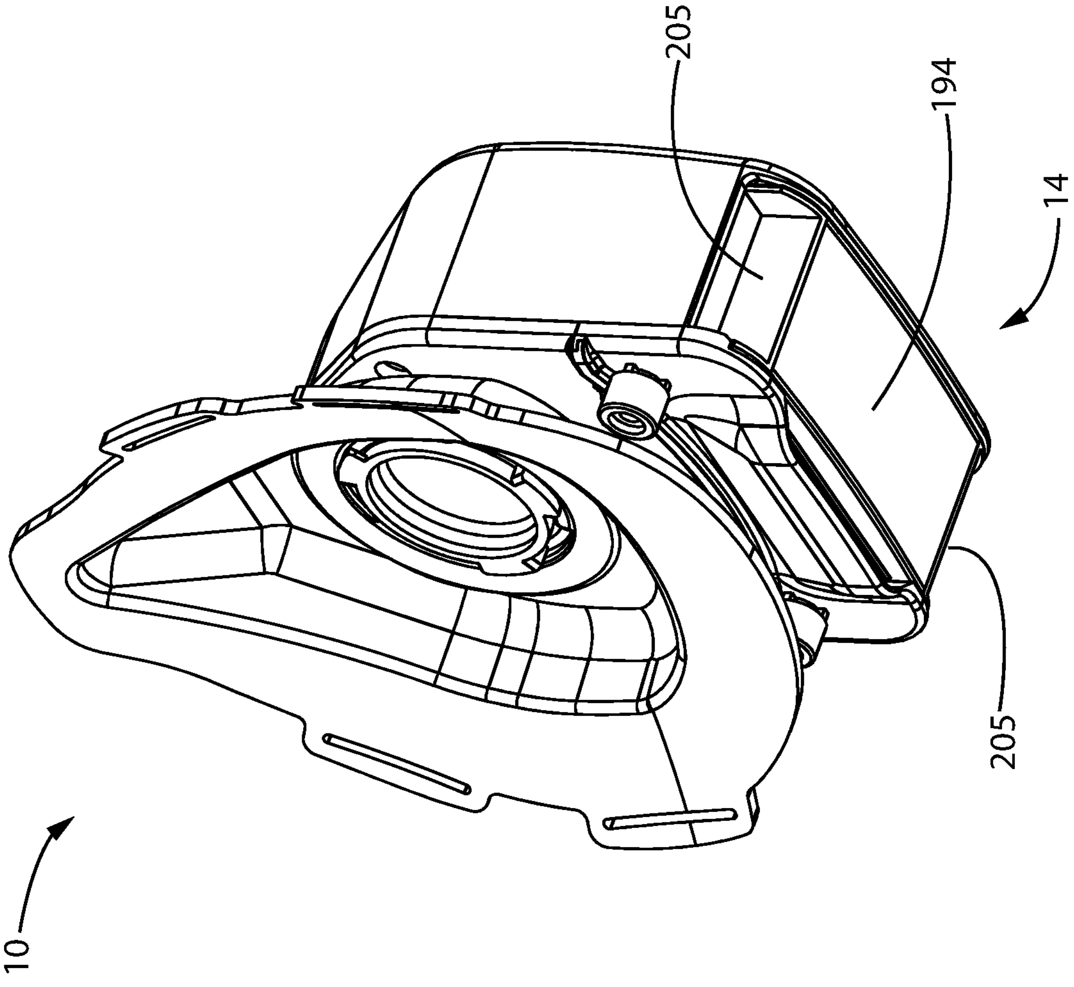
FIG. 77 is a bottom perspective view of the filter mask of FIG. 72.
Figure 78:
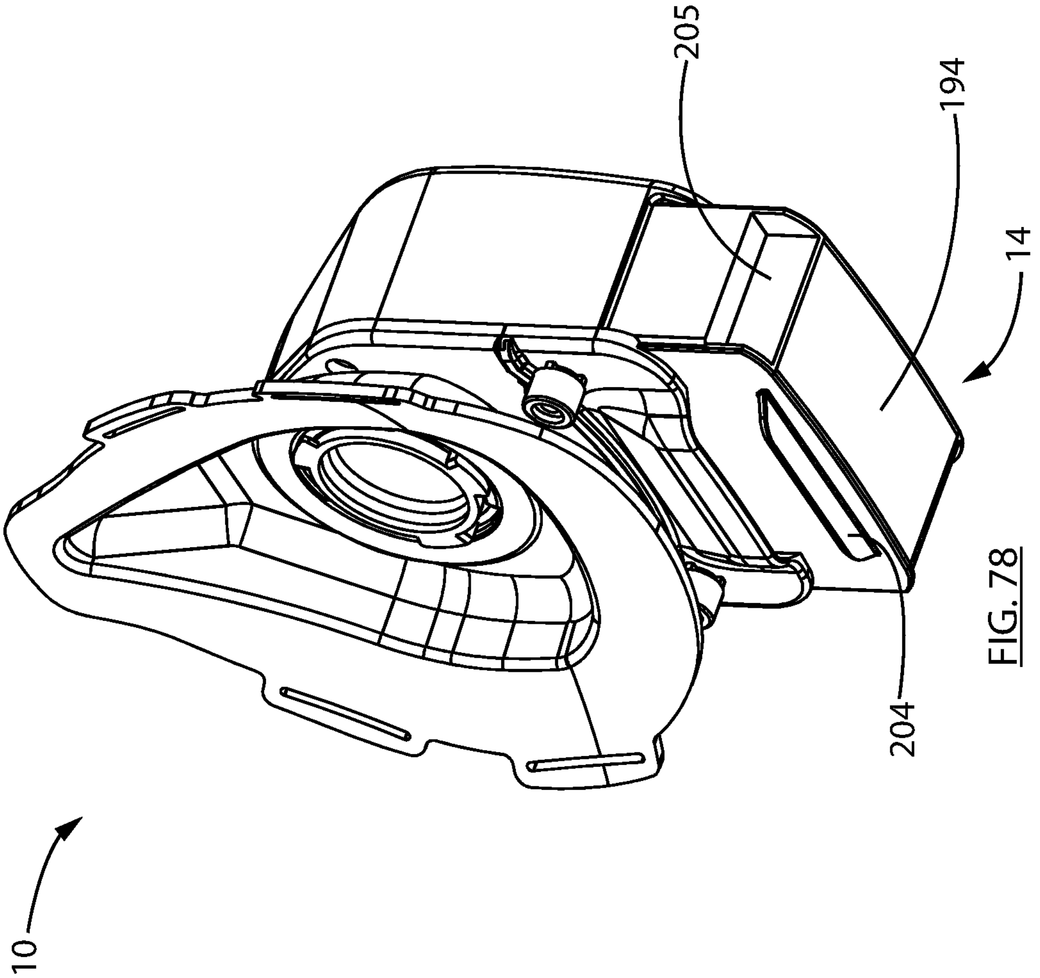
FIG. 78 is a bottom perspective view of the filter mask of FIG. 72 with a filter cartridge partially removed.
Figure 79:
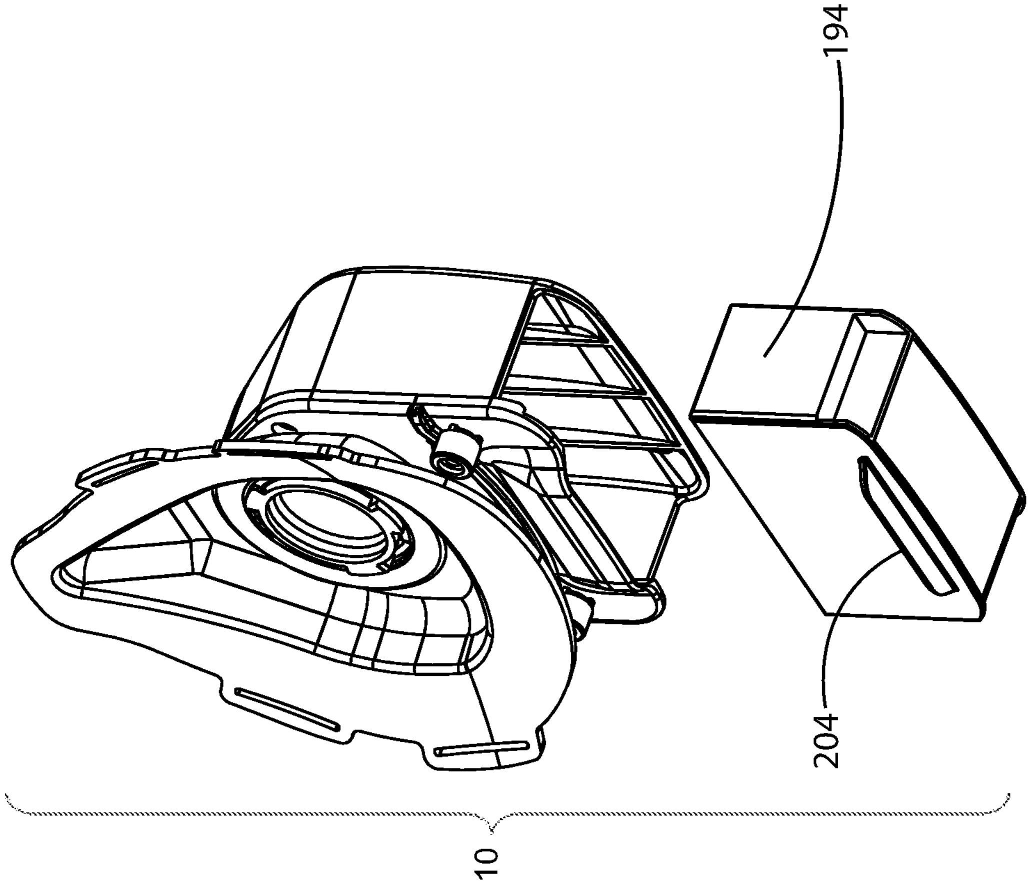
FIG. 79 is a bottom perspective view of the filter mask of FIG. 72 with a filter cartridge fully removed.
Figure 80:
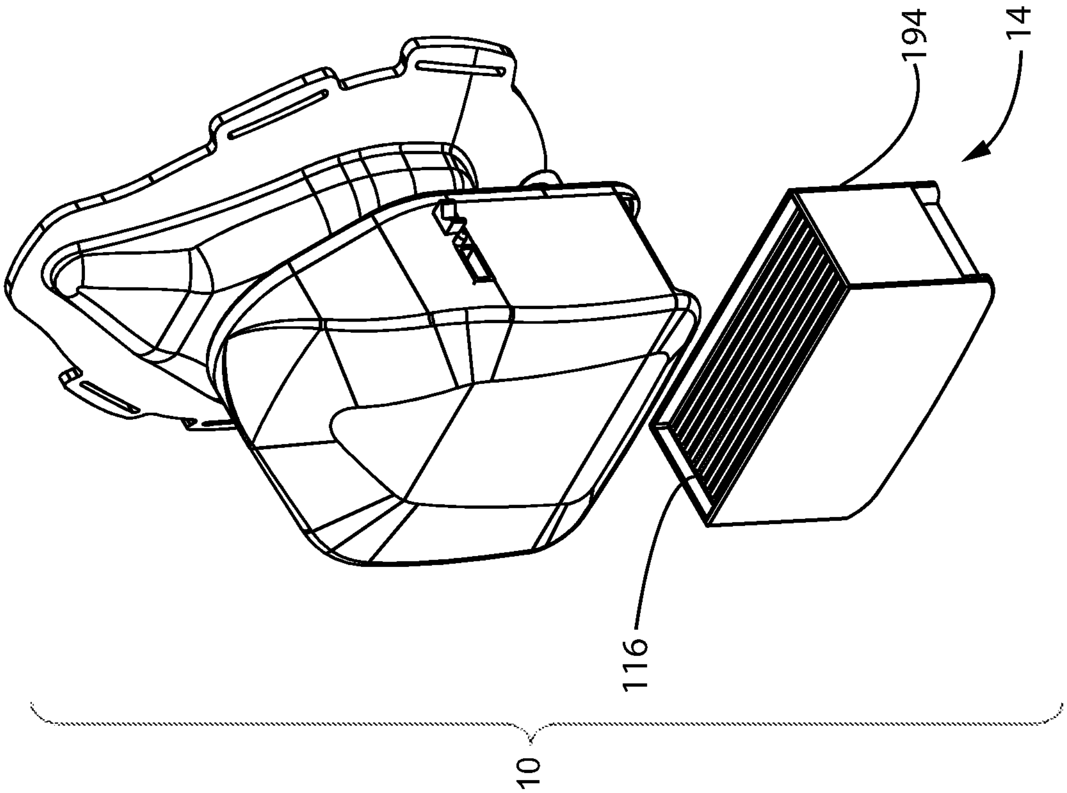
FIG. 80 is a front perspective view of the filter mask of FIG. 72 with a filter cartridge fully removed.
Figure 81:
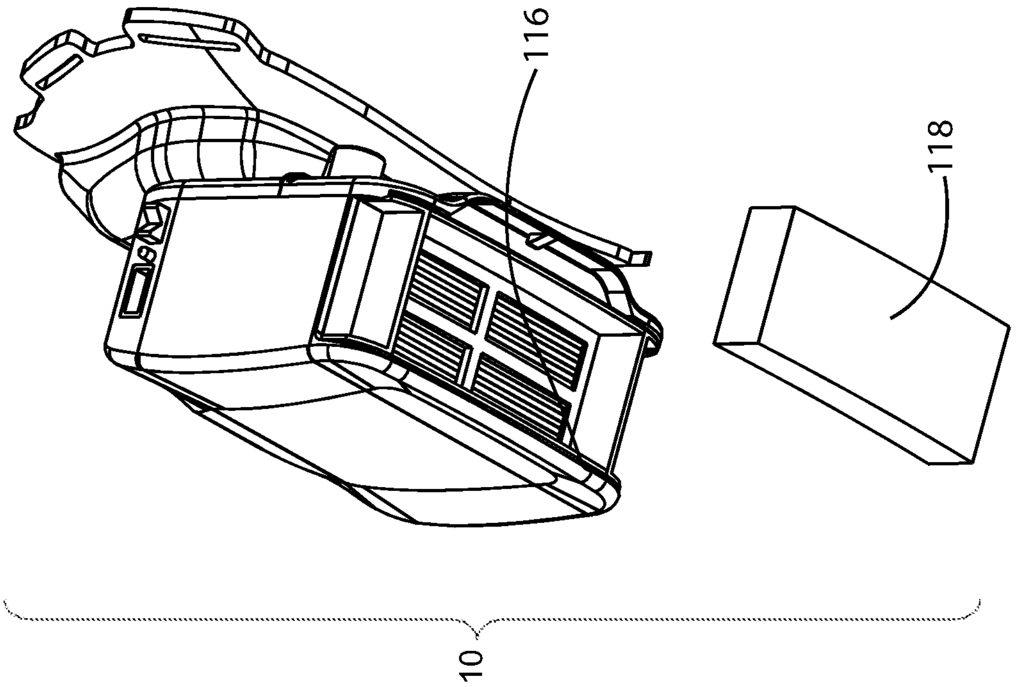
FIG. 81 is a bottom perspective view of the filter mask of FIG. 72 with a foam filter fully removed.
Figure 82:
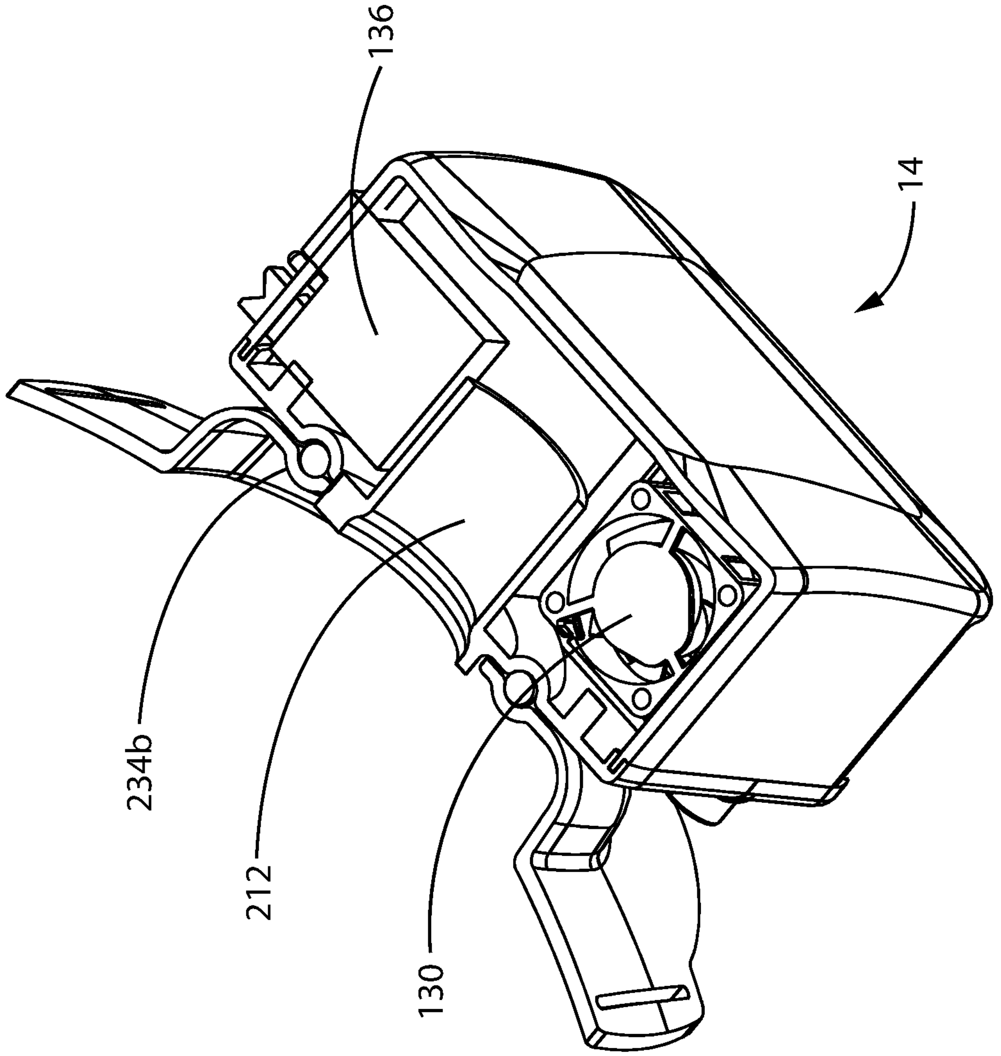
FIG. 82 is a top perspective view of a filter assembly of the filter mask of FIG. 72 with the front cover and a lid of the filter assembly removed.

It will be appreciated that, as exemplified in FIG. 64, port 102 may extend through the filter media itself or, alternately, filter media may be provided to either side of port 102.

The openable door 100 may be a pivotally mounted door, a door which translates or a removable door. When opened, the door 100 reveals a port 102 through which a medical sampling device may be inserted. As exemplified, the medical sampling device is a swab 104 having a cotton tip 106. Any medical sampling device, such as a bel bulb pipetor, may be used.

When the door 100 is open, a virus may possibly pass through port 102. Accordingly, a sealing membrane 108 or a valve, such as a duck bill valve, may be provided. As exemplified in FIG. 14, sealing membrane 108 has an opening through which swab 104 extends. When swab 104 is inserted through port 102, sealing membrane 108 may abut against the portion of the face plate 20 surrounding port 102 and effectively close port 102 while the biological sample is taken. After the sample is taken, the swab may be removed and door 100 moved to the closed position, thereby closing port 102. Alternately, if a duck bill valve 184 is used, the act of insertion of, e.g., straw 186, will open the valve 184 (see for example FIG. 66).

It will be appreciated that the sealing membrane 108 may be located at a fixed position on the medical sampling device. Optionally, the sealing membrane may be slidably mounted or mountable on a medical sampling device. Accordingly, the sealing membrane may be positioned on swab 104 immediately rearward of cotton tip 106. As the swab is inserted through port 102, the shaft 112 of the medical sampling device may slide through a central opening in membrane 108 thereby closing the port for a longer period of time as a biological sample is taken. The sealing membrane 108 may be provided already mounted on the medical sampling device or the sealing membrane 108 may be placed on a shaft 112 of a medical sampling device prior to the biological sample being taken, e.g., prior to door 100 being opened.

It will be appreciated that a sealing membrane 108 may be used with a straw to seal port 102 when a person is drinking through a straw.

It will be appreciated that a sealing member (e.g., a gasket made of, for example, silicone or rubber or other sealing material) may be provided on the inner side of door 102 and/or the portion of face plate 20 surrounding port 102 so as to seal the port 102 when the door 100 is closed.

Alternately, instead of an openable door 100, or in addition to an openable door 100, a penetrable membrane 110 may be provided at the port 102. The penetrable membrane 100 may have an opening through which a medical sampling device may be pushed to enable a biological sample to be taken. For example, penetrable membrane 100 may have a small opening that is enlarged when a medical sampling device is inserted therethrough or it may comprise one or more overlapping flaps (such as an openable iris) which are deformed or moved when contacted by a medical sampling device to enable the medical sampling device to pass therethrough. An advantage of this design is that the port 102 is closed until the medical sampling device is inserted.

General Description of a Filter Assembly

In accordance with this aspect, which may be used by itself or in combination with one or more other aspects, as exemplified in FIGS. 1, 5, 13, 15, 20, 53, 72, 87 and 110 one or more filter assemblies 14 may be in air flow communication with volume 28 and positioned spaced from the mouth of a person. An advantage of this design is that, if a person were to vomit while wearing the filter mask 10, the air treatment member would not be soiled by the vomit.

Optionally, as exemplified in FIGS. 1, 5, 13 and 20, the filter assembly is positioned above the face plate 20, and optionally above the mask body 12, so as not to obstruct the view of the face of a person wearing the mask. Accordingly, the filter assembly 14 may be positioned above a person's head (see, e.g., FIG. 1) or above the face plate 20 (see, e.g., FIGS. 5, 13, 15 and 27). Alternately, the filter assembly 14 may be positioned below the mouth of the user as exemplified in FIGS. 101-117.

As exemplified in FIGS. 1, 12, 15 and 28, the filter assembly 14 may be in air flow communication with the volume 28 by one or more conduits 42. One or more air flow ports 44 may be provided in the upper portion 22 of the face plate 20, side panel 18 or the mask body 12. As exemplified in FIGS. 1 and 15, conduit 42 extends upwardly and rearwardly from the air flow port 44 to the filter assembly 14 or, as optionally exemplified in FIG. 27, upwardly. As exemplified in FIGS. 5, 12 and 27, the filter assembly may be provided (e.g., mounted to) the side panel 18 of the mask body 12 such that the air flow conduit 42 is a passage that extends upwardly from side panel 18 to the interior of the filter assembly 14.

It will be appreciated that, in some embodiments, the one or more conduits 42 may not provide airflow into the volume 28. Instead, as exemplified in FIG. 116, upon inhalation, air may exit the filter assembly (fan 130) and travel directly into the volume 28. Alternately, as exemplified in FIG. 83, upon inhalation, air may pass through a mounting assembly 210 that may function as a conduit 42.

The filter assembly comprises one or more air treatment members 46 to filter air that enters the filter assembly 14. The air treatment member 46 may comprise one or more filters that remove biological material from an air flow stream travelling through the filter assembly 14. For example, as exemplified in FIGS. 2, 11, 12 and 32-27 and as discussed subsequently, the air treatment member 46 may be one or more filter media 48 so as to provide a layered or multi-layer filter. As exemplified in FIGS. 3 and 4, the air treatment member may be an electrostatic precipitator 50, which may be provided, in a tortuous path 52. It will be appreciated that a combination of a filter media 48 and an electrostatic precipitator 50 may be used. It will also be appreciated that other air treatment members, such as a cyclone, may be used.

Removable Filter Assembly

In accordance with this aspect, which may be used by itself or in combination with one or more other aspects, as with container 38, one or more filter assembles 14 may be removably attached to mask body 12, such as by being removably attachable to conduit 42 (or mounting assembly 210 that functions as a conduit 42) and/or conduit 42 may be removable attached to mask body 12.

One advantage of this design is that, if the filter assembly were damaged or the air treatment member 46 needed to be changed, the conduit 42 and/or the filter assembly 14 could be removed for cleaning and disinfection and/or replacement.

Another advantage is that the mask body 12 may have different filter assemblies mountable thereto. For example, filter assemblies 14 having differing levels of filtration may be provided, each of which is mountable to the same mask body 12.

Alternately, or in addition, filter assemblies 14 having differing life spans of the filter material may be provided, each of which is mountable to the same mask body 12, thereby enabling the mask body 12 to be a universal mask body 12. For example, one filter assembly useable for, e.g., 12, 24 or 36 hours may be provided. Such a filter assembly may be provided for a patient who visits a doctor or a hospital. The user will wear the mask for a short period of time and therefore, less filter material may be used. Another filter assembly may be useable for a longer period of time (e.g., a week, two weeks, a month or longer). Such a filter assembly may be used for medical practitioners. An advantage of this design is that, if filter material capable of blocking the flow of a virus is in limited supply (e.g., HEPA, ULPA, MERV 15, MERV 16, MERV17 or higher filter material), then the amount of filter material that is used in a filter assembly may be selected based on the length of time that the filter assembly will be in use.

Accordingly, a universal mask body 12 may have different filter assemblies mountable thereto. When a mask is required, a universal mask body that has a suitable filter assembly 14 mounted or removably mounted thereto, based on the length of time that the filter mask 10 is expected to be in use, may be provided. Similarly, mask bodies of differing sizes (e.g., sized for a child, a small adult or a large adult), may use the same filter assemblies 14.

It will be appreciated that, after a filter mask 10 has been used, that the filter assembly 14 may be removed from the mask body 12. As discussed subsequently with reference to FIGS. 121-122, the mask body 12, which may have no filter media attached thereto, may then be sanitized (disinfected) so that the mask body 12 may then be used for a different person.

Alternately, or in addition, filter assemblies having different sizes and/or configurations may be used with a single mask body 12 thereby enabling the mask body 12 to be a universal mask body 12. An advantage of this design is that, if filter material capable of blocking the flow of a virus is in limited supply (e.g., HEPA, ULPA, MERV 15, MERV 16, MERV17 or higher filter material), then a filter assembly may be designed which provides a desired level of filtration with the available filter material. Based on the filter material that is available, the size and/or shape of the filter assembly may be varied. However, any such filter assembly may be mateable with one or more ports 44 provided on a mask body 12. It will be appreciated that if not all ports 44 are attached in air flow communication with a filter assembly, then the unused ports 44 may be blocked by, e.g., a stopper, a valve or the like.

Figure 13:
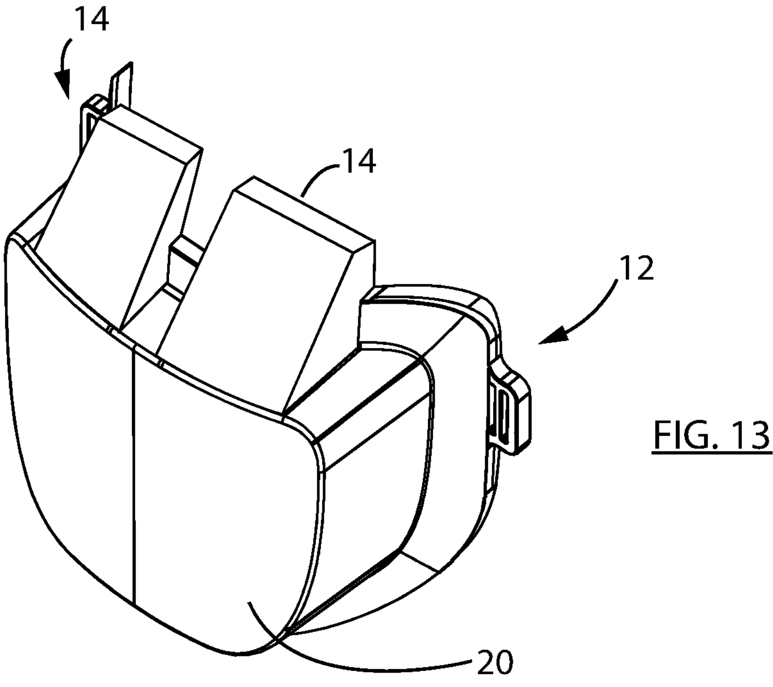
FIG. 13 is a front perspective view of a further alternate embodiment of a filter mask wherein the strap for securing the filter mask in position has been omitted and two separate filter assemblies are provided.
Figure 15:
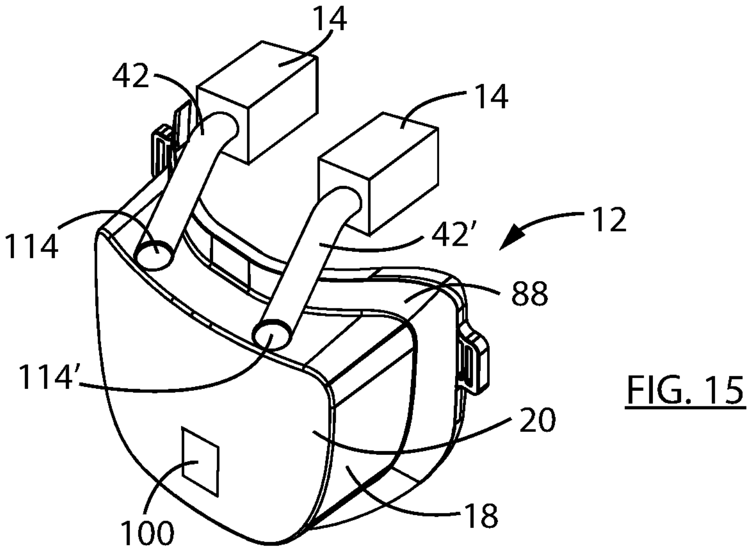
FIG. 15 is a front perspective view of a further alternate embodiment of a filter mask wherein the strap for securing the filter mask in position has been omitted and two separate filter assemblies are provided.
Figure 16:
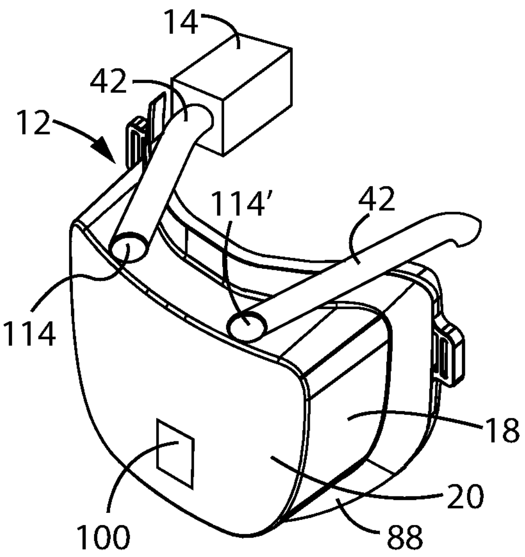
FIG. 16 is a front perspective view of the alternate filter mask of FIG. 15 wherein one of the air flow conduits has been rotated to close a valve in the air flow conduit and the filter assembly of that air flow conduit has been removed for replacement.

Optionally, as exemplified in FIGS. 13, 15 and 16, a mask body 12 may have two filter assemblies 14 attached thereto. One advantage of this design is that a first filter assembly 14 may be used while the second filter assembly 14' is reserved as a backup. Accordingly, referring to FIG. 13, filter assembly 14 may be used while filter assembly 14' is reserved. Air flow conduit 42 may be closed such as by a valve (not shown). If filter assembly 14 is damaged or if filter assembly

14 has reached the end of the filter life, then filter assembly 14' may be placed in air flow communication with the mask body 12 by, e.g., opening a valve. It will be appreciated that filter assembly 14 may be isolated from air flow communication with the mask body 12 by, e.g., closing a valve. Another option for opening and closing air flow communication with the mask body 12 may be to cover of close the inlet and outlet port 56 of a filter assembly 14, 14'.

As exemplified in the embodiment of FIGS. 15 and 16, a valve 114 such as a ball valve, may be opened or closed by rotating air flow conduit 42. In FIG. 16, air flow conduit 42' has been rotated about 90° thereby closing valve 114'. Accordingly filter assembly 14' has been removed while mask body 12 remains closed to air flow through conduit 42'. Therefore, a filter assembly 14 may be replaced by a new or a cleaned filter assembly while the ports 44 with which the filter assembly is in air flow communication when positioned on the mask body 12 are closed.

It will be appreciated that the valve 114 or other closure member may be located at different locations, such as the inlet of air flow conduit 42 distal to mask body 12. Accordingly, the inlet of air flow conduit 42 distal to mask body 12 may be closed or automatically closed when a filter assembly 14 is removed. For example, the filter assembly may push open a flap that rotates inwardly into conduit 42 when the filter assembly is attached to conduit 42. The flap may be biased to close the inlet of air flow conduit 42 distal to mask body 12 when the filter assembly is removed.

Figure 25:
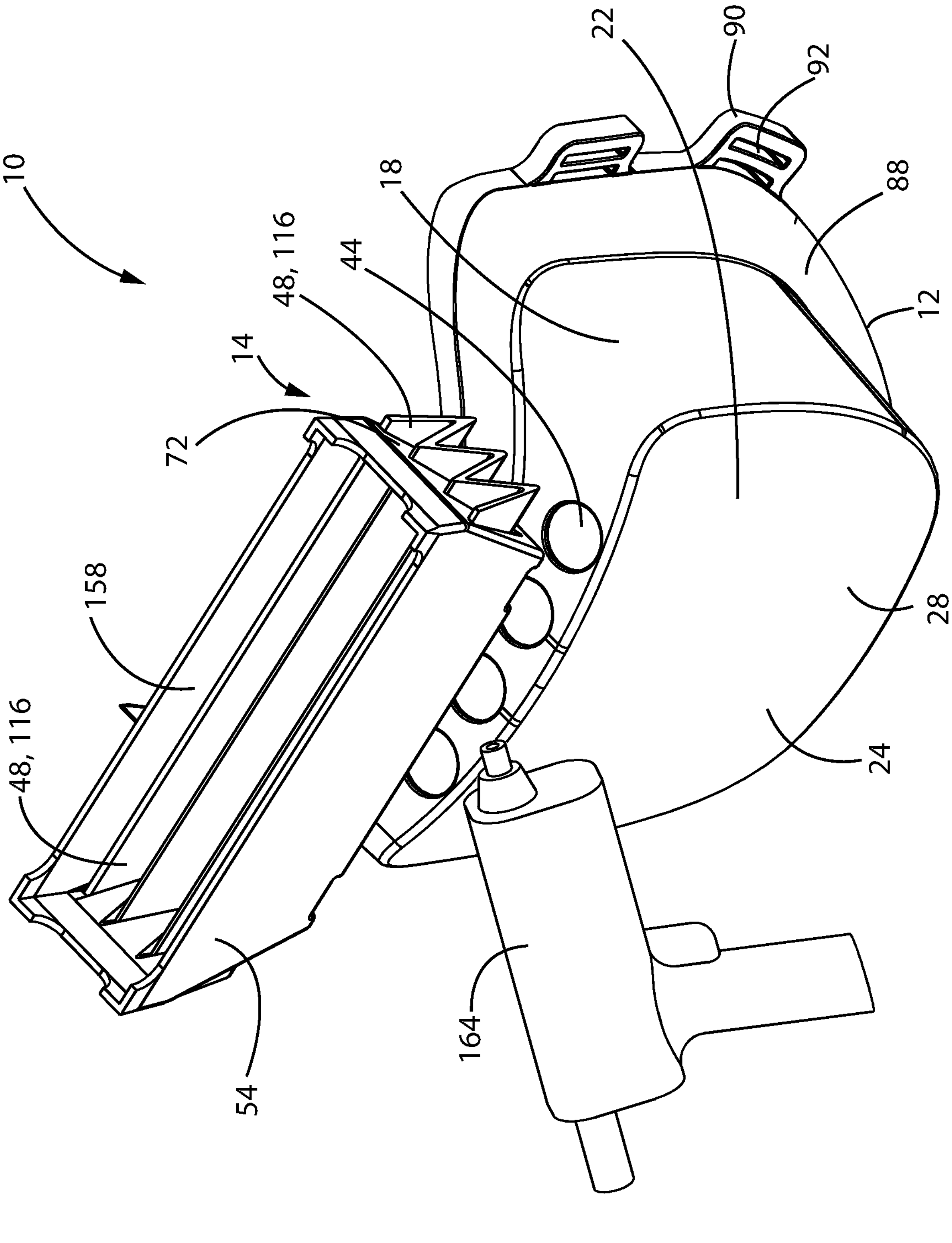
FIG. 25 is a top perspective view of the filter mask of FIG. 20 with the filter assembly removed, the top of the filter assembly removed and the filter assembly being glued to the mask.
Figure 26:
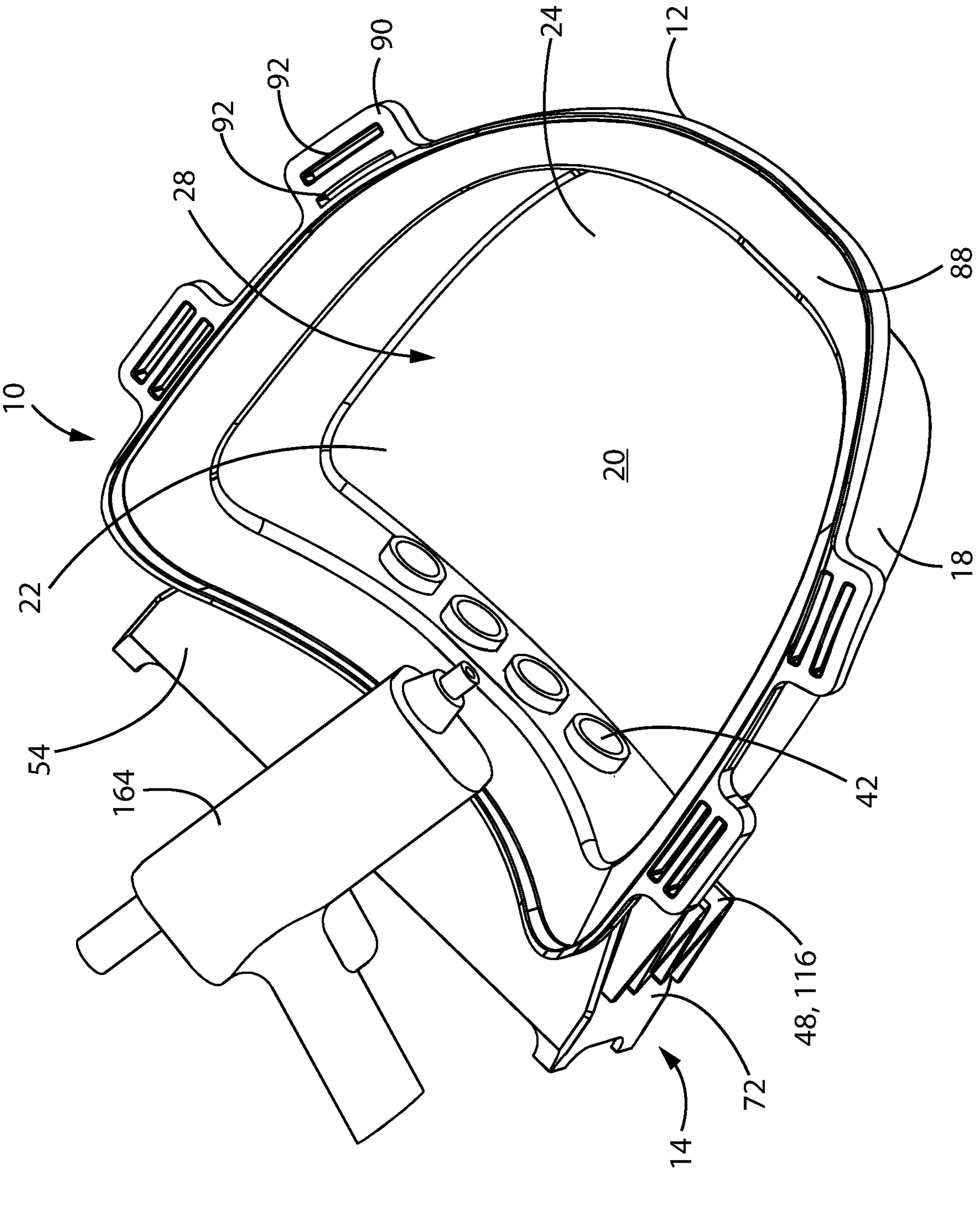
FIG. 26 is a rear perspective view of the filter mask of FIG. 20 with the filter assembly being glued to the mask.
Figure 27:
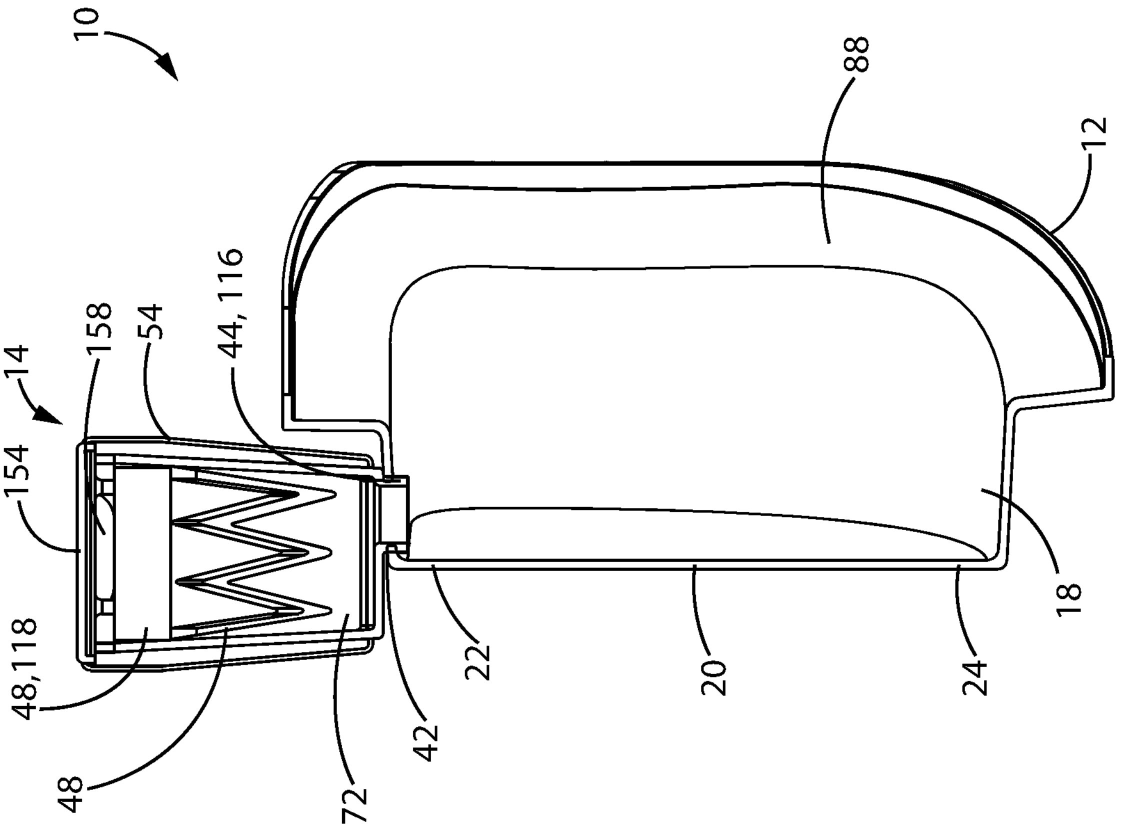
FIG. 27 is a cross-sectional view along line 27-27 in FIG. 20.
Figure 28:
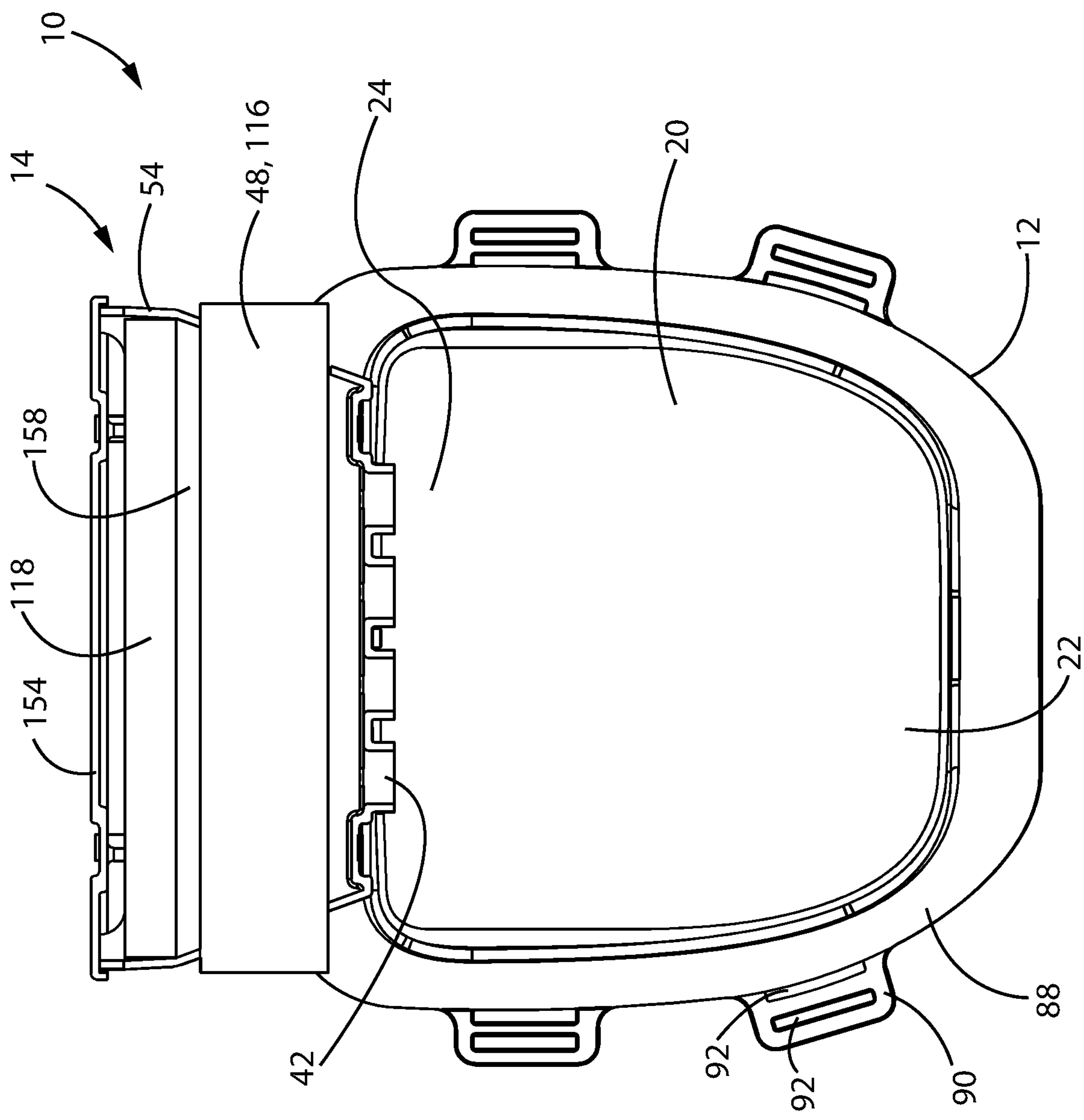
FIG. 28 is a cross-sectional view along line 28-28 in FIG. 20
Figure 29:
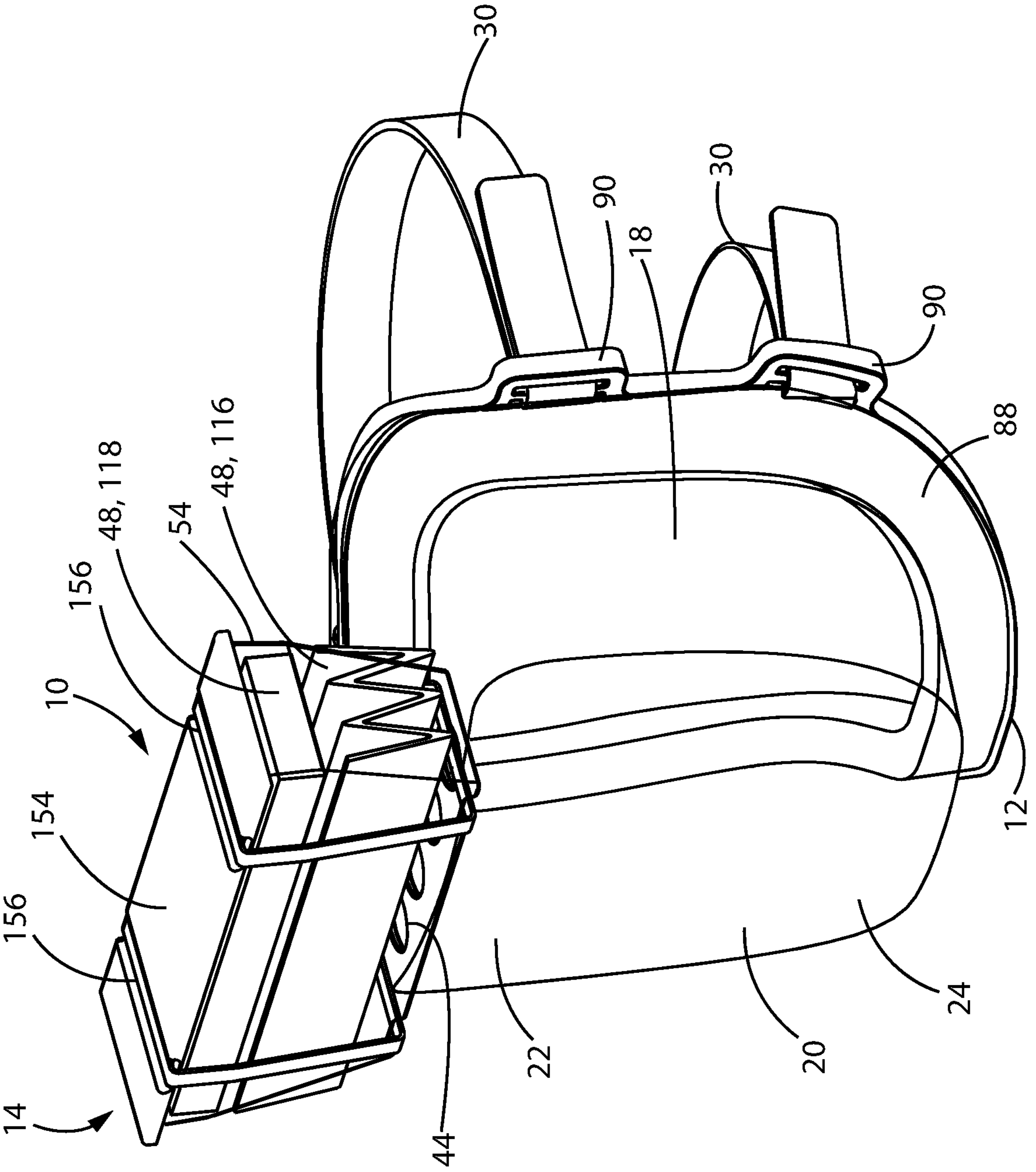
FIG. 29 is a side perspective view of the filter mask of FIG. 20 with the filter holder being transparent.

It will be appreciated that, in an alternate embodiment, filter assembly 14 may be secured in position to mask body 12, such as by an adhesive which may be applied, e.g., between filter assembly 14 and mask body 12 as exemplified in FIG. 25 or to the interior of mask body 12, e.g., to secure conduits 42 to ports 44 as exemplified in FIG. 26.

In some embodiments, the filter assembly 14 may be rotatably mounted to the mask body 12. Accordingly, as exemplified in FIGS. 58 and 59, mask body 12 may have screw threads 188 and filter assembly (e.g., inner filter housing 182) may have mating screw threads 190. Alternately, as exemplified in FIGS. 83 and 90, a bayonet mount may be used, optionally as part of a mounting assembly 210.

As exemplified, the mounting assembly 210 may include a first mounting member provided on the filter assembly 14 and a second mounting member provided on the mask body 12. For example, the bayonet mount 210, as exemplified in FIGS. 72-97, may include a male portion 212 having a plurality of radial pins 214 and a female portion 220 having a plurality of radial seats 222. As exemplified, the male portion 212 is located on the filter assembly 14 and the female portion 220 is located on the substrate 174. It will be appreciated that the male portion 212 may be located on the substrate 174 and the female portion 220 may be located on the filter assembly 14. As exemplified, the first and second mounting members of the mounting assembly 210 may define a portion of the air flow passage of the filter assembly 14, as exemplified in FIGS. 72-97.

During use, the male portion 212 is inserted into the female portion 220 such that the plurality of radial pins 214 are passed through gaps between the plurality of radial seats 222. Once the plurality of radial pins 214 are inserted past the radial seats 222, the filter assembly 14 may be rotated such that the plurality of radial pins 214 are seated behind the plurality of radial seats 222, thereby securing the filter assembly 14 to the substrate 174.

In some embodiments, as exemplified in FIGS. 72-97, the bayonet mount 210 may include a mount seal 216. The mount seal 216 may be positioned between the male portion 212 and the female portion 220 such that the seal 216 is compressed between them. The seal 216 may improve leakage of the filter mask 10, improving the safety of the user.

Downwardly Facing Filter Inlet

In accordance with this aspect, which may be used by itself or in combination with one or more other aspects, as exemplified in FIG. 1, the filter assembly 14, which may comprise a filter housing 54 (which may be referred to as a filter body 54) having an inlet and outlet port 56 that faces downwardly. An advantage of the inlet and outlet port 56 facing downwardly is that rain would be inhibited from entering into the inlet and outlet port 56. The inlet and outlet port 56 may optionally face the top of a head of a person wearing the filter mask 10 (see for example FIG. 1) or the ground (see for example FIG. 88). It will be appreciated that the filter assembly may optionally function as a filter housing and the filter media may be mounted to the filter assembly 14. Alternately, the filter assembly may receive a filter housing 54 wherein the filter media by itself or as part of a filter cartridge 194 may be mounted to the filter housing 54.

Optionally, as exemplified in FIG. 1, a descending lip 58 may be provided. The descending lip 58 extends generally downwardly so as to inhibit air travelling laterally into the inlet and outlet port 56. Accordingly, if it were raining, rain would tend to drip off the filter housing 54 and not be drawn into the inlet and outlet port 56. The descending lip 58 may extend downwardly any desired amount from the outer surface 60 of the filter media 48 (see FIG. 2) or the inlet and outlet port 56 of the electrostatic precipitator 50 (see FIGS. 3 and 4).

Filter housing 54 may be of any particular shape and size provided it may house suitable air treatment member or members 46. Accordingly, filter housing 54 may be a generally rectangular member, which is in air flow communication with air flow conduit 42.

As exemplified, filter housing 54 may be provided with an air flow passage, such as an upper air flow passage 62. As exemplified in FIGS. 1 and 2, if the air treatment member 46 is a filter media 48, then the entire upper surface 68 of the filter media 48 may be exposed to the air flow passage 62 and may comprise the lower surface of the air flow passage 62.

Figures 2, 3, 4:
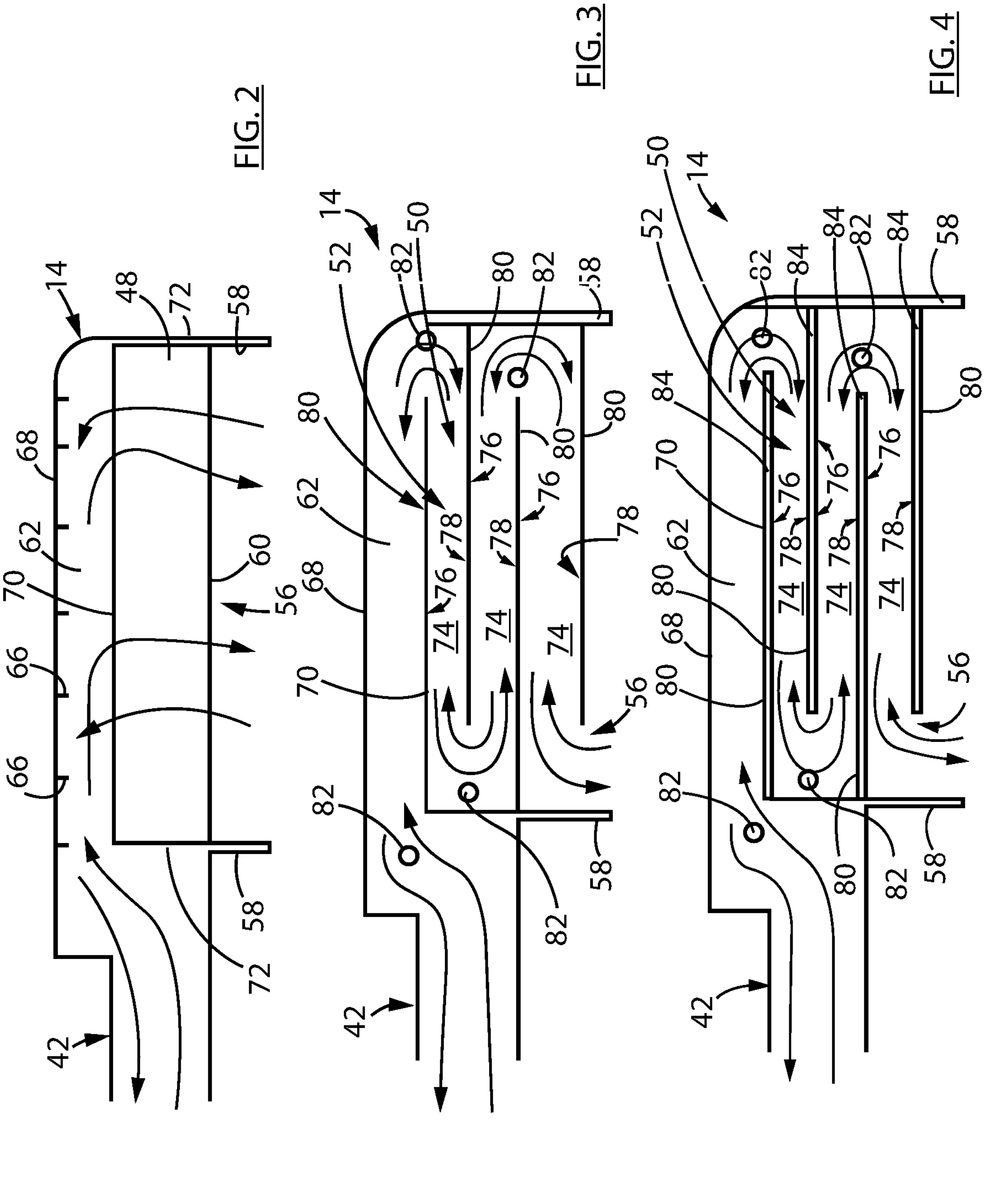
FIG. 2 is a cross-sectional view of a first embodiment of a filter apparatus for the filter mask of FIG. 1.
FIG. 3 is a cross-sectional view of a second embodiment of a filter apparatus for the filter mask of FIG. 1.
FIG. 4 is a cross-sectional view of a third embodiment of a filter apparatus for the filter mask of FIG. 1

Air flow passage 62 may be of any configuration that enable a suitable air flow to travel therethrough. As exemplified in FIG. 2, air flow passage 62 has upper and lower sides 68 and 70. In the embodiment of FIG. 2, lower side 70 may be porous and provide a surface against which filter media 48 seats when installed in the filter housing 54. Alternately, it may be an opening in the lower wall of the passage 62.

Air flow passage 62 may be provided with ribs 66. Ribs 66 may reinforce the upper surface 68 of the filter housing 54. Alternately, or in addition, ribs 66 may provide a standoff to limit the extent to which filter media 48 may be inserted into filter housing 54, e.g., if the lower side of passage 62 is opening in the lower wall of the passage 62.

Figure 83:
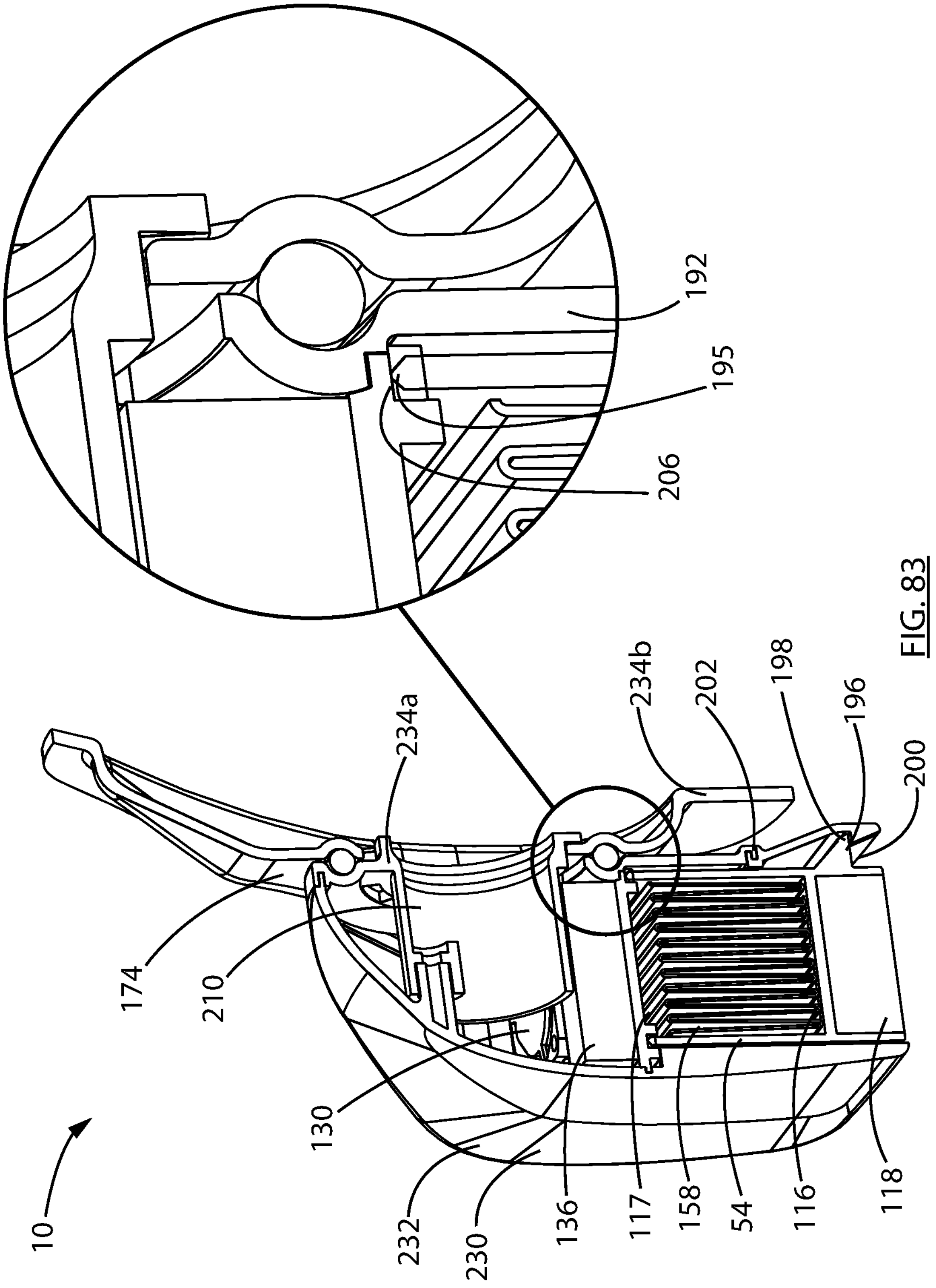
FIG. 83 is a perspective cross-sectional view along the line 83-83 in FIG. 75.

As exemplified, for example in FIG. 83, filter housing 54 has a cavity 158 (defined by the lower side 70 of passage 62 and sidewalls 72 of filter housing 54) in which filter media 48 is positioned. Filter media may be removably positionable in the cavity 158 through an entrance to the cavity 158, also referred to as a port. Accordingly, the filter media 48 may be removed for cleaning and disinfection and/or replacement.

Layered Filter Media

In accordance with this aspect, which may be used by itself or in combination with one or more other aspects, one or more filter media 48 may be provided in cavity 158 of the filter housing 54. The filter media 48 may be any porous filter media. Optionally, the filter media comprises at least one layer of filter media that is selected to prevent or limit the flow therethrough of biological material. Accordingly, it may have pore sizes that inhibit or prevent the flow therethrough of bacteria and/or viruses. Examples of suitable filter material include HEPA, ULPA, MERV 15, MERV 16, MERV17 or higher filter materials. Optionally, the filter media may be a pleated filter media (see for example, FIG. 42). Such filter material may be referred to as biological filter media 116.

Optionally, according to this aspect, one or more other filter material is provided on one or both sides of the biological filter media. During use, the efficacy or life span of the biological filter media may be degraded by moisture in the air (e.g., rain) or particulate contaminants in the air that is inhaled. Providing more porous filter media that is selected to filter such material on the upstream side of the biological filter media when a person inhales may extend the life span of the biological filter media. Similarly, during use, when a person exhales, droplets in the exhalation of a person may contaminate the biological filter media. Providing more porous filter media that is selected to filter such material on the upstream side of the biological filter media when a person exhales may extend the life span of the biological filter media. Optionally, such more porous filter media may be provided on each side of the biological filter media.

Figure 11:
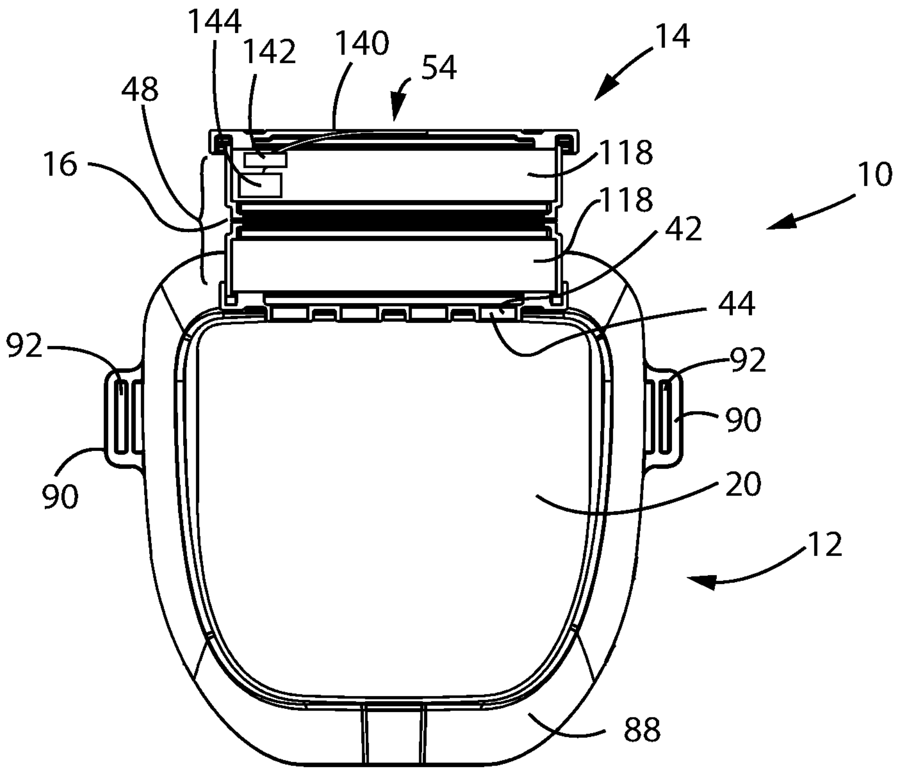
FIG. 11 is a cross section along the line 11-11 of the filter assembly of FIG. 5.
Figure 12:
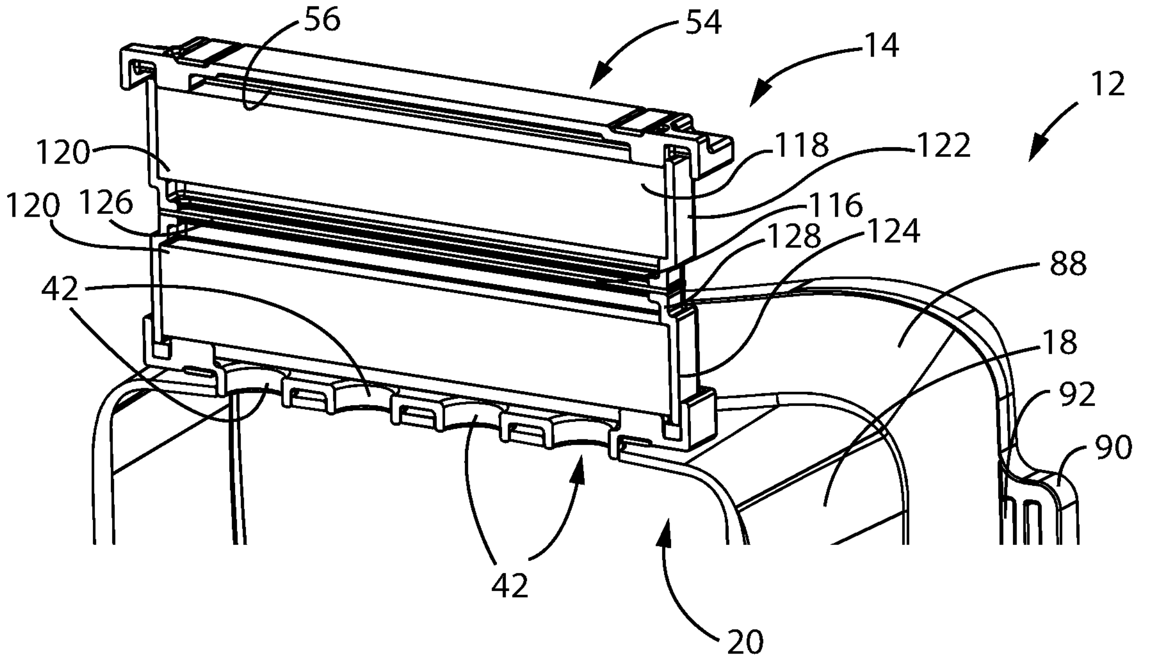
FIG. 12 is an enlarged cross section along the line 11-11 of the filter assembly and the upper portion of the filter mask of FIG. 5.

As exemplified in FIG. 11, the filter media 48 may comprise a foam filter 118 (open or closed cell foam) on each side of biological filter media 116. As exemplified in FIG. 12, the filter media 48 may comprise a foam filter 118 (open or closed cell foam) and an inner felt filter 120 on each side of biological filter media 116. The foam and felt filters protect the biological filter media 116 by inhibiting moisture droplets and particulate contaminants passing therethrough to the biological filter media 116. In other words, the foam and felt filters may protect the biological filter media 116 by capturing larger debris and/or droplets, thereby increasing the lifetime of the biological filter media 116.

Figure 30:
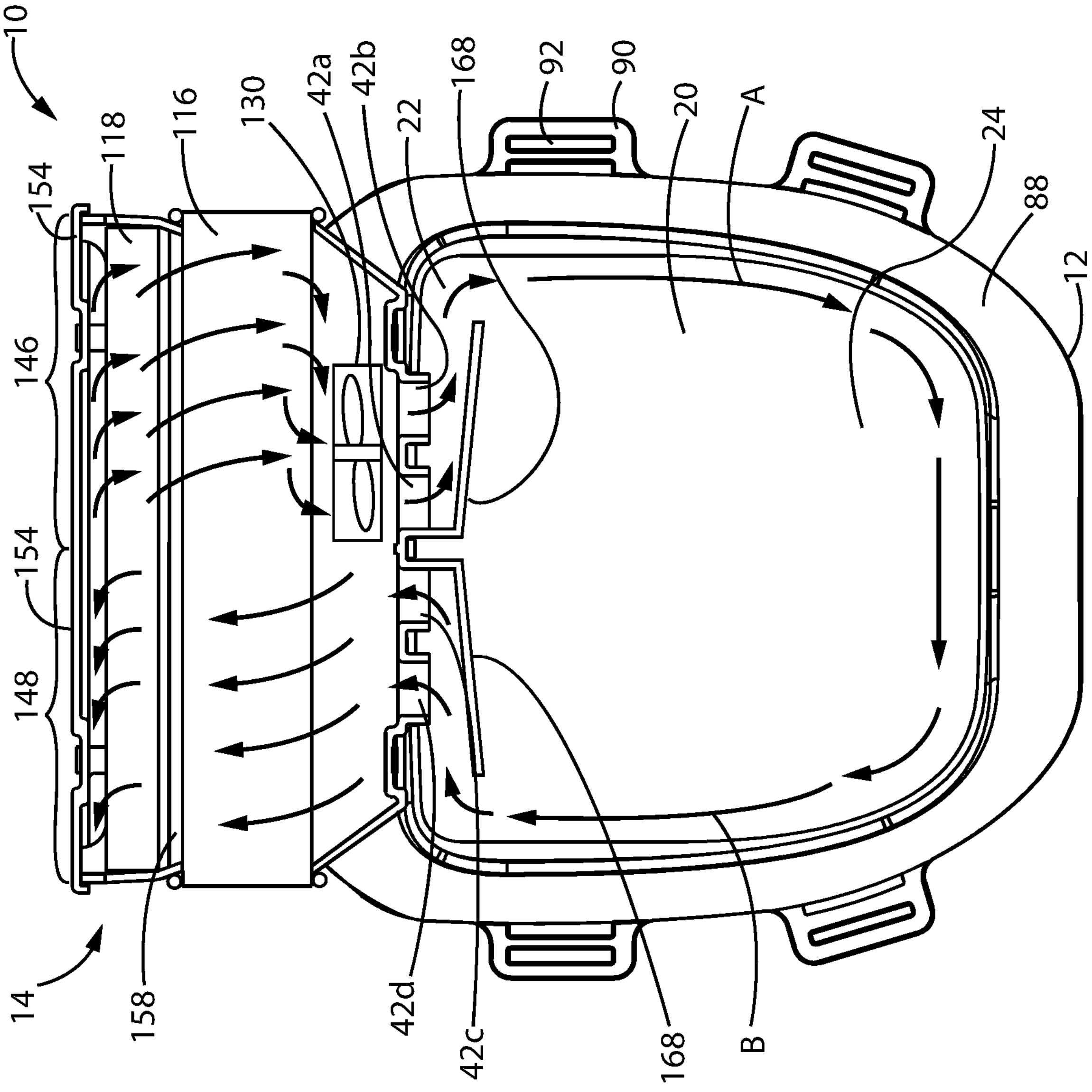
FIG. 30 is a cross-sectional view along line 28-28 in FIG. 20 of a further alternate embodiment of a filter mask having fan assisted inhalation and showing a circulation pattern during typical inhalation.

It will be appreciated that various different combinations of layered filters, with and without a fan 130 to assist inhalation and/or exhalation (as discussed subsequently) may be provided. For example, FIGS. 30 and 31 exemplify an embodiment in which a single foam filter 118 is provided on top of a single HEPA filter 116.

Figure 32:
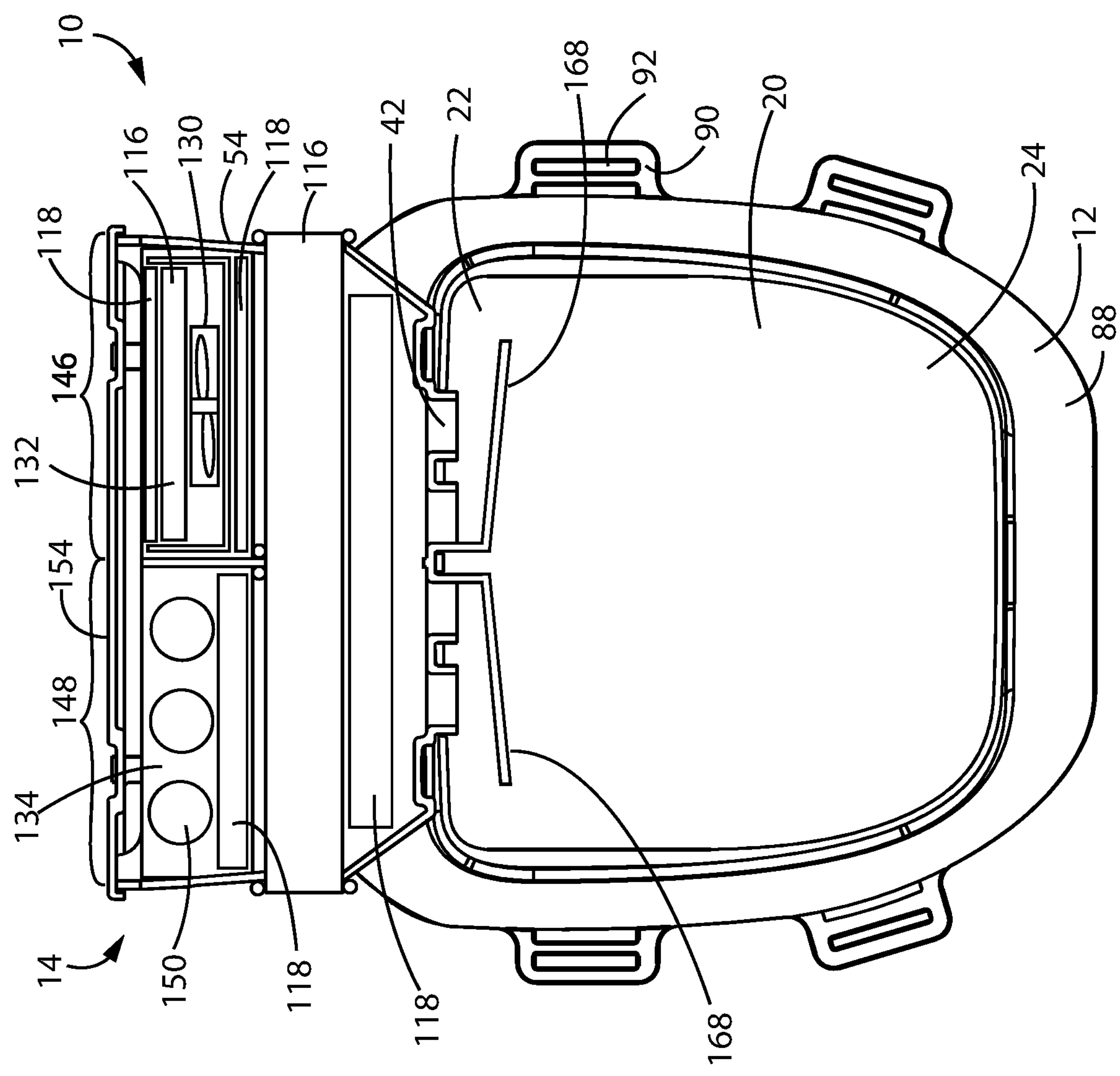
FIG. 32 is a cross-sectional view along line 28-28 in FIG. 20 of a further alternate embodiment of a filter mask.

FIG. 32 exemplifies an embodiment wherein a fan 130 is provided for assistance with inhalation. Accordingly, filter housing 54 has an inhalation side 146 and an exhalation side 148. Filter housing 54 may be configured, as exemplified in FIG. 32, such that inhalation and exhalation sides 146, 148 are provided on opposed lateral sides of filter housing 54. Alternately, it will be appreciated that inhalation and exhalation sides 146, 148 may be positioned with one forward of the other. As separate inhalation and exhalation sides 146, 148 are provided, exhalation side 148 is provided with one or more exhalation ports 150 and inhalation side 146 is provided with one or more inhalation ports 152 (see, e.g., FIG. 34). Inhalation ports 150 may be located at any location on inhalation side 146 and exhalation ports 152 may be provided at any location on exhalation side 148. The inhalation and exhalation ports 150, 152 may be provided on the same side of filter housing 54 or different sides, and optionally each may face downwardly as discussed previously. As exemplified in FIG. 32, exhalation ports 150 may be provided on a rear side of exhalation side 148 of filter body. In this embodiment, not shown, inhalation ports 152 may be provided, e.g., on a front side of inhalation side 146 of filter housing 54. Alternately, as exemplified in FIG. 34, inhalation ports 152 may be provided on a rear side of inhalation side 146 of filter body. In this embodiment, not shown, exhalation ports 150 may be provided, e.g., on a front side of exhalation side 148 of filter housing 54.

In the embodiment of FIG. 32, on inhalation side 146, a foam filter 118 and an underlying HEPA filter 116 are provided on the intake side of fan 130. A foam filter 118 is provided on the lower outlet end of fan 130. A HEPA filter 116 is provided across the entire air flow passage, accordingly extending across both inhalation and exhalation sides 146, 148 of filter housing 54. A foam filter 118 is provided on the lower (volume 28 side) of the HEPA filter 116. A foam filter 118 is provided on the upper side of the exhalation side 148 of HEPA filter 116.

Figure 33:
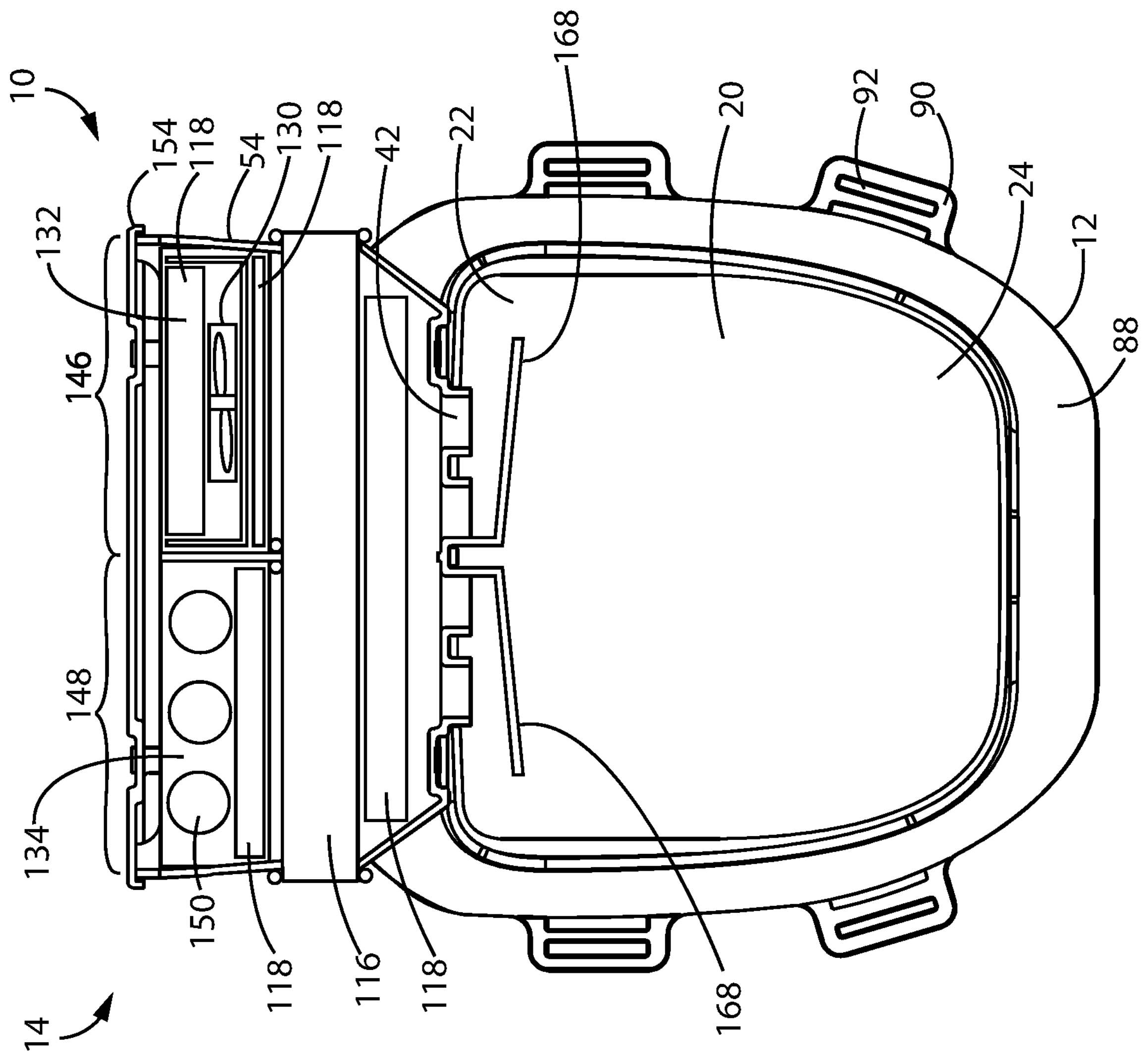
FIG. 33 is a cross-sectional view along line 28-28 in FIG. 20 of a further alternate embodiment of a filter mask.

FIG. 33 exemplifies an embodiment similar to that of FIG. 32 except that in the embodiment of FIG. 33, only a foam filter 118 is provided on the intake side of fan 130.

Figure 34:
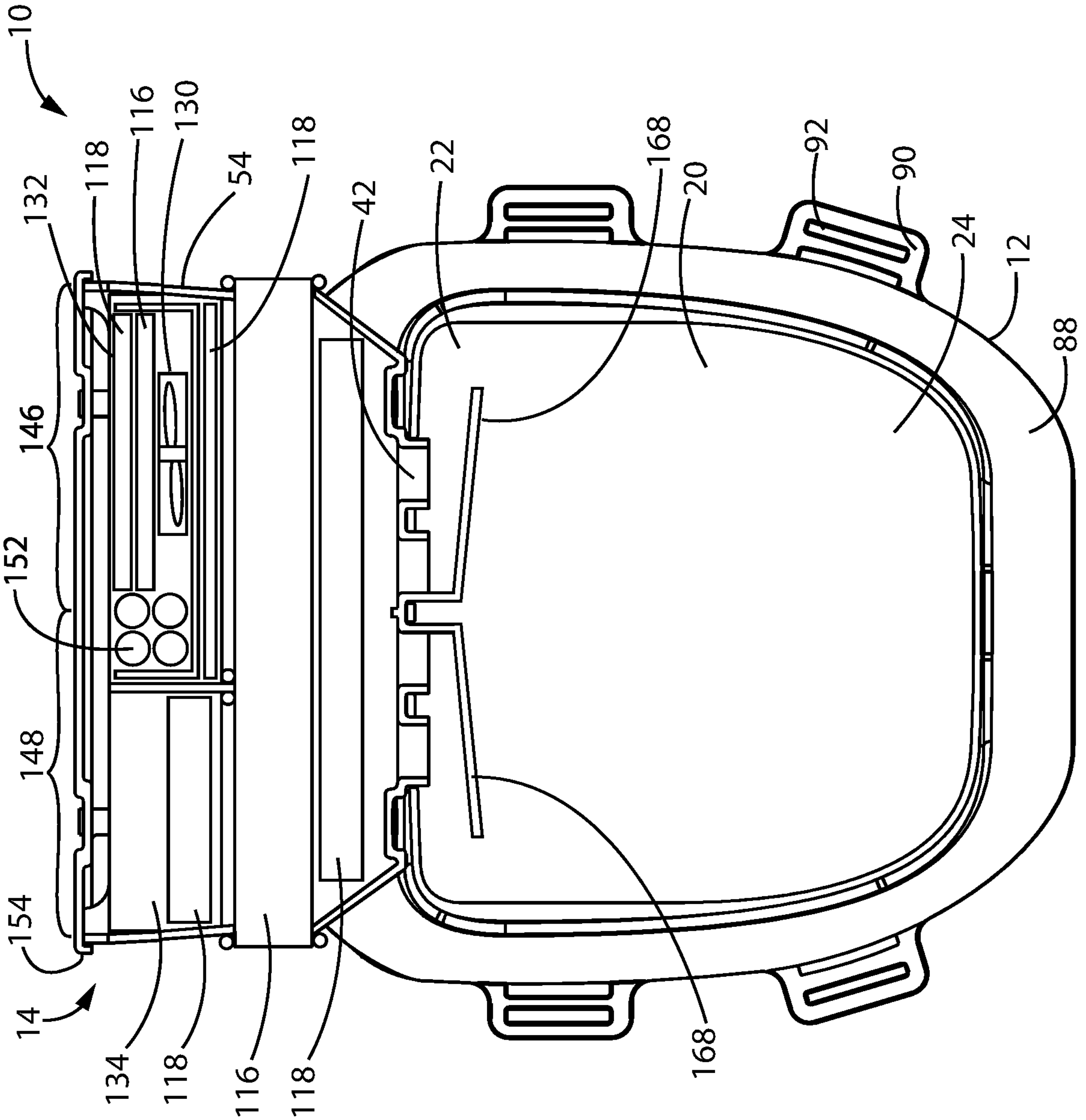
FIG. 34 is a cross-sectional view along line 28-28 in FIG. 20 of a further alternate embodiment of a filter mask.
Figure 35:
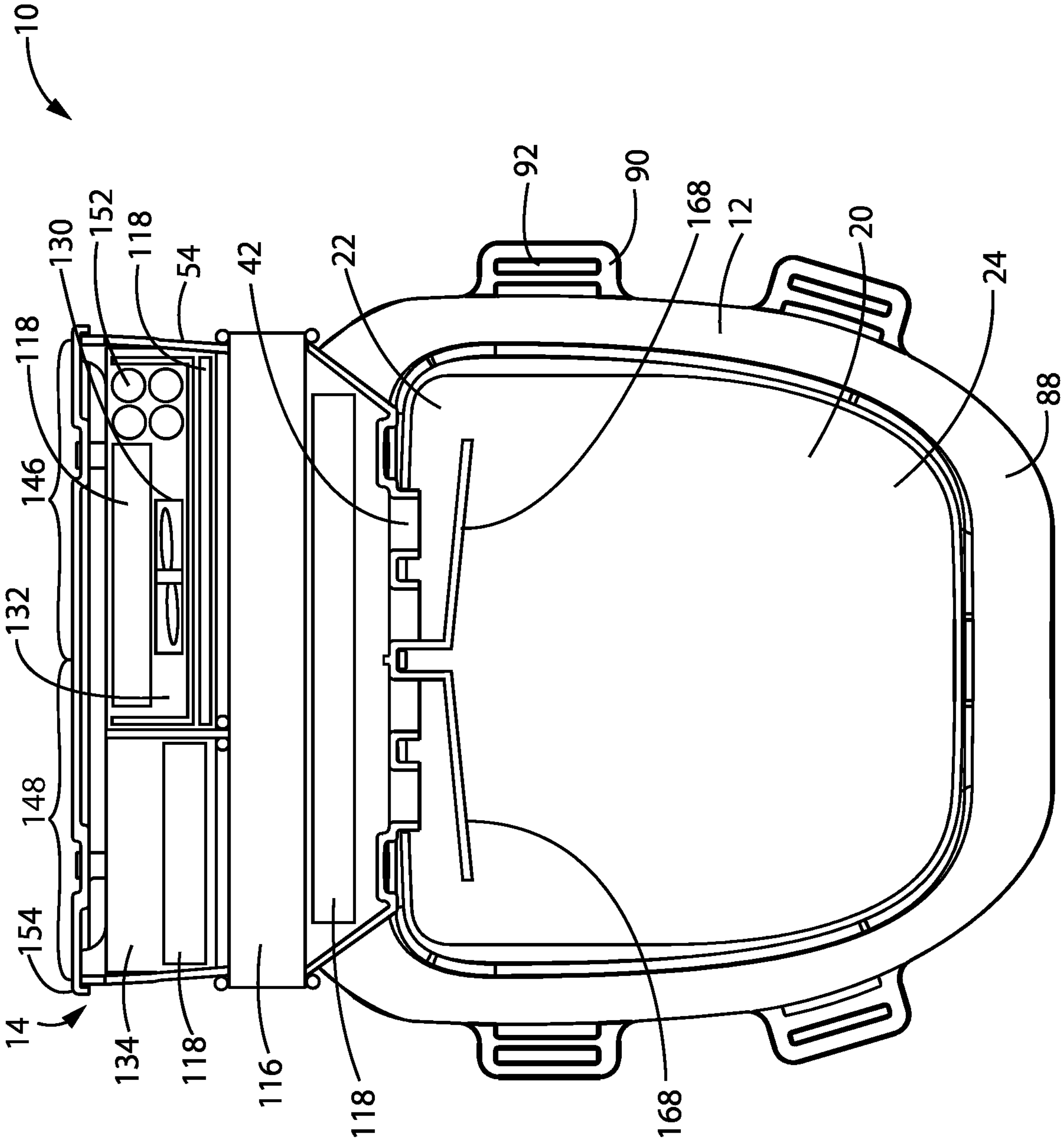
FIG. 35 is a cross-sectional view along line 28-28 in FIG. 20 of a further alternate embodiment of a filter mask.

FIG. 35 exemplifies an embodiment similar to that of FIG. 33 except that in the embodiment of FIG. 35, inhalation ports 152 are positioned similarly to those of the embodiment of FIG. 34. Accordingly, inlet ports 152 of inhalation side 146 are provided in a rear side of the inhalation portion 146 and the exhalation ports 150 are provided, e.g., on a front side of the filter housing 54.

Figure 36:
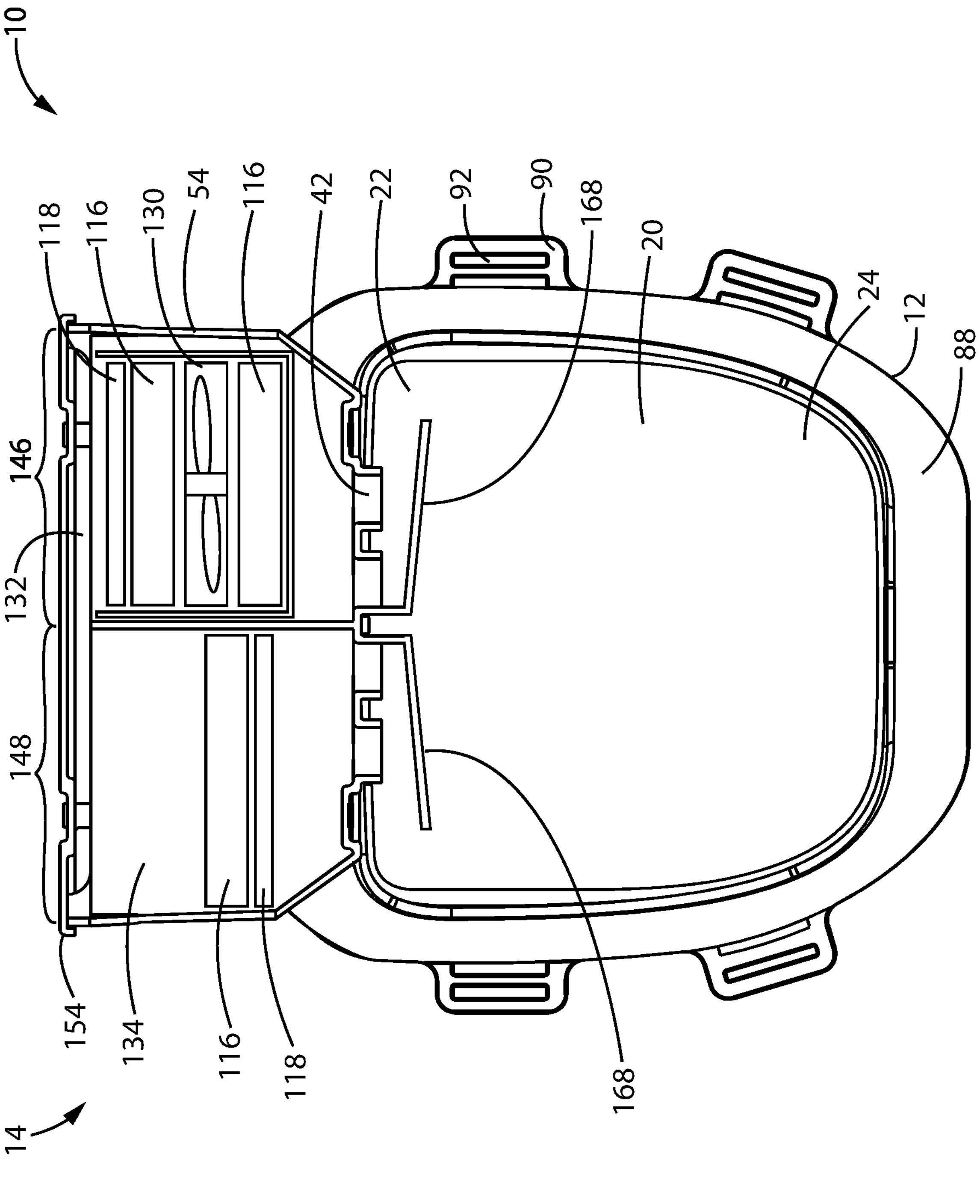
FIG. 36 is a cross-sectional view along line 28-28 in FIG. 20 of a further alternate embodiment of a filter mask.

FIG. 36 exemplifies an embodiment wherein filter housing 54 does not include a common air flow passage for inhalation and exhalation. In this embodiment, inhalation side 146 has a foam filter 118 and a HEPA filter 116 on the intake side of fan 130 and a HEPA filter 116 on the downstream side of fan 130. On exhalation side 148, a foam filter 118 is provided upstream of HEPA filter 116.

Figure 37:
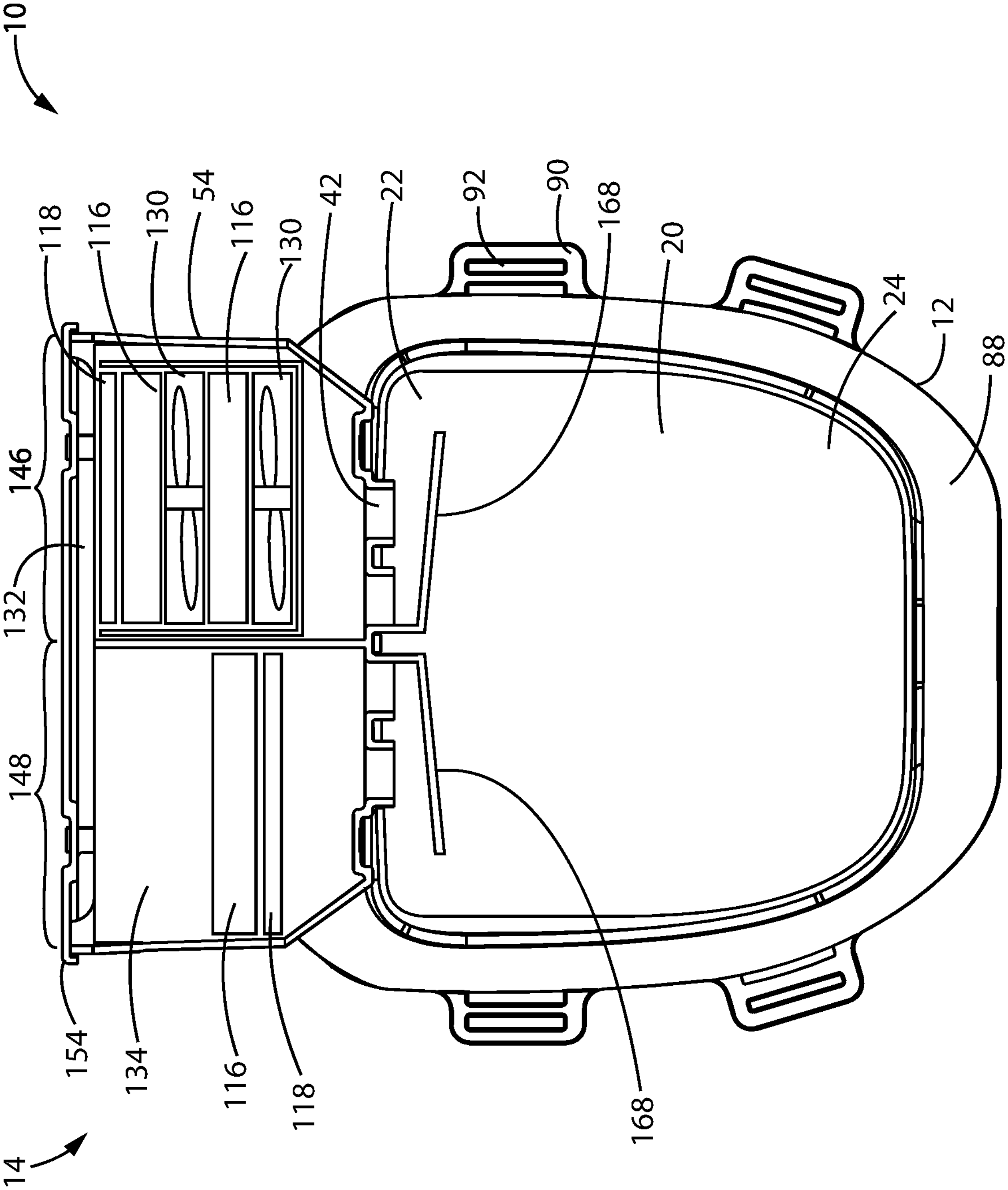
FIG. 37 is a cross-sectional view along line 28-28 in FIG. 20 of a further alternate embodiment of a filter mask.
Figure 38:
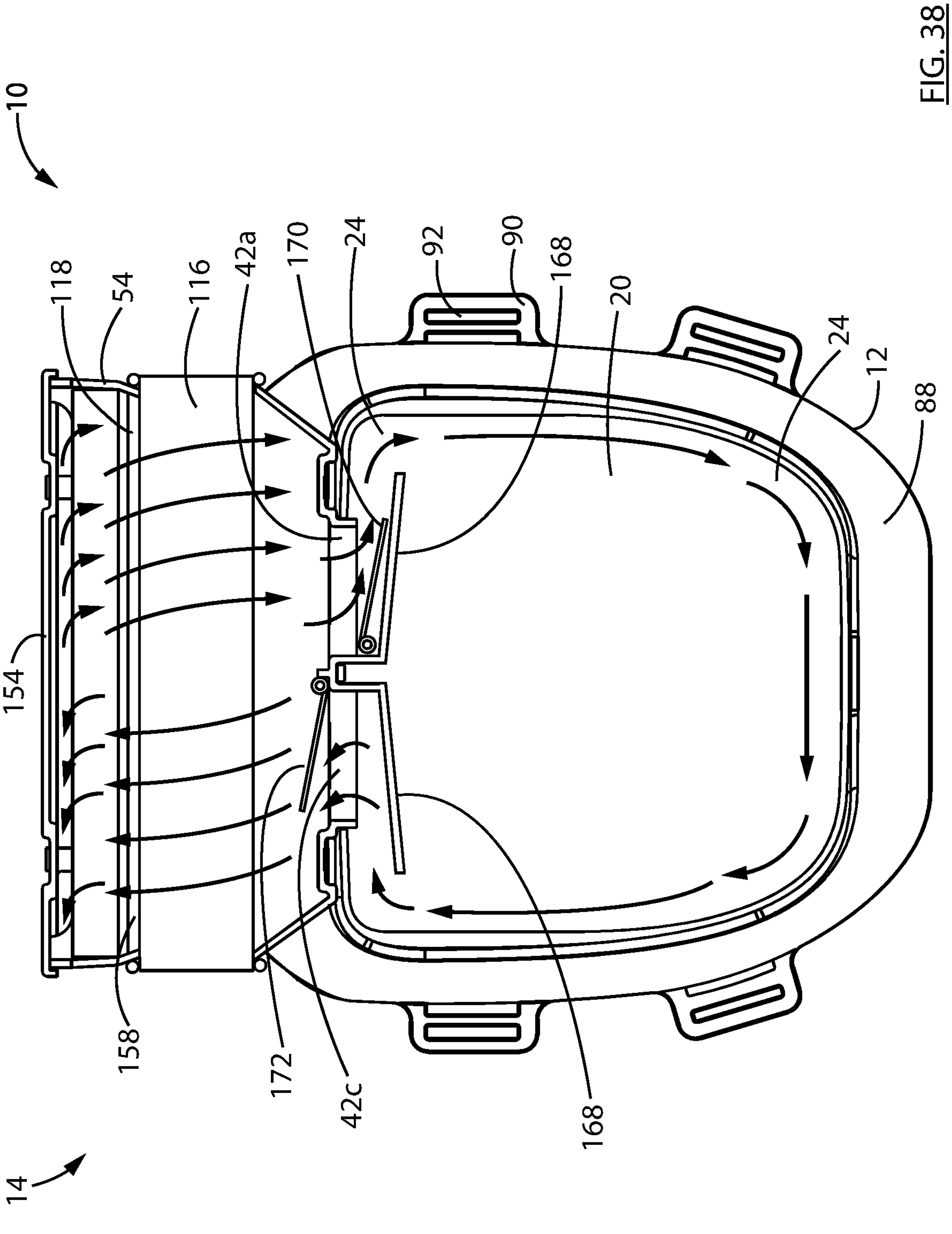
FIG. 38 is a cross-sectional view along line 28-28 in FIG. 20 of a further alternate embodiment of a filter mask.
Figure 39:
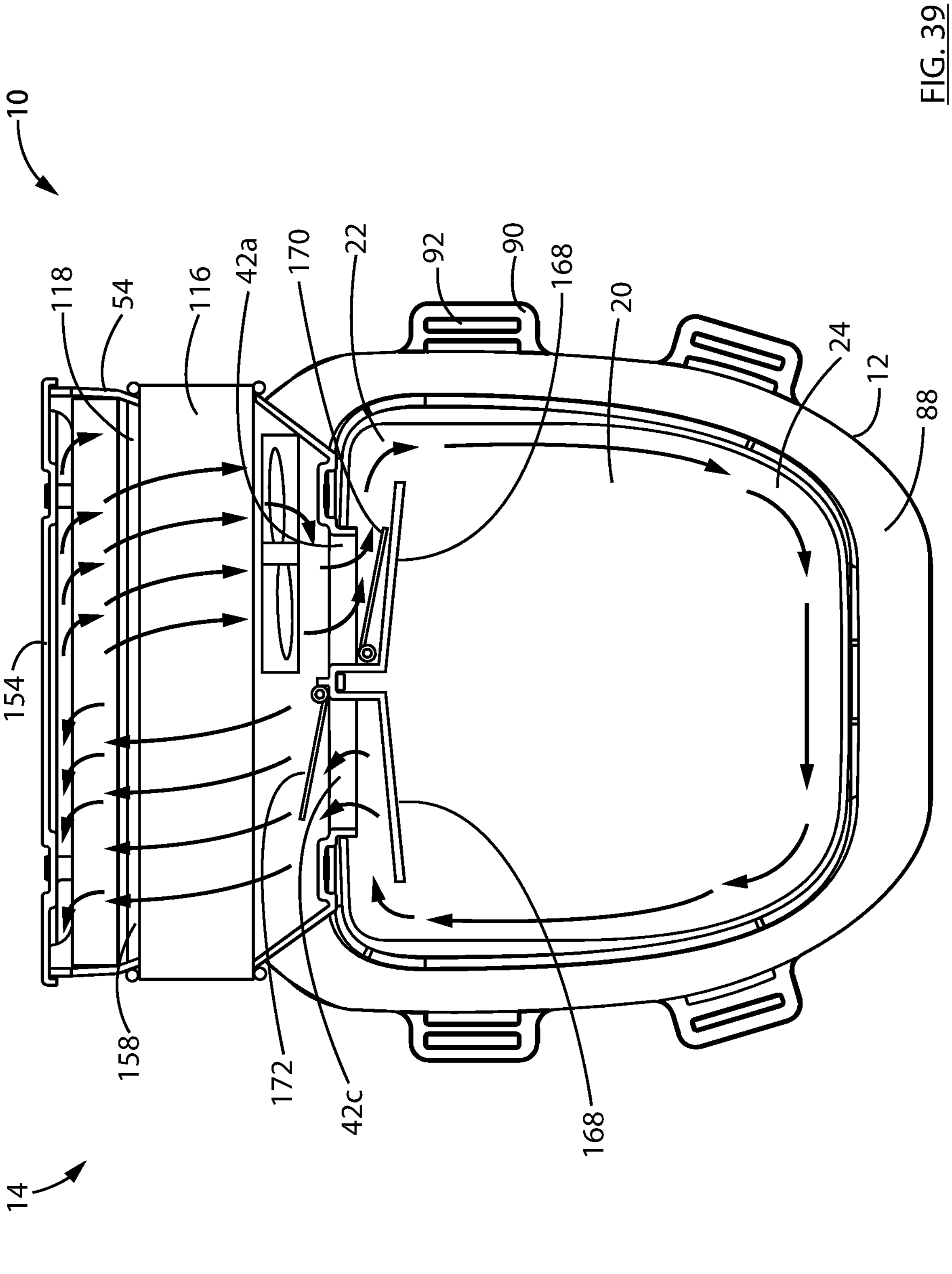
FIG. 39 is a cross-sectional view along line 28-28 in FIG. 20 of a further alternate embodiment of a filter mask.
Figure 40:
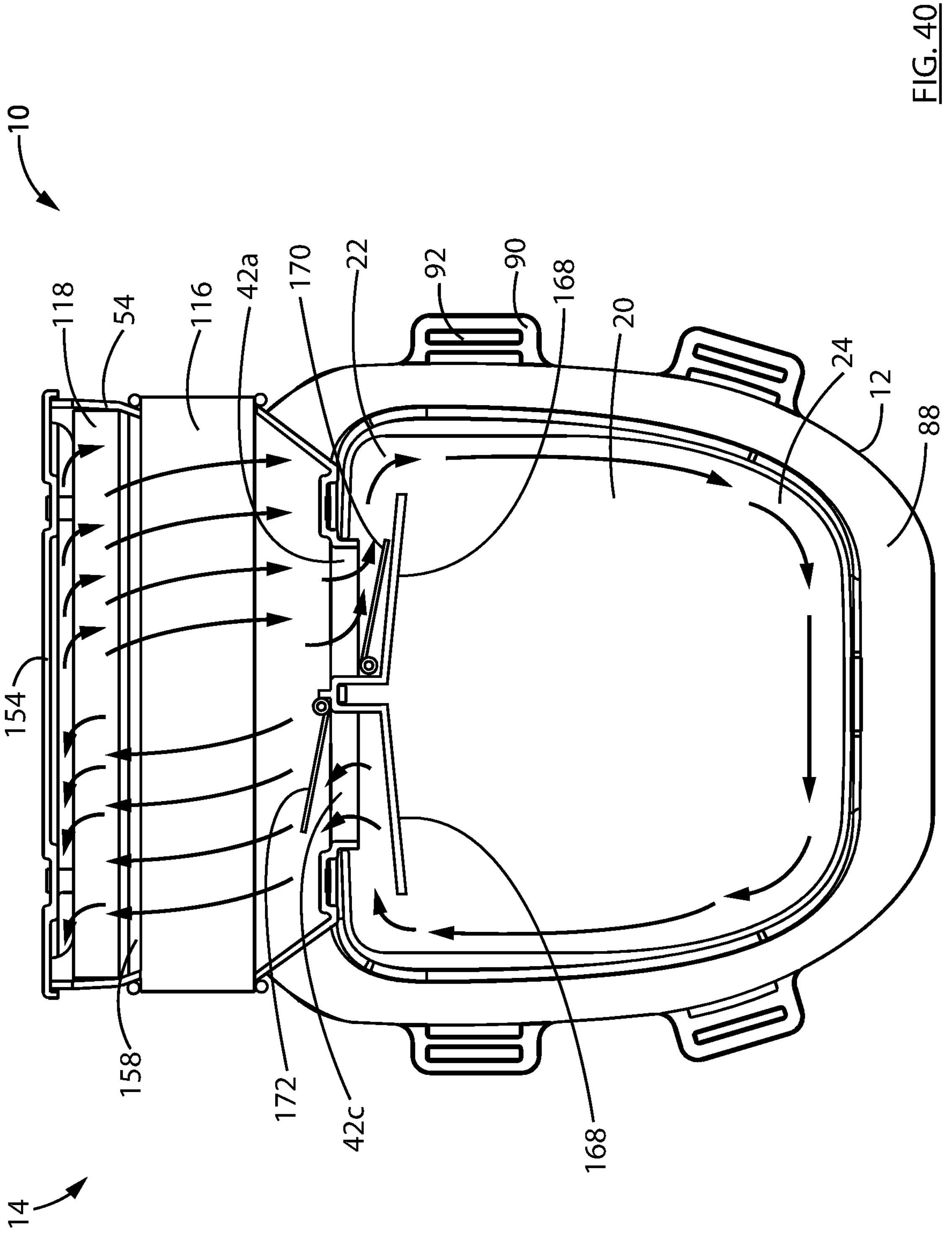
FIG. 40 is a cross-sectional view along line 28-28 in FIG. 20 of a further alternate embodiment of a filter mask.
Figure 41:
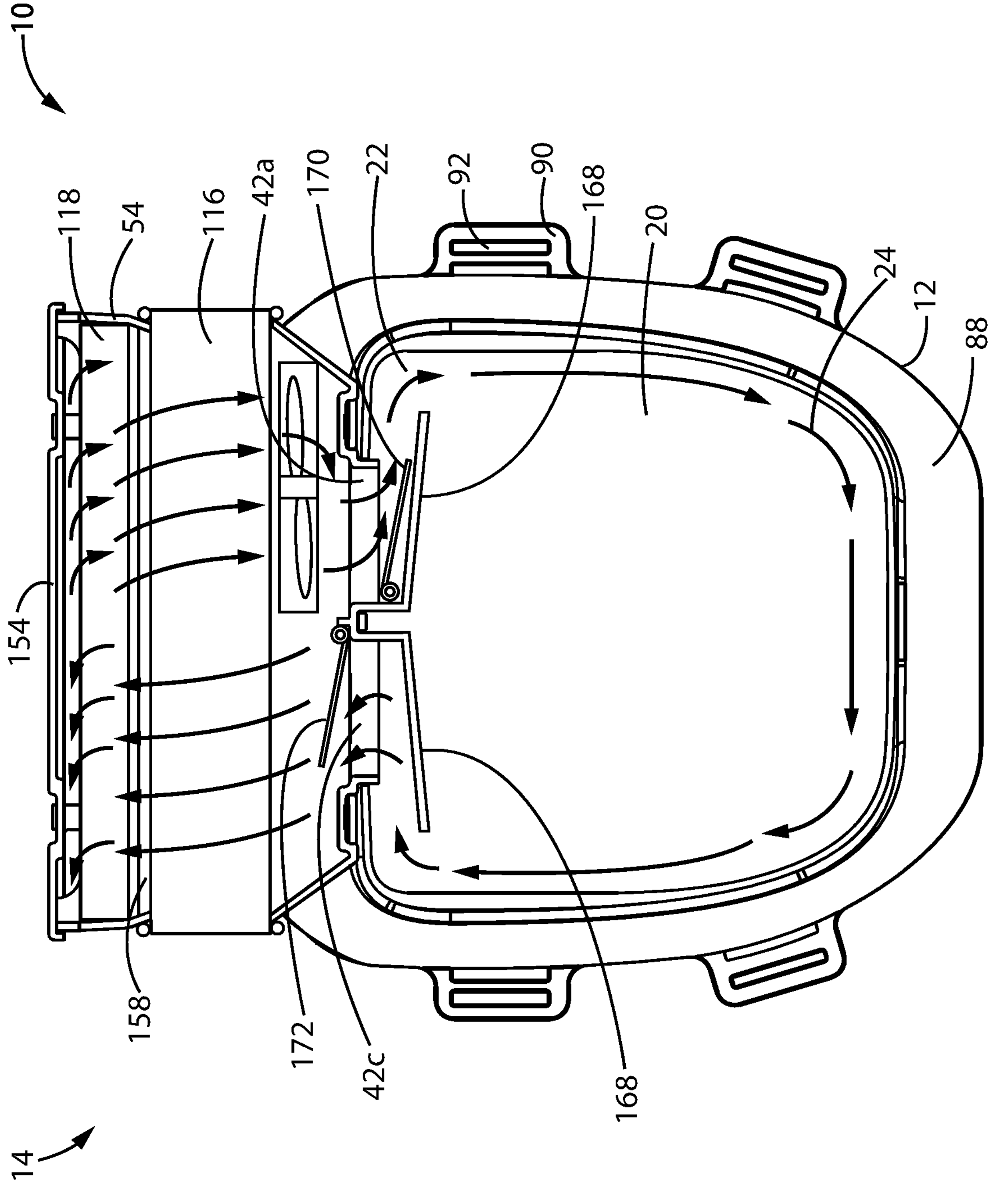
FIG. 41 is a cross-sectional view along line 28-28 in FIG. 20 of a further alternate embodiment of a filter mask.

FIG. 37 exemplifies an embodiment that is similar to the embodiment of FIG. 36 except that two fans 130 are provided on inhalation side 146 and the second (downstream) fan 130 is provided downstream of the HEPA filter 116 that is positioned downstream of the first (upstream fan) 130.

In the preceding examples, it will be appreciated that foam filter 118 may be any more porous media (any one or more layers of more porous filter media) that is provided on an upstream and/or downstream of a biological filter media 116. Similarly, it will be appreciated that HEPA filter 116 may be any one or more layers of a biological filter media 116. It will also be appreciated that the orientation of the layered filters may vary depending on the mask body design. For example, FIGS. 72-97 exemplify an embodiment in which a single foam filter 118 is provided below a single HEPA filter 116. As exemplified in FIGS. 98-100, a single foam filter 118 is provided below each HEPA filter 116. As exemplified in FIGS. 101-120, a single biological filter media 116 is provided in the filter housing 54. As exemplified, in such embodiments the air inlet and air outlet may face downwardly when the mask is worn by a user.

The foam filter material may have 100 pores per inch or more (e.g., the pores may have a size of about 150 microns). For example, the foam may have 500 or 1,000 pores per inch (e.g., pores about 15 microns in size). The pores per inch of the foam may be increased, e.g., by heat compressing the foam.

Optionally, the foam is a reticulated foam, such as a reticulated polyurethane foam.

When a person is wearing the filter mask 10 and inhales, air enters the inlet and outlet port 56 or separate inlet ports 150, travels through the air treatment member 46 and through the air flow conduit 42 into the volume 28 thereby enabling the person wearing the filter mask 10 to breath in filtered or treated air. When a person is wearing the filter mask 10 and exhales, air enters the volume 28 and optionally passes through the air flow conduit 42, the air treatment member 46 and out through the inlet and outlet port 56 or separate outlet ports 152. It will be appreciated that, in an alternate embodiment, a separate outlet port may be provided elsewhere, such as in face plate 20, air flow conduit 42 or the filter housing 54 such that exhaled air does not have to pass through the air treatment member 46.

Replaceable Filter Media and Filter Assembly Construction

In accordance with this aspect, which may be used by itself or in combination with one or more other aspects, filter assembly 14 may be openable to replace one or more filter media provided therein (which may be mounted in a filter housing 54 or a filter cartridge 194) or may have a cavity in which, e.g., one or more filter layers or a filter cartridge 194 or a filter housing 54 is insertable therein.

Figure 119:
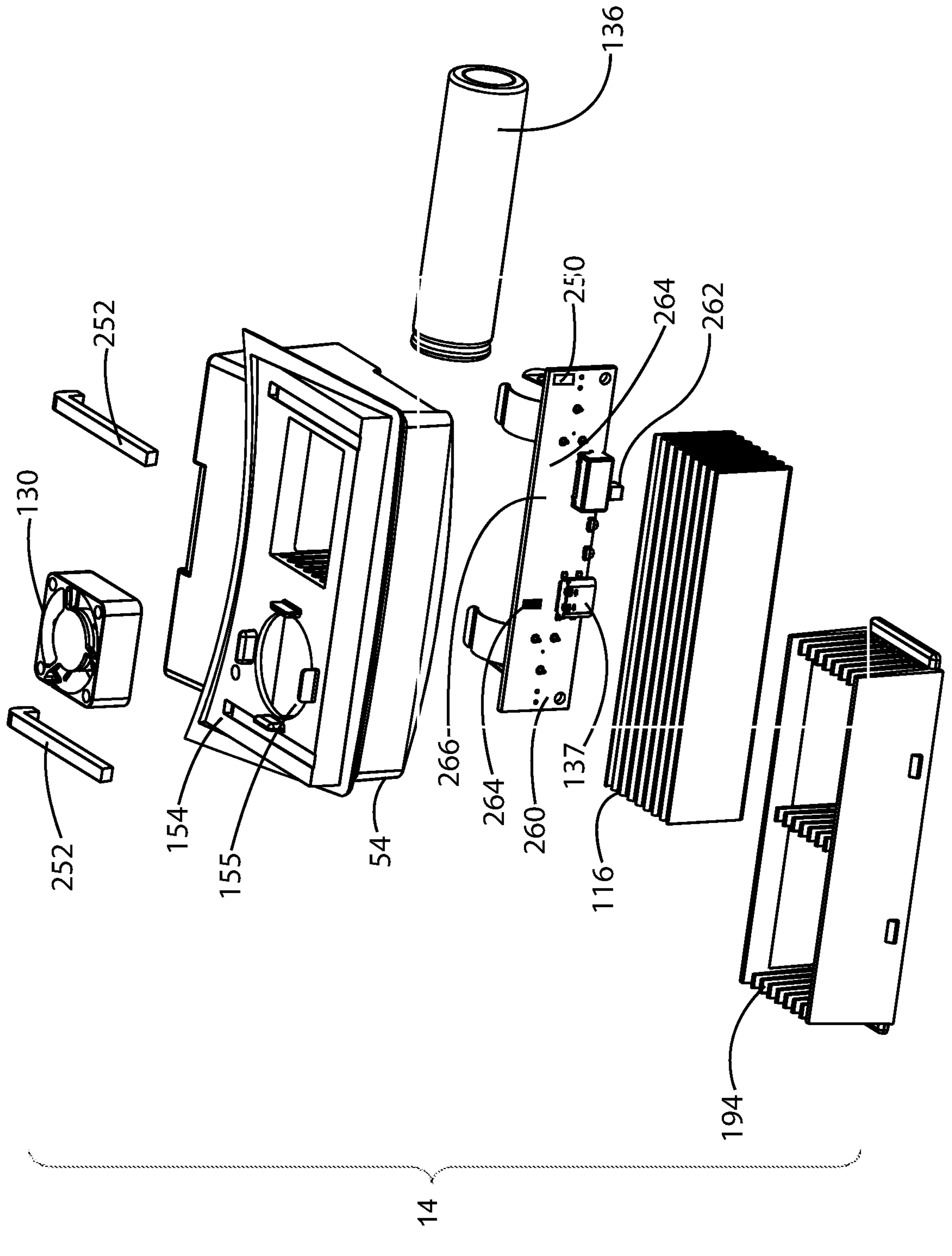
FIG. 119 is a front perspective exploded view of the filter assembly of FIG. 118.
Figure 120:
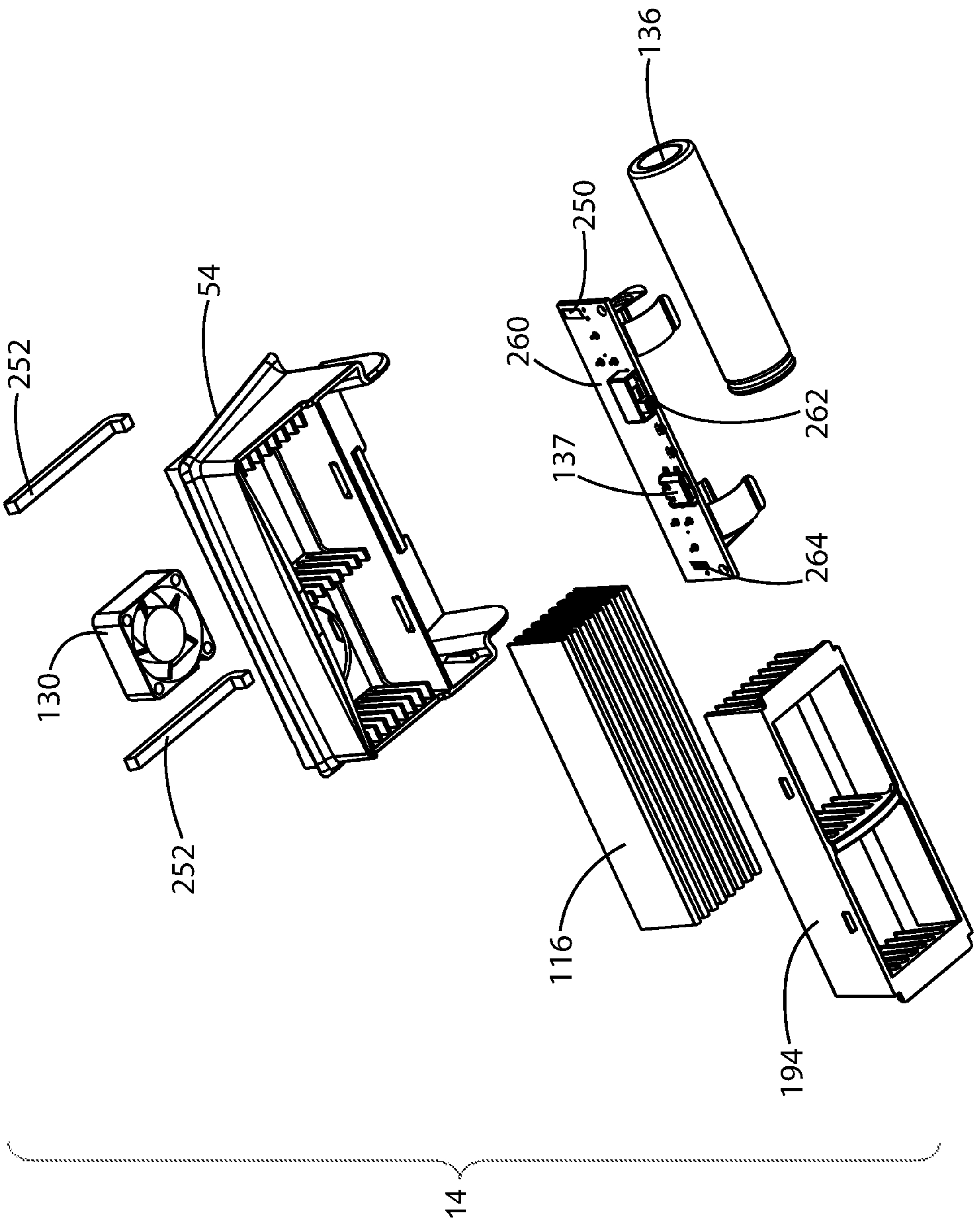

Alternately, or in addition, in accordance with this aspect, which may be used by itself or in combination with one or more other aspects, one or more filter members may be secured in a filter holder on an exterior of the filter holder (see for example FIG. 81) or may be positionable in an openable filter cartridge 194 as discussed subsequently (see for example FIG. 119). An advantage of this aspect is that the filter member may be more readily secured in position. A further advantage is that the sealing of the filter member to the filter holder is more visible and the seal may be readily checked to determine of the seal is complete.

These aspects may be used if the filter assembly is removably mounted to the mask body or if the filter assembly is secured (non-removably mounted) to the mask body.

In accordance with this aspect, some or all of the filter media 48 may be removably positionable in the filter housing 54. For example, the filter media may be compressible (e.g., foam) which may be secured in position in cavity 158 by compression. Alternately, filter media 48 may have one or more rigid walls (e.g., in the case of a pleated filter) that enables the air treatment member 46 to be held in position by a friction fit (see for example FIG. 119). Alternately or in addition, a mechanical locking member may be provided that engages with the air treatment member 46 so as to inhibit the removal of the air treatment member 46. Alternately, the air treatment member 46 may be slidably insertable through an openable door provided in a sidewall 72 and/or an openable bottom and/or an openable top and/or lid 154 (see for example FIG. 49). The opening providing an entrance to the cavity 158 may also be referred to as a port and the port need not be openable.

In some embodiments, the cavity 158 may have an insertion direction for the filter media 48. When the filter media 48 is positioned within the cavity 158, the filter media 48 may be recessed inwardly of the port (or entrance to the cavity 158) in the insertion direction. A portion of the cavity 158 walls may define a descending lip 58, which may extend outwardly of the filter media 48 in a direction that is opposite to the insertion direction. In other words, the filter media 48 may be recessed within the cavity 158 such that there is a portion of the walls defining the cavity 158 that does not contain the filter media 48. This descending lip may provide additional protection to the filter media 48 by providing a protective ridge. Additionally, the descending lip may provide a surface for attaching other components to the mask 10 without interfering with the filter media 48.

In some embodiments, the cavity 158 may have a header 117 located on the downstream side of the cavity 158 (relative to inhalation by the user), as exemplified in FIG. 83. The header 117 may be positioned between the filter media 48 and the top and/or lid 154 of the filter housing 54. The header 117 may be used to assist with maintain sufficient airflow in the filter housing 54.

Optionally, the more porous filter media is removable (e.g., the foam 118 and/or the felt 120 filter media). Therefore, the more porous filter media may be removed for cleaning and reuse or replaced by clean more porous filter media. An advantage of this design is that the life span of the biological filter media 116 may be extended.

Optionally, biological filter media 116 may be non-removably secured in position, such as by securing the biological filter media 116 to filter housing 54. An advantage of this design is that the edges of the biological filter media 116 may be secured to the filter housing 54 by, e.g., an adhesive (e.g., hot melt glue, silicone, etc.) welding or the like, to inhibit or prevent bypass of the biological filter media 116.

Optionally, the filter media is at least partially secured to an outer surface of the filter housing 54 and/or a portion of cavity 158 of filter body that is easily visible. An advantage of this design is that the seal of the biological filter material 116 to the filter body is visible and may enable a reliable and quick quality control visual inspection of a filter body having biological filter material 116 secured in position to confirm that the biological filter material 116 is secured such that bypass of the biological filter material 116 will not occur during use of filter assembly 14.

Figure 42:
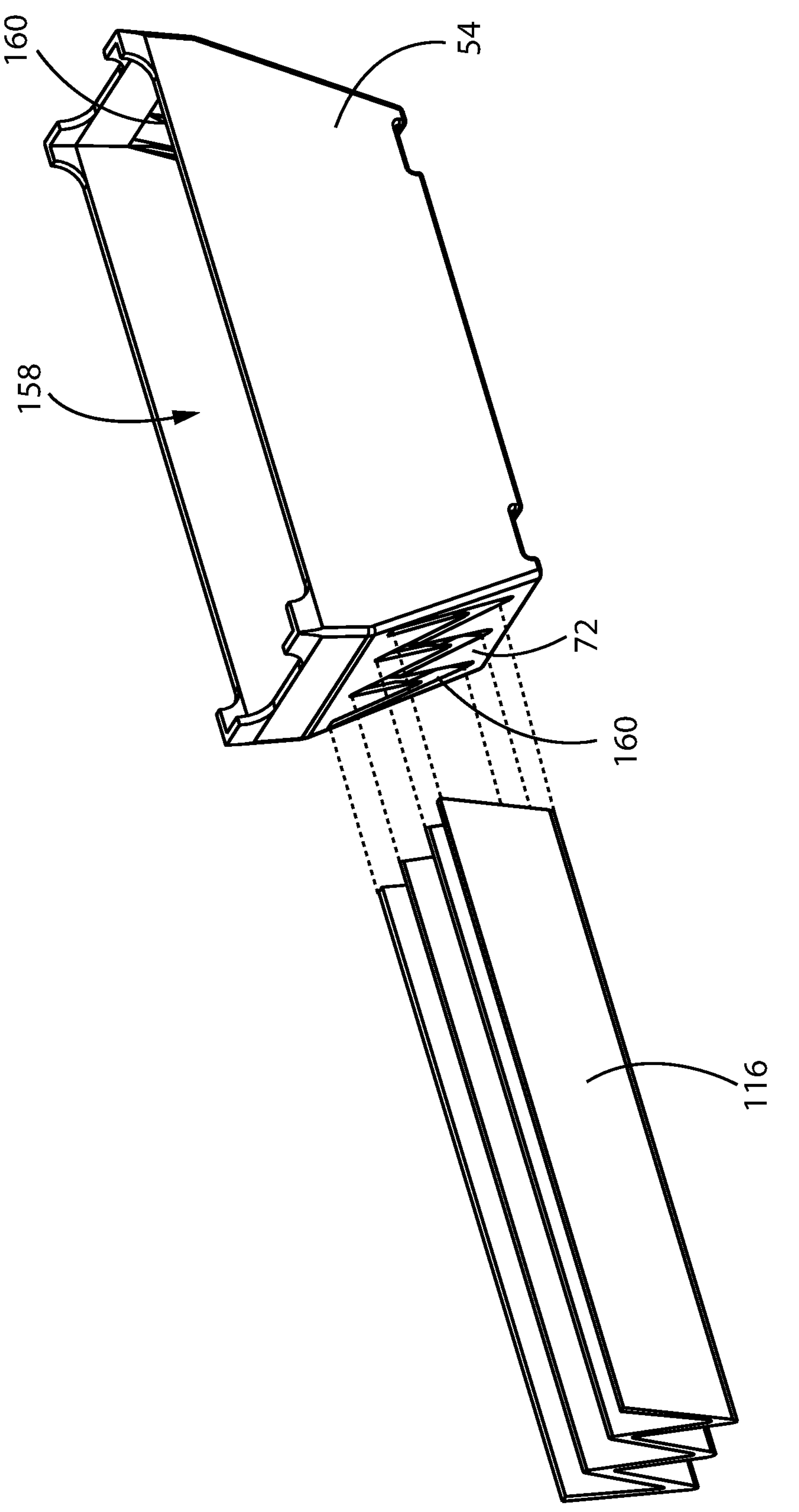
FIG. 42 is an exploded view of a filter holder and a filter member.
Figure 43:
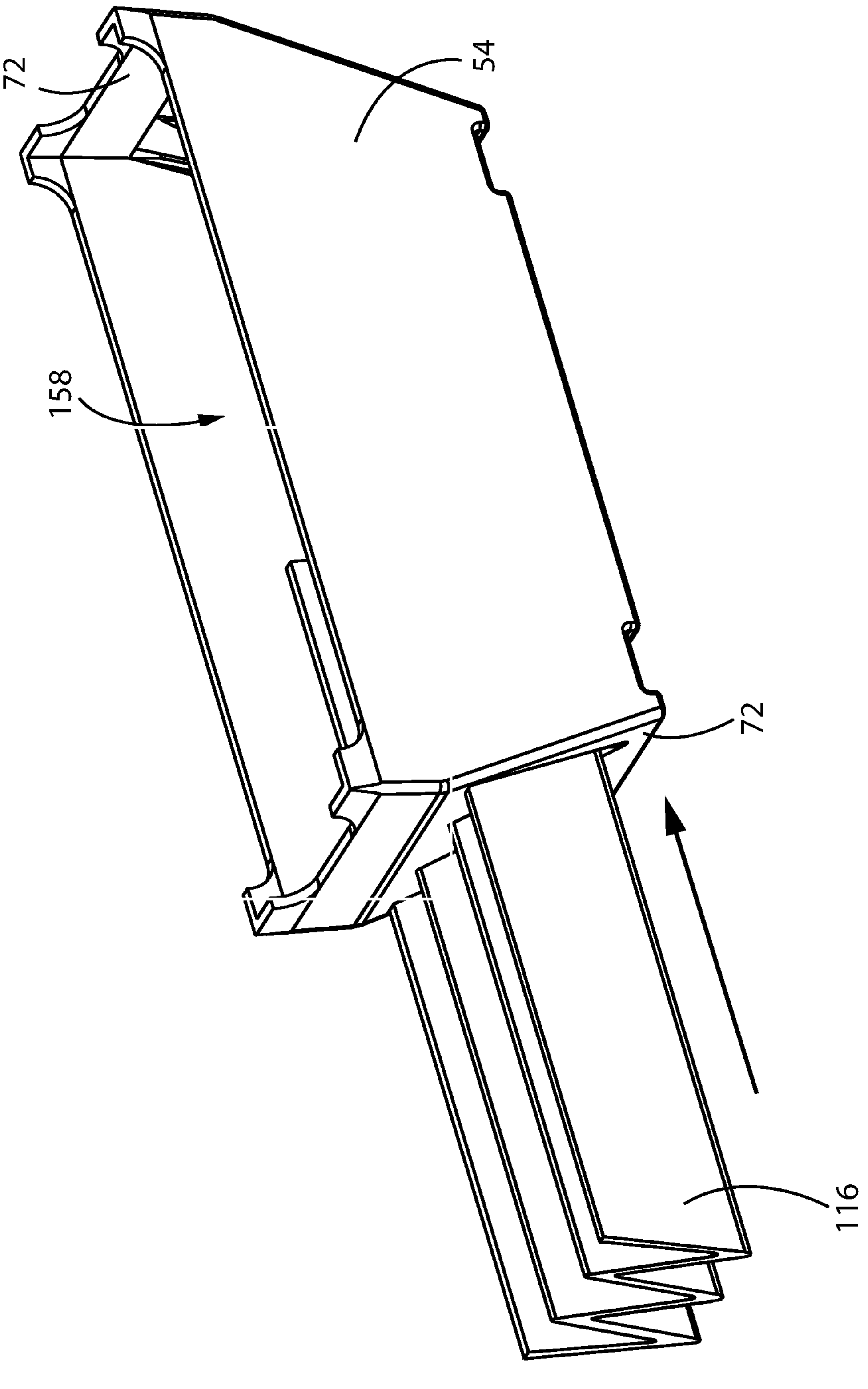
FIG. 43 is a perspective view of the filter member of FIG. 42 being slid into the filter holder of FIG. 42.

FIGS. 42-52 exemplify a method of securing a filter media (optionally a biological filter media 116) in a filter housing 54. As exemplified in FIG. 42, biological filter material is positioned to be slid into filter housing 54 via opening 160 in sidewall 72 of filter housing 54. Opening 160 may be of any configuration. As shown in FIG. 42, the opening is in a zig-zag shape to enable a biological filter material 116 that is folded in an accordion pattern to be slid into filter housing 54. It will be appreciated that opening 160 may be provided in any wall of filter housing 54.

Figure 44:
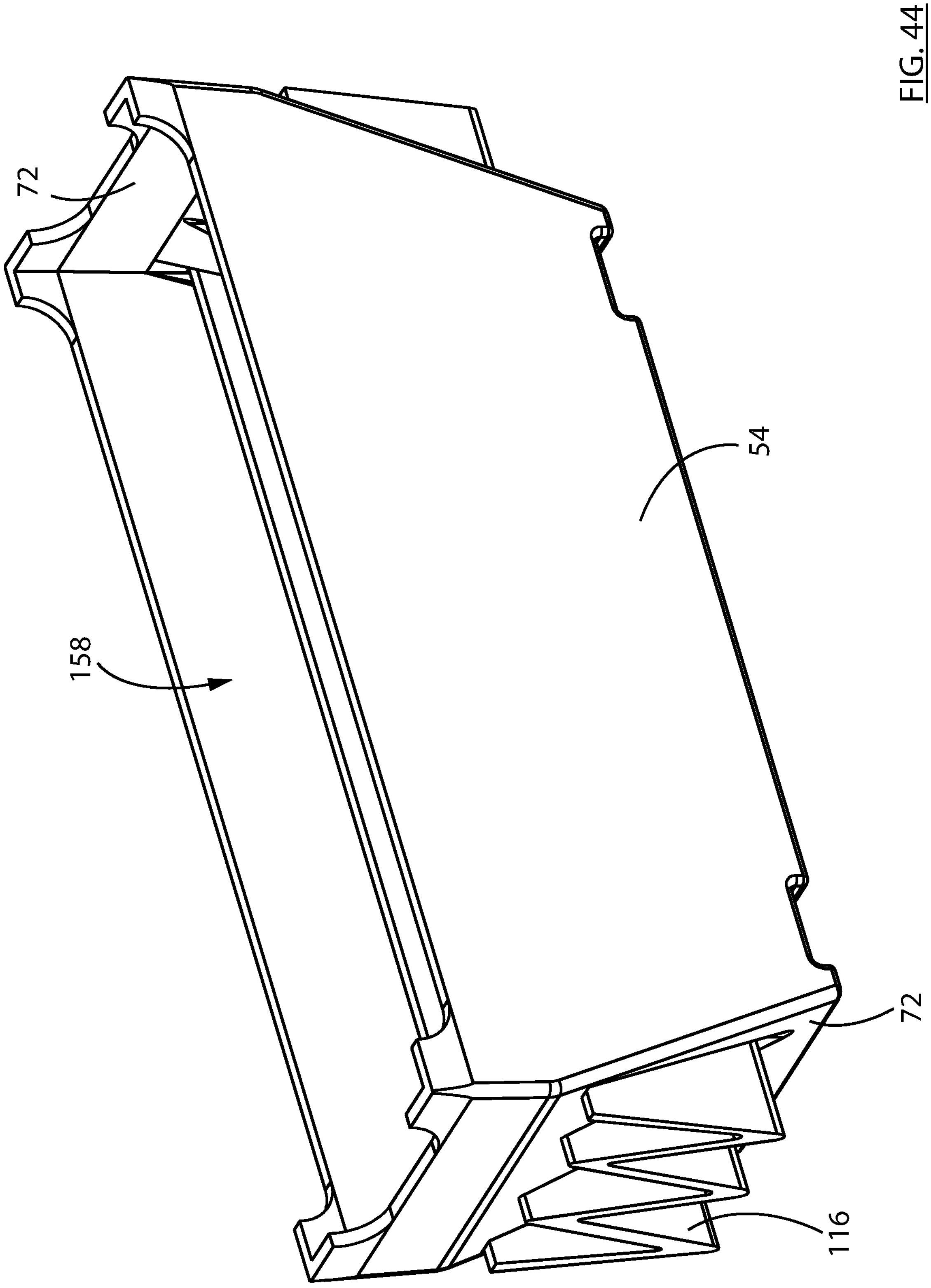
FIG. 44 is a perspective view of the filter member of FIG. 42 fully inserted into the filter holder of FIG. 42.
Figure 45:
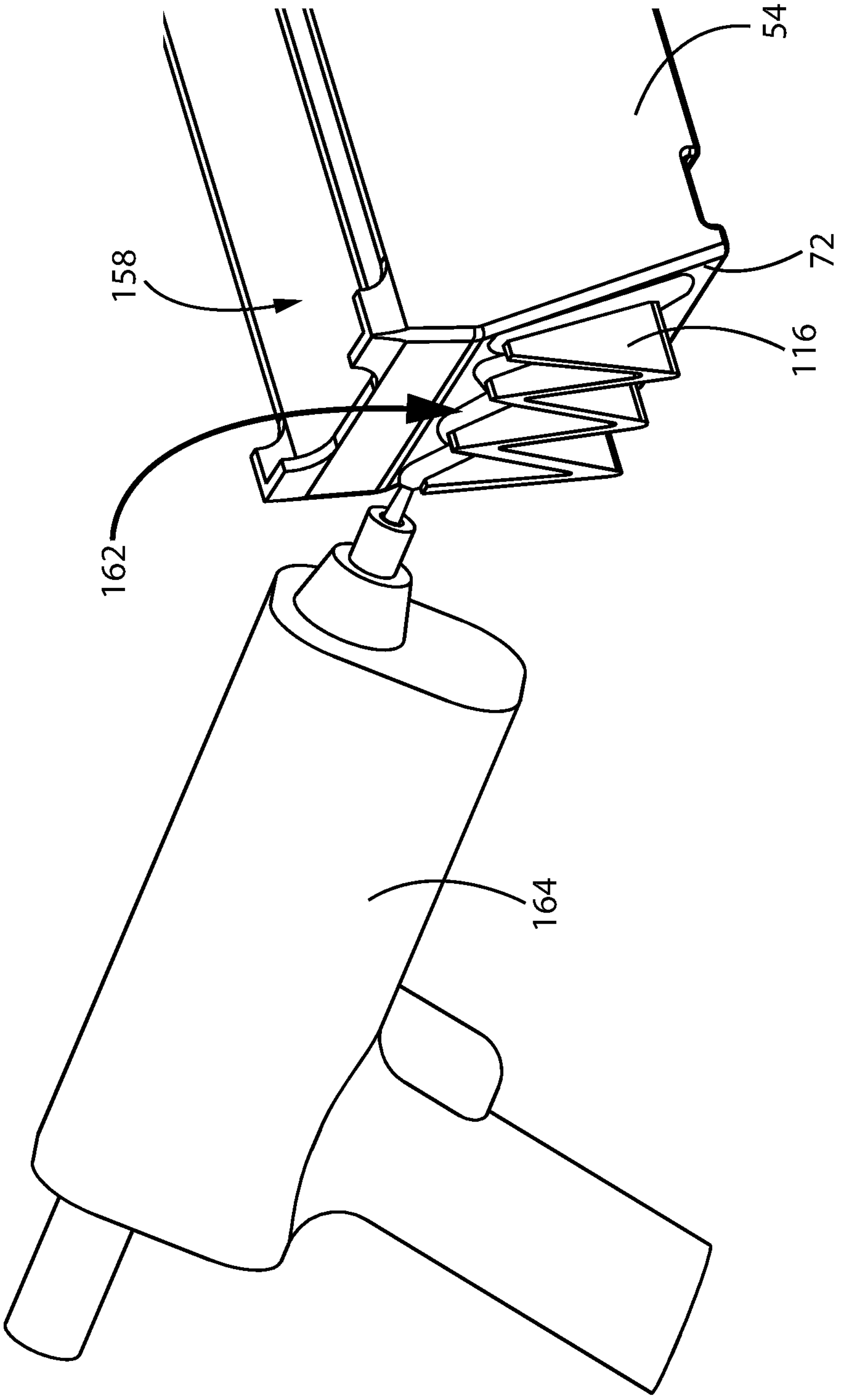
FIG. 45 is a perspective view of the filter member of FIG. 42 being glued to the filter holder of FIG. 42.
Figure 46:
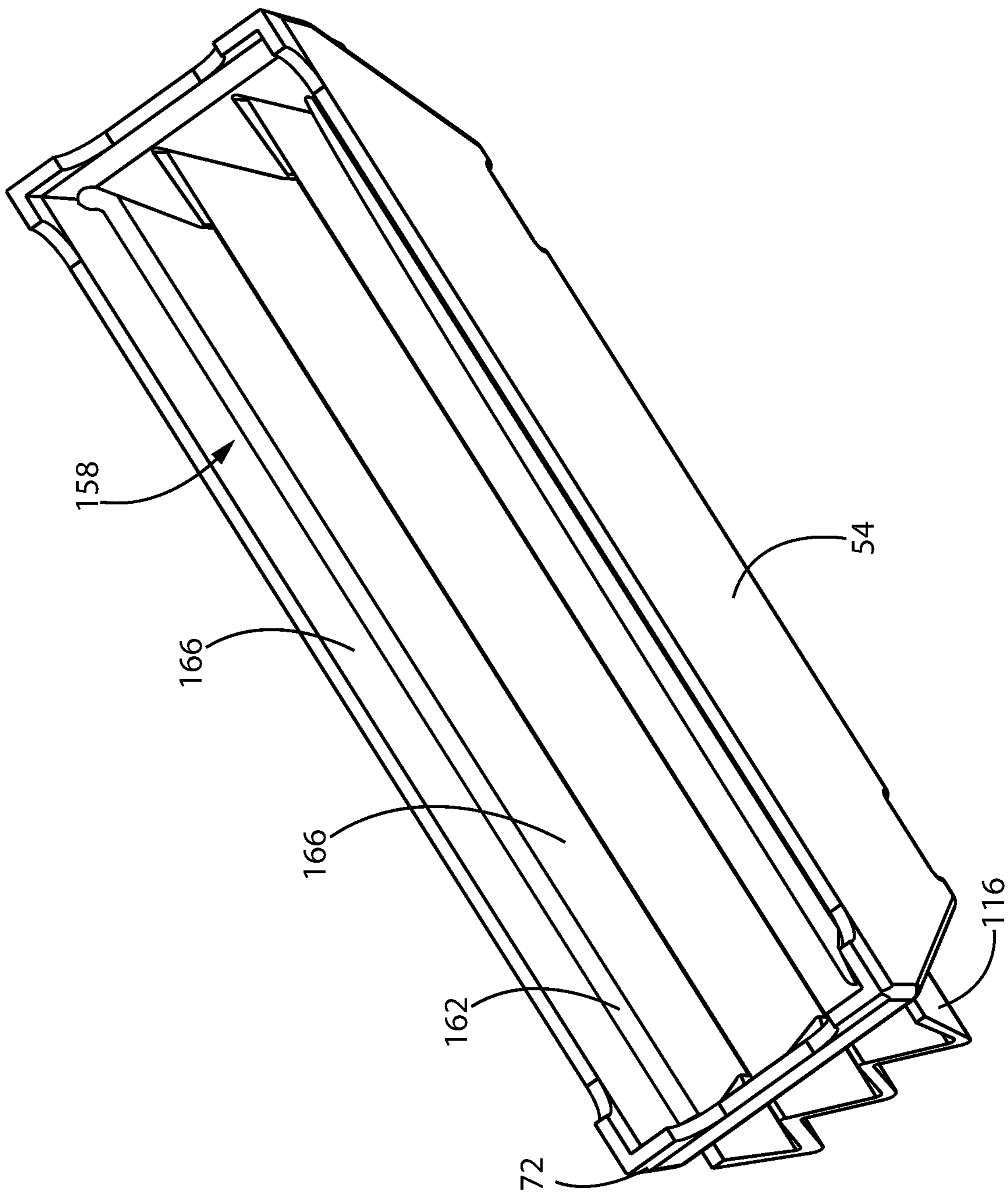
FIG. 46 is a top perspective view of the filter member of FIG. 42 having been glued to the filter holder of FIG. 42.

Optionally, as exemplified in FIG. 42, an opposed wall of filter housing 54 may have an opening 160 so as to enable one end of biological filter material to be slid through cavity 158 (see FIG. 43) to the opposed wall and out opening 160 in the opposed wall of filter housing 54 such that, as exemplified in FIG. 44, an end of biological filter material 116 extends outwardly on each opposed side 72 of filter housing 54.

Once biological filter material 116 is positioned in filter housing 54, biological filter material 116 may be secured to the filter body. As exemplified in FIG. 45, adhesive 162 may be applied to the exterior of filter body at the location at which biological filter material 116 extends through opening 160 in sidewall 72. Adhesive 162 may be provided to the upper surface and/or the lower surface of biological filter material 116. Optionally, as exemplified in FIG. 46, an adhesive 162 may also be applied in cavity 158 at the location at which biological filter material 116 abuts longitudinally extending sidewall 166 of filter body. Accordingly, all portions of biological filter material which engage a wall of filter housing 54 are secured to the filter body with the sealing means readily visible.

Figure 47:
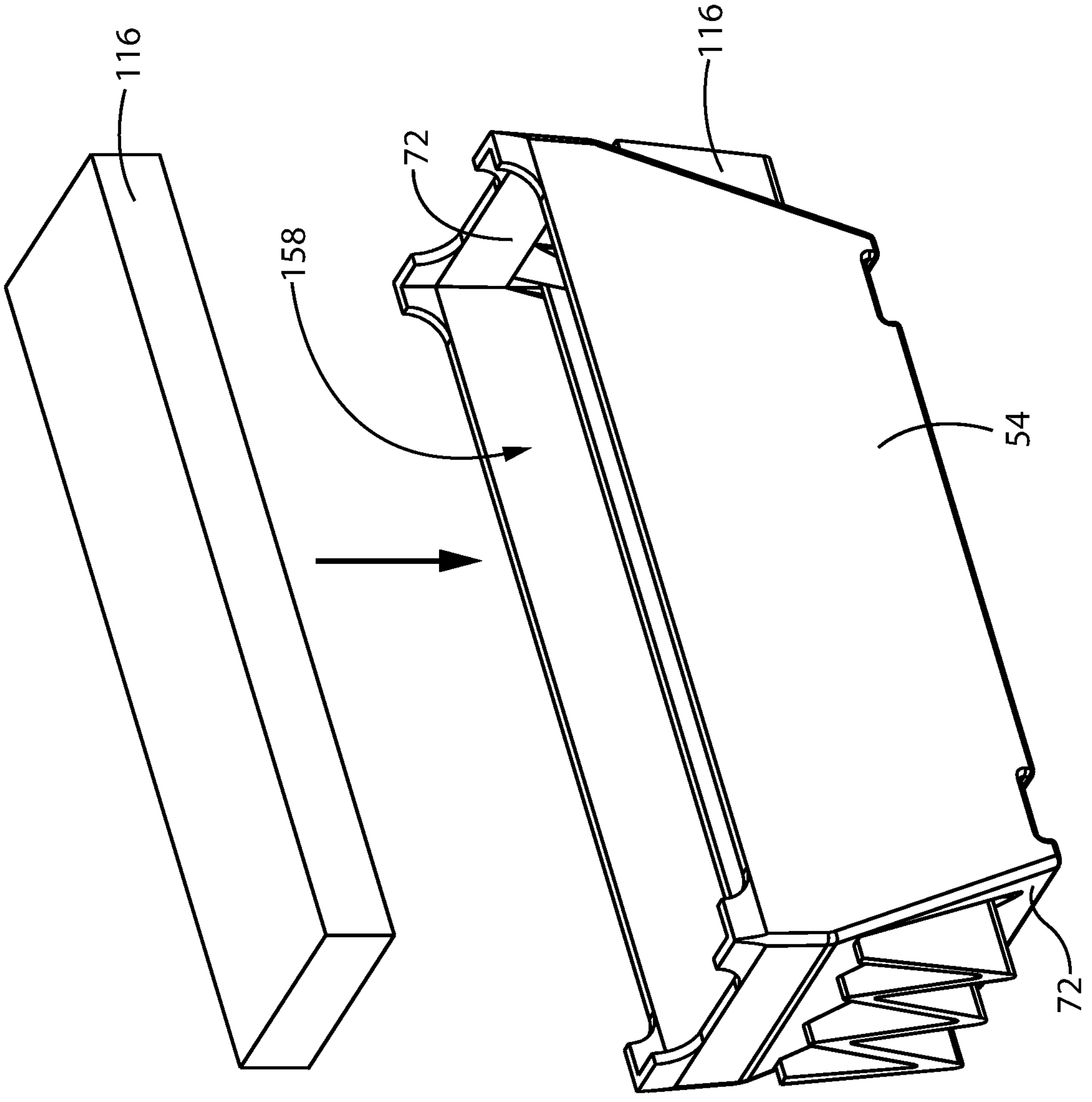
FIG. 47 is a perspective view of a removable filter member being inserted into the top of the filter holder of FIG. 42.
Figure 48:
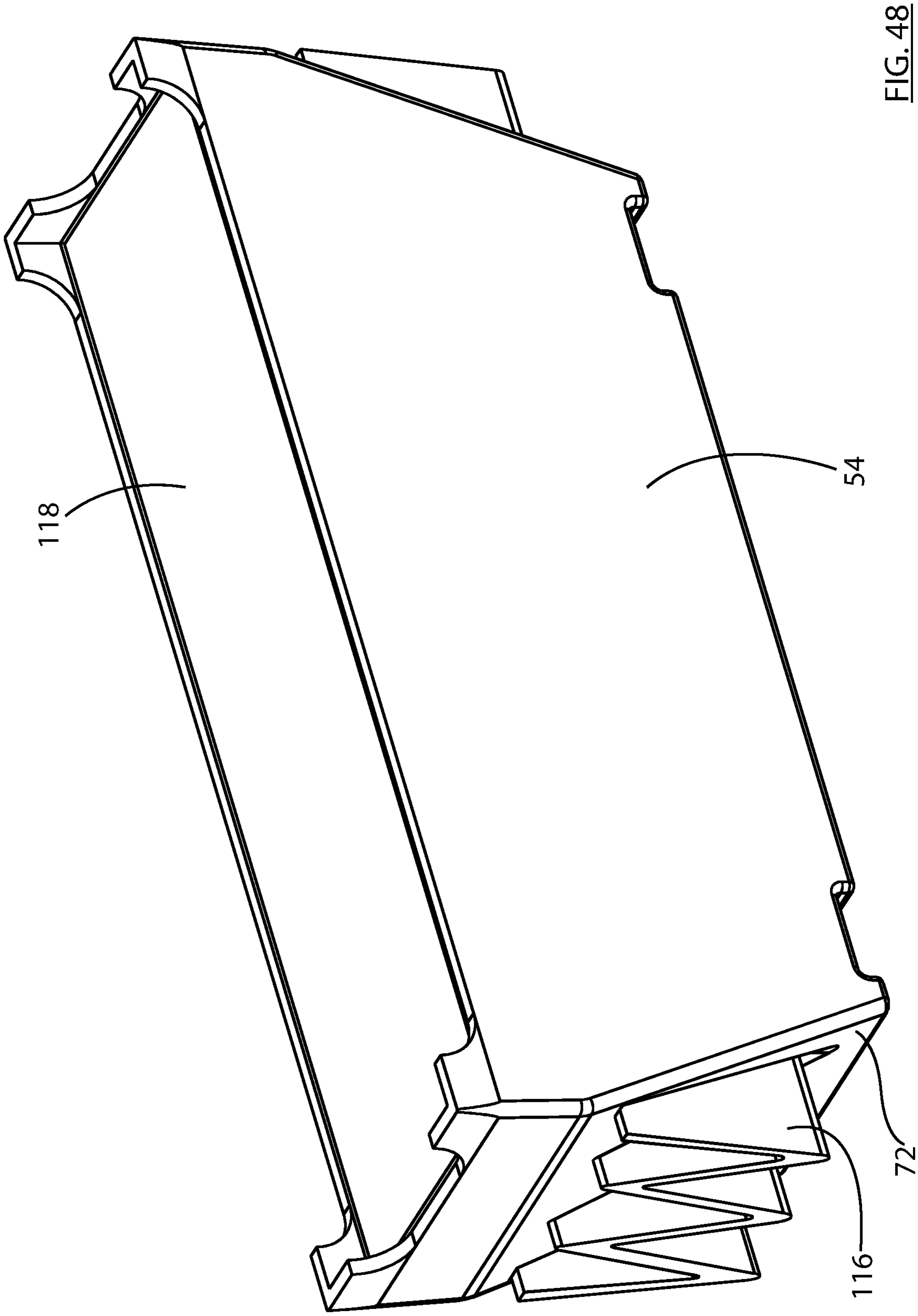
FIG. 48 is a perspective view of the filter holder of FIG. 42 with the removable filter member of FIG. 47 positioned therein.

Subsequent to optionally applying an adhesive interior of cavity 158, as exemplified in FIG. 47 one or more layers of more porous filter media may be placed in filter housing 54 above biological filter material 116 so as to rest above biological filter material 116 (see, e.g., FIG. 48) or below biological filter material 116 (see, e.g., FIG. 83).

Figure 49:
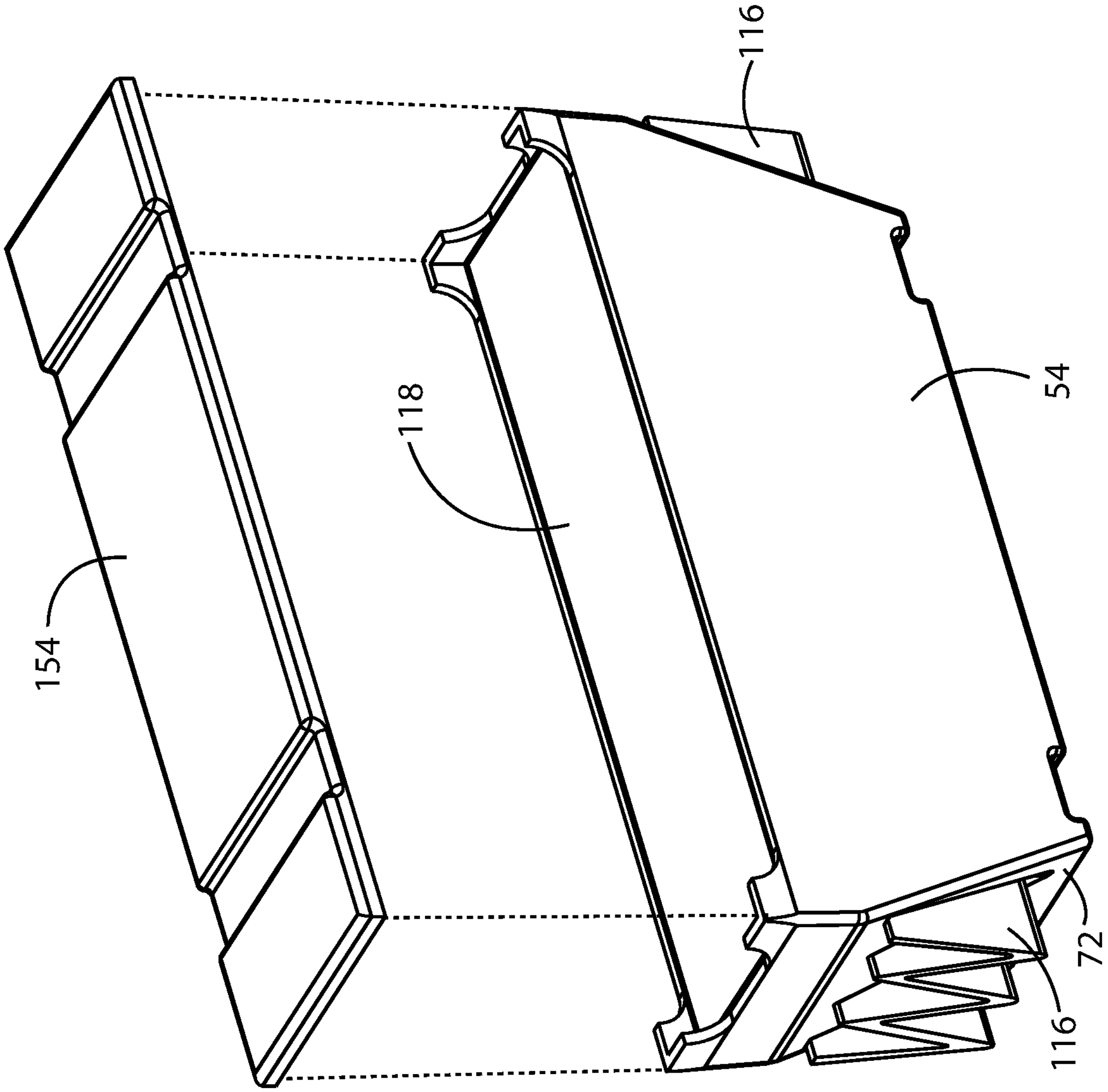
FIG. 49 is a perspective view of a top lid being placed on the top of the filter holder of FIG. 42.
Figure 50:
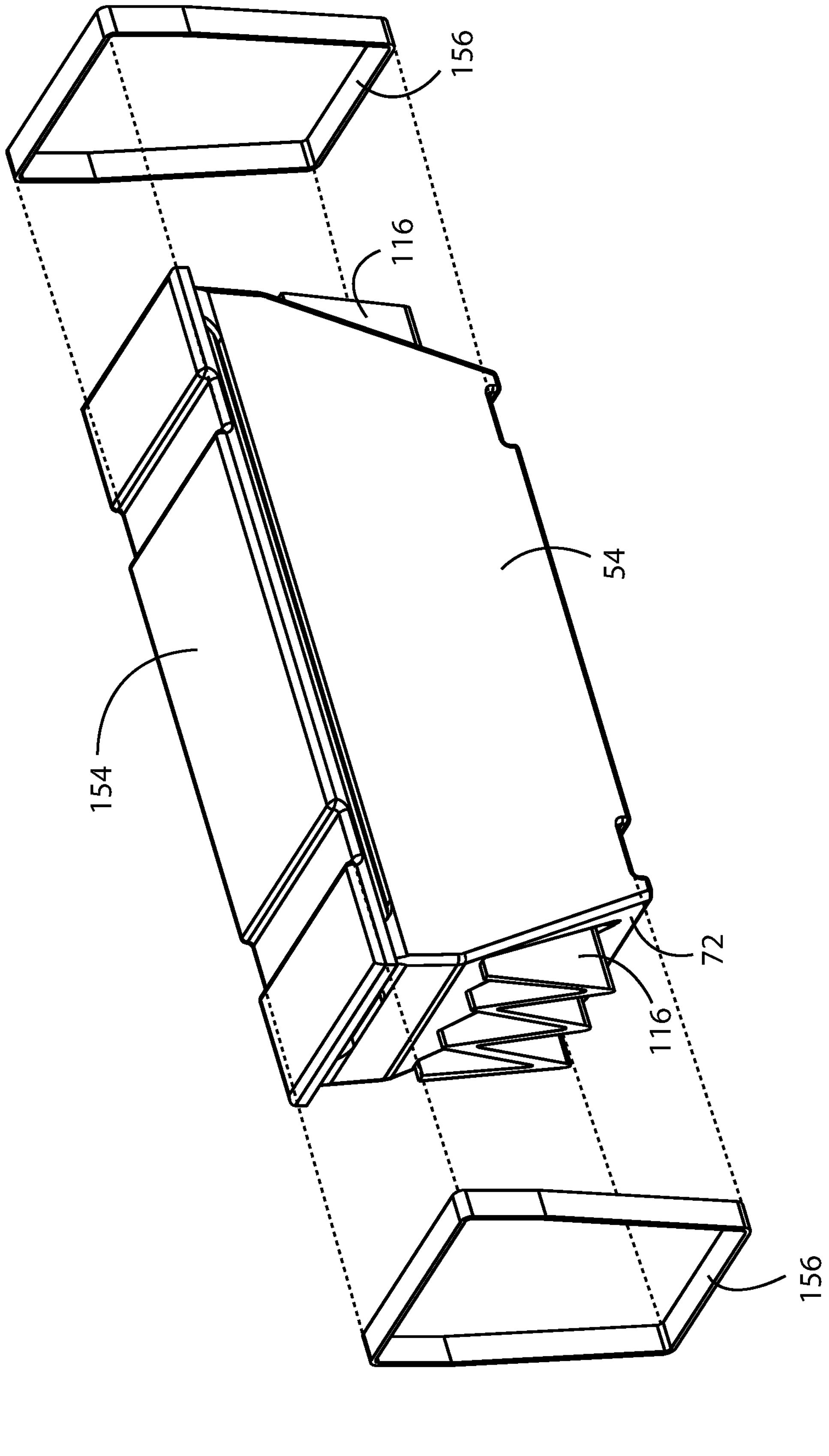
FIG. 50 is an exploded view of two elastic securing members positioned to be placed on the filter holder of FIG. 42 which has the top lid of FIG. 49 placed thereon.
Figure 51:
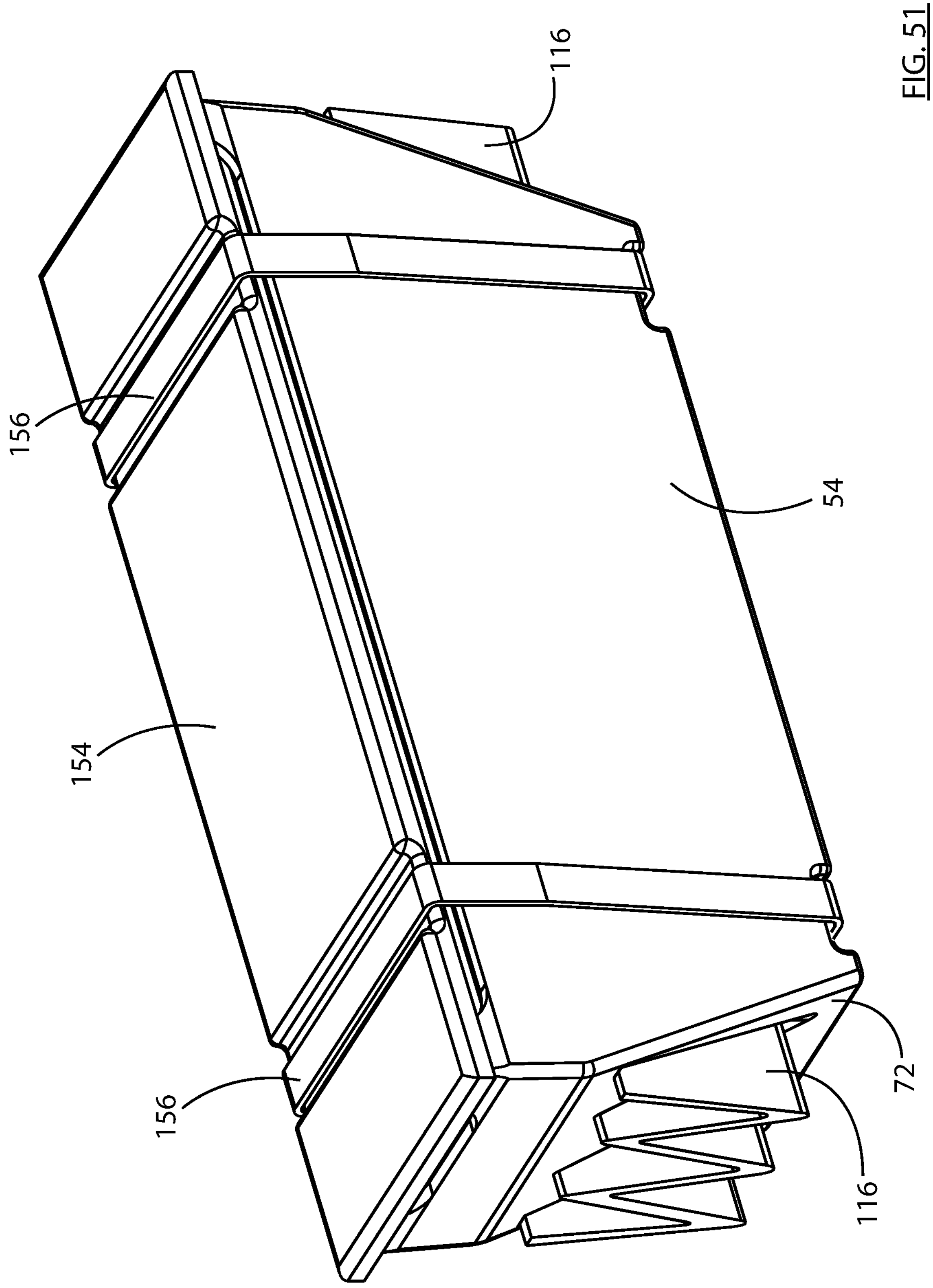
FIG. 51 is a perspective view of the filter assembly of FIG. 50 in a fully assembled configuration.
Figure 52:
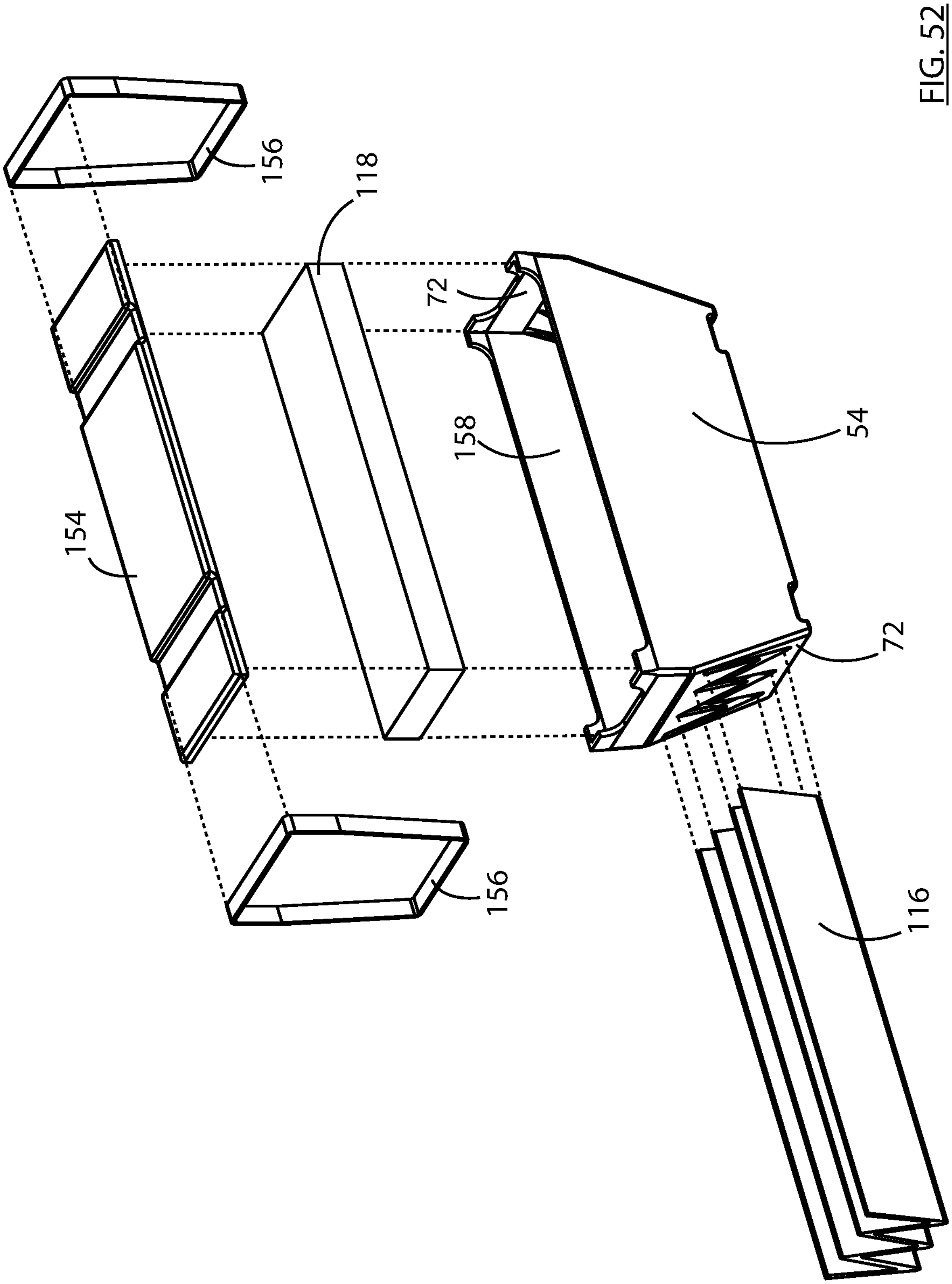
FIG. 52 is a fully exploded view of the filter assembly of FIG. 51
Figure 53:
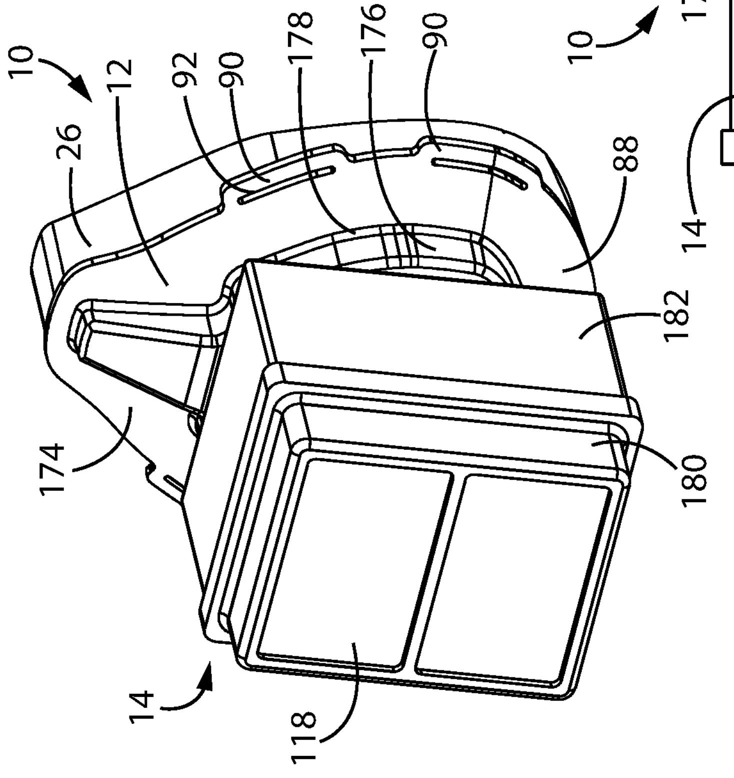
FIG. 53 is a front perspective view of a further alternate embodiment of a filter mask.
Figure 54:
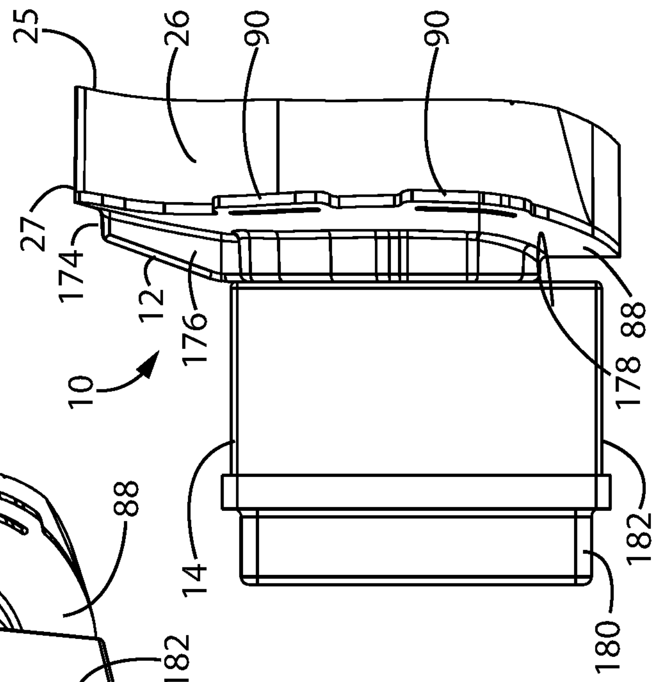
FIG. 54 is a side elevation view of the filter mask of FIG. 53.
Figure 56:
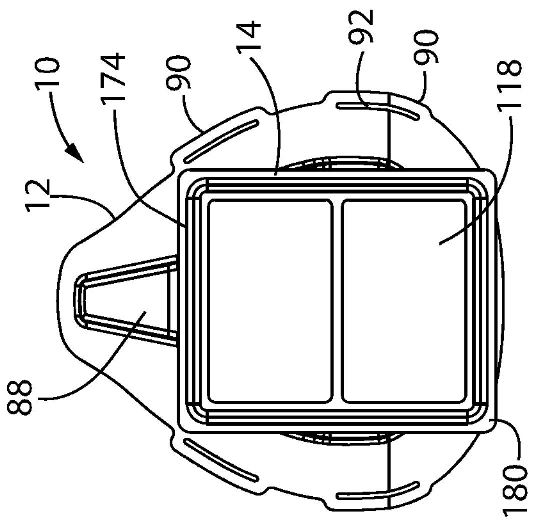
FIG. 56 is a front elevation view of the filter mask of FIG. 53.
Figure 55:
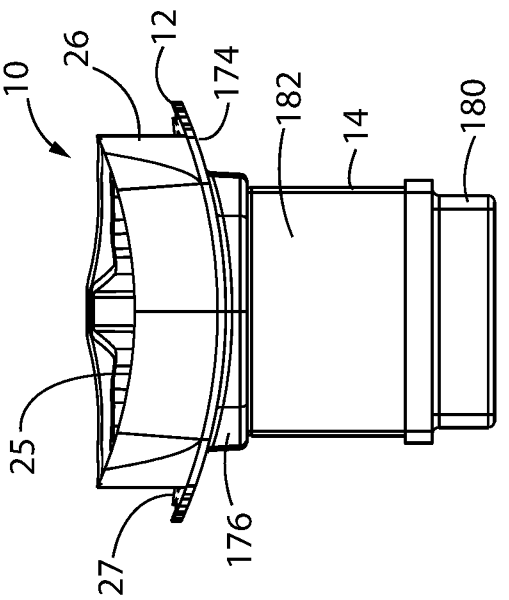
FIG. 55 is a top plan view of the filter mask of FIG. 53.
Figure 57:
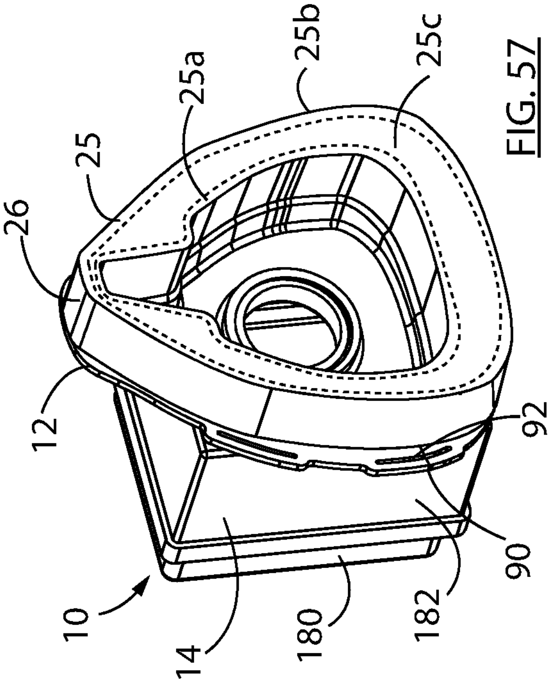
FIG. 57 is a rear perspective view of the filter mask of FIG. 53.
Figure 58:
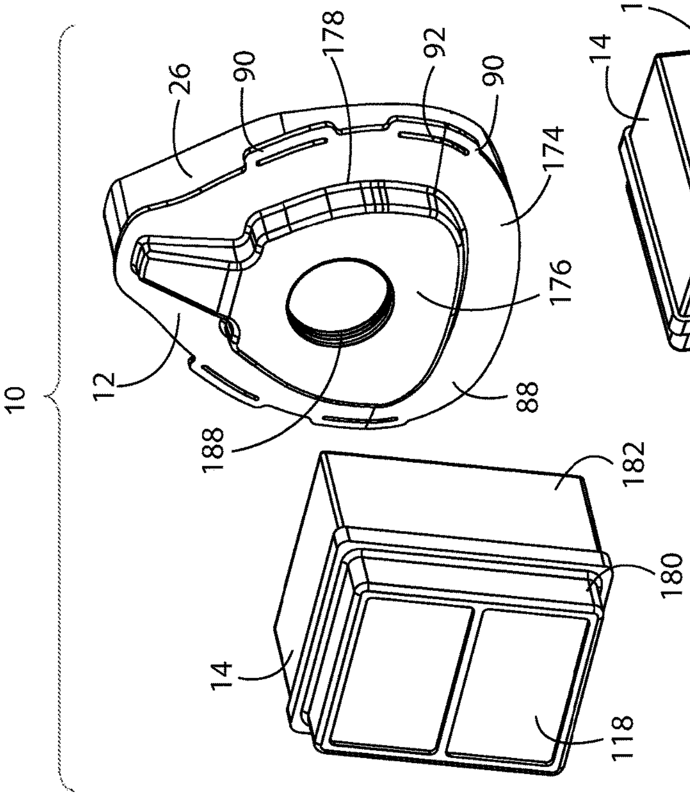
FIG. 58 is a front perspective view of the filter mask of FIG. 53 with the filter assembly removed.
Figure 59:
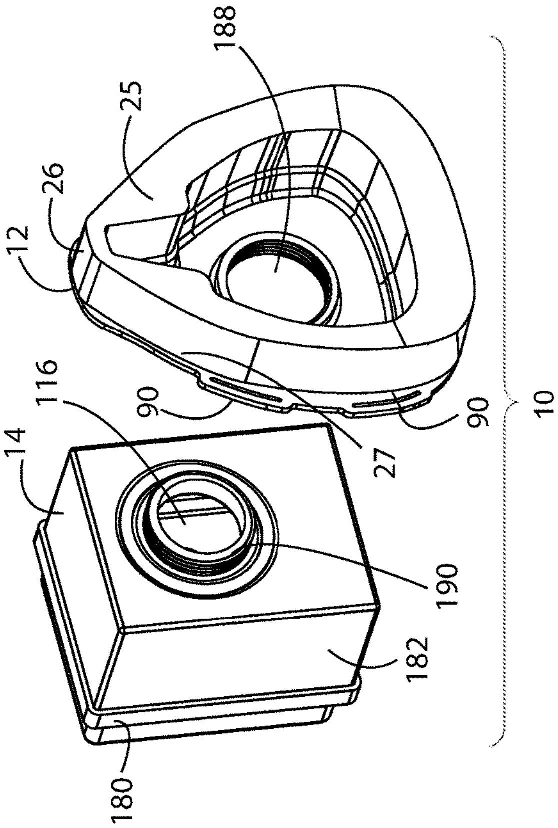
FIG. 59 is a rear perspective view of the filter mask of FIG. 53 with the filter assembly removed
Figure 61:
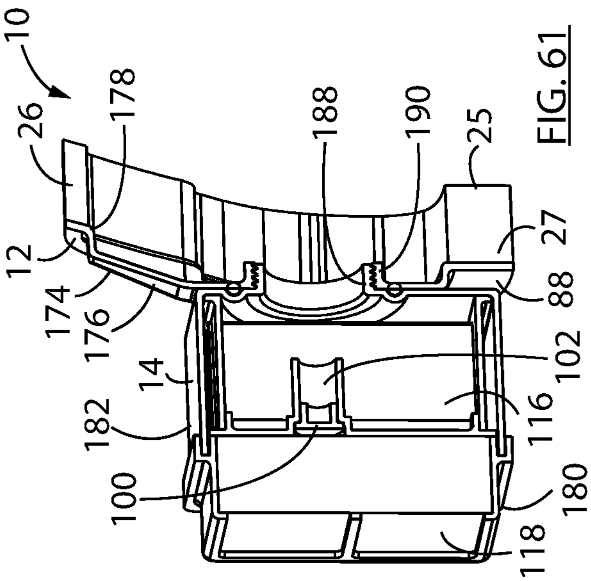
FIG. 61 is a perspective cross-sectional view along the line 61-61 in FIG. 60.
Figure 63:
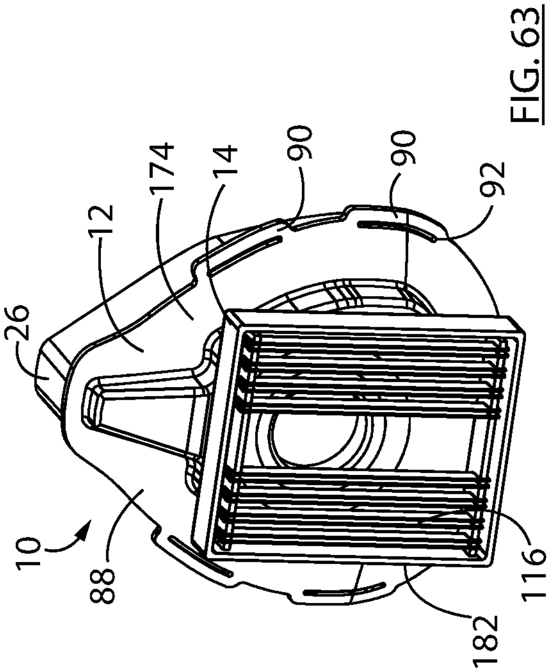
FIG. 63 is a cross-sectional view along the line 63-63 in FIG. 60.
Figure 60:
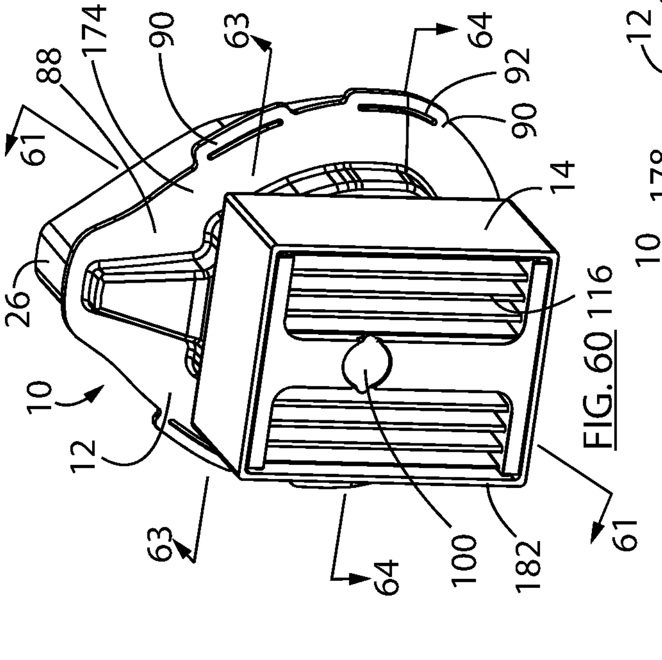
FIG. 60 is a front perspective view of a further alternate embodiment of a filter mask.
Figure 62:
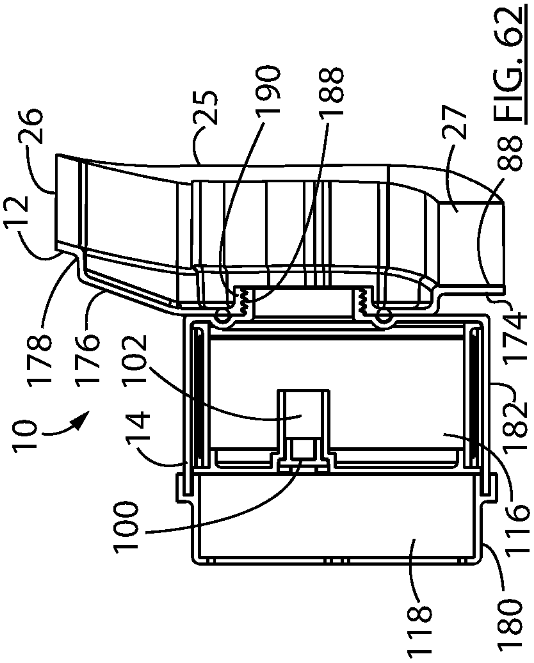
FIG. 62 is an elevation cross-sectional view along the line 61-61 in FIG. 60.

A lid 154 may then be placed on the filter housing 54 (see, e.g., FIG. 49). Lid 154 may be secured in position by any manner, such as a mechanical lock or, as exemplified in FIG. 50, by one or more straps 156. Optionally, straps 156 are stretchable (e.g., elastomeric) so as to enable straps 156 to be expanded and slid into position. Any number of straps 156 may be used.

It will be appreciated that if one or more layers of more porous filter media are positioned below biological filter material 116, that these may also be removable. In such an embodiment, the bottom of filter housing 54 may be openable, optionally in a similar manner to lid 154. Alternately, or in addition, the one or more layers of more porous filter material may form an interference fit with the filter housing 54 such that a lid is not required (see e.g., FIG. 83). In such an embodiment, the more porous filter media 116 may be removed by pulling on the filter 116 such that the friction between the filter 116 and the filter housing 54 is overcome. It will be appreciated that, such as in the embodiment of FIG. 83, a lid may not be provided.

It will be appreciated that the filter material that is secured in position may be any filter material. Further, one or more layers of filter material may be secured in position.

FIGS. 67-71 exemplify an alternate embodiment for securing a filter member 46 in a filter mask 10. As exemplified, in FIG. 69, biological filter material 116 is positioned in openings 160 (see FIG. 67) of two laterally opposed side panels 192. Accordingly, a side panel may be provided on each laterally opposed side of biological filter material 116. Adhesive 162 may then be applied on the outer side of each panel 192 to secure biological filter material 116 in each side panel 192 (see FIG. 68) and form a filter cartridge 194. As discussed previously, applying adhesive 162 on the outer side of side panels 192 enables a quick visual inspection that a full seal has been provide between biological filter material 116 and side panel 192. The assembled filter cartridge may then be slid into a recess in a filter assembly 14 or a filter housing 54. As exemplified in FIGS. 70 and 71, filter assembly 14 comprises a filter body that is formed as part of mask body 12 and has a front cavity 158 in which the assembled filter cartridge 194 is slideably receivable.

FIGS. 72-120 exemplify additional embodiments wherein, the filter cartridge 194 may include one or more filters, which may be removably receivable in the filter assembly 14 of the filter mask 10 by itself or as part of a filter housing 54. As exemplified in, FIGS. 72-100, the filter cartridge 194 includes a foam filter 118 and a biological filter 116. As exemplified in FIGS. 101-120, the filter cartridge 194 includes a biological filter 116 and the filter cartridge 194 is receivable in the filter housing 54.

As illustrated in FIGS. 77-120, the filter cartridge 194 may be removed from the filter assembly 14. It will be appreciated that the filter cartridge 194 may be removable when the filter mask 10 is secured in place on the user's face, or when the filter mask 10 has been removed from the user's face. An advantage of the cartridge 194 being removable while the filter mask 10 is secured to the user's face is that the user does not need to expose themselves to the atmosphere to change the filter cartridge 194. Reducing exposure to the user's environment may improve the safety of the user when the user is in a high-risk environment. The cartridge 194 may be easily removed and replaced with a new cartridge 194 without ever requiring the user to expose themselves to their environment. Alternately, or in addition, foam filter 118 may be removed while the biological filter 116 remains in place and optionally the filter cartridge remains in place is the filter assembly.

It will be appreciated that the filter cartridge 194 may be secured to the filter assembly 14 by any means known in the art, including, but not limited to, magnets, suction, mechanical fasteners, mechanical locks, friction fits, etc.

As exemplified in FIGS. 72-100, and more clearly shown in FIG. 83, the filter cartridge 194 may include a mechanical locking mechanism. The locking mechanism may include first and second engagement members which mate to secure the filter cartridge 194 in position. For example, as exemplified, the filter cartridge 194 has a protrusion 196 that is removably receivable in a corresponding recess 198 on the filter assembly 14. The filter assembly 14 may include a ramp and/or guide 200 for guiding the filter cartridge 194 into the filter assembly 14. During installation, the filter cartridge 194 may be slid into the filter assembly 14, sliding the protrusion 196 along the guide 200 and into the recess 198. In some embodiments, the filter assembly 14 may be openable. For example, as exemplified in FIGS. 72-100, the portion of the filter assembly 14 that contains the recess 198 may be flexible to allow the cartridge 194 to be more easily inserted into and/or removed from the filter assembly 14. In some embodiments, the filter assembly 14 may include pivot 202, as exemplified in FIGS. 72-100. The pivot 202 may be biased to the closed position of the portion of the filter assembly 14 that contains the recess 198, such that during use, when the filter cartridge 194 is inserted into the filter assembly 14, the pivot 202 allows the filter assembly 14 to more easily accept the cartridge 194, while also ensuring that the cartridge 194 is secured in place once it has been fully inserted.

It will be appreciated that the filter assembly 14 may be formed of a flexible material that inherently provides a bias to close the filter assembly 14 once the filter cartridge 194 has been inserted, while also allowing for the cartridge 194 to be easily removed. Alternately, or in addition, the filter assembly 14 may include a biasing member (e.g., a spring) to bias the filter assembly 14 in the closed position. Accordingly, pivot 202 may move to the closed position due to the resilience of the material it is made of and/or due to a biasing member. In other words, the pivot 202 may allow the filter assembly 14 to be moved between an open, or removable, position in which the filter cartridge 194 may be removed from the cavity 158 and a closed position in which the filter cartridge 194 may be secured in the cavity 158.

In some embodiments, the filter cartridge 194 may include a handle 204 to assist with the removal of the cartridge 194 from the filter assembly 14. For example, as exemplified in FIG. 78, the handle 204 may be used to pull the cartridge 194 from the filter assembly 14. Alternately, or in addition, the filter cartridge 194 may include a grip 205 for assisting with the removal and/or replacement of the filter cartridge 194. For example, as exemplified in FIG. 78, the filter cartridge 194 has a grip 205 on either side. The grip 205 may assist a user by providing a graspable surface to more easily remove the filter cartridge 194. As exemplified in FIGS. 77 and 78, the grips 205 are formed of a portion of the two opposed sides of the filter cartridge 194 and are visible to the user when the cartridge 194 is positioned within the filter assembly 14 due to recesses provided in the sidewalls of the filter assembly 14.

It will be appreciated that, in some embodiments, one or more filters in the filter cartridge 194 may be independently, concurrently, and/or subsequently removable from the filter assembly 14. For example, in some embodiments, the foam filter 118 may be removable from the filter cartridge 194 while the biological filter 116 remains in place, as exemplified in FIG. 81. Once the foam filter 118 has been removed, the biological filter 116 may subsequently be removed. In some embodiments, both the foam filter 118 and the biological filter 116 may be concurrently removable.

In some embodiments, the filter assembly 14 may include a filter seal 206, as exemplified in FIGS. 72-100. The filter seal 206 may be positioned between the filter assembly 14 and the filter cartridge 194, thereby reducing the likelihood of airflow leakage through the filter assembly 14.

In some embodiments, the side panels 192 of the filter cartridge 194 may be shaped to improve the connection between to the filter cartridge 194 and the filter seal 206. As exemplified in FIG. 83, the side panels 192 each have a pointed, or V-shaped, top portion 195. The pointed top portions 195 improve the connection between the filter cartridge 194 and the filter seal 206 by applying a pressure to the filter seal 206 such that a portion of the filter seal 206 is slightly displaced by the top portions 195. It will be appreciated that the top portions 195 may be any shape that improves the seal of the filter cartridge 194 in the filter assembly 14. Such a seal may also be used, e.g., in the embodiment of FIG. 49 between lid 154 and filter housing 54.

In some embodiments, as exemplified in FIGS. 72-120, the filter assembly or an outer surface of the filter assembly (e.g., a front cover 232) may be formed of a single piece. Forming the filter assembly of a single piece may reduce the likelihood of airflow leakage in the filter assembly 14 and may generally improve the cleanliness of the filter mask 10. For example, forming the filter assembly of a single piece allows for the reduction of the number of seams in the filter assembly 14. Reducing the number of seams may make the filter assembly 14 easier to clean and may reduce the accumulation of dirt on the filter mask 10. A reduction in the number of seams may also reduce the likelihood of rain or other liquids entering the filter mask 10. In some embodiments, the filter assembly 14 may be formed of a smooth material. Reducing the roughness of the materials used in the filter assembly 14 may reduce the likelihood of contaminates attaching to the filter assembly 14. Additionally, the use of smooth materials may make the filter mask 10 easier to clean and/or disinfect.

In some embodiments, the filter assembly and/or the filter housing and/or the filter cartridge 194 may be formed of a translucent or transparent material such that the filter assembly and/or the filter housing and/or the filter cartridge 194 is at least partially see-through. Having the filter assembly and/or the filter housing and/or the filter cartridge 194 at least partially see-through may allow a user to check the status of the filters, without requiring the user to remove the filter(s). Additionally, a transparent filter cartridge 194 allows a user to check that the filters have been sealed properly before they first don the filter mask 10, such as if the biological filter 116 is supported by a holder as discussed with respect to FIGS. 42-45.

In some embodiments, as exemplified in FIGS. 72-100, the filter assembly 14 may include a filter cover 230. The filter cover 230 may protect the filter assembly 14 from dust and liquid, thereby reducing the likelihood of damage to the filter mask 10. It will be appreciated that the filter cover 230 may be any shape and/or size that protects the filter assembly 14. In some embodiments, as exemplified in FIGS. 72-100, the filter cover 230 has a front cover 232 and a rear cover 234. In some embodiments, as exemplified in FIGS. 72-100, the rear cover 234 may be formed of a first rear cover portion **234*a* and a second rear cover portion 234*b*. To form the assembled filter cover 230, the first rear cover portion 234*a* is coupled to the second rear cover portion 234*b* and to the front cover 232. By separating the rear cover 234 into two pieces, the comfort of the filter mask 10 may be improved since the shape of the rear cover 234 may slightly change depending on the size and shape of a user's face. Additionally, forming the rear cover 234 with two pieces may allow for easier assembly and disassembly of the filter mask 10**.

In some embodiments, the front cover 232 is formed of a single piece, reducing the number of seams as described above. It will be appreciated that the filter cover 230 may also be formed of a translucent or transparent material to allow a user to check the status of the filter FIG. 12 exemplifies an alternate method to secure a filter material, such as biological filter material 116, to filter housing 54. As exemplified in FIG. 12, filter housing 54 comprises an outer filter body housing 122 and an inner filter body housing 124. The biological filter media 116 may be positioned at a location at which the outer and inner filter body housings 122, 124 abut and may be sandwiched therebetween. Accordingly, the biological filter media 116 may be secured to an inner face 126 of outer filter body housing 122 and/or the inner face 128 of inner filter body housing 124 (e.g., by an adhesive such as silicon). Inner and outer filter body housings 122, 124 may be secured or removably secured to each other by any means.

It will be appreciated that when filter assembly 14 is removed from mask body 12 that the more porous filter media may be removed from each of the outer and inner filter body housings 122, 124 or an upper or lower side of filter housing 54 that is exemplified in FIGS. 42-52.

Filter Assembly with Ionization

In accordance with this aspect, which may be used by itself or in combination with one or more other aspects, an ionizer may be provided to provide negative ions to the incoming air. One advantage of this design is that, by charging the incoming air, particulate matter may be charged. This may cause the particulate matter to aggregate forming larger particles that are more easily trapped by the filter media (e.g., the more porous washable filter material such as a foam or felt filter). In addition, if an electrostatic precipitator is used, the particles are more likely to be retained by the electrostatic precipitator.

A further advantage is that, by providing negative ions in the air being inhaled, a person may produce increased levels of serotonin, which may relax a patient (increased levels of negative ions are theorized to increase serotonin production in humans).

As exemplified in FIGS. 3 and 4, the air treatment member 46 may comprise or consist of an electrostatic precipitator 50. Any electrostatic precipitator known in the air treatment arts may be used. The electrostatic precipitator 50 may have a tortuous path 52 defined by a plurality of passageways 74. Each passageway may be defined by opposed (e.g., upper and lower) walls 80. Each passageway 74 may have an upper side 76 and a lower side 78. As exemplified in FIG. 3, each of the upper and lower walls 80 defining a passageway 74 comprises or consists of an electrostatic plate. Therefore, as air passes through the tortuous path 52, the electrostatic plates may attract contaminants thereto.

Figure 84:
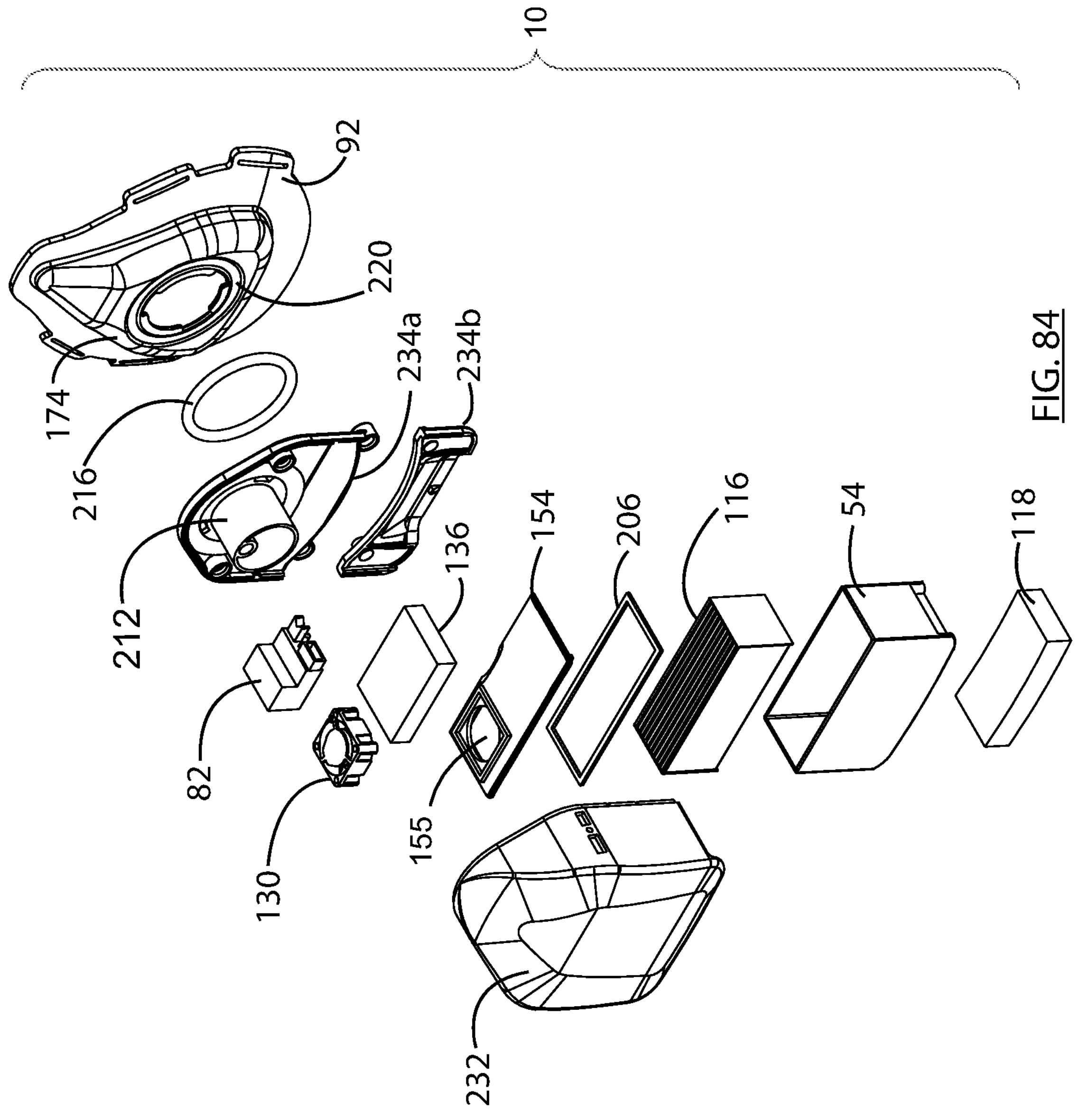
FIG. 84 is a front perspective exploded view of the filter mask of FIG. 72.
Figure 85:
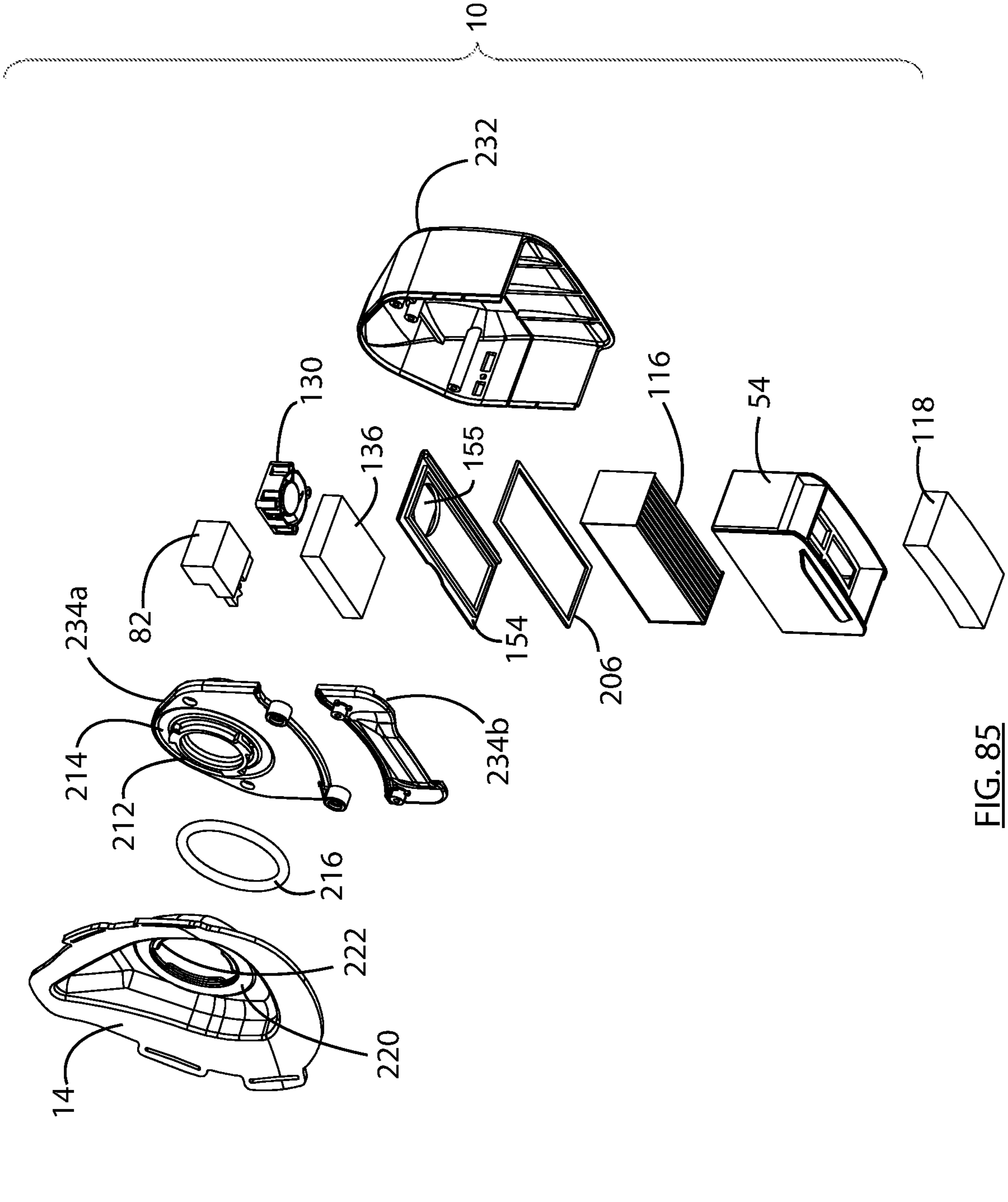
FIG. 85 is a rear perspective exploded view of the filter mask of FIG. 72.
Figure 86:
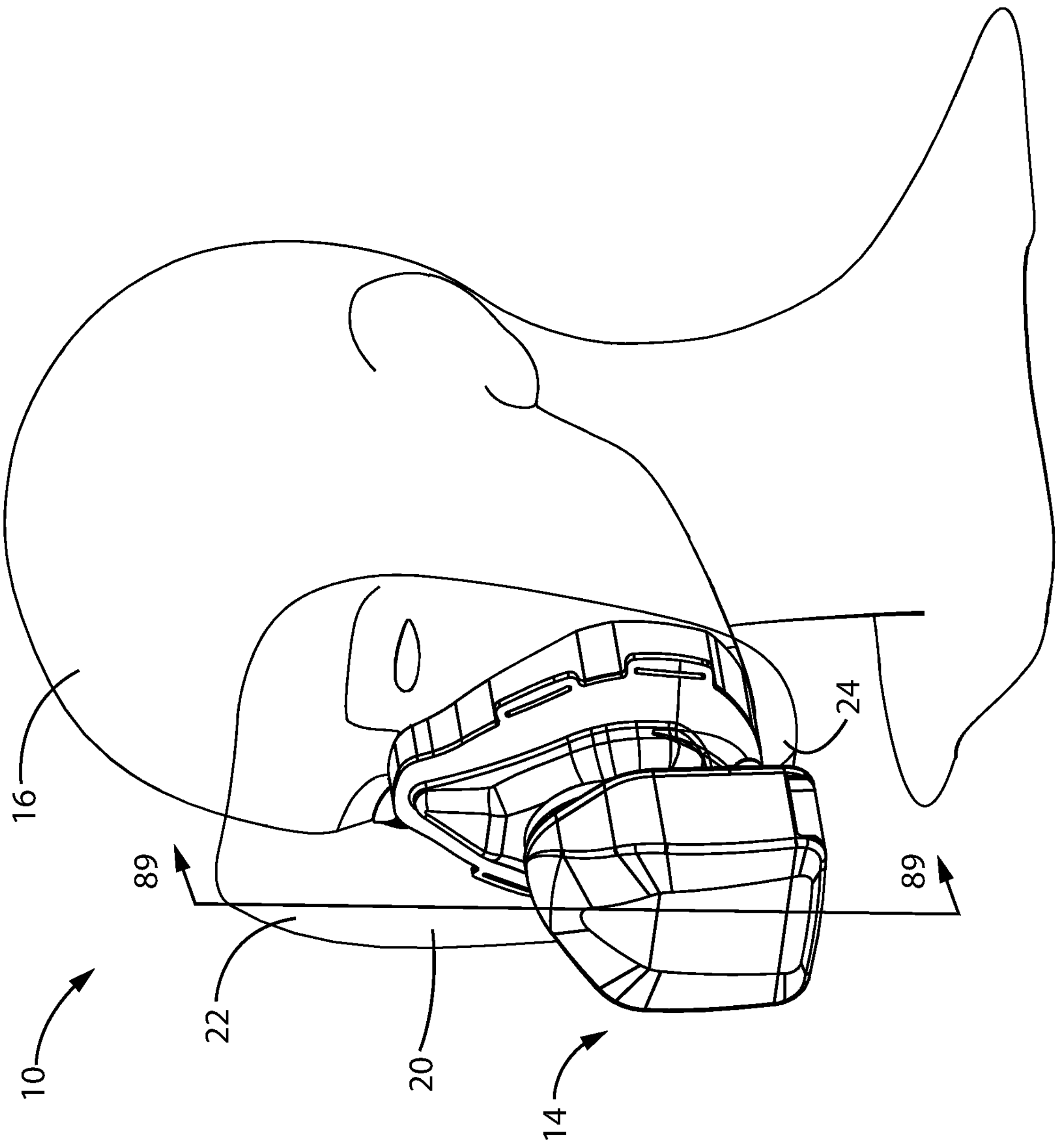
FIG. 86 is a front perspective view of a further alternate embodiment of a filter mask having a face plate offset from the face of a user, wherein the straps for securing the filter mask in position has been omitted.
Figure 87:
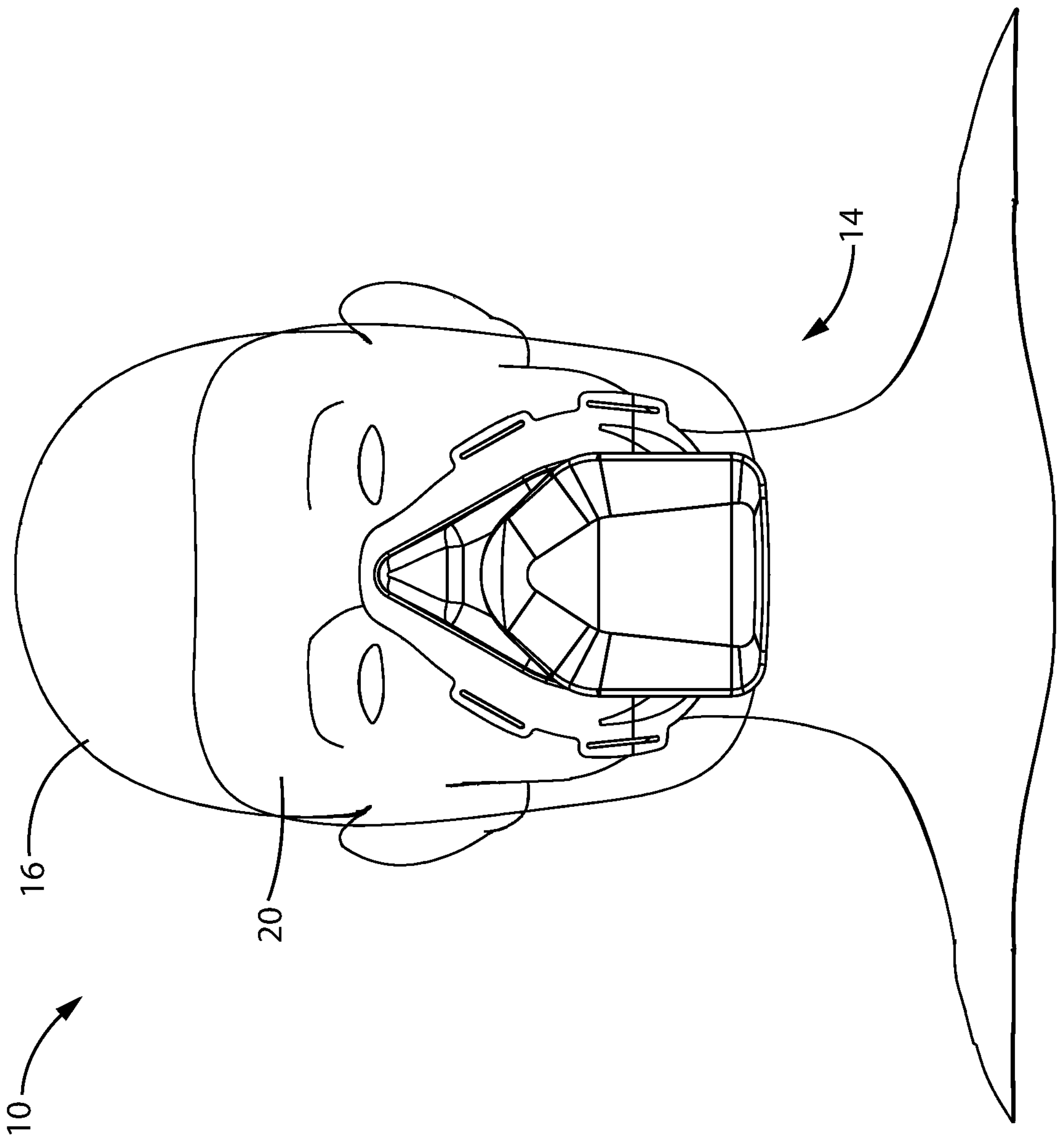
FIG. 87 is a front view of the filter mask of FIG. 86.
Figure 88:
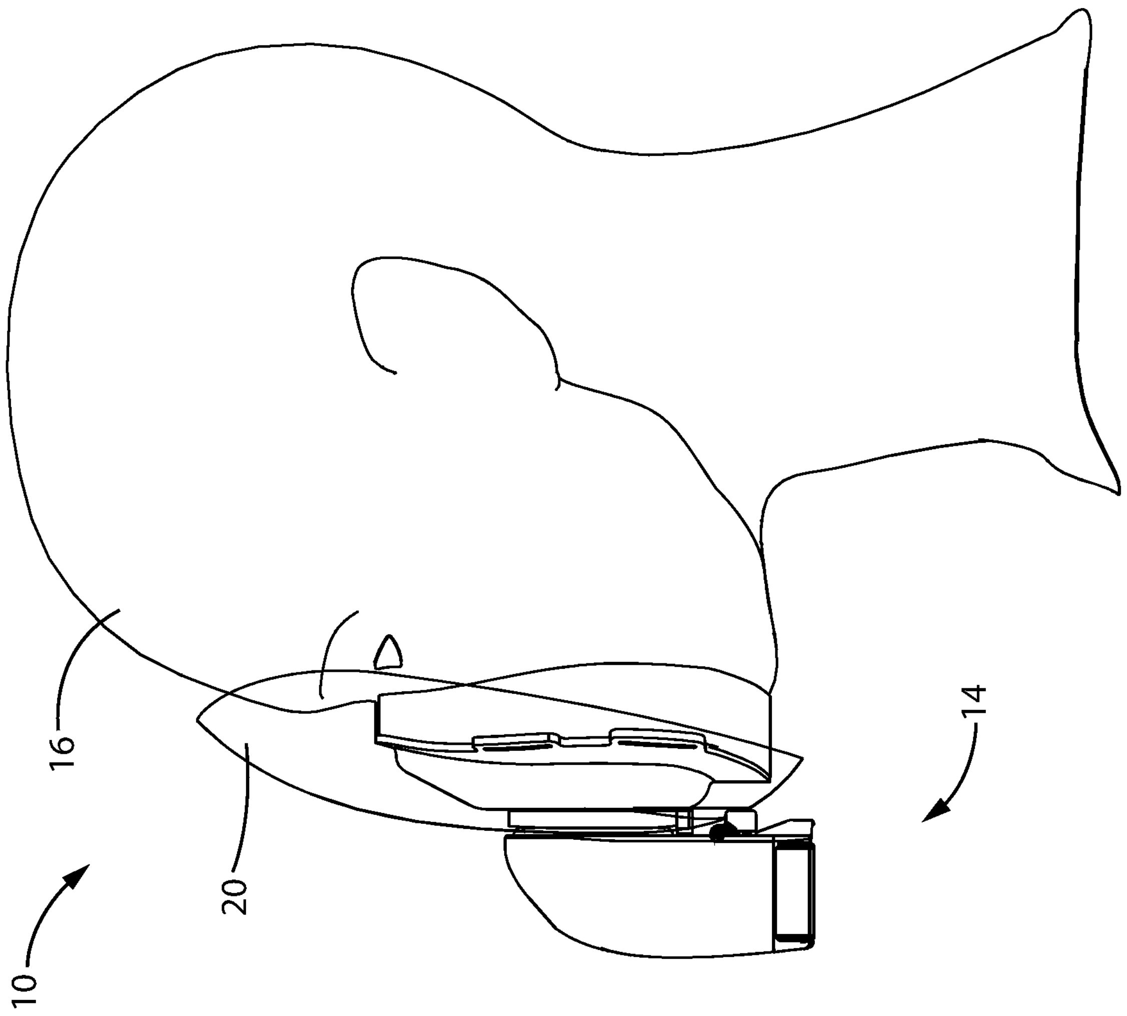
FIG. 88 is a side view of the filter mask of FIG. 86.

As exemplified in FIGS. 3, 4, and 84, one or more ionizing sources 82, e.g., a corona discharge element, may be provided to generate negative ions to thereby ionize contaminants in the air flow passing through the filter housing 54. These may be provided internal to and/or external of the electrostatic precipitator 50, or even if an electrostatic precipitator 50 is not provided. For example, a corona discharge element may be provided in the upper air flow passage 62 and/or in one or more of the passageways 74 of the tortuous path 52. The ionizing source may be powered by 1-10 KV, 2-6 KV or 3-5 KV. Accordingly, the filter mask 10 may be provided by an on board power source, which as one or more batteries or capacitors.

Alternately, as exemplified in FIG. 4, the electrostatic precipitator 50 may have a tortuous path 52 defined by solid non-conductive wall 80 wherein a conductive member, e.g., an electrostatic mesh plate 84 is provided on the upper and or lower surfaces of non-conductive walls 80 so as to define the upper and lower sides 76, 78 of the passageways 74.

The electrostatic plates of FIG. 3 and the electrostatic mesh plates of FIG. 4 may be made from, e.g., aluminum, nickel, stainless steel, copper, copper plated stainless steel, coper plated nickel, copper plated aluminum, brass plated aluminum, brass plated nickel or brass plated stainless steel. The electrostatic mesh plates of FIG. 4 may be woven or non-woven mesh plates.

Different filters operate at different efficiencies for differently sized particles. The removal efficiency of a particular filter, with a particular pore size, may be improved by electrostatically enhancing the filter material. In some embodiments, one or more ionizing sources 82 may be used to enhance the removal efficiency of the filter assembly. For example, one or more filters may be exposed to positive or negative ions, electrostatically charging the filter media. Electrostatically charging the filter media, such as by one or more ionizing sources 82, may result in attractive forces or enhanced attractive forces between the filter and airborne particles, thereby improving the removal efficiency of the filters. In other words, the filters may be electrostatically enhanced to improve the removal of airborne particles that may otherwise have passed through the filters due to the pore size of the filter material.

In some embodiments, electrostatic enhancement of the filter material may be optimized for certain particle sizes, such as biological contaminants. For example, HEPA material used in filters has approximately a 99.9% removal efficiency of particles sized at 0.3 microns. However, HEPA filters have approximately a 99% removal efficiency of particles sized at 0.1 microns. Electrostatically enhancing the HEPA filter material may improve the removal efficiency of 0.1 micron particles from 99% to approximately 99.97%.

It will be appreciated that, in some embodiments, a single filter may be electrostatically enhanced to improve its removal efficiency, while leaving one or more remaining filters uncharged. By selectively charging filters in the filter mask 10, the lifetime of one or more filters may be increased at the expense of the other filters. For example, the foam filter 118 may be electrostatically charged to improve the lifetime of the biological filter 116, or vice versa. An advantage of selectively charging filters in the filter mask 10 is that the lifetime of filter material that is in short supply in times of crises may be prolonged.

Assisted Breathing

In accordance with this aspect, which may be used by itself or in combination with one or more other aspects, one or more fans may be provided to assist in drawing air into or out of the filter mask 10. The fan may have a motor and a propeller to generate air flow through the mask 10. The fan may be provided downstream of the cavity 158 in a direction of flow of air, relative to inhalation by a user. For example, a fan may be provided to assist a person during inhalation. Alternately, or in addition, a fan may be provided to assist a person wearing the mask during exhalation.

Accordingly, in some embodiments, one or more fans 130 may be provided for assistance during inhalation and a different fan or fans 130 may be provided to assist during exhalation. In such cases, separate inhalation and exhalation passages may be provided in the filter assembly 14. The fan may be actuated by a sensor (e.g., a pressure sensor or a flow sensor) provided in the air flow passage having the fan.

Figure 98:
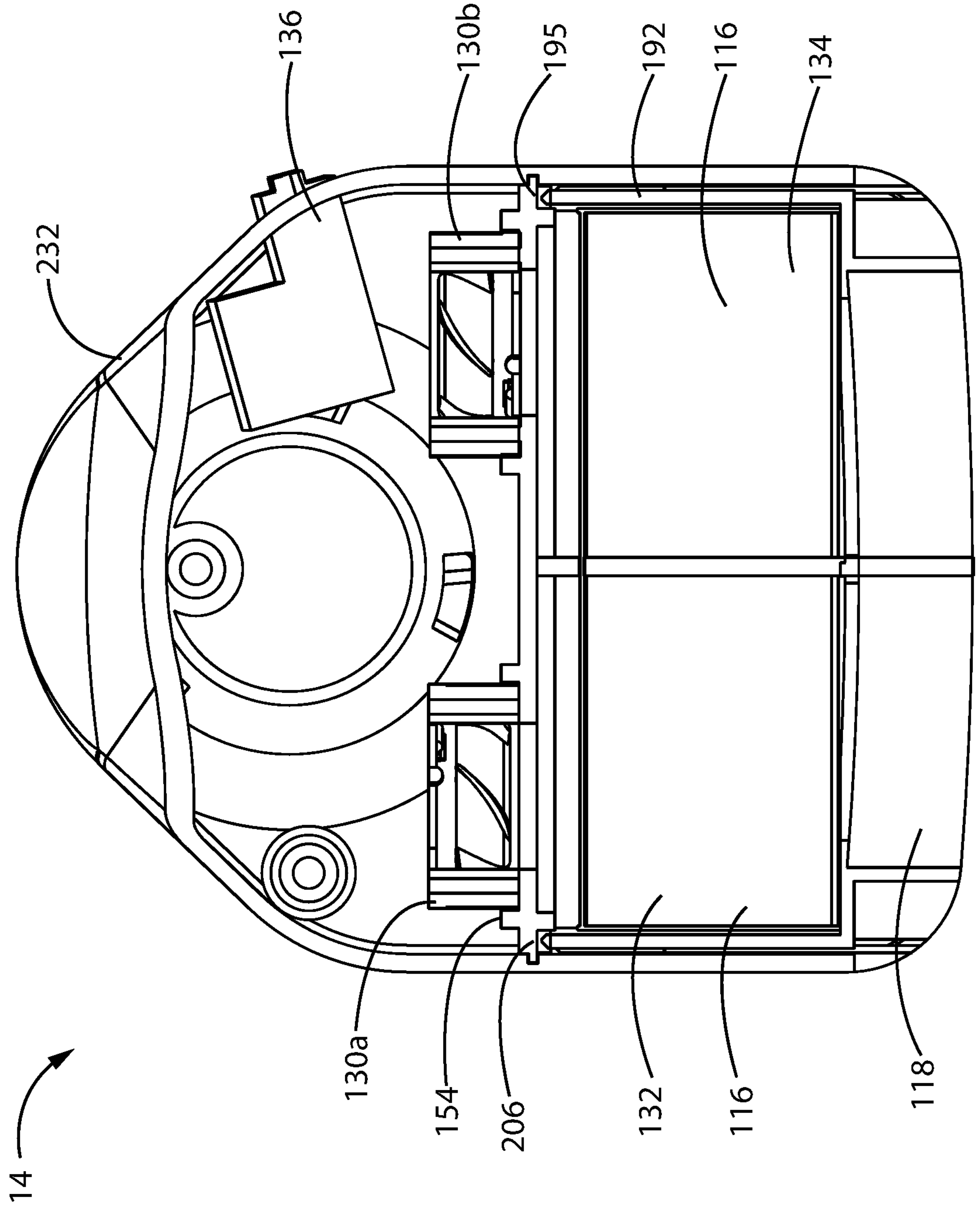
FIG. 98 is a rear cross-sectional view along the line 97-97 in FIG. 97 of a further embodiment of a filter assembly having two fans.
Figure 99:
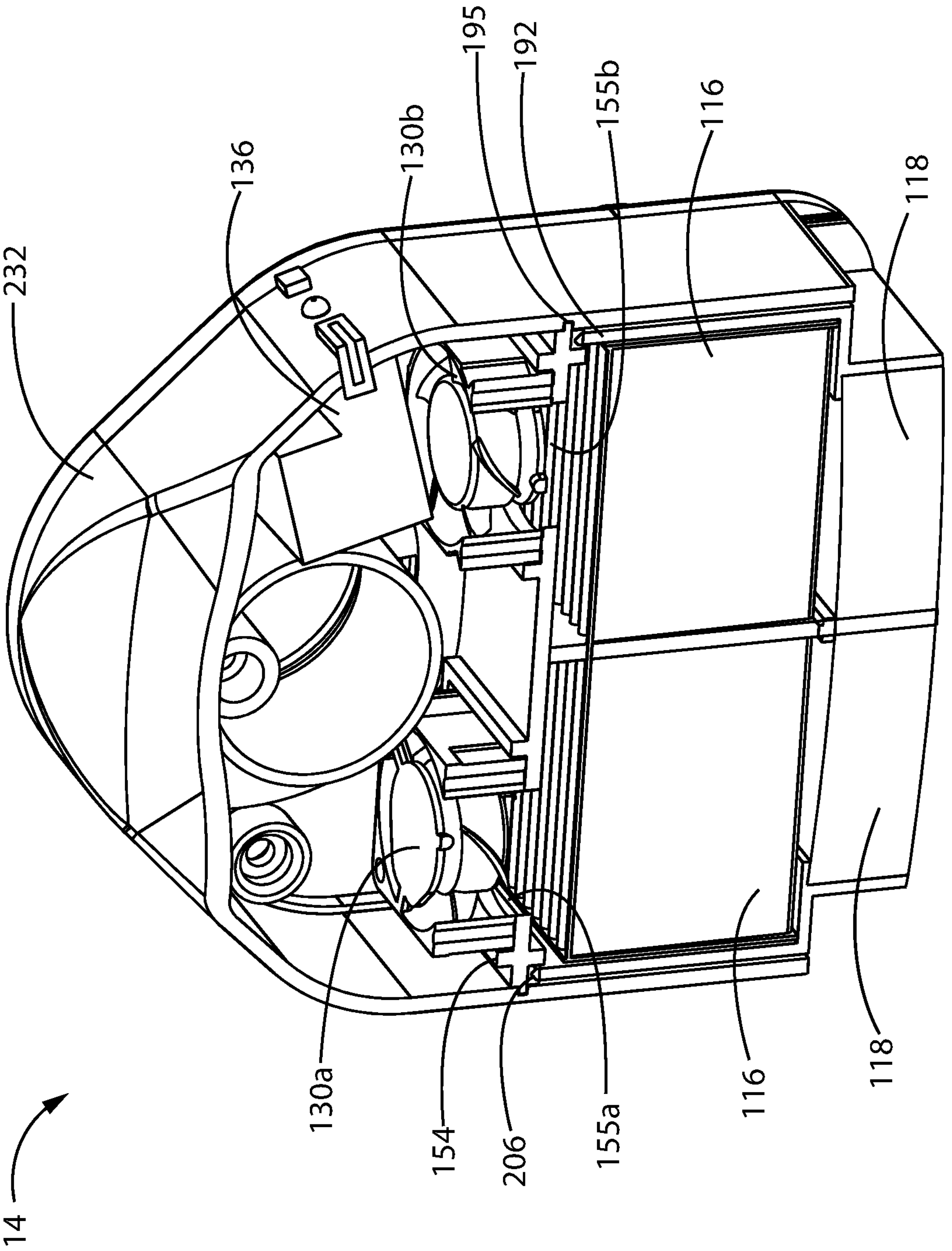
FIG. 99 is a rear perspective cross-sectional view along the line 97-97 in FIG. 97 of the filter assembly of FIG. 98.
Figure 100:
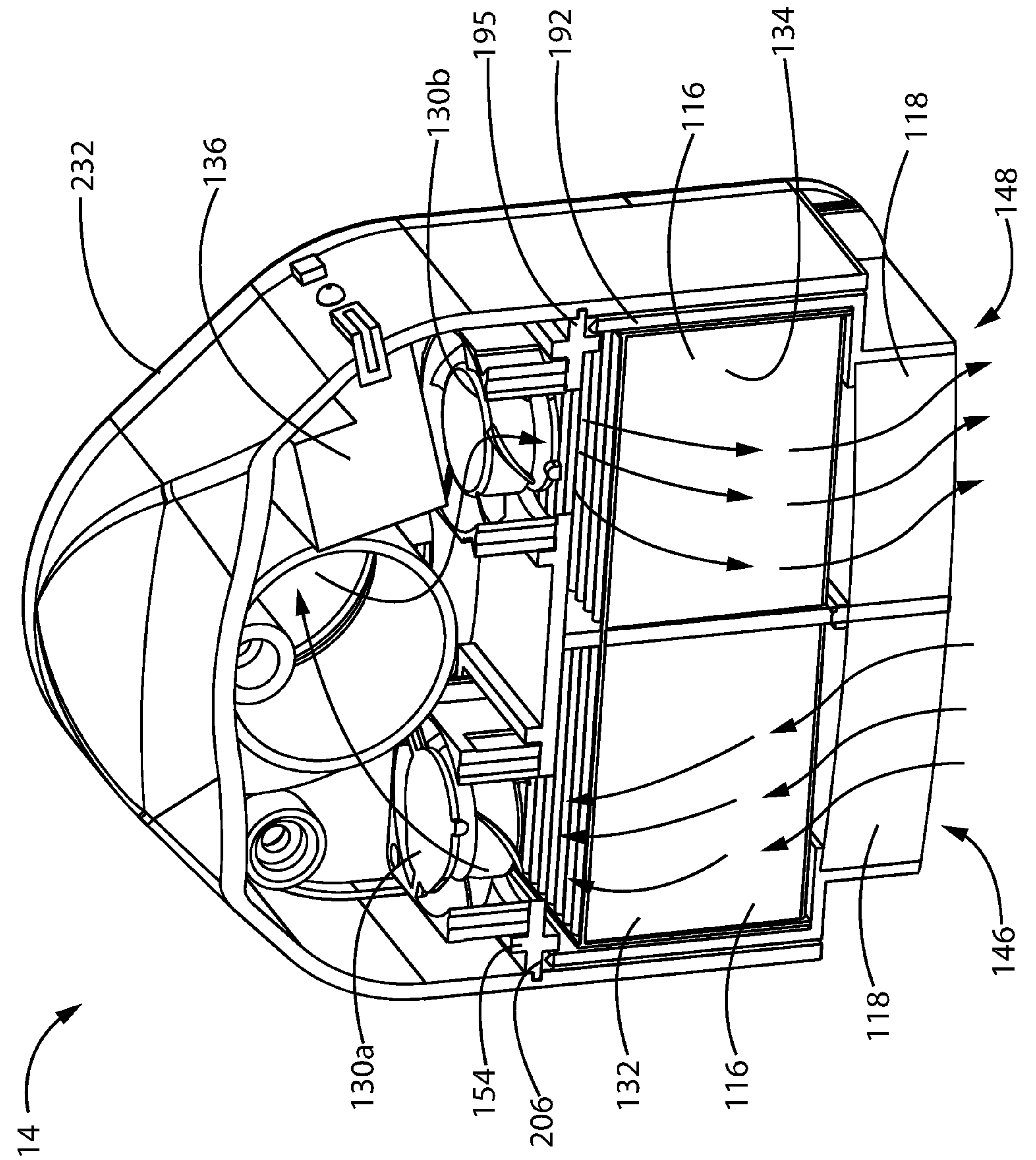
FIG. 100 is a rear perspective cross-sectional view along the line 97-97 in FIG. 97 of the filter assembly of FIG. 98 with airflow illustrations.
Figure 101:
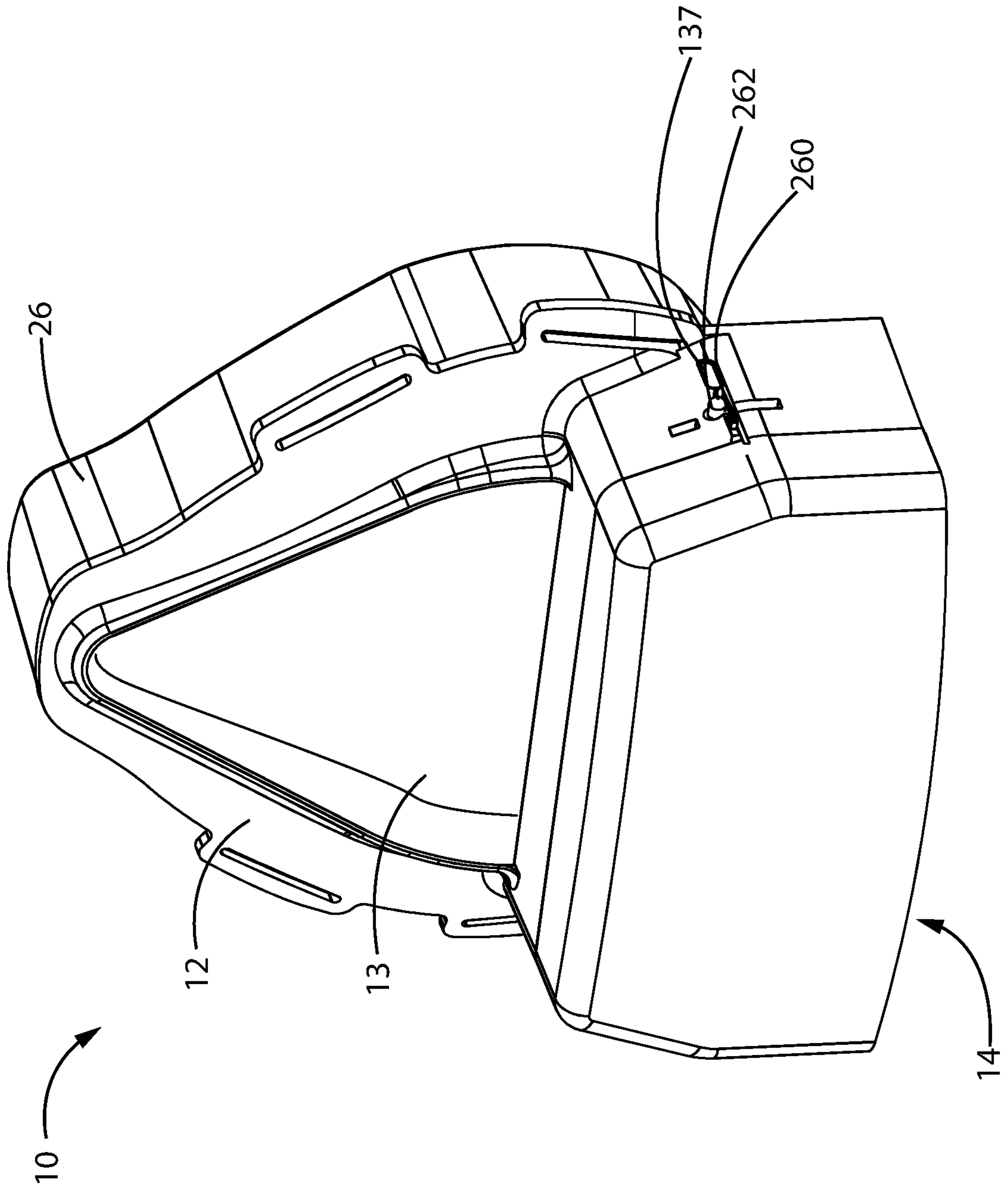
FIG. 101 is a front perspective view of a further alternate embodiment of a filter mask having a mask body with a transparent portion.
Figure 102:
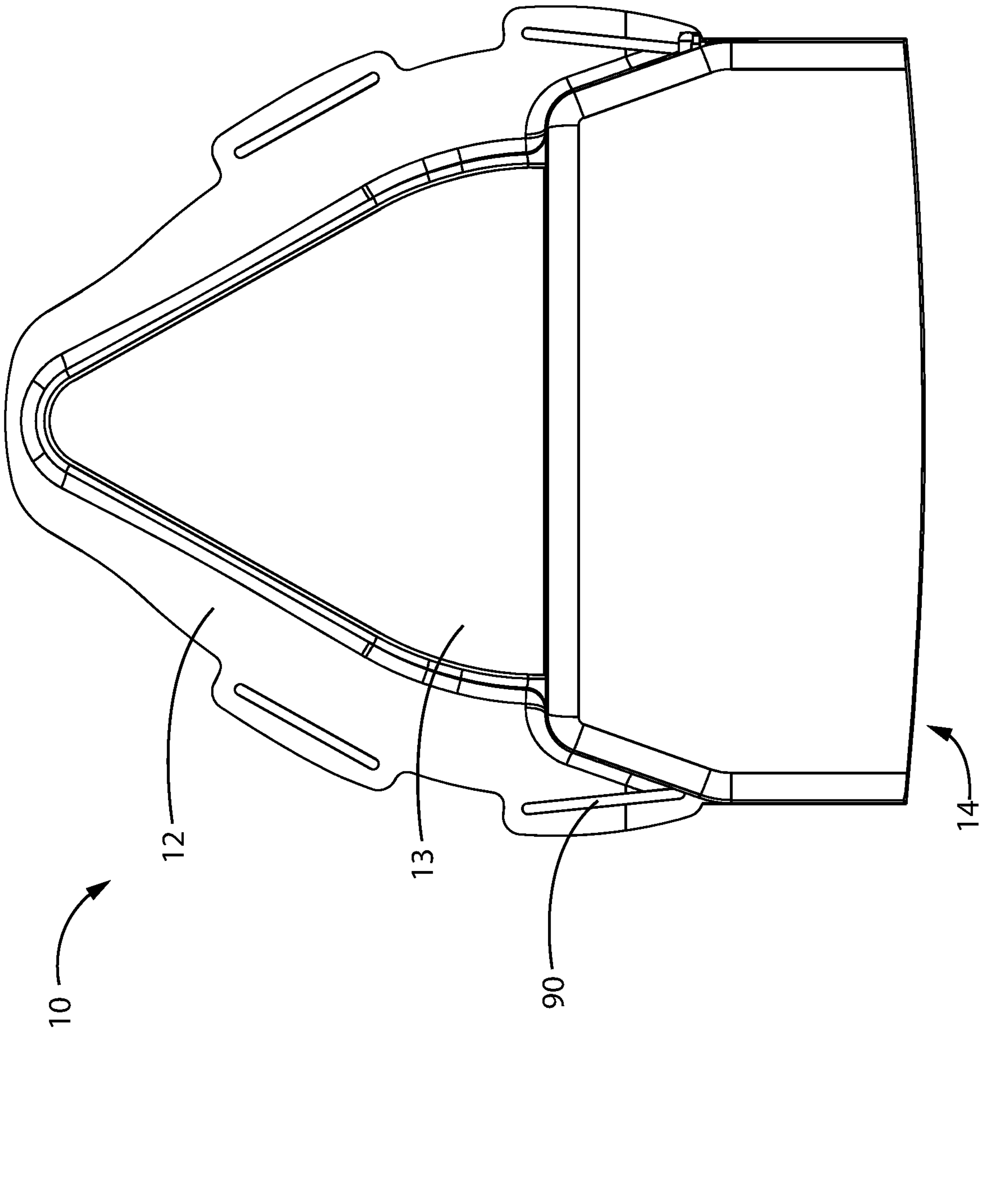
FIG. 102 is a front view of the filter mask of FIG. 101.
Figure 103:
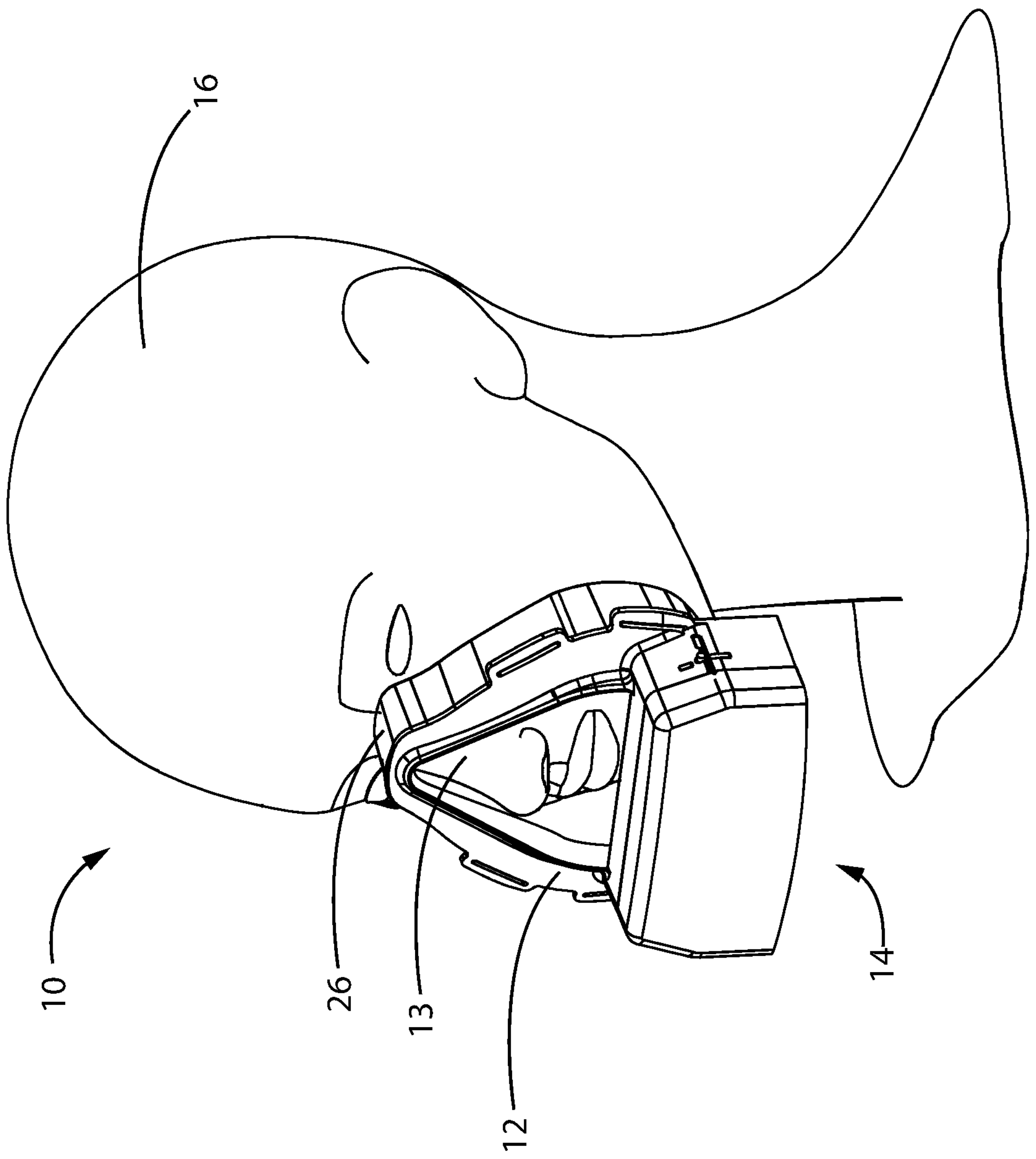
FIG. 103 is a front perspective view of the filter mask of FIG. 101 when worn by a user.
Figure 104:
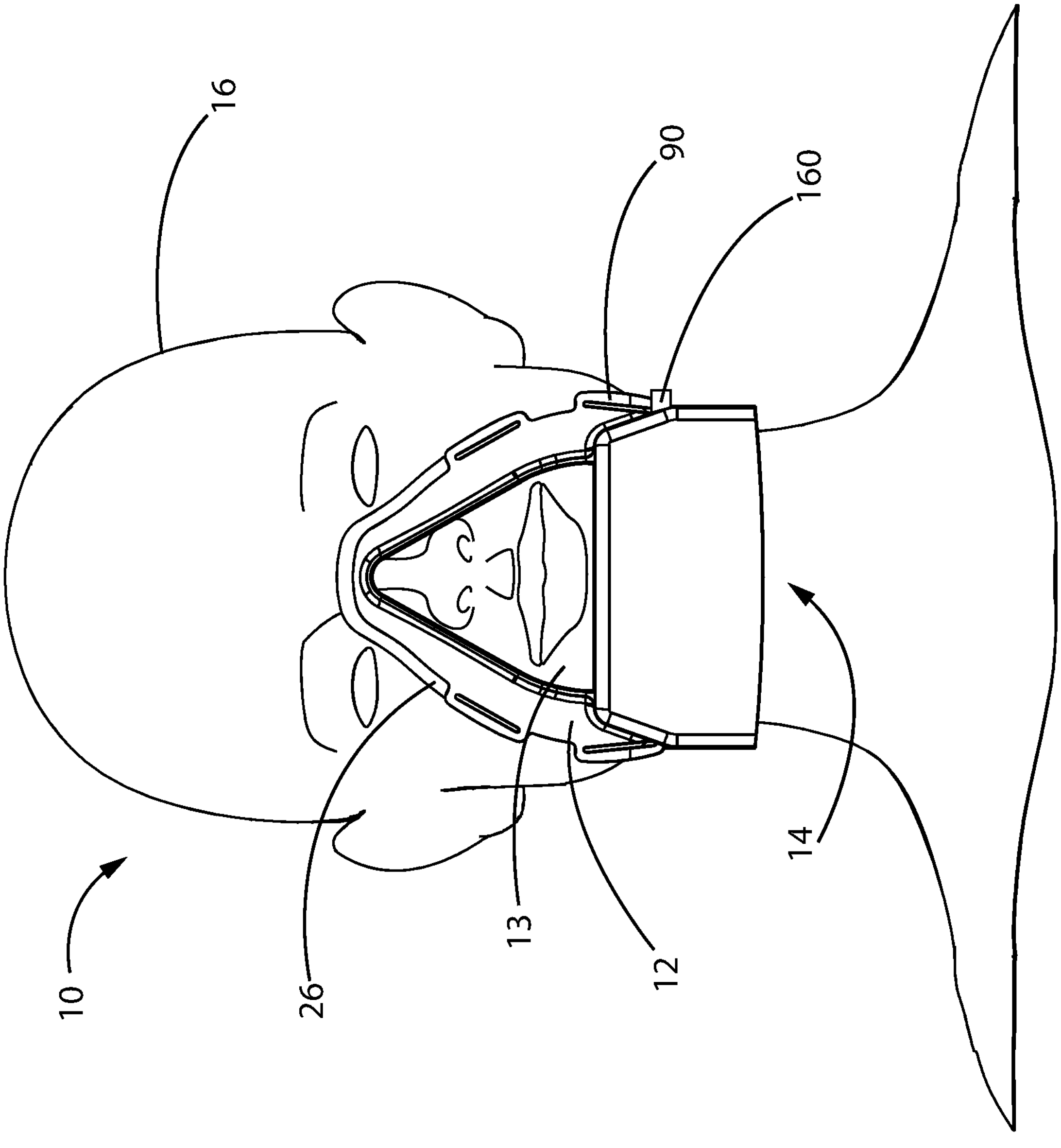
FIG. 104 is a front view of the filter mask of FIG. 101 when worn by a user.
Figure 105:
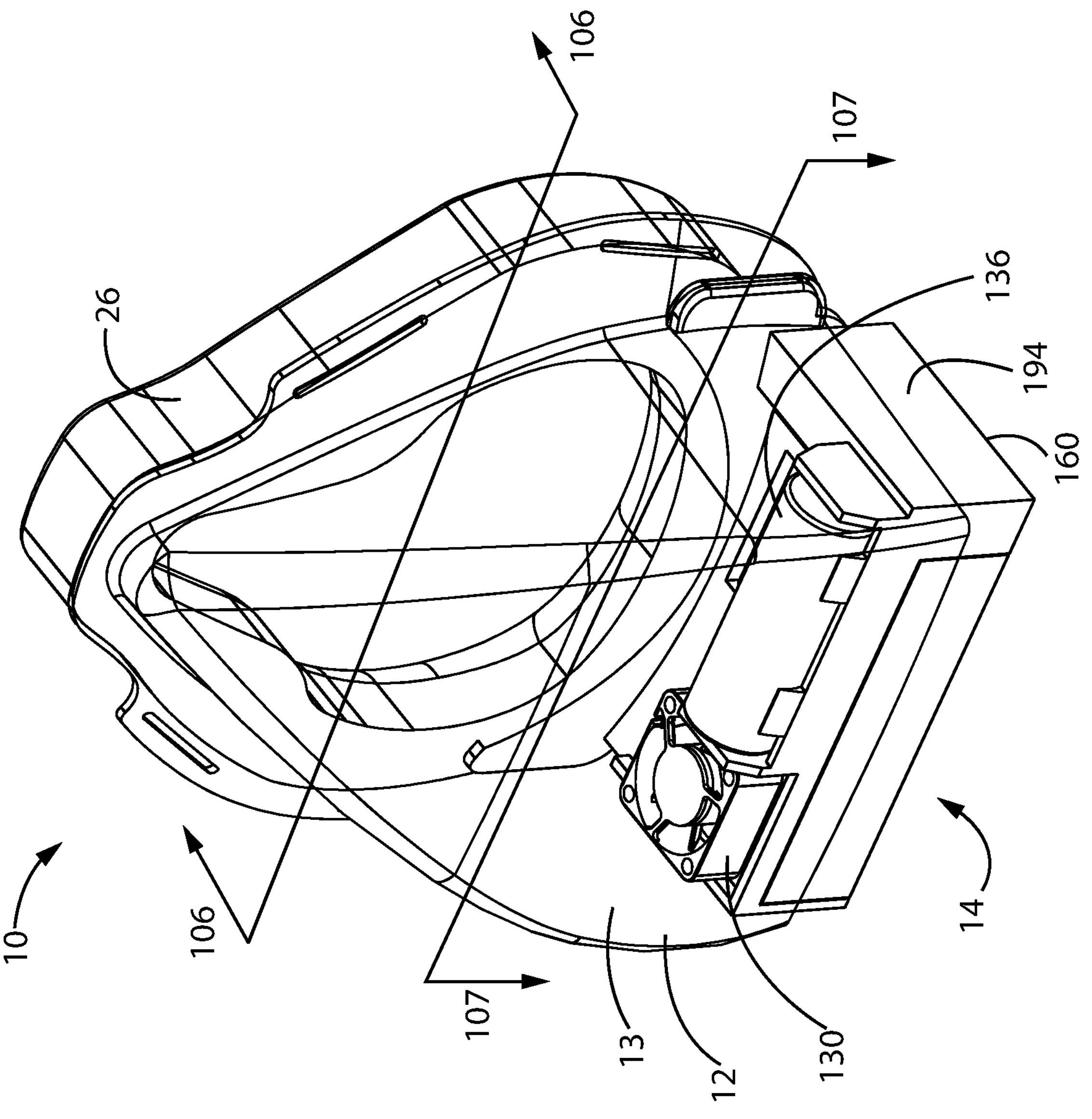
FIG. 105 is a front perspective view of a further alternate embodiment of a filter mask having a transparent mask body.
Figure 106:
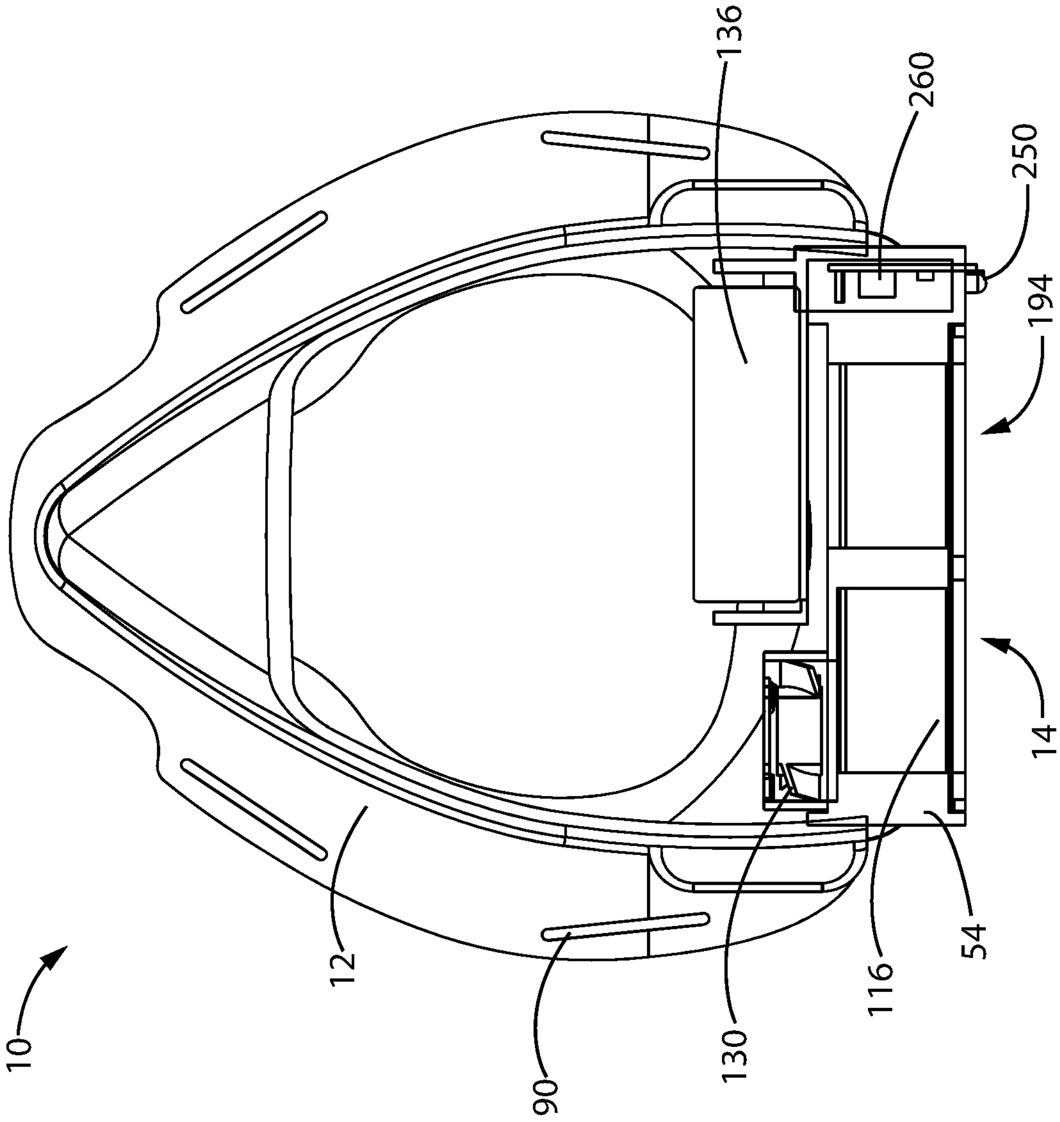
FIG. 106 is a sectional view of the filter mask of FIG. 105 along the line 106-106 in FIG. 105.
Figure 107:
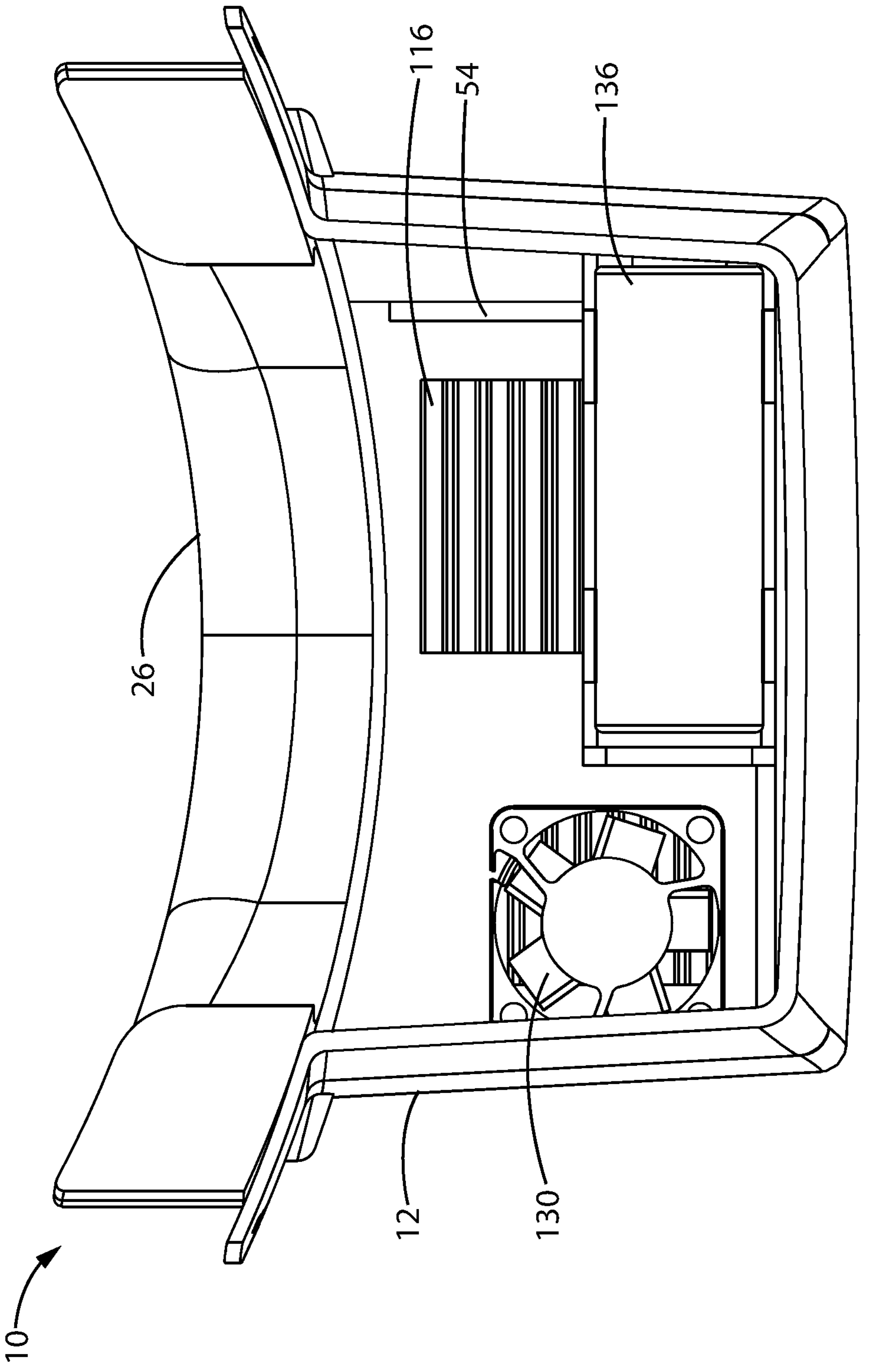
FIG. 107 is a sectional view of the filter mask of FIG. 105 along the line 107-107 in FIG. 105.
Figure 108:
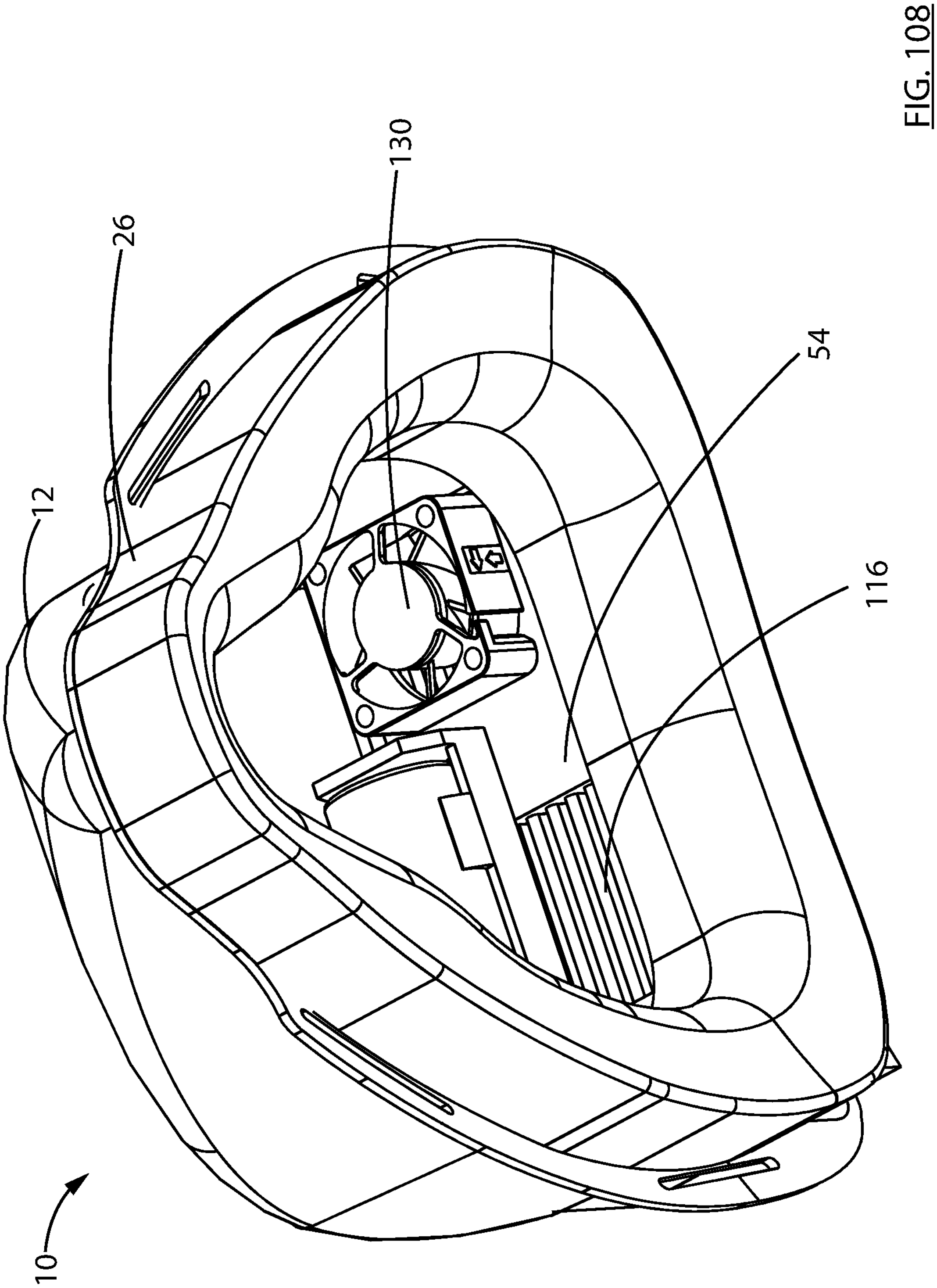
FIG. 108 is a rear perspective view of the filter mask of FIG. 105.

For example, as exemplified in FIGS. 98-100, the filter mask 10 has two fans 130. The first fan **130*a* may assist with inhalation of the user and the second fan 130*b* may assist with exhalation of the user. As exemplified, the first fan 130*a* operates to blow air into the filter mask 10, thereby assisting with inhalation, while the second fan 130*b* operates to blow air out of the filter mask 10, thereby assisting with exhalation. As described previously, as exemplified, each of the inhalation side 146 and the exhalation side 148 may have a foam filter 118 and/or a biological filter 116**.

Fan 130 may produce an air flow of 3-18 liters/minute, optionally 6-18 liters/minute or 12-18 liters/minute or optionally about 6 liters/minute.

In other embodiments, a single fan may be used. The fan may be positioned in a common passage used for inhalation and exhalation and the direction of rotation of the fan may be altered based on whether the person wearing the mask is inhaling or exhaling. The direction of rotation of the fan may be adjusted by a sensor (e.g., a pressure sensor or a flow sensor) provided in the air flow passage. Accordingly, in some embodiments, air may travel past the fan 130 during both inhalation and exhalation.

If a fan is used only for inhalation, then the fan may be positioned in a common passage used for inhalation and exhalation or, alternately as exemplified in FIGS. 19 and 101-120, the fan 130 may be provided in a passage for inhalation 132 and a separate passage may be used for exhalation (the exhalation passage 134). It will be appreciated that an energy storage member 136, such as a battery or capacitor, may be provided at any location on the filter mask 10 and may be provided in the filter assembly 14. Accordingly, if the filter assembly 14 is removable, the energy storage member 136 may be recharged or replaced when the filter assembly is removed for, e.g., cleaning.

In some embodiments, a top portion of the filter cartridge 194 may include a fan port 155 for facilitating airflow through the fan 130. As exemplified in FIGS. 84 and 85, the lid 154 has a fan port 155 and the fan 130 is located downstream (relative to an inhalation) of the fan port 155. The fan port 155 may be used to supply air flow to the fan 130 from the common passage for inhalation and exhalation. For example, as a user inhales, the air passes through the bottom of the filter assembly 14, through the filter media 116 and 118. The air then passes through the fan port 155 and through the fan 130 to the user. When the user exhales, the air passes through the fan 130, through the fan port 155, and out of the filter assembly 14 after passing the filter media 116 and 118. As exemplified in FIGS. 84 and 85, the fan port 155 is the only opening in the lid 154 with the rest of the lid 154 being air pervious, thereby facilitating the use of a common airflow passage. In some embodiments, the fan port 155 may occupy less than 50% of the lid 154. If a single fan port is provided, then fan 130 optionally uses a propeller instead of an impeller.

In some embodiments, the size of the fans 130 may vary depending on the desired use of the filter mask 10. For example, a larger mask 10 may require larger fans 130 to assist with the increased volume of air. It will be appreciated that the projected area of the fan(s) 130 onto the filter 116 may be the same as the projected area of the filter 116. In other words, the surface area of the air transfer region from the filter 116 to the fan 130 may be the same as the surface area of the received air transfer region in the fan 130. Equalizing, or approximately equalizing, the projected areas of the filter 116 and the fan 130 may reduce backpressure within the filter mask 10, thereby improving the function and/or comfort of the user. It will be appreciated that, in some embodiments, the projected areas of the filter 116 and the fan 130 may be differently sized.

In some embodiments, the top portion of the filter cartridge 194 may have a plurality of fan ports 155. For example, as exemplified in FIGS. 98-100, the lid 154 includes a first fan port 155*a* and a second fan port 155*b*. The first fan port 155*a* is located on the inhalation side 146 in the inhalation passage 132. The second fan port 155*b* is located on the exhalation side 148 in the exhalation passage 134. As exemplified in FIGS. 98-100, the first fan 130*a* is located downstream (relative to an inhalation) of the first fan port 155*a* and the second fan 130*b* is located upstream (relative to an exhalation) of the second fan port 155*b*. When a user inhales, air enters the filter cartridge 194 and passes through the filter media 116, 118, through the first fan port 155*a*, and through the fan 130*a* to the user. When the user exhales, air flows through the second fan 130*b*, through the second fan port 155*b*, through the filter media 116, 118, and out of the filter cartridge 194.

Figure 19:
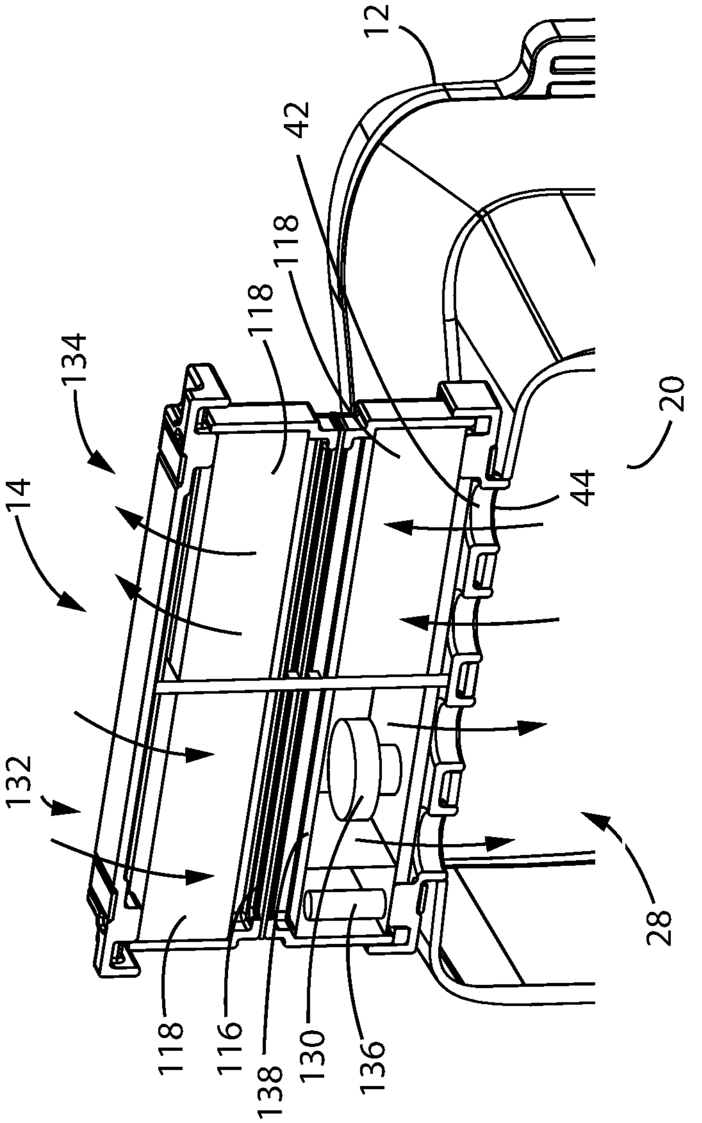
FIG. 19 is a cross section along the line 11-11 of a further alternate embodiment of a filter assembly of FIG. 5.

As exemplified, the flow passage between the filter assembly 14 and the volume 28 in FIG. 19 is common to inhalation and exhalation (e.g., there may be a common header). In such a case, a one-way valve may be provided to prevent or inhibit the flow of air through a passageway in a direction reverse to the direction of the flow of air induced by a fan 130. For example, in the embodiment of FIG. 19, a one-way valve 138 is provided upstream of fan 130. It will be appreciated that the valve 138 may be provided downstream of fan 130. Any one-way valve may be used. The one-way valve may be actuated by flow therethrough or a sensor (e.g., a pressure sensor or a flow sensor).

In some embodiments, the fan 130 may have a relatively low head of pressure due to the use of propeller instead of an impeller. During exhalation, the assistance of the fan 130 may be overcome due to the low head, thereby allowing a single fan to assist with inhalation while maintaining ease of exhalation. Such a fan may be used in an embodiment, such as is exemplified in FIGS. 82-85 wherein a common passage is provided for inhalation and exhalation.

It will be appreciated that, as exemplified in FIG. 19, if a one-way valve is used and/or if a fan 130 is used, then more porous filter media 118, 120 need not be provided downstream of the biological filter material 116.

Charging

In accordance with this aspect, which may be used by itself or in combination with one or more aspects, if the mask includes an electrically powered component, such as a fan 130 or a light source 250 (such as an LED), then the mask may include one or more energy storage members, such as one or more batteries or capacitors, and the one or more energy storage members may be removable for replacement and/or recharging and/or recharging and the one or more energy storage members may be recharged while positioned in the mask.

In some embodiments, the energy storage member 136 may be rechargeable without removing the filter assembly 14. Accordingly, as exemplified in FIGS. 72-120, the filter mask 10 has a charging port 137, which may be located on the filter assembly 14. The charging port 137 may allow a user to charge the energy storage member 136 by electrically connecting the energy storage member 136 to an external power source (not shown) by a power cord that is insertable into the charging port 137. For example, the charging port 137 may be a USB port. In some embodiments, the energy storage member 136 may be charged while the mask is in use.

In some embodiments, a second energy storage member 136 may be connected to the first energy storage member 136 through the charging port 137. The second energy storage member 136 may charge the first energy storage member 136, thereby allowing the user to continue wearing the mask 10 while the first energy storage member 136 charges.

In some embodiments, the energy storage member 136 may be charged wirelessly. For example, the user may remove the mask 10 and place the mask 10 on an induction charger. The induction charger may charge the energy storage member 136 without the need of a wire to charge the energy storage member 136. Induction charging may improve the seal of the mask 10, since the energy storage member 136 need not be removed from the mask 10 to charge.

In some embodiments, the energy storage member 136 may be removed from the mask 10. The energy storage member 136 may be replaced with a second energy storage member 136 that is fully charged, allowing the mask 10 to be used while the first energy storage member 136 charges. For example, as exemplified in FIGS. 105-120, the energy storage member 136 may be removed from the mask 10. As exemplified, the energy storage member 136 is a battery. The user may remove the mask 10, providing an opening to volume 28 where the user's face rests in the mask 10. The battery 136 may be detached from the filter assembly 14 and removed through the opening in the mask 10. The battery 136 may then be replaced or recharged before being returned to the mask 10. The use of a removable energy storage member 136 may allow the seal on the mask 10 to be improved, since the energy storage member 136 can only be removed by the user removing the mask 10.

Alternately, as exemplified in FIG. 117, the energy storage member 136 may be accessible when the mask is being worn and may be removed without removing any component of the filter assembly 14.

Regenerative Charging

In accordance with this aspect, which may be used by itself or in combination with one or more aspects, the fan 130 may be used for regenerative energy recovery. When a person breathes in and out, the motion of the breath provides fluidic energy. Positioning the fan 130 in the exhaust flow of a user's breath may assist in recovering some fluidic power through use of the fan 130. An advantage of this aspect is that air, which is exhaled past the fan, may cause the fan to rotate in an opposite direction compared to the direction used for blowing air. Rotating the fan in the opposite direction may allow the fan to be used as a generator. The generator may be coupled to the rechargeable energy storage member 136, such as a battery.

Accordingly, a user's exhalation may be used to, e.g., increase and/or maintain the charge of a battery within the mask, to allow the mask to operate for longer periods of time without requiring external charging. The regeneration may use one or more fans 130. For example, in some embodiments, there may be a single passage for intake and exhaust with a single fan 130. During inhalation, the fan 130 may assist by rotating a propeller in a first direction, powered by the energy storage member 136, thereby actively blowing air into the mask 10 for the user to breathe. During exhalation, the user's breath may overcome the fan 130, causing the fan 130 to rotate in a second direction. As the propeller of the fan 130 rotates in the second direction, the propeller may act as a generator. The generator may be coupled to the energy storage member 136, allowing the generator energy to recharge the energy storage member 136.

In some embodiments, the filter assembly 14 may have a common air passage for inhalation and exhalation. Accordingly, a fan inlet (i.e. for inhalation) of the fan may be located on a bottom side of the fan, while the outlet (i.e. for inhalation) may be located on the side of the fan. Positioning the inlet on the bottom and the outlet on the side may help with overpowering the fan 130 on a user's exhale to generate energy. Accordingly, during inhalation, the air flows through the bottom of the fan 130 and out the side of the fan 130. During exhalation, the user overpowers the fan 130 to allow air to move through a top of the fan 130, causing the fan 130 to rotate in the second direction. The exhaled air may pass through the top of the fan 130 and out the bottom (the inlet) of the fan 130, thereby allowing the fan 130 to be used as a regenerator.

In some embodiments, the filter assembly 14 may have separate air passages for inhalation and the exhalation. For example, as exemplified in FIGS. 98-100, the filter assembly 14 has an inhalation passage 132 on the inhalation side 146 and an exhalation passage 134 on the exhalation side 148. Accordingly, to regenerate energy using the exhale of a user, a plurality of fans 130 may be used. For example, as exemplified in FIGS. 98-100, a first fan 130*a* may be provided on the inlet side while a second fan 130*b* may be provided on the outlet side. As the user inhales, the first fan 130*a* may assist with blowing air into the mask 10. As the user exhales, the second fan 130*b* may act as a generator as described above, thereby recovering the fluidic energy caused by the user's exhale. The recovered energy may be used to power and/or recharge other components of the mask 10.

Light Source

In accordance with this aspect, which may be used by itself or in combination with one or more other aspects, the mask 10 may include a light source 250. The light source 250 may be controlled by one or more buttons on the mask 10, as will be described subsequently. An advantage of having a light source 250 on the mask 10 may be that a user does not need to hold an additional light source in areas where airborne contaminates or insufficient light prevent the user from being able to see properly. Alternately, or in addition, the light source 250 may be used to indicate the status of electrical components in the mask 10. A status light source may, for example, allow a user to determine when the mask needs to be charged or if a component has failed.

The light source 250 may be any light source used in the mask arts and may be a light emitting diode (LED). The LED 250 may indicate that the energy storage member 136 needs to be charged.

In some embodiments, the light source 250 may include one or more light pipes 252, as exemplified in FIGS. 116-120. The light pipe 252 may increase the dispersion of the light source 250 and/or may allow light to be emitted from a location distal to the light source 250 itself. Accordingly, the light source 250 may be used as a flashlight. For example, as exemplified in FIGS. 116-120, the light pipes 252 extend from a rear side of the filter housing 54 to the front of the filter housing 54. As exemplified, the light sources 250 are positioned at the rear side of the filter housing 54. Accordingly, the light pipes 252 allow the light sources 250 to be positioned at the rear side of the filter housing 54, such as on a printed circuit board, while still emitting light from the front of the mask 10, improving the usability of the flashlight for the user.

In some embodiments, the light pipe 252 may be triangularly shaped, as exemplified in FIGS. 133 and 134. The triangularly shaped light pipe 252 may include a reflector on the top surface of the light pipe 252. The light pipe and/or reflector may be used to emit light in a particular direction, e.g., forwardly. As exemplified, the triangularly shaped light pipes 252 are used to emit light in a forward direction, while allowing the light source 250 to remain within the filter assembly 14. During use, the light source 250 may emit light upwardly through the light pipe 252. Once the light emitted from the light source 250 reaches, e.g., the reflector of the light pipe 252, the reflector reflects the emitted light in a forward direction. It will be appreciated that the angle of reflection may vary depending on the desired use of the filter mask 10. For example, in some embodiments, the angle of reflection may be in the range of 30-150°, optionally 45-135°, optionally 60-120°, or optionally 80-100°. It will be appreciated that the angle of reflection may be any angle.

In some embodiments, the direction of the emitted light may be controlled by the shape of the filter housing 54. As exemplified in FIGS. 135 and 136, the filter housing 54 is contoured to form a U-shape 55. The light sources 250 are located on either side of the U-shape 55, allowing the light sources 250 to be located above the rest of the filter assembly 14. Raising the light sources 250 above the plane of the filter assembly 14 may allow light to more easily be emitted outwardly from the filter mask 10 without a light pipe.

Electronics Unit

In accordance with this aspect, which may be used by itself or in combination with one or more other aspects, the mask 10 may include an electronics unit 260. It will be appreciated that the electronics unit 260 may be used to control any one or more of the electronic components of the mask 10. For example, the electronics unit 260 may be used for controlling, including, but not limited to, the speaker 32, the microphone 33, the electrostatic precipitator 50, one or more fans 130, the energy storage member 136, the regenerator, the ionizing sources 82, charging the energy storage member 136, the light source 250, or any combination thereof.

In some embodiments, the electronics unit 260 may include one or more buttons for controlling one or more electronic components of the mask 10. The buttons may be located on the electronics unit 260 and/or on the mask body 12. For example, as exemplified in FIGS. 100 to 115, the mask 10, e.g., the filter assembly includes a plurality of buttons 262. The buttons 262 may be used to control any of the electrical components of the mask 10. For example, a first and a second button 262 may control the volume of the speaker 32 and/or the volume of the microphone 33. Another button 262 may turn the light source 250 on and off. Another button 262 may turn the fan 130 on and off. Another button 262 may control the Bluetooth receiver for connecting the speaker 32 and/or microphone 33 to an external device, such as a computer and/or mobile device. As exemplified in FIGS. 116-120, the button 262 may be used to turn on and off the fan 130 and/or the light source 250.

The electronics unit 260 may be powered by one or more energy storage members 136. For example, in some embodiments, the electronics unit 260 may include an energy storage member holder 264, as exemplified in FIGS. 116-

120. The energy storage member holder 264 may be used to hold the energy storage member 136 in electrical contact with the electronics unit 260.

In some embodiments, the electronics unit 260 may include a foam 261, as exemplified in FIG. 134. It will be appreciated that the foam 261 may be an open cell foam and/or a closed cell foam. The foam 261 may be used to provide support for the energy storage member 136 and/or the electronics unit 260. For example, the foam 261 may secure the energy storage member 136 and/or the electronics unit 260 in place within the filter assembly 14. The foam 261 may also act as a shock absorber for the energy storage member 136 and/or electronics unit 260 in the event that the mask 10 is dropped. The foam 261 may also be used to provide a seal against dust and/or liquids to provide additional protection to the electronics unit 260.

In some embodiments, the button 262 may be used to turn on and off the energy storage member 136. Once the energy storage member 136 is activated, additional buttons 262 may control the individual components of the electronics unit 260.

In some embodiments, the buttons 262 may be located on the mask 10 separate from the electronics unit 260. For example, the buttons 262 may be located on one or more of the mask body 12, the filter assembly 14, or the filter cartridge 194, optionally on an outer surface thereof such that the buttons may be actuated while the mask is being worn.

In some embodiments, the light source 250 may be positioned on the electronics unit 260. The light pipes 252 may allow the electronic components of the light source 250 to be positioned with the rest of the electronics unit 260, while still emitting light from the front of the mask 10. Grouping the electronics into a single location may reduce manufacturing costs and may improve the ease of repairing and/or replacing parts.

In some embodiments, the electronics unit 260 may be removable from the mask 10. For example, in some embodiments, the electronics unit 260 may be a part of the filter cartridge 194. Accordingly, a user may remove the filter cartridge 194 with the electronics unit 260 and subsequently the user may remove the electronics unit 260, such as if the electronics unit 260 needs to be replaced. For example, as exemplified in FIGS. 101-115, the electronics unit 260 is removable with the filter cartridge 194 and is subsequently removable from the filter cartridge 194

In some embodiments, the electronics unit 260 may be separately removable from the mask 10. Accordingly, the electronics unit 260 may be positioned such that the electronics unit 260 may be removed without the user removing the mask 10. As exemplified in FIGS. 116-120, the electronics unit 260 is removable from the filter housing 54.

It will be appreciated that the electronics unit 260 may be mounted to the mask 10 by any means. For example, the electronics unit 260 may be mounted to the mask 10 by, including, but not limited to, magnets, mechanical fasteners, clips, friction fit, rib and grooves, or any combination thereof. For example, as exemplified in FIGS. 116-120, the electronics unit 260 includes two clips 266. The clips 266 may be used to mount the electronics unit 260 to a mounting member on the filter housing 54 (not shown).

Sanitization

In accordance with this aspect, which may be used by itself or in combination with one or more other aspects, the mask 10 may be sanitized by, e.g., steam cleaning and/or ozonation and/or UV light. An advantage of using steam cleaning, ozonation and UV light to sterilize the mask 10 is that the mask may be cleaned without extreme heat or high levels of UV radiation.

Figure 121:
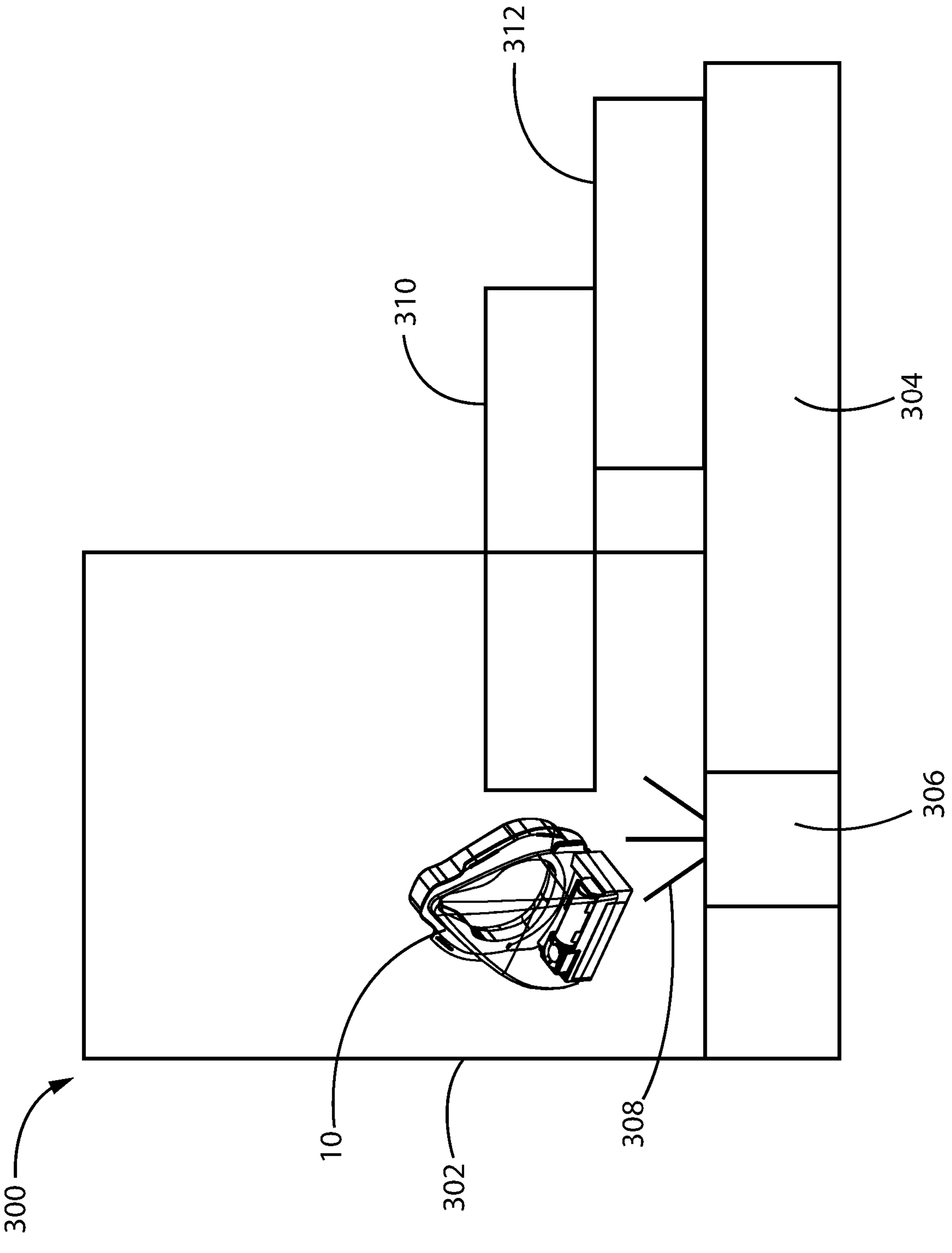

In accordance with this aspect, after use, the mask 10 may be placed in the cleaner 300, which may use any sterilization method and hereinafter referred to as a steam cleaner 300 for convenience, as exemplified in FIGS. 121-122. The steam cleaner 300 may include a container 302, a water supply 304, and a steamer 306 (or other sterilization source). The container 302 may receive the mask 10 for cleaning the mask. The steamer 306 may use the water supply 304 to generate steam 308. For example, the steamer 306 may include a heater, a pump, and a nozzle for generating and dispensing steam. The steam 208 may then be dispersed or otherwise inserted into the container 302.

It will be appreciated that the operating temperature of the steam cleaner 300 may have a wide range. The temperature of the steam 208 may vary depending on the type of contaminate that the mask 10 has been exposed to and the length of time that the steam is applied. For example, in some cases, a temperature of 60° C.-80° C. may be sufficient to degrade a viral contaminate. Accordingly, the steam 308 may be heated to a sufficient temperature to disinfect the mask 10, without causing significant damage to the mask 10.

In some embodiments, the mask 10 may be steam cleaned with the electronics unit 260 in the mask 10. As exemplified in FIG. 121, the mask 10 is positioned within the container 302 with the electronics unit 260 still in place. In some embodiments, the steam cleaner 300 may include a cooling system 310 for cooling the electronics unit 260 and/or the energy supply member 136 as the mask 10 is being cleaned. The cooling system 310 may be used to selectively cool a portion of the mask 10 that may be damaged by higher heat. In some embodiments, one or more fans 130 within the mask 10 may be turned on while the mask 10 is being cleaned, thereby lowering the internal temperature of the mask 10.

Figure 122:
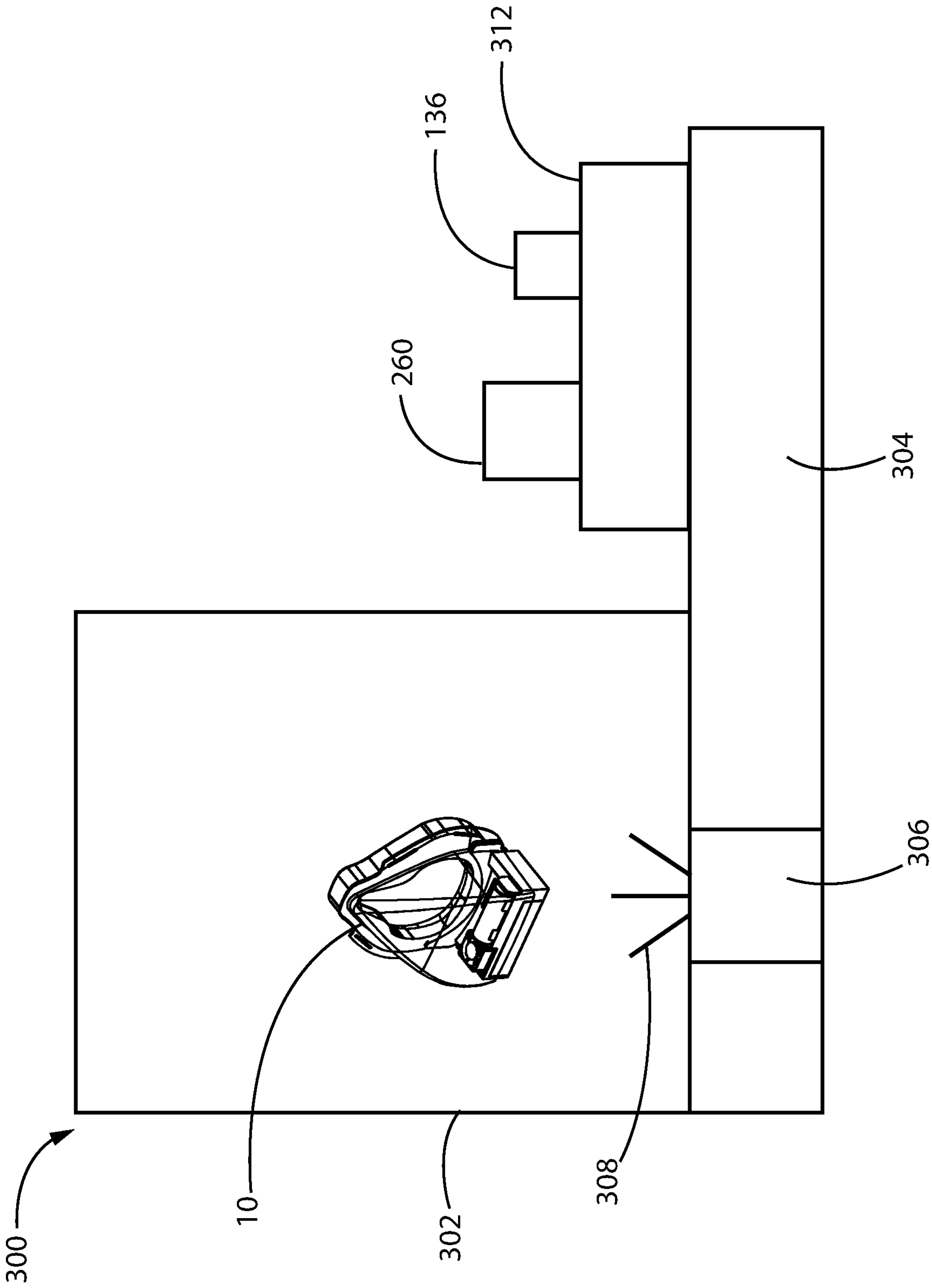
Figure 123:
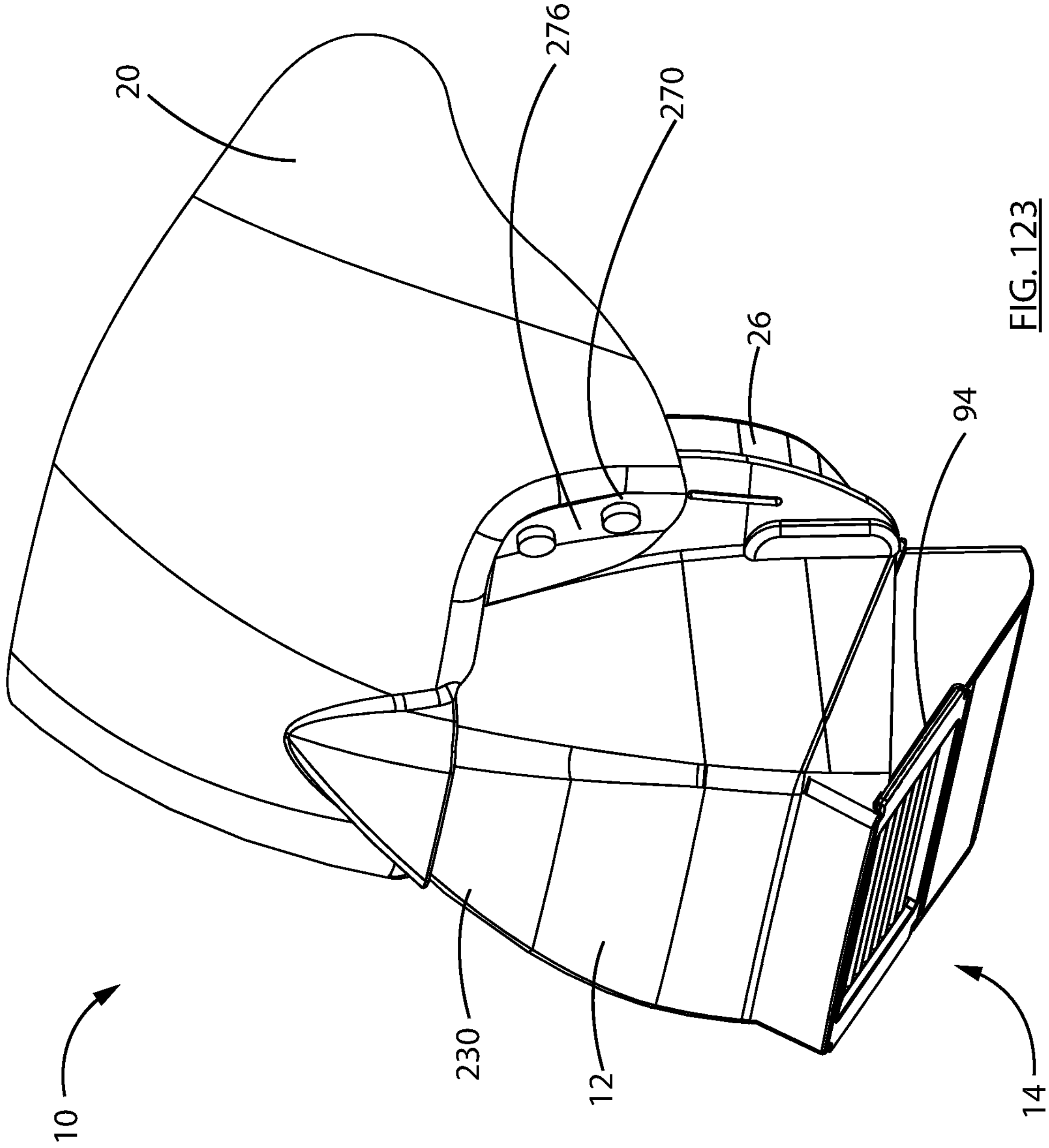
Figure 124:
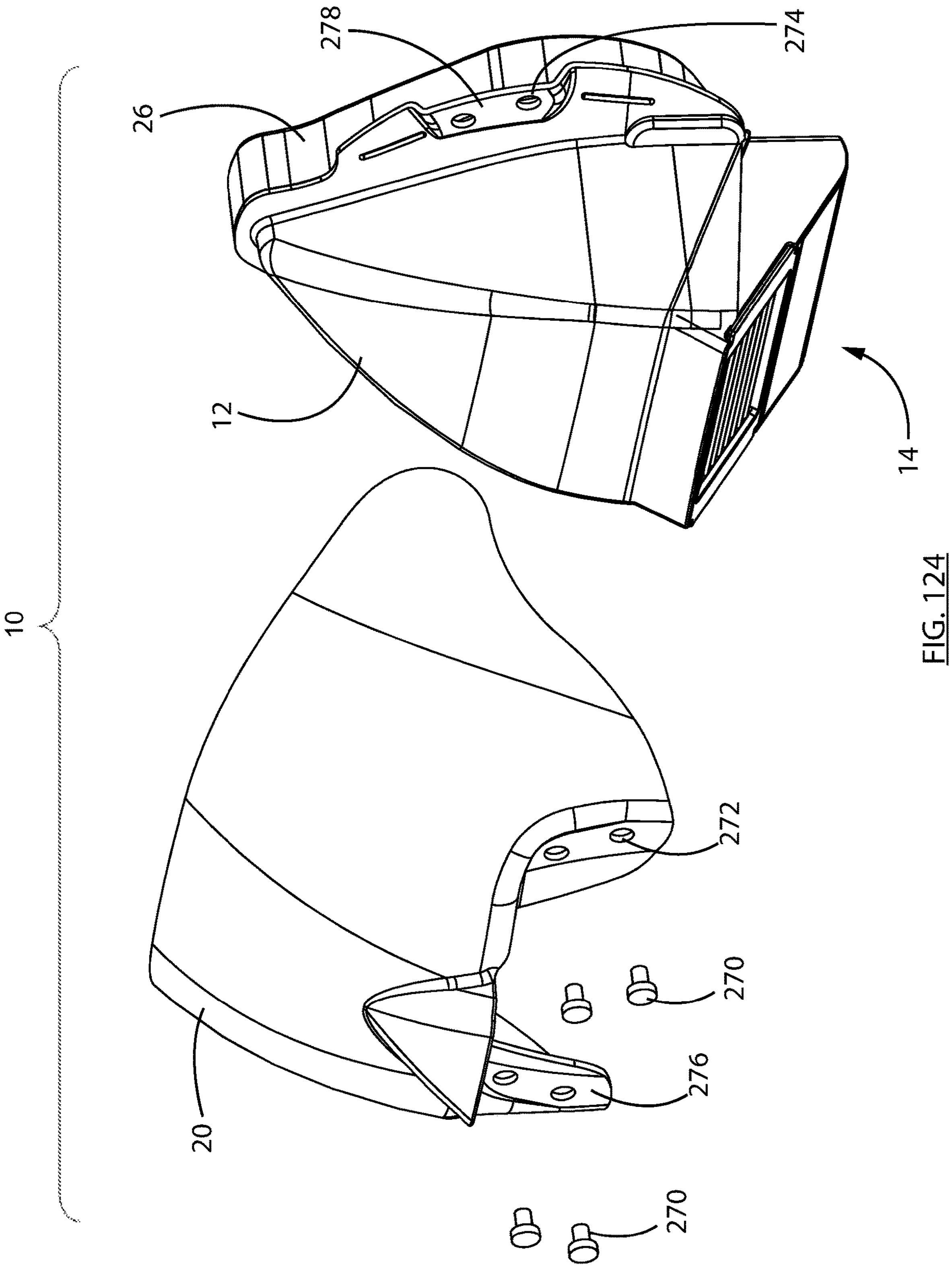
Figure 125:
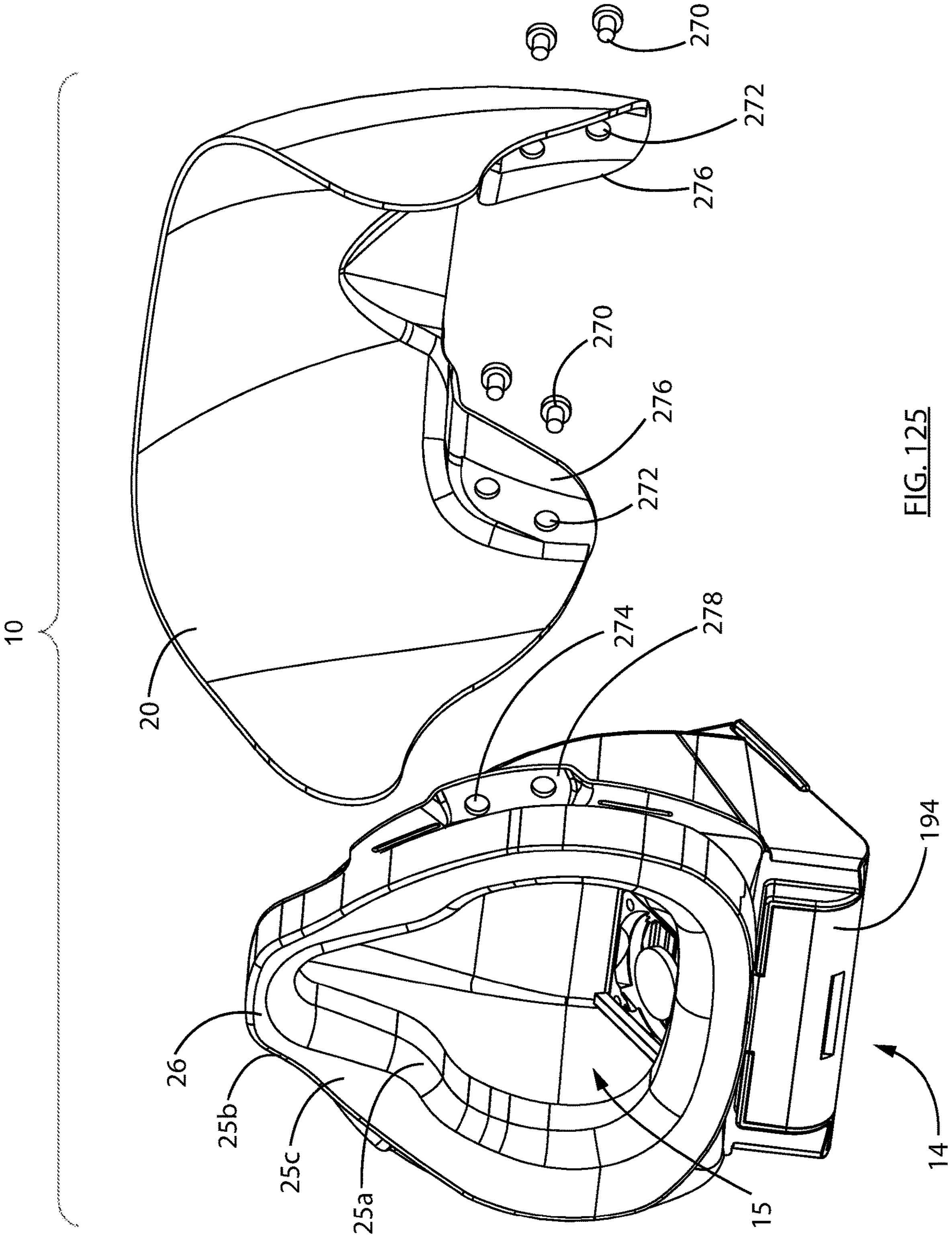
Figure 126:
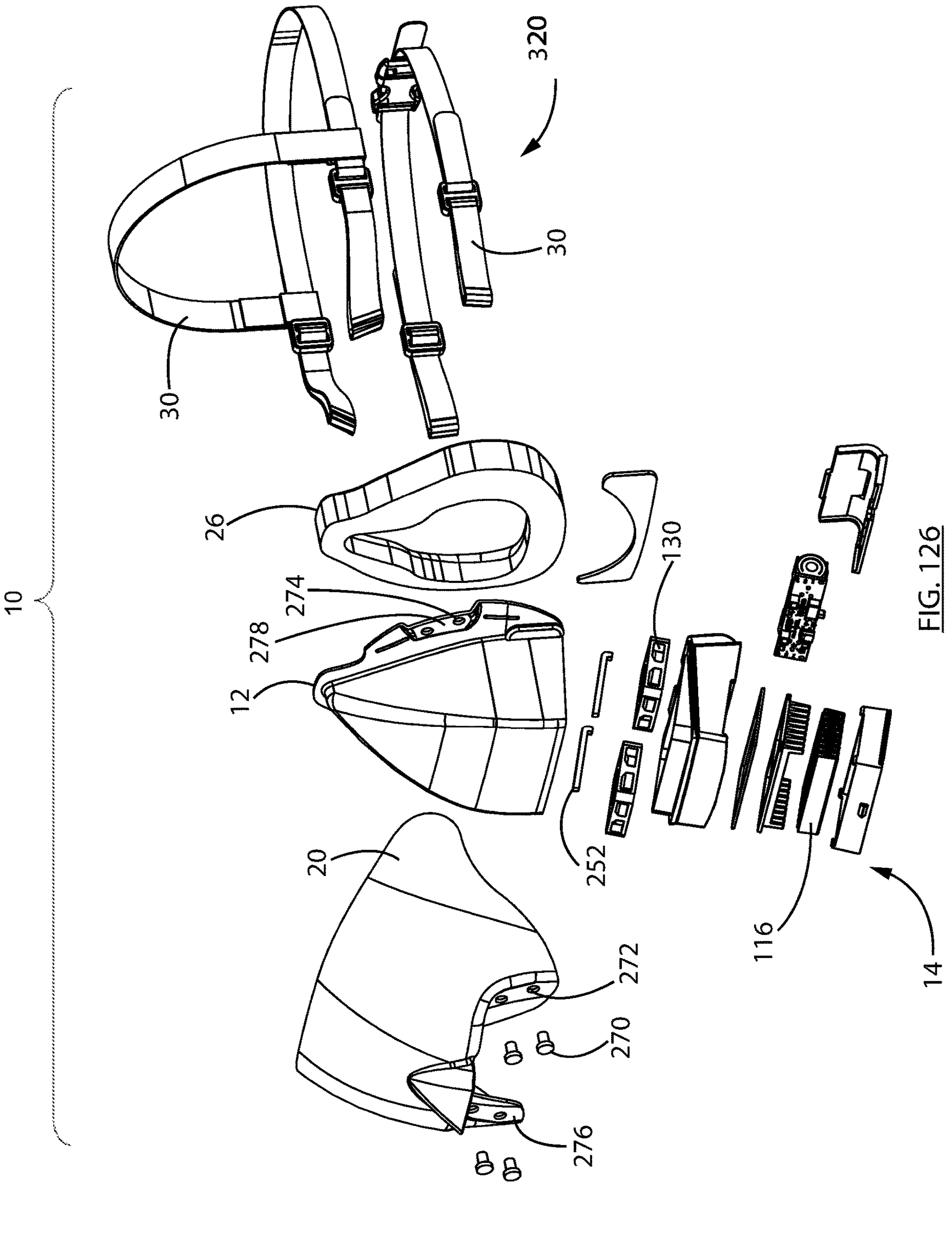

In some embodiments, components of the mask 10 that may be damaged by steam cleaning or moisture, if the electronics unit 260 and the energy storage member are not sealed, may be removed prior to cleaning, as exemplified in FIG. 122. For example, the electronics unit 260 and/or energy storage member 136 may be removed prior to the mask 10 being steam cleaned. As described above, the electronics unit 260 may be removed separately from the filter assembly 14 and/or the filter cartridge 194, or may be removed concurrently with the filter assembly 14 and/or the filter cartridge 194. Removing the electronics unit 260 prior to steam cleaning may allow the mask 10 to be subjected to higher temperatures to improve the sanitization of the mask 10.

In some embodiments, the mask 10 may be charged while being steam cleaned. For example, the mask 10 may be connected to an external power supply 312 by port 137 to charge the energy supply member 136, within the container 302. In some embodiments, the external power supply 312 may use wireless charging, such as induction charging, to charge the mask 10 while the mask 10 is being cleaned.

In some embodiments, the external power supply 312 may be located outside of the container 302, as exemplified in FIG. 122. In such embodiments, the electronics unit 260 may be removed from the mask 10 and plugged in and/or wireless charged by the external power supply 312.

Circulation Pattern

In accordance with this aspect, which may be used by itself or in combination with one or more other aspects, the inlet and outlet air flow passage may be configured to produce circulation of air within volume 28 between a mask and the face of a user. An advantage of this aspect is that air, which is exhaled into the volume, may be more completely removed from the volume, which may result in a reduction of carbon dioxide in the volume. A further advantage is that fogging on the inner surface of the face plate may be reduced or essentially eliminated.

In accordance with this aspect, separate inlet and outlet posts may optionally be provided. For example, an inlet port may be provided that is optionally closed by a valve (e.g., a flexible diaphragm) and which opens when a person inhales and an outlet port may be provided that is optionally closed by a valve (e.g., a flexible diaphragm) and which opens when a person exhales.

As exemplified in FIGS. 30 and 30-41, filter mask 10 may have one or more passages, which are provided on one lateral side of filter mask 10, for air traveling into volume 28 during inhalation on one lateral side of filter mask 10 and one or more passages, which are provided on the other lateral side of filter mask 10, for air traveling out of volume 28 during exhalation. As exemplified in FIG. 30, filter mask 10 has two inlet conduits 42*a*, 42*b* through which air travels during inhalation. These are provided on the right lateral side of filter mask 10, as viewed in FIG. 30. Filter mask 10 also has two outlet conduits 42*c*, 42*d* through which air travels during exhalation. These are provided on the left lateral side of filter mask 10, as viewed in FIG. 30. As a result, a circulation pattern is developed inside volume 28. As exemplified, incoming air introduced into volume 28 may tend to travel down the right side of the face of a user (as exemplified by Arrow A) and outgoing air exhaled by a user into volume 28 may tend to travel up the left side of the face of a user (as exemplified by Arrow B). This circulation will tend to inhibit the buildup of carbon dioxide in volume 28 as air will tend to travel in a generally circular pattern inside volume 28 and essentially cause air, which is exhaled to exit volume 28.

The circulation pattern may be enhanced in one or more ways. For example, the use of a fan 130 inhalation side 146 will tend to cause air to enter and travel down the right side of volume 28. If fan 130 operates at all times to draw air into volume 28, then exhaled air will tend to travel upwardly on the left side of volume 28.

Alternately or in addition, an eye shield 168, as discussed subsequently, may be provided. If eye shield 168 is provided, then eye shield 168 may have an upper surface that is configured to direct air to one side of volume 28 (e.g., eye shield 168 below inlet conduits 42*a*, 42*b* may direct air to the right side of volume 28 as exemplified in FIG. 30). Alternately, or in addition, an eye shield 168 may be provided below outlet conduits 42*c*, 42*d* to assist in directing air into outlet conduits 42*c*, 42*d*. Accordingly, for example, the upper surface of eye shield 168 may extend from the inner side thereof sidewardly and downwardly, e.g., it may have a linear upper surface that extends at a constant angle downwardly or the upper surface may be curved downwardly from the inner side of eye shield 168.

Figure 31:
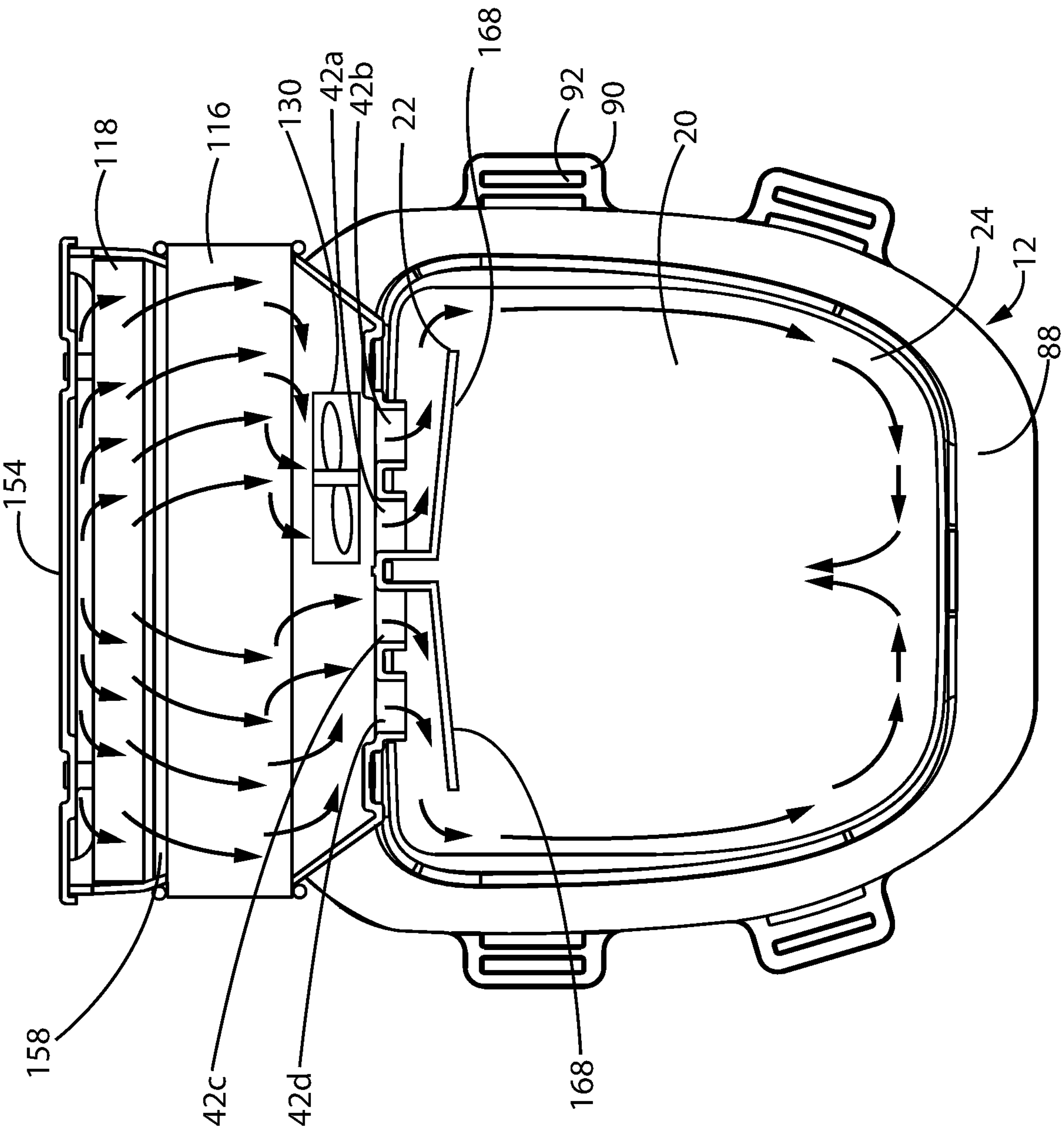
FIG. 31 is a cross-sectional view along line 28-28 in FIG. 20 of the alternate filter mask of FIG. 30 showing a circulation pattern during deep inhalation.

During deep inhalation, it is possible that air may also be drawn into volume 28 via outlet conduits 42*c*, 42*d*, see for example FIG. 31. In order to prevent such a flow pattern, as exemplified in FIGS. 38-41, the inlet passage and/or the outlet passage may be provided with a valve 170, 172 to close the passage. Inlet closure valve 170 may be configured to close automatically during exhalation and/or to automatically open upon inhalation. Accordingly, as exemplified in FIGS. 38-41, inlet closure valve 170 may be placed on the downstream side of inlet conduit 42*a*. Inlet closure valve may be pivotally mounted and may be optionally spring biased to a closed position. Accordingly, when a user inhales, inlet closure valve 170 may be pivoted to the open position shown in FIG. 38 by the incoming air. When a user finishes inhaling, inlet closure valve 170 may then return to the closed position due to the biasing member. Alternately or in addition, air traveling upwardly towards inlet conduit 42*a* may drive or assist in driving inlet closure valve 170 to the closed position. When in the closed position, inlet closure valve 170 will cause air to exit via outlet conduit 42*c*.

Alternately, or in addition, as exemplified in FIGS. 38-41, the outlet passage may be provided with outlet closure valve 172 to close the passage. Outlet closure valve 172 may be configured to close automatically during inhalation and/or to automatically open upon exhalation. Accordingly, as exemplified in FIGS. 38-41, outlet closure valve 172 may be placed on the downstream side of outlet conduit 42*c*. Outlet closure valve 172 may be pivotally mounted and may be optionally spring biased to a closed position. Accordingly, when a user exhales, outlet closure valve 172 may be pivoted to the open position shown in FIG. 38 by the outgoing air. When a user finishes exhaling, outlet closure valve 172 may then return to the closed position due to the biasing member. Alternately or in addition, air traveling downwardly towards through the filter media 46 may drive or assist in driving outlet closure valve 172 to the closed position. When in the closed position, outlet closure valve 172 will cause air to travel through inlet conduit 42*a*.

Offset Face Plate

In accordance with this aspect, which may be used by itself or in combination with one or more other aspects, the inlet and outlet air flow passage may be configured to reduce or eliminate air flow in and/or over the volume 28 between a mask and the face of a user. This may be achieved by positioning the inlet and outlet away from a face plate or by configuring the outlet to direct air away from the face plate. An advantage of this aspect is that air is not exhaled into the volume or over the interior of the face plate, which may result in a reduction or elimination of carbon dioxide and/or condensation in the volume 28. A further advantage is that fogging on the inner surface of the face plate may be reduced or essentially eliminated. Accordingly, a face plate may be provided (offset from but closely positioned to a person's face) to protect the user from droplets exhaled by a person which may have a biological contaminant.

In accordance with this aspect, the air inlet and air outlet of the filter mask may be positioned such that inhaled and exhaled air does not pass through or near the volume between the face plate and the user's face.

As exemplified in FIGS. 86-97 and 113-115, the face plate 20 of the filter mask 10 is spaced apart from, and does not contact, the user's face. It will be appreciated that at least some of the face plate 20 may contact the user's face depending on the desired use of the filter mask 10. As exemplified, the face plate 20 is positioned between the substrate 174 and the filter assembly 14. As described previously, the inlet and/or outlet may be positioned on the lower side of the filter assembly 14 (as exemplified in FIG. 89 a common inlet and outlet may face downwardly). Accordingly, the airflow into and out of the filter mask 10 does not pass through or near the volume 28 between the face plate 20 and the user's face. By positioning the inlet and/or outlet passages 42 to reduce or remove airflow in front of user's face, the user's face may be protected by the face plate 20 without the need for sealing the face plate 20 against the user's face. Accordingly, the face plate 20 may be used to protect a user's eyes against projectile contaminates, such as from a coughing person, while still allowing for air flow in front of the user's face to improve the comfort of the user.

Another possible advantage is that the offset face plate may improve the adaptability of the filter mask to be used for a variety of head shapes and sizes. By offsetting the face plate and changing the position of the airflow conduits 42, the substrate 174 and/or sealing member 26 may be used to create the seal against the user's face, while not requiring the face plate 20 to be fitted to a user, thereby allowing the face plate 20 to be used for more face shapes and sizes.

In some embodiments, the face plate 20 may be permanently attached to the filter mask 10, as exemplified in FIGS. 1 and 127-132 For example, the face plate 20 may form an integral part of the mask body 12. For example, the face plate 20 may be integrally molded with a portion of the mask body 12. In some embodiments, both the portion of the mask body 12 and the face plate 20 may be transparent. In other words, the portion of the mask body 12 that includes the integrally molded face plate 20 may be the transparent portion 13 of the mask body 12. As exemplified in FIGS. 127-132, the face plate 20 extends outwardly from the transparent portion 13 of the mask body 12.

Mounting the Face Plate

In accordance with this aspect, which may be used by itself or in combination with one or more other aspects, a supplemental face plate to overlie the eyes of a user may be removably mounted to the mask. An advantage of this aspect is that a user may remove the supplemental face plate from the mask in situations where a supplemental face plate is not needed. Alternately, or in addition, the supplemental face plate may be removed from the mask to facilitate cleaning and/or disinfecting of the face plate and/or mask.

Figure 89:
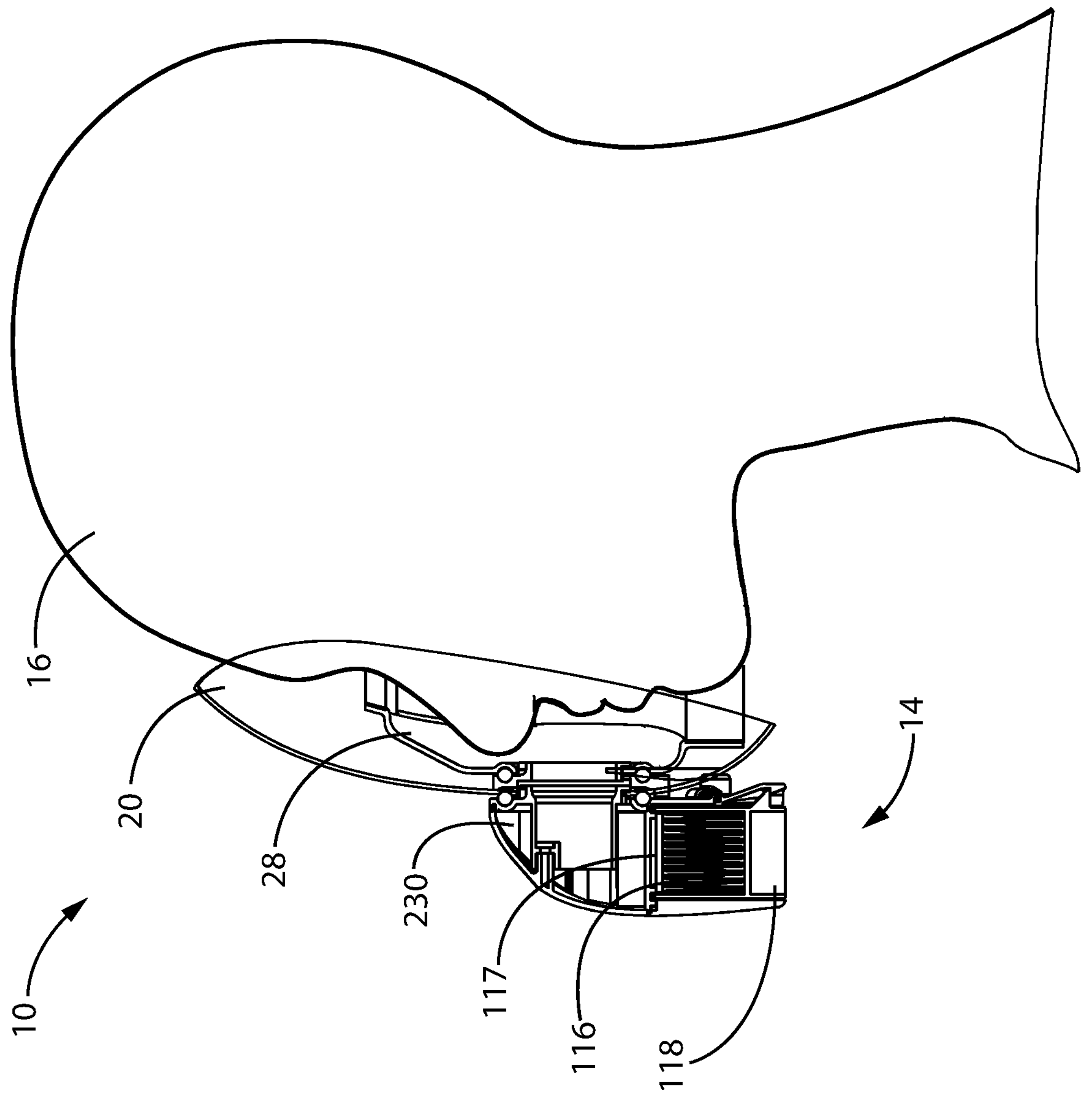
FIG. 89 is a side cross-sectional view along the line 89-89 in FIG. 86.
Figure 90:
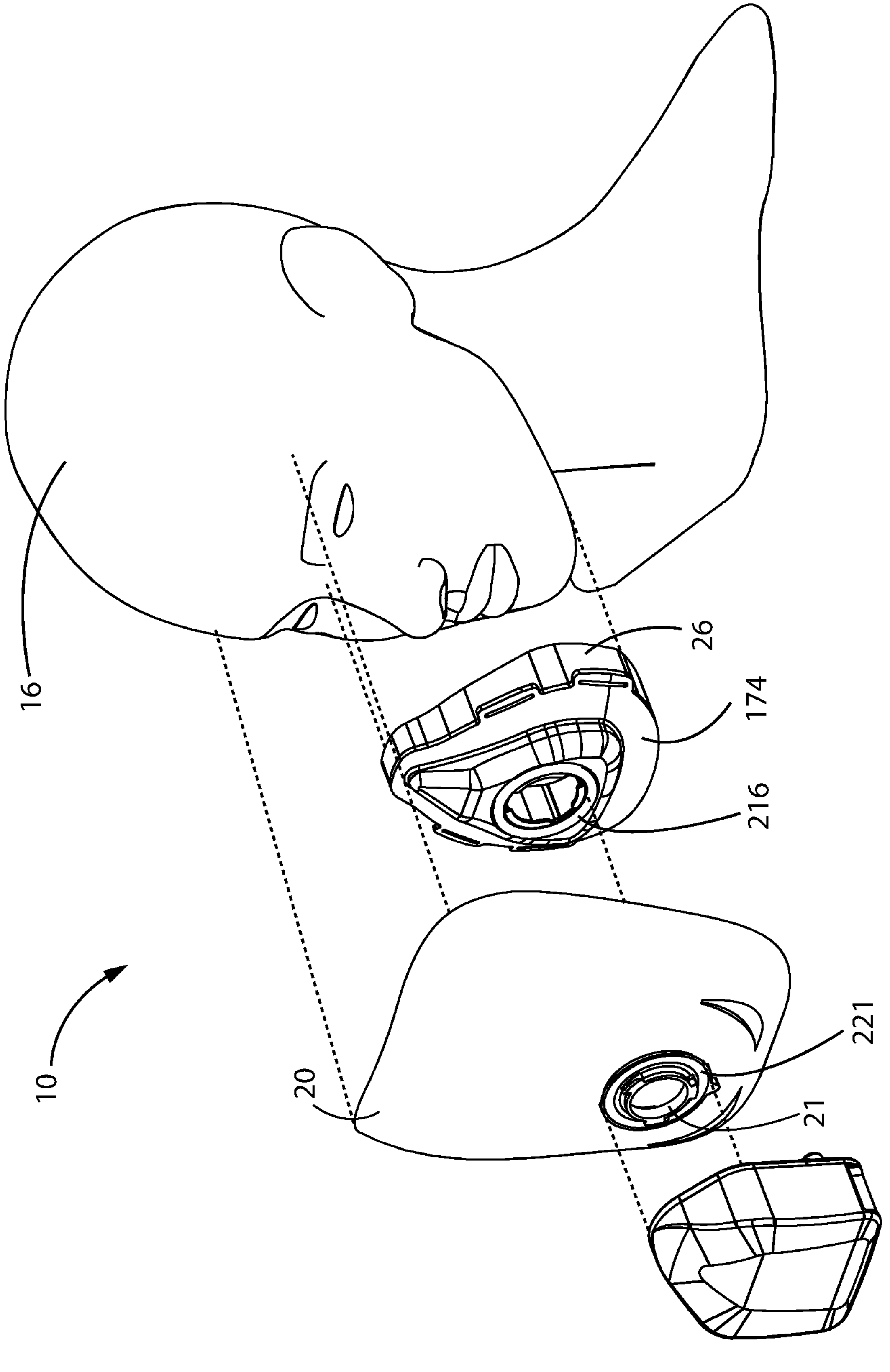
FIG. 90 is a front exploded view of the filter mask of FIG. 86.
Figure 91:
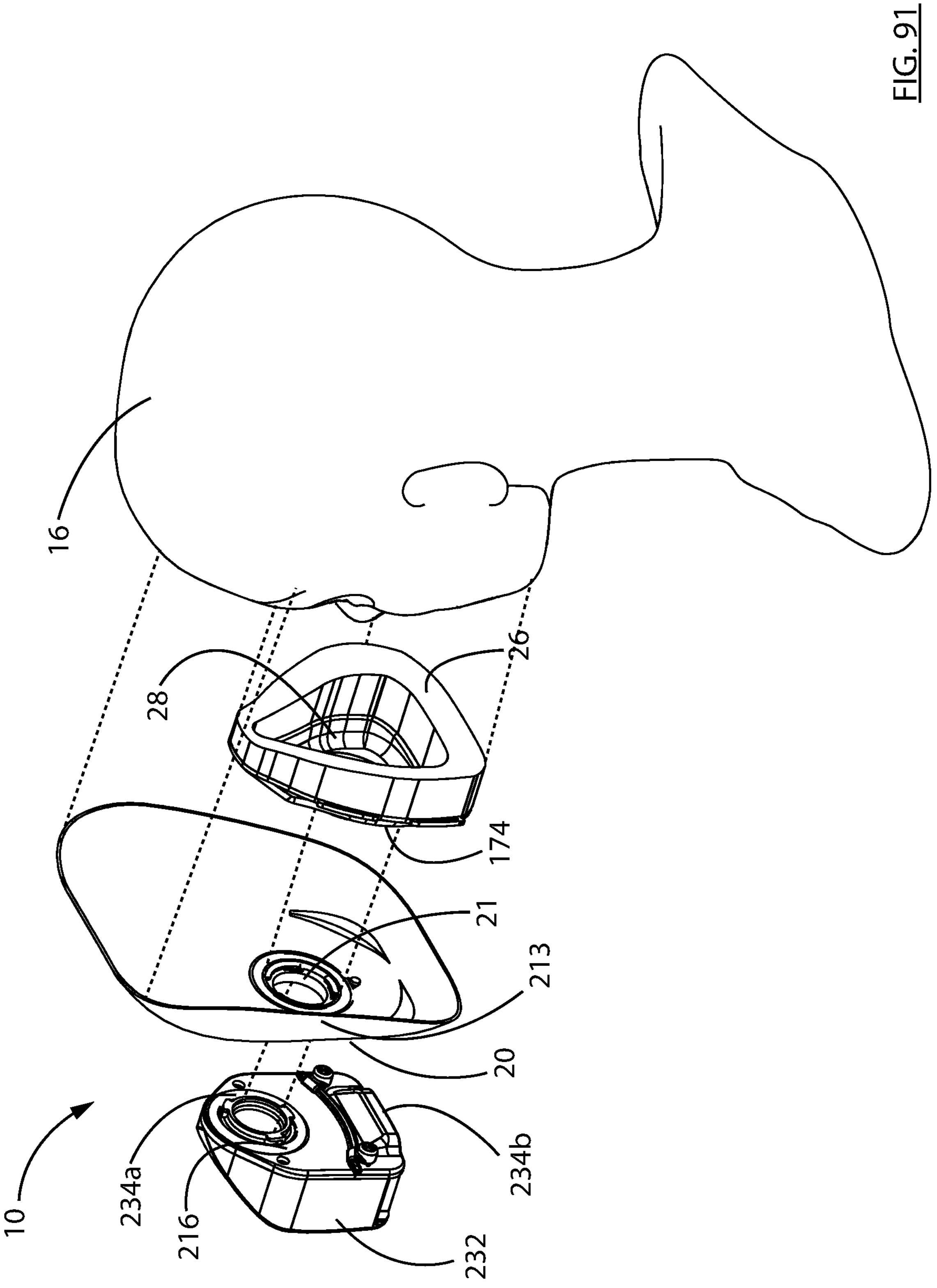
FIG. 91 is a rear exploded view of the filter mask of FIG. 86.
Figure 92:
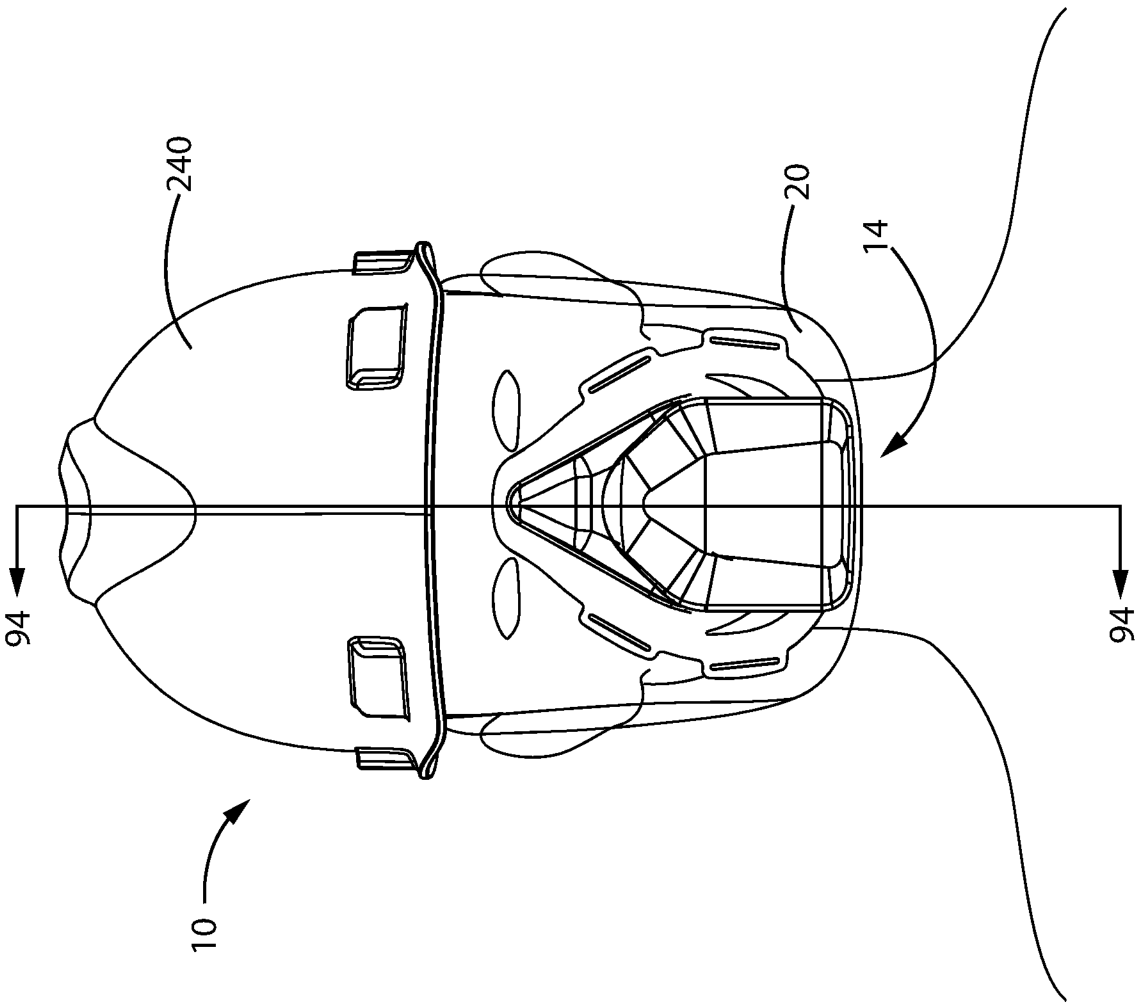
FIG. 92 is a front view of a further alternate embodiment of a filter mask having a face plate offset from the face of a user, wherein the straps for securing the filter mask in position has been omitted and the user is wearing a hardhat.
Figure 93:
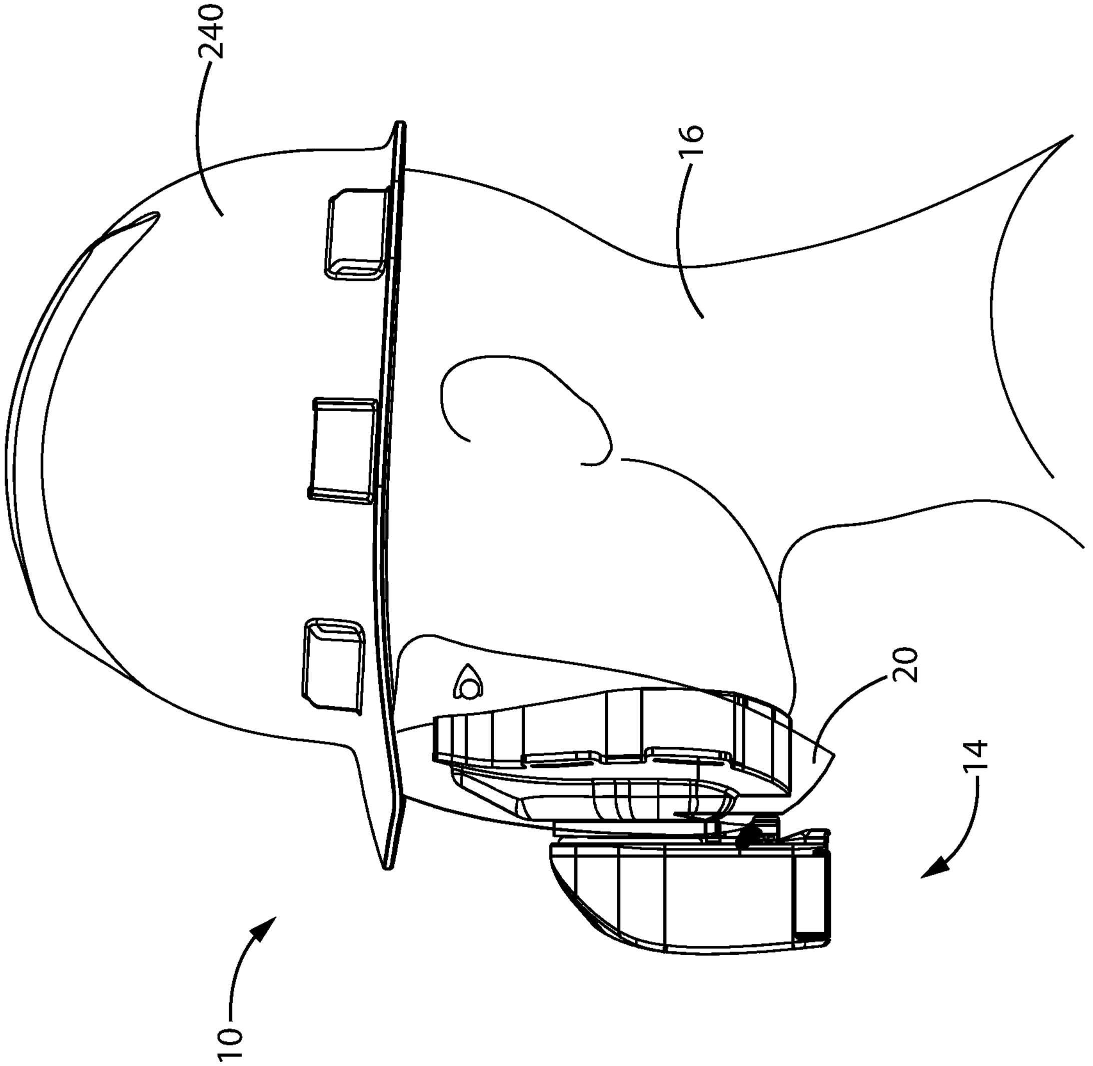
FIG. 93 is a side view of the filter mask of FIG. 92.
Figure 94:
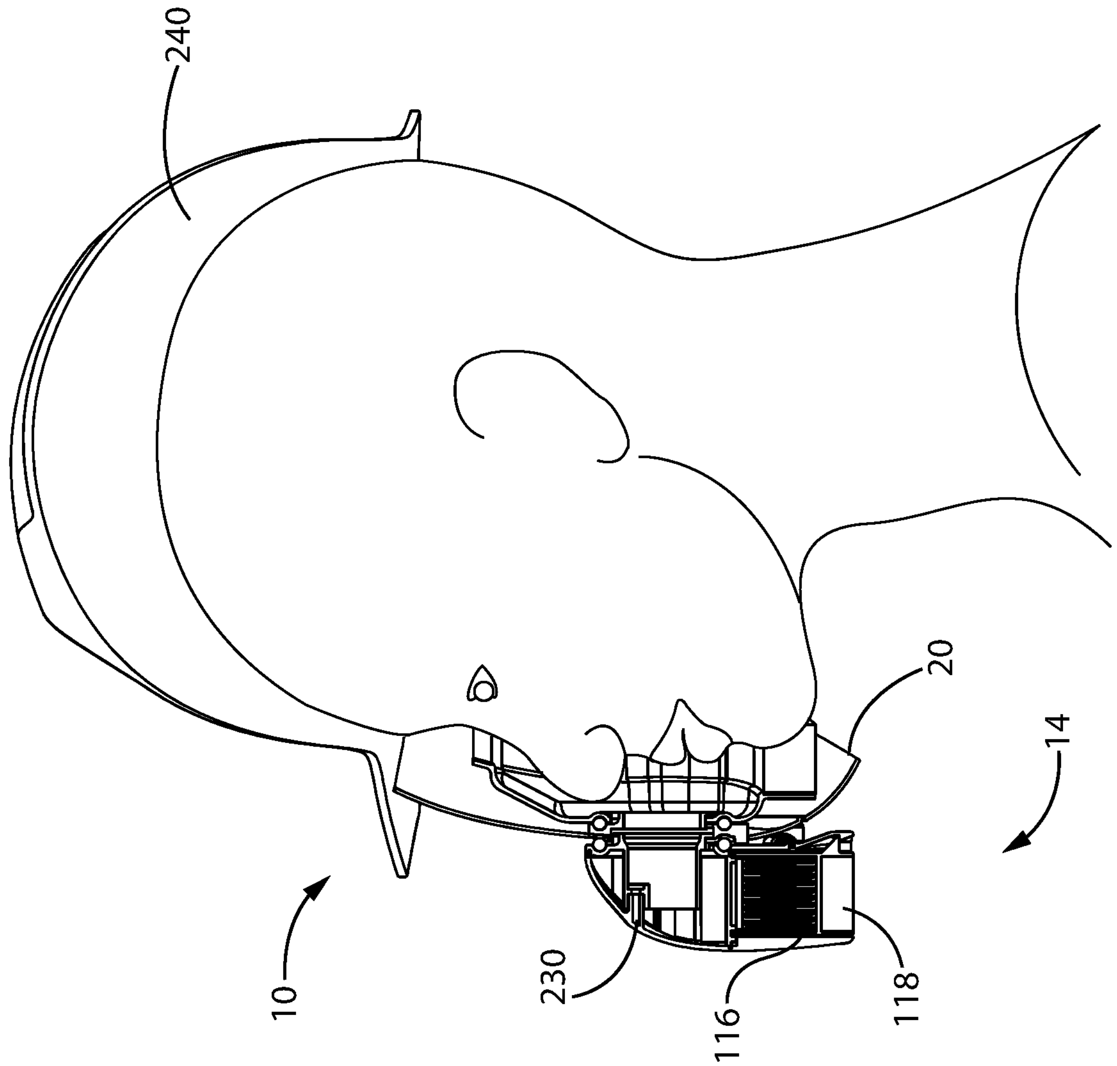
FIG. 94 is a side cross-sectional view along the line 94-94 of FIG. 92.
Figure 115:
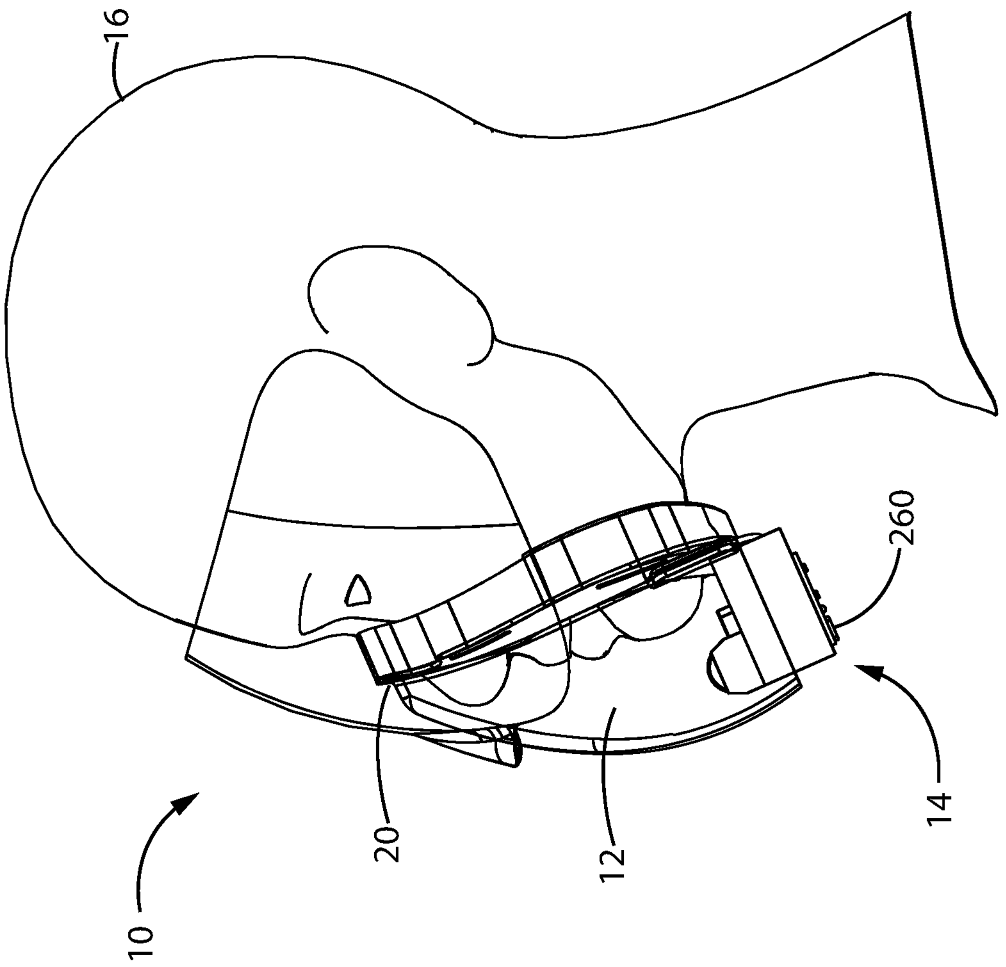
FIG. 115 is a side view of the filter mask of FIG. 113 when worn by a user.

In accordance with this aspect, the supplemental face plate 20 may be positioned, once mounted to the mask, such that the supplemental face plate is spaced in front of the eyes of the user and spaced therefrom (see for example FIGS. 89 and 115). The supplemental face plate may be shaped and sized to overlie the front of the face of a user as exemplified in FIG. 89 or the supplemental face plate 20 may be shaped and sized to extend around the side of the head of the user as exemplified in FIG. 115.

The supplemental face plate may be secured in any manner. For example, the supplemental face plate 20 may be removably mounted between the filter assembly 14 and the mask body 12, as exemplified in FIGS. 86-97. Alternately, as exemplified in FIGS. 113-115, the supplemental face plate 20 may be mounted to the mask body 12. The face plate 20 may be mounted to the mask 10 by, including, but not limited to, magnets, mechanical fasteners, clips, hook and loop fasteners, groove and rib, standoffs, a friction fit or any combination thereof.

In some embodiments, the face plate 20 may be mounted to the mask body 12 by one or more removable fasteners 270. For example, as exemplified in FIGS. 123-126, the face plate 20 is removably mounted to the mask body 12 by screws 270. As exemplified, the two screws 270 secure each side of the face plate 20 to the mask body 12. As shown, the face plate 20 has first fastener holes 272 and the mask body 12 has second fastener holes 274. As exemplified, the first fastener holes 272 are located on a mask body abutment surface 276, while the second fastener holes 274 are located on a face plate seat 278. During use, the mask body abutment surfaces 276 on the face plate 20 are positioned to abut and rest in their respective face plate seats 278 on the mask body 12. The screws 270 are then threaded through the first fastener holes 272 into the second fastener holes 274, thereby securing the face plate 20 to the mask body 12. It will be appreciated that there may be any number of fasteners used to secure the face plate 20 to the mask body 12.

If the supplemental face plate 20 is removably mounted between the filter assembly 14 and the mask body 12, then the mounting assembly 210 may extend through an opening in the supplemental face plate 20. For example, as exemplified in FIGS. 86-97, the supplemental face plate 20 includes an opening 21, a male face plate portion 213, and a female face plate portion 221.

During use, the male portion 212 of the filter assembly 14 is inserted into the female face plate portion 221 and secured as described previously. The male face plate portion 213 may be inserted into the female portion 220 on the substrate 174 and secured as described previously. The opening 21 allows for airflow between the filter assembly 14 and the mouth of the user. Alternately, the male portion 212 of the filter assembly 14 may be inserted through an opening in the supplemental face plate and then into the female portion 220 on the substrate 174 and the supplemental face plate 20 may be sandwiched therebetween.

Figure 113:
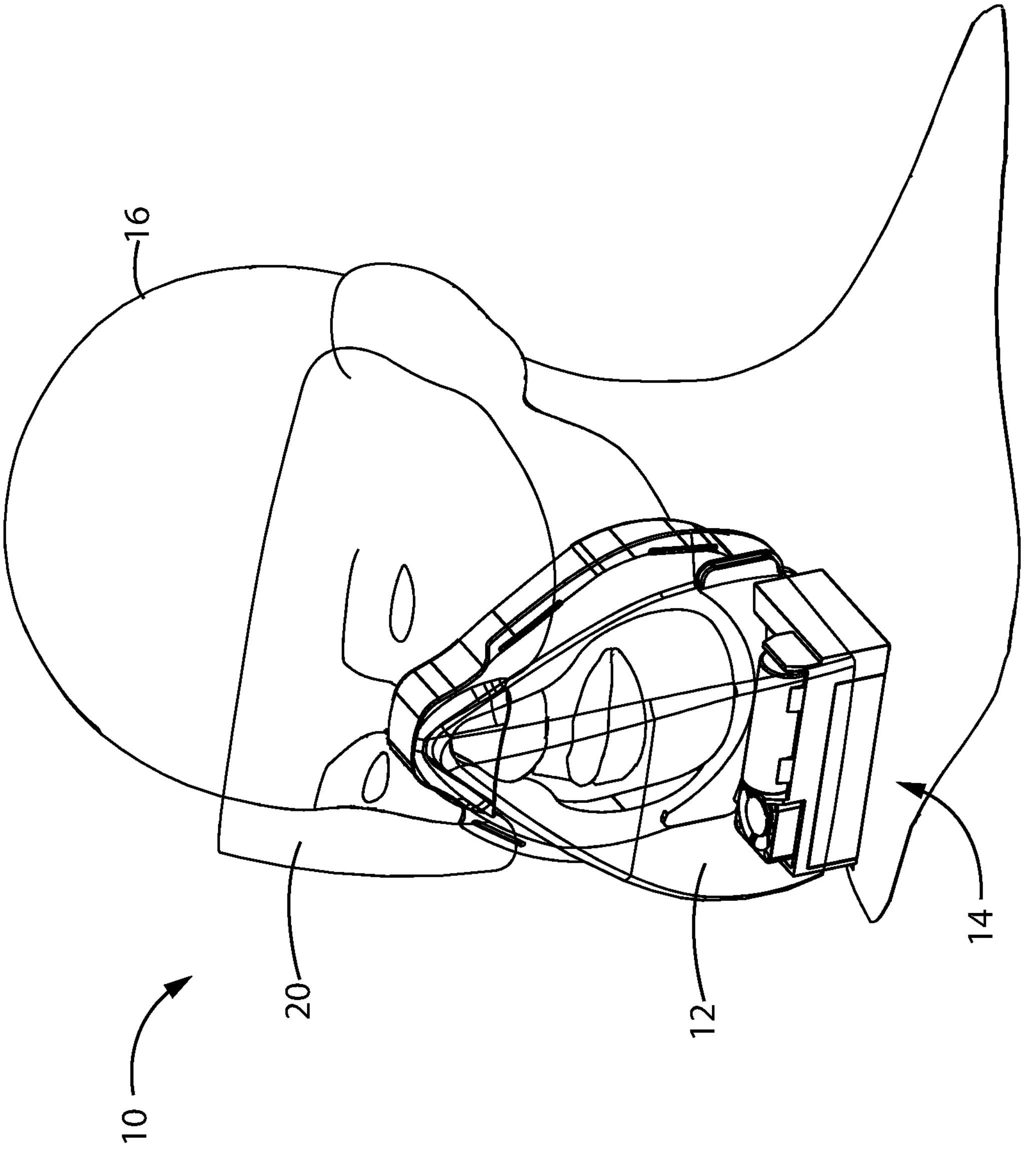
FIG. 113 is a front perspective view of a further alternate embodiment of a filter mask having a face plate when worn by a user.
Figure 114:
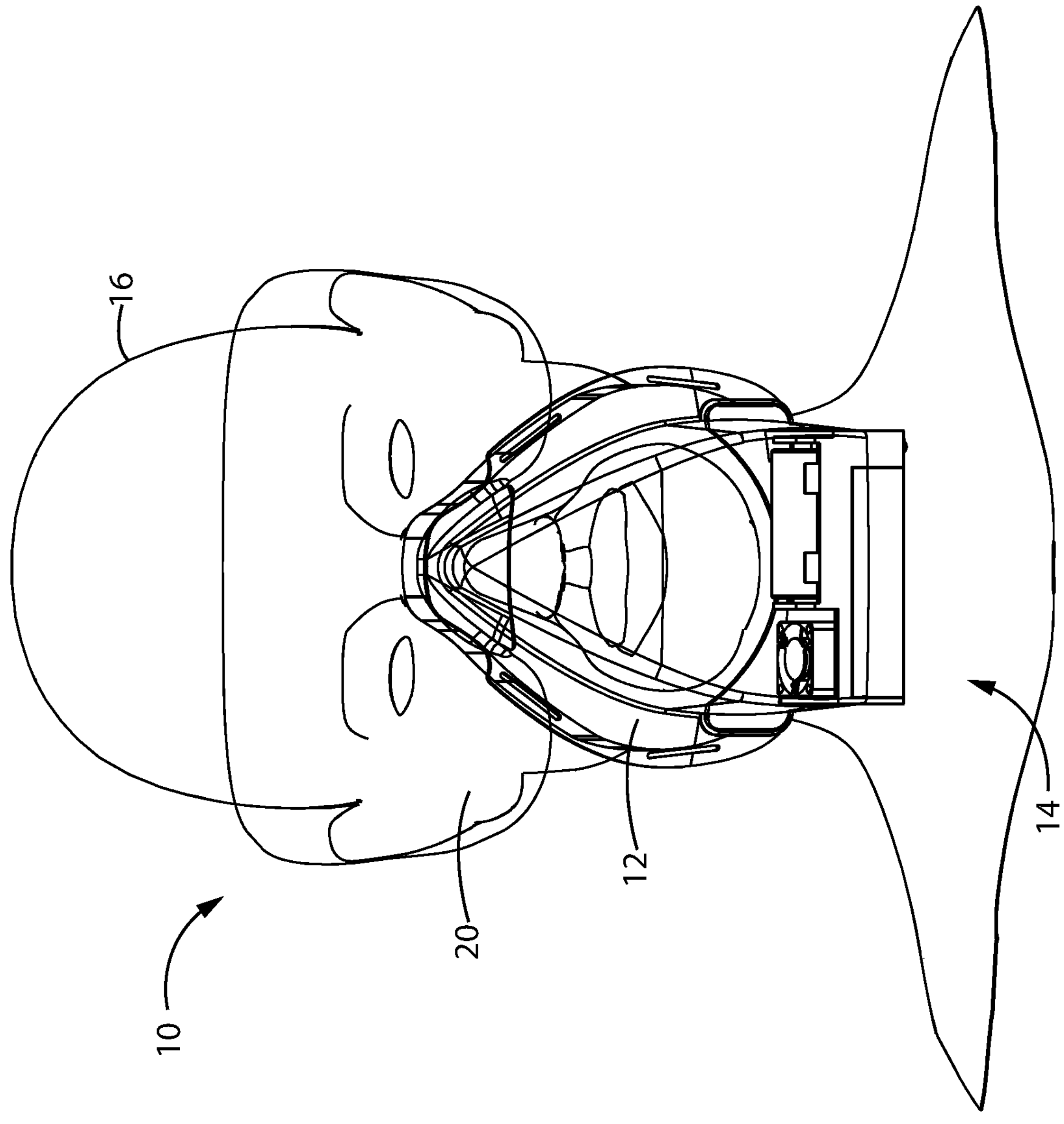
FIG. 114 is a front view of the filter mask of FIG. 113 when worn by a user.

It will be appreciated that one or more seals 216 may be positioned between each of the filter assembly 14 and the face plate 20, and the substrate 174 and the face plate 20. In the embodiment of FIGS. 113-115, the supplemental face plate 20 is mounted to the upper portion of the mask body and, optionally, is removably mounted thereto.

In some embodiments, when the face plate 20 is mounted to the mask 10, the supplemental face plate 20 may be locked in position. Locking the supplemental face plate 20 to the mask 10 may improve the stability of the supplemental face plate 20 as a user moves their head. The supplemental face plate 20 may be unlocked to remove the supplemental face plate 20 from the mask 10.

Securing Mechanism

In accordance with this aspect, which may be used by itself or in combination with one or more other aspects, the securing mechanism used to secure the filter mask to the face of a user may be positioned to allow a user to wear additional headgear. An advantage of this aspect is that a user may wear additional protection, such as a hat, hard hat, sweat band, goggles, etc. without affecting the comfort of the filter mask.

In accordance with this aspect, in some embodiments as exemplified in FIGS. 96, 126, 127, 132 and 141-147, a securing mechanism 320 may pass along the lateral sides of the head of a user, rather than across the forehead. In some embodiments, a portion of the securing mechanism 320 may pass over the top of a user's head, without interfering with a user's forehead or face.

Figure 95:
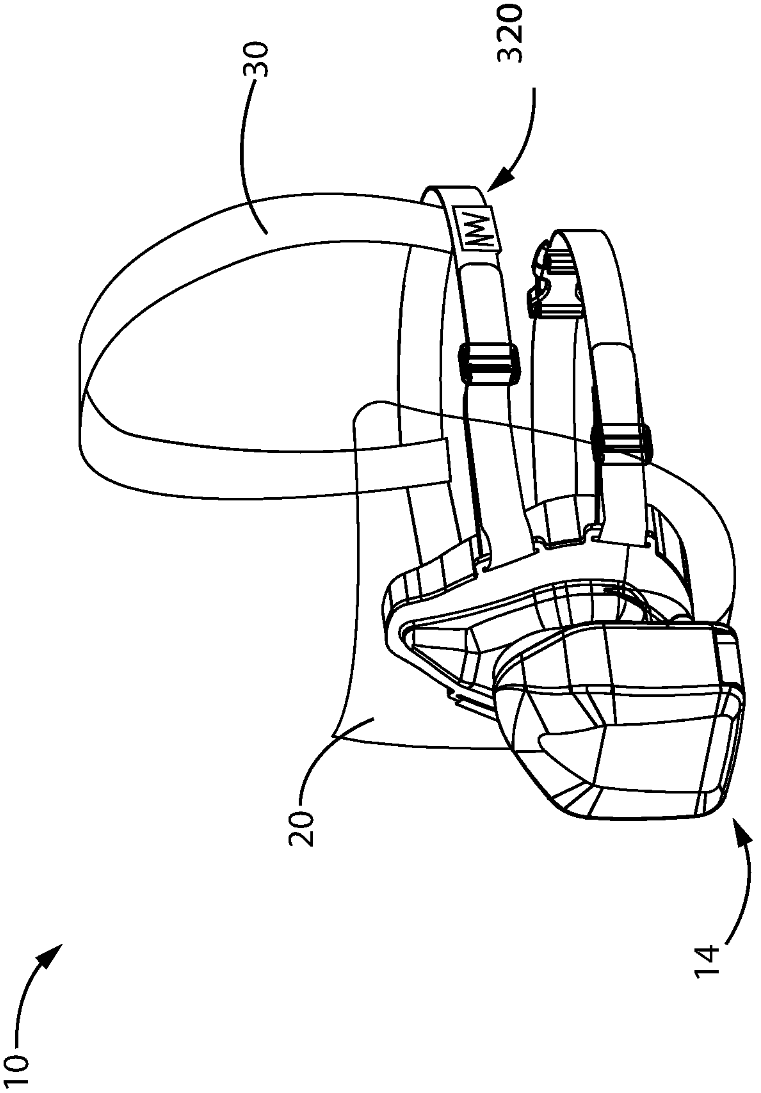
FIG. 95 is a front perspective view of a further alternate embodiment of a filter mask having a face plate offset from the face of a user.
Figure 96:
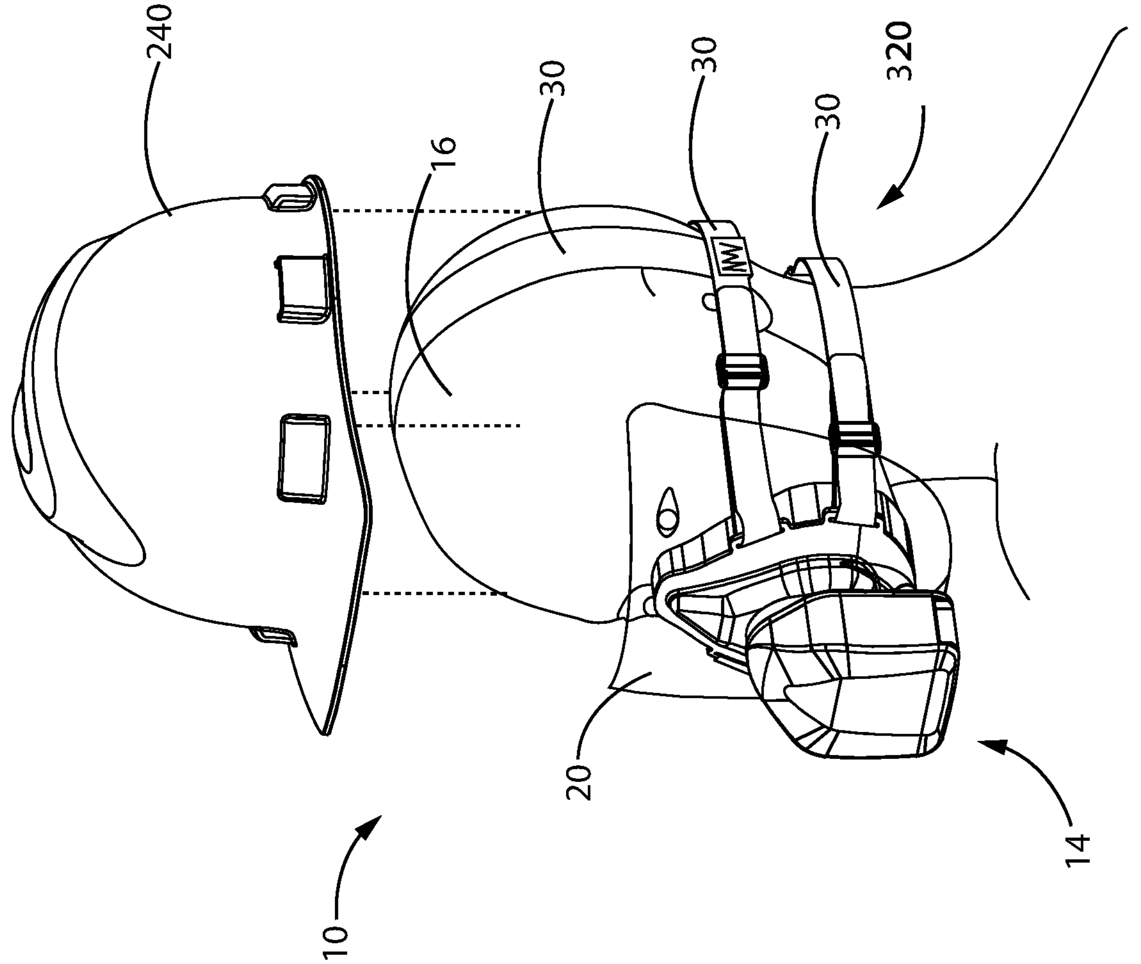
FIG. 96 is a front perspective view of the filter mask of FIG. 95 worn by a user.
Figure 97:
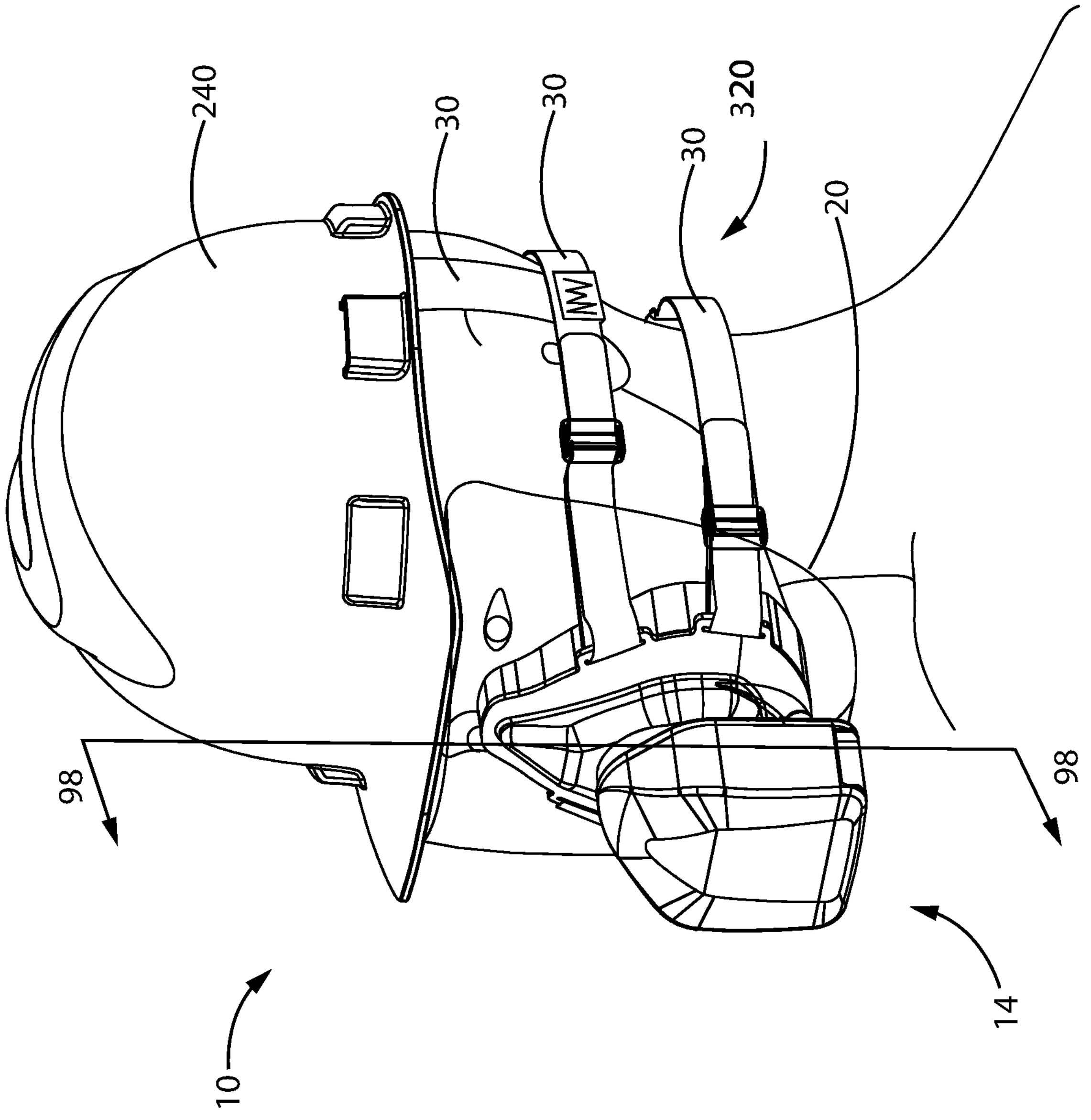
FIG. 97 is a front perspective view of the filter mask of FIG. 95 worn by a user.

As exemplified in FIGS. 95 and 96, the securing mechanism 320 includes three straps 30. Accordingly, the securing mechanism 320 may also be referred to as a strap assembly. Two of the straps 30 pass along the sides of the head of a user and one of the straps 30 passes over the rear top portion of the user's head. Additionally, the supplemental face plate 20 is offset from the face of the user, as described above. The position of the securing mechanism 320 and the supplemental face plate 20 may allow a user to wear a hardhat 240, as exemplified in FIGS. 92-94 and 96-97, without causing discomfort to the user. Accordingly, a user may improve their comfort and protection levels without sacrificing comfort and safety. It will be appreciated that, in some embodiments, only one strap 30 may pass behind a person's head and only one strap may pass over the top of a person's head. Accordingly, for example, lower strap 30 in FIG. 96 may optionally not be provided.

In some embodiments, the position of the securing mechanism 320 may allow for a user to wear other forms of protection, such as glasses or goggles, without affecting the protection and/or comfort of the user. The glasses may be positioned on the inner side of the supplemental face plate 20 that faces the user. For example, when the securing mechanism 320 passes along the sides of the head of a user, a user may still be able to wear goggles to protect their eyes. In some embodiments, as described above, a portion of the securing mechanism 320 may pass over the top of the user's head, without interfering with their forehead or face. This positioning allows for a user to wear goggles without affecting the seal of the goggles on the user's face, thereby improving the safety of the user.

Securing Mechanism with Rigid Portions

In accordance with this aspect, which may be used by itself or in combination with one or more other aspects, the securing mechanism used to secure the filter mask to the face of a user may include first and second rigid portions. An advantage of this design is that the first and second rigid portions may be shaped and/or positioned to improve the comfort of the user when wearing the filter mask. Another advantage of this aspect is that the first and second rigid portions may allow a user to wear additional protection, such as a hat, hard hat, sweat band, goggles, glasses, etc. without affecting the comfort of the filter mask.

For example, as exemplified in FIGS. 141-147, the securing mechanism 320 includes a first strap 30*a* having a first side portion 322*a* and a second side portion 322*b*. As exemplified, the first side portion 322*a* extends over a portion of a first lateral side 323*a* of the head of the user (the right side as exemplified in FIG. 145), while the second side portion 322*b* extends over a portion of a second lateral side 323*b* of the head of the user (the left side as exemplified in FIG. 145). As exemplified in FIGS. 142 and 143, the first side portion 322*a* has a mask body engagement end 324*a* and a rearwardly disposed opposed end 326*a*, and the second side portion 322*b* has a mask body engagement end 324*b* and a rearwardly disposed opposed end 326*b*. The mask body engagement ends 324*a*, 324*b* may be coupled to the mask body 12 at the strap attachments 90.

As exemplified in FIGS. 141-147, the side portions 322*a*, 322*b* are rigid. The term "rigid" with respect to the side portions 322*a*, 322*b* is defined as being sufficiently stiff so as not to collapse and put pressure on the left and right sides of the head of a user when the user is wearing the mask 10. Accordingly, the securing mechanism will not apply pressure, or a level of pressure, to the left and right sides of the head of a user that will cause discomfort or pain. The securing mechanism may be shaped so as to not directly (by the side portion itself contacting the side of a head of a user) or indirectly (by the side portion contacting the temples of glasses which are worn by a user) apply pressure to the sides of a hear of a user wearing the mask. This is particularly the case if the user is wearing glasses while wearing the mask. Accordingly, the portion of the securing member that would overlie the temples of glasses may be rigid and shaped so as to not press inwardly on the temples of the glasses and is optionally spaced outwardly from the temples of the glasses. Accordingly, the side portions 322*a*, 322*b* may be made from a rigid plastic, which may include, but is not limited to, ABS, HDPE, nylon, and/or polycarbonate.

It will be appreciated that a strap that includes a rigid portion may have an adjustable length. For example, a rear end of the rigid side portions 322*a*, 322*b* may be connected by an adjustable band 340 and/or the side portions may include a part that has an adjustable length. Adjustable band 340 may be any strap member that has a variable length, such as an elastomeric strap or a non-elastomeric strap that has an adjustable length. Adjustable band 340 may be a single continuous strap member as exemplified by the upper strap 30*a* in FIG. 144A or it may be made of two or more strap members that may be secured together, e.g. by a bracket 360 as exemplified by the lower strap 30*b* in FIG. 144B.

For example, as exemplified in FIGS. 141-144B and 147, the first strap 30*a* may include an adjustable band 340 which is a single continuous strap member that extends between a first end 341 and a second end 343 and which is adjustable at one or both ends 341, 343. As exemplified, the adjustable band 340 extends between the opposed (rear) ends 326*a*, 326*b* of the first and second side portions 322*a*, 322*b* and is coupled to each of the first and second side portions 322*a*, 332*b* by a bracket 342*a*, 342*b* located on each opposed end 326*a*, 326*b* of the side portions 322*a*, 322*b*. For example, the first end 341 of the adjustable band 340 may be fed through the bracket 342*a* on the opposed end 326*a* of the first side portion 322*a*, while the second end 343 is fed through the bracket 342*b* on the opposed end 326*b* of the second side portion 322*b*. The user may then adjust the length of the adjustable band 340. Alternately, or in addition, the adjustable band 340 may include an elastomeric material. The elastomeric adjustable band 340 may provide additional comfort to the user by allowing for added flexibility in adjusting the length of the adjustable band 340.

Alternately, or in addition, as exemplified in FIGS. 145 and 146 the first strap 30*a* may include third and fourth brackets 342*c* and 342*d*. In this embodiment, brackets 342*a*, 342*b* receive the band 340. The third and fourth brackets 342*c*, 342*d* may improve the adjustability of the securing mechanism 320 by allowing the user to adjust the adjustable band 40 at a location towards the rear of the user's head.

Accordingly, the user may adjust the mask 10 by adjusting the length of the first strap 30*a* to improve the comfort when wearing the mask 10. The rigidity of the side portions 322*a*, 322*b* may allow the user to adjust the adjustable band 340 such that the side portions 322*a*, 322*b* are positioned to apply pressure from the first strap 30 to the most comfortable location for the user, which may be the rear side of the head. Accordingly, the side portions 322*a*, 322*b* extend rearwardly from the mask and may contact the head of a user rearward of the acoustic meatus of the head and optionally reward of the temporal bone of the skull. Optionally, only the opposed end 326*a*, 326*b* of the side portions 322*a*, 322*b* may contact the head of a user.

It will be appreciated that the shape of the side portions 322*a*, 322*b* may be designed to improve the comfort of the user by reducing or essentially eliminating contact with the side portions of a head or a user. For example, as exemplified in FIGS. 141-147, the side portions 322*a*, 322*b* may be convex. In other words, the side portions 322*a*, 322*b* may bow away from the lateral sides 323*a*, 323*b* of the head of the user such that pressure is at least reduced along the lateral sides 323*a*, 323*b* of the user's head. In other words, the convex shape of the side portions 322*a*, 322*b* may allow the side portions 322*a*, 322*b* to engage the head of the user further rearward than they would have without the convex shape. For example, the side portions 322*a*, 322*b* may engage the head rearward of the acoustic meatus of the head. Similarly, when a user wears glasses 370, as exemplified in FIGS. 145-146, the convex shape may allow the side portions 322*a*, 322*b* to be positioned laterally outwardly of temples 372 of the glasses 370. In some embodiments, the convex shape may allow the side portions 322*a*, 322*b* to engage the head of the user rearward of the temples 372 of the glasses 370. Engaging the head of the user rearward of the temples 372 of the glasses 370 may improve the comfort of the user by allowing the glasses 370 to rest naturally on the user's head without additional applied pressure from the first strap 30*a*.

Optionally, the side portions 322*a*, 322*b* may be movably attached to the mask. Accordingly, the user may move the side portions 322*a*, 322*b* outwardly when putting the mask on and off. For example the mask body engagement ends 324*a*, 324*b* may be rotatably mounted to the strap attachment members 90. For example, as exemplified in FIG. 143, one or more mask body engagement ends 324*a*, 324*b* may include a hook 328 and each strap attachment 90 may include a hook receiving portion 91. Each hook receiving portion 91 may receive one of the hooks 328 of the mask body engagement ends 324*a*, 324*b*. Optionally, each of the mask body engagement ends 324*a*, 324*b* may be removably rotatably mounted to the strap attachment members 90.

Alternately, a pivot pin may be provided on the mask of the strap. Accordingly one or more of the mask body engagement ends 324*a*, 324*b* may include a pivot pin receiving portion 330 and the strap attachment members 90 may include a pivot pin 93. Referring to FIG. 142, the mask body engagement ends 334*a*, 334*b* of the second strap 30*b* includes a pivot pin receiving portion 330 that loops around the pivot pins 91 on the mask body 12.

During use, the user may rotate the side portions 322*a*, 322*b* about the hook receiving portion 91 or pivot pin 93. Rotating the side portions 322*a*, 322*b* may allow the user to vary the position of applied pressure of the first strap 30*a*, thereby improving the comfort of the user. For example, the user may rotate the side portions 322*a*, 322*b* away from their head to reduce pressure along the lateral sides 323*a*, 323*b* of the user's head. The user may then tighten the adjustable band 340 to ensure a proper fit of the mask 10, while also relieving pressure along the lateral sides 323*a*, 323*b* of the user's head. This relief in lateral pressure along the user's head may be especially helpful when the user is wearing glasses 370, as exemplified in FIGS. 145 and 146. By shifting the pressure point of the side portions 322*a*, 322*b* to, for example, rearward of the temples 372 of the glasses, the user may improve the comfort of the mask 10.

In some embodiments, as exemplified in FIGS. 141-147, the securing mechanism 320 may include a second strap 30*b*. The second strap 30*b* may further improve the comfort of the user by distributing the pressure of the securing mechanism 320 across both straps 30*a*, 30*b*. The second strap 30*b* may also include a rigid portion and may be the same as first strap 30*a*. The second strap 30*b* is vertically displaced from the first strap 30*a* and, as exemplified, is lower than the first strap 30*a*.

As exemplified, the second strap 30*b* includes a first side portion 332*a* and a second side portion 332*b*. The first side portion 332*a* extends over a portion of the first lateral side 323*a* of the head of the user, while the second side portion 332*b* extends over a portion of the second lateral side 323*b* of the head of the user. As exemplified in FIGS. 142 and 143, the first side portion 332*a* has a mask body engagement end 334*a* and a rearwardly disposed opposed end 336*a*, and the second side portion 332*b* has a mask body engagement end 334*b* and a rearwardly disposed opposed end 336*b*. The mask body engagement ends 334*a*, 334*b* may be coupled to the mask body 12 at the strap attachments 90. As exemplified more clearly in FIG. 143, each of the first and second side portions 332*a*, 332*b* of the second strap 30*b* may include an adjustable band 350 for adjusting the length of the second strap 30*b*. Adjustable band 350 may be the same as adjustable band 340.

In some embodiments, each adjustable band 350*a*, 350*b* may be an extension of the first and second side portions 332*a*, 332*b*, respectively, as exemplified in FIGS. 141-146. As exemplified, the second strap 30*b* may include brackets 352*a*, 352*b* for adjusting the length of the second strap 30*b*, which may be any design discussed with respect to first strap 30*a*. For example, as exemplified in FIGS. 141-147, the second strap 30*b* may include a buckle 360 for connecting the first portion 332*a* to the second portion 332*b*. As shown, the buckle 360 may also act as a bracket for adjusting the length of the second strap 30*b*. Accordingly, first ends 351*a*, 351*b* of respective adjustment bands 350*a*, 350*b* may be used to adjust the second strap 30*b* at the brackets 352*a*, 352*b*, while second ends 353*a*, 353*b* of respective adjustment bands 350*a*, 350*b* may be used to adjust the second strap 30*b* at the buckle 360.

In some embodiments, each adjustable band 350*a*, 350*b* may be separate from the first and second side portions 332*a*, 332*b*, as exemplified in FIG. 147. As shown, the opposed ends 336*a*, 336*b* of the first and second side portions 332*a*, 332*b* of the second strap 30*b* include brackets 352*a*, 352*b*. For example, each adjustable band 350*a*, 350*b* may be coupled to the respective side portion 332*a*, 332*b* by bracket 352*a*, 352*b* located on each opposed end 336*a*, 336*b* of the side portions 332*a*, 332*b*. During use, a first end 351*a* of the adjustable band 350*a* is fed through the bracket 352*a* on the opposed end 336*a* of the first side portion 332*a*, while a second end 353*a* is fed through the buckle 360. Similarly, a first end 351*b* of the adjustable band 350*b* is fed through the bracket 352*b* on the opposed end 336*b* of the second side portion 332*b*, while a second end 353*b* is fed through the buckle 360. The user may then adjust the length of each adjustable band 350*a*, 350*b* at one or both of the brackets 352*a*, 352*b* and/or the buckle 360. Optionally, the adjustable bands 350*a*, 350*b* may comprise or consist of an elastomeric material. The elastomeric adjustable bands 350*a*, 350*b* may provide additional comfort to the user by allowing for additional flexibility in adjusting the length of the adjustable bands 350*a*, 350*b*.

In some embodiments, at least a portion of one of the straps 30 may be transparent. For example, in some embodiments, the first and second portions 322*a*, 322*b* of the first strap 30*a* may be transparent. In some embodiments, both the first and second portions 322*a*, 322*b*, 332*a*, 332*b* of the first and second straps 30*a*, 30*b* may be transparent.

It will be appreciated that, while shown with a filter mask 10, the securing mechanism 320 may be used to secure any headwear to the head of a user. For example, the securing mechanism 320 may be used with laboratory goggles, ski goggles, scuba masks, swimming goggles, safety goggles, sports masks, welding masks, and the like.

Securing Mechanism with a Top Strap and Flared Connectors

In accordance with this aspect, which may be used by itself or in combination with one or more other aspects, the securing mechanism used to secure the filter mask to the face of a user may include a top strap 30*c*. The top strap extends over the head of the user and attaches to a connector member on each lateral side of the user's head. The connector members each have flared rigid portion that extends outwardly from the head of the user. An advantage of this design is that the flared rigid portions may be shaped and/or positioned to improve the comfort of the user when wearing the filter mask by reducing the pressure applied to the lateral sides of the head of the user. Another advantage of this aspect is that the top strap may improve the stability of the mask when worn by the user. A further advantage of this aspect is that the flared rigid portions may allow a user to wear additional protection, such as a hat, hard hat, sweat band, goggles, glasses, etc. without affecting the comfort of the filter mask.

As exemplified in FIGS. 148-152, the securing mechanism 320, also referred to as the strap assembly 320, includes a first connector member 380*a* on the first lateral side 323*a* and a second connector member 380*b* on the second lateral side 323*b*. The first connector member 380*a* has a first rigid flared portion 382*a* and the second connector member 380*b* has a second rigid flared portion 382*b*. In some embodiments, as exemplified, the first and second connector members 380*a*, 380*b* may be positioned rearward of the external acoustic meatus of the head. This positioning may improve the comfort of the user by reducing pressure applied to the lateral sides of the user's head.

In some embodiments, the first and second connector members 380*a*, 380*b* may be rigid. For example, the first and second connector members 380*a*, 380*b* may be made of a rigid plastic including, but not limited to, ABS, HDPE, nylon, and/or polycarbonate.

The strap assembly 320 includes a top strap 30*c*, which, when worn by the user, extends over the head of the user. The top strap 30*c* has a first portion 390*a* and a spaced apart second portion 390*b*. When the securing mechanism 320 is assembled, the first portion 390*a* is attached to the first rigid flared portion 382*a* and the second portion 390*b* is attached to the second rigid flared portion 382*b*. As exemplified in FIGS. 148-152, each of the rigid flared portions 382*a*, 382*b* has an aperture 384*a*, 384*b*, respectively. Accordingly, the first portion 390*a* is attached to the first rigid flared portion 382*a* by inserting the first portion 390*a* through the aperture 384*a* and the second portion 390*b* is attached to the second rigid flared portion 382*b* by inserting the second portion 390*b* through the aperture 384*b*. As illustrated, each of the flared rigid portions 382*a*, 382*b* extends outwardly from the head of the user when the mask is worn. It will be appreciated that the top strap 30*c* may be attached to flared rigid portions 382*a*, 382*b* by any other means used with straps for helmets, goggles and the like, such as a snap connector.

It will be appreciated that the angle at which the flared rigid portions 382*a*, 382*b* extend from the head of the user may vary. For example, the flared rigid portions 382*a*, 382*b* may extend upwardly and outwardly at an angle in the range of 70-85°, optionally 80° from a plane 386 in which the rest of the connector member 380*a*, 380*b* extends.

The flared rigid portions 382*a*, 382*b* extending upwardly and outwardly may improve the comfort of the user by reducing pressure along the lateral sides of the user's head. Since the flared rigid portions 382*a*, 382*b* extend away from the head of the user, the top strap 30*c* is spaced away from the head of the user along the lateral sides of the user's head when the mask 10 is worn. Accordingly, the top strap 30*c* provides additional stability to the mask 10 when worn by the user, without causing discomfort due to the connector members 380*a*, 380*b*.

Optionally, the top strap 30*c* may be adjustable. For example, the top strap 30*c* may include or be made of an elastomeric material. Alternately or in addition, the top strap 30*c* may have an adjustable length. As exemplified in FIGS. 148-152, the top strap 30*c* includes a first top strap bracket 392*a* and a second top strap bracket 392*b*. The first top strap bracket 392*a* receives the first portion 390*a* and the second top strap bracket 392*b* receives the second portion 390*b*. Accordingly, a user may adjust the length of the top strap 30*c* using the first and second top strap brackets 392*a*, 392*b*.

The flared rigid portions 382*a*, 382*b* may also improve the comfort of the user when the user adjusts the top strap 30*c*. For example, if the top strap 30*c* is tightened to better secure the mask 10 to the head of the user, the user may pull on the first portion 390*a* and/or the second portion 390*b* to reduce the length of the top strap 30*c* that passes over the head of the user. As the top strap 30*c* is adjusted, the flared rigid portions 382*a*, 382*b* maintain a space between each of the first and second connector members 380*a*, 380*b* and the head of the user. Accordingly, the user may tighten the top strap 30*c* without increasing pressure applied to the lateral sides of the user's head.

In some embodiments, each connector member 380*a*, 380*b* may be rotatable about an axis generally parallel to the head of the user such that the connector members 380*a*, 380*b* rotate when the top strap 30*c* is adjusted. As exemplified in FIG. 152, the top strap 30*c* has been adjusted such that the length of the top strap 30*c* is reduced. Tightening the top strap 30*c* results in the connector members 380*a*, 380*b* rotating, thereby allowing the top strap 30*c* to be tightened without increasing the pressure applied to the lateral sides of the user's head.

As exemplified in FIGS. 148-152, the strap assembly 320 includes the first strap 30*a*, also referred to as a rear strap. The rear strap 30*a*, when worn by the user, extends around a rear portion of the head of the user. As described above, the strap 30*a* includes the first side portion 322*a* and the second side portion 322*b*, each of which may be rigid. In some embodiments, as exemplified, the first and second connector members 380*a*, 380*b* form a part of the first and second side portions 322*a*, 322*b* and may be integrally molded therewith. For example, as illustrated, the first and second connector members 380*a*, 380*b* are located on the first and second brackets 342*a*, 342*b*. Accordingly, the first and second brackets 342*a*, 342*b* are used to secure the adjustable band 340 and the top strap 30*c*.

In some embodiments, as exemplified in FIGS. 148-152, each of the first and second connector members 380*a*, 380*b* may have an additional flared rigid portion 382*c*, 382*d* respectively. An advantage of this design is that the first and second connector members 380*a*, 380*b* may be reversible. In other words, the first and second connector members 380*a*, 380*b* may be used on either the first lateral side or the second lateral side of the user's head.

Eye Shields

In accordance with this aspect, which may be used by itself or in combination with one or more other aspects, a shield may be provided in the volume 28 between the face plate and the face of a user to inhibit or prevent air flowing over the eyes of a user. An advantage of this design is that air may be diverted from flowing in front of the eyes of a user, which may tend to dry the eyes of the user.

As exemplified in FIGS. 38-41, eye shields 168 may be positioned so as to inhibit or prevent air travelling downwardly across a person's eyes or upwardly across a person's eyes.

Anti-Microbial Agent

In accordance with this aspect, which may be used by itself or in combination with one or more other aspects, any or all portions of the filter mask 10 may be provided with a layer of an antimicrobial agent, such as Indian tin oxide, copper, silver, zinc or any combination thereof. Accordingly, the inner surface of the face plate 20 and any or all portions of the air flow path may be coated with, e.g., Indian tin oxide copper, silver, zinc or any combination thereof.

Optionally, the foam filter media 118 may be coated with any such agent (e.g., copper coated reticulated polyurethane foam). Materials, such as copper, produce ions that destroy a virus. Silver will also destroy a virus but requires the presence of moisture. Therefore, if silver is used, a moisture source (e.g., atomized water) to provide moisture to the foam filter media 118 may optionally be provided.

A metal antimicrobial agent may be vapor deposited or applied using a plasma spray to any portion of filter mask 10, including one or more layers of the filter media. Alternately, or in addition, nanoparticles of a metal anti-microbial agent (e.g., nanoparticles of copper, silver, zinc or a mixture thereof) may be applied to foam filter media 118.

Optionally, the metal anti-microbial agent may be applied to an open cell foam to reduce the size of the pores so as to provide an open cell foam having a desired reduced pore size. An advantage of this design is that a more porous open cell foam may be converted to a finer filter material while adding an anti-microbial activity to the foam. For example, an open cell foam such as polypropylene, having 0.2-100 or 0.5-50 or 3-25 micron pores prior to application of the anti-microbial agent may be converted to an open cell foam having, e.g., 0.05-0.1 micron pores after application of the anti-microbial agent Ear Covers In accordance with this aspect, which may be used by itself or in combination with one or more other aspects, filter mask 10 may be provided with ear flaps 86 that overlie the ears to inhibit or prevent droplets from entering the ears of a person wearing the filter mask 10 (see FIG. 1). The ear flaps 86 may merely overlie the ears of the person or they may seat on the head and surround the ears (e.g., like headphones) to enclose the ears.

Cooling

In accordance with this aspect, which may be used by itself or in combination with one or more other aspects, the incoming air may be cooled by exposing the incoming air to water. For example, water may be sprayed, e.g., by an atomizer, to the air being inhaled at a location upstream of the biological filter material 116 and optionally upstream of the more porous filter media (the foam/felt filter media 118, 120). Alternately, or in addition, water may be provided to the more porous filter media (the foam/felt filter media 118, 120). For example, as exemplified in FIG. 11, an atomizer 142 may be provided with a volume to store water. An energy storage member 144 (e.g., a battery or a capacitor) may power the atomizer 142. Atomized water may travel through discharge passage 140 (optionally with the assist of a fan) to provide atomized water to the air being inhaled. It will be appreciated that, in an alternate embodiment, discharge passage may be provided internal of foam filter media 118.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A mask comprising:

(a) a mask body having a front;

(b) a strap assembly securable on a head of a user, the strap assembly comprising, when worn by a user, a first side portion on a first lateral side of a head of the user, a second side portion on a second lateral side of a head of the user and a top strap, a rear end of the first side portion has a first connector member, a rear end of the second side portion has a second connector member, the first connector member has a first rigid flared portion, the second connector member has a second rigid flared portion and the top strap has a first top strap portion and a spaced apart second top strap portion, wherein, when worn by a user, each of the first rigid flared portion and the second rigid flared portion extends outwardly from the head of the user, wherein, when the mask is worn by a user, the top strap extends over the head of the user, the first top strap portion of the top strap is directly attached to the first rigid flared portion, the second top strap portion of the top strap is directly attached to the second rigid flared portion whereby, when worn by a user, the first top strap portion of the top strap that is attached to the first rigid flared portion is spaced from the head of the user and the second top strap portion of the top strap that is attached to the second rigid flared portion is spaced from the head of the user.

2. The mask of claim 1, wherein, when the mask is worn by the user and the top strap extends over the head of the user, each of the first and second rigid flared portions extend upwardly and outwardly at an angle in the range of 70-85° from a plane in which the corresponding rigid flared portion is located.

3. The mask of claim 2, wherein the angle is about 80°.

4. The mask of claim 1, wherein the top strap is adjustable.

5. The mask of claim 4, wherein the adjustable top strap comprises an elastomeric material.

6. The mask of claim 4, wherein the adjustable top strap has an adjustable length.

7. The mask of claim 4, wherein each connector member is rotatable about an axis generally parallel to the head of the user such that the connector member rotates when the top strap is adjusted.

8. The mask of claim 1, wherein the first side portion and the second side portion have convex sections that, when worn by a user, are spaced from the head of the user.

9. The mask of claim 1, wherein the first and second connector members are positioned rearward of the external acoustic meatus of the head.

10. The mask of claim 1, wherein the first and second connector members are rigid.

11. The mask of claim 10, wherein the first and second connector members are made from a rigid plastic.

12. The mask of claim 11, wherein the rigid plastic is acrylonitrile butadiene styrene (ABS), high density polyethylene (HDPE), nylon or polycarbonate.

* * * * *